United States Patent [19]
Harrison

[11] Patent Number: 5,914,082
[45] Date of Patent: Jun. 22, 1999

[54] METHOD AND APPARATUS FOR MOLDING THERMOSETTING POLYMERS ONTO SUBSTRATES

[76] Inventor: Donald G. Harrison, 3302 Mercer, Houston, Tex. 77027

[21] Appl. No.: 08/918,199

[22] Filed: Aug. 25, 1997

Related U.S. Application Data

[63] Continuation-in-part of application No. 08/564,855, Nov. 30, 1995, abandoned.

[51] Int. Cl.⁶ ............................. B29C 45/14; B29C 45/16
[52] U.S. Cl. .................... 264/251; 264/260; 264/328.18; 425/120; 425/121; 425/127; 425/130; 425/543; 425/572; 425/548; 425/549; 425/557
[58] Field of Search ..................... 425/127, 120, 425/121, 125, 543, 130, 571, 572, 548, 549, 557; 264/251, 260, 259, 297.1, 297.2, 297.8, 328.1, 328.2, 328.4, 328.5, 328.6, 328.8, 328.17, 328.18, 328.119

[56] References Cited

U.S. PATENT DOCUMENTS

| | | | |
|---|---|---|---|
| 2,485,323 | 10/1949 | Schwartz | 425/130 |
| 2,591,941 | 4/1952 | Innerfield | 425/125 |
| 2,656,570 | 10/1953 | Harmon et al. | 425/127 |
| 2,697,253 | 12/1954 | Kruft | 425/125 |
| 2,766,484 | 10/1956 | Sanderson | 425/125 |
| 2,926,439 | 3/1960 | Holick | 40/1.5 |
| 3,055,133 | 9/1962 | Anderson | 40/586 |
| 3,193,435 | 7/1965 | Schafer | 428/160 |
| 3,256,626 | 6/1966 | Stoffel | 40/1.5 |
| 3,442,736 | 5/1969 | Duns | 156/85 |
| 3,591,897 | 7/1971 | Perras | 425/543 |
| 3,654,062 | 4/1972 | Loew | 428/164 |
| 3,669,415 | 6/1972 | Nielander | 366/96 |
| 3,705,935 | 12/1972 | Francis et al. | 264/257 |
| 3,861,955 | 1/1975 | Lemelson | 427/131 |
| 3,876,356 | 4/1975 | Fazekas et al. | 425/543 |

(List continued on next page.)

FOREIGN PATENT DOCUMENTS

| | | |
|---|---|---|
| 1319234 | 6/1993 | Canada. |
| 2717739 | 9/1995 | France. |
| 23 56 004 | 5/1975 | Germany. |
| 28 27 149 A 1 | 1/1979 | Germany. |
| 85 33 472 | 3/1986 | Germany. |
| 39 38 966 A 1 | 5/1991 | Germany. |
| 41 32 476 A 1 | 4/1993 | Germany. |
| 59-38017 | 3/1984 | Japan ..................................... 425/121 |
| 6-158527 | 6/1994 | Japan. |
| 2 047 126 | 11/1980 | United Kingdom. |
| 2 241 191 | 8/1991 | United Kingdom. |
| WO 91/10007 | 7/1991 | WIPO. |
| WO 91/12365 | 8/1991 | WIPO. |
| WO 96/24490 | 8/1996 | WIPO. |

OTHER PUBLICATIONS

Hays, W. R., "A New Liquid Processing System for Making Silicone Rubber Parts," *Proceedings of the International Rubber Conference 1979*, pp. 821–827, Venice, Italy, Oct. 3–6, 1979.

Hegele, K., "Eight–Cavity Injection Moulds for Manufacturing Bellows of Silicone Rubber," *Kunststoffe 74* (1984) 12, pp. 714–715 (Translation provided).

Romig, C. A., "Automatic Preparation of Silicone–Rubber Parts," *GAK Aug. 1995 —Issue 38*, pp. 408–409 (Translation provided).

Weise, G., "HTV Liquid Silicone Rubber for the Production of Form Parts in the Injection–Molding Process—an Economic Alternative," *German Rubber Days*, Jun. 13–16, 1983 (Translation provided).

*Primary Examiner*—Robert Davis

[57] ABSTRACT

An apparatus and method for molding thermosetting polymers onto clothing. The apparatus includes at least one molding device, at least one polymer supply and a control system for controlling the operation of the molding devices and polymer supplies. The molding devices include die sets having an input member and a mold. The polymer supplies supply polymers for injection into the input members of the molding devices for use in molding three dimensional bodies of polymers onto substrates such as clothing.

23 Claims, 84 Drawing Sheets

U.S. PATENT DOCUMENTS

| | | | |
|---|---|---|---|
| 3,890,679 | 6/1975 | Simon | 264/252 |
| 4,238,181 | 12/1980 | Dannels et al. | 425/543 |
| 4,264,386 | 4/1981 | Sears, Jr. et al. | 364/322 |
| 4,292,263 | 9/1981 | Hanrahan et al. | 264/46.9 |
| 4,370,115 | 1/1983 | Miura | 425/543 |
| 4,481,160 | 11/1984 | Bree | 264/135 |
| 4,484,360 | 11/1984 | Leighton et al. | 2/22 |
| 4,484,361 | 11/1984 | Leighton et al. | 2/24 |
| 4,493,865 | 1/1985 | Kuhlmann et al. | 2/20 |
| 4,494,247 | 1/1985 | Kelly | 2/16 |
| 4,530,874 | 7/1985 | Hendrix et al. | 427/258 |
| 4,573,216 | 3/1986 | Wortberg | 2/465 |
| 4,631,210 | 12/1986 | McGee et al. | 428/13 |
| 4,645,629 | 2/1987 | Stern | 425/174.2 |
| 4,686,766 | 8/1987 | Dubbs et al. | 264/271.1 |
| 4,693,769 | 9/1987 | Fritz et al. | 264/129 |
| 4,709,443 | 12/1987 | Bigley | 264/266 |
| 4,710,145 | 12/1987 | Vandis | 446/100 |
| 4,806,391 | 2/1989 | Shorin | 427/288 |
| 4,810,559 | 3/1989 | Fortier et al. | 428/161 |
| 4,815,149 | 3/1989 | Erhardt et al. | 2/403 |
| 4,818,829 | 4/1989 | Nopper et al. | 264/261 |
| 4,837,864 | 6/1989 | Thill | 2/244 |
| 4,838,965 | 6/1989 | Bussard | 156/83 |
| 4,849,145 | 7/1989 | Hirsch | 264/46.4 |
| 4,876,805 | 10/1989 | Peoples | 36/43 |
| 4,910,886 | 3/1990 | Sullivan et al. | 36/44 |
| 4,922,929 | 5/1990 | DeJournett | 2/16 |
| 4,923,848 | 5/1990 | Akada et al. | 156/235 |
| 4,926,502 | 5/1990 | Miyamura | 2/44 |
| 4,933,120 | 6/1990 | D'Amato et al. | 264/1.4 |
| 4,956,040 | 9/1990 | Fry | 156/267 |
| 4,963,208 | 10/1990 | Muncy et al. | 156/145 |
| 4,982,447 | 1/1991 | Henson | 2/462 |
| 4,987,613 | 1/1991 | Loverdi et al. | 2/23 |
| 5,005,219 | 4/1991 | Diaz | 2/244 |
| 5,014,354 | 5/1991 | Dumont | 2/23 |
| 5,014,358 | 5/1991 | Matumori | 2/94 |
| 5,033,939 | 7/1991 | Brasel | 264/125 |
| 5,048,123 | 9/1991 | Monson | 2/69 |
| 5,065,475 | 11/1991 | Watt | 16/114 R |
| 5,073,222 | 12/1991 | Fry | 156/267 |
| 5,075,899 | 12/1991 | Funahashi et al. | 2/19 |
| 5,087,193 | 2/1992 | Herbert, Jr. | 425/543 |
| 5,093,067 | 3/1992 | Gibson | 264/273 |
| 5,101,580 | 4/1992 | Lyden | 36/93 |
| 5,139,566 | 8/1992 | Zimmerman | 264/251 |
| 5,146,628 | 9/1992 | Herrmann et al. | 2/169 |
| 5,151,239 | 9/1992 | King, Jr. | 264/272.11 |
| 5,153,007 | 10/1992 | Watkins | 425/407 |
| 5,168,576 | 12/1992 | Krent et al. | 2/267 |
| 5,173,968 | 12/1992 | Fox | 2/244 |
| 5,188,981 | 2/1993 | Stiles et al. | 428/198 |
| 5,200,208 | 4/1993 | Cohen et al. | 425/572 |
| 5,200,263 | 4/1993 | Gould et al. | 428/323 |
| 5,205,892 | 4/1993 | Gagliani et al. | 264/510 |
| 5,210,877 | 5/1993 | Newman | 2/115 |
| 5,229,144 | 7/1993 | Kuntz | 425/557 |
| 5,236,324 | 8/1993 | Konieczny et al. | 425/139 |
| 5,241,919 | 9/1993 | LaGreca | 112/410 |
| 5,281,499 | 1/1994 | Bussard | 156/267 |
| 5,296,182 | 3/1994 | Thary | 244/46.5 |
| 5,304,547 | 4/1994 | Mentink et al. | 552/545 |
| 5,309,840 | 5/1994 | Takamura et al. | 101/488 |
| 5,314,767 | 5/1994 | Bussard | 156/251 |
| 5,316,820 | 5/1994 | Harpell et al. | 428/109 |
| 5,328,652 | 7/1994 | Thompson | 264/51 |
| 5,337,418 | 8/1994 | Kato et al. | 2/44 |
| 5,362,349 | 11/1994 | Zoller | 156/309.9 |
| 5,364,387 | 11/1994 | Sweeney | 604/411 |
| 5,364,584 | 11/1994 | Imanara et al. | 264/510 |
| 5,368,930 | 11/1994 | Samples | 2/2.5 |
| 5,398,345 | 3/1995 | Kenneth et al. | 2/247 |
| 5,405,312 | 4/1995 | Jacobs | 602/5 |
| 5,418,980 | 5/1995 | Kelly | 2/170 |
| 5,419,475 | 5/1995 | Naritomi | 264/273 |
| 5,423,087 | 6/1995 | Krent et al. | 2/267 |
| 5,435,007 | 7/1995 | Kalvestran et al. | 2/16 |
| 5,455,129 | 10/1995 | Bussard | 430/1 |
| 5,460,873 | 10/1995 | Ogawa et al. | 427/369 |
| 5,487,861 | 1/1996 | Reeder et al. | 264/134 |
| 5,494,621 | 2/1996 | Sugisaki et al. | 264/328.12 |
| 5,510,911 | 4/1996 | Sharpe et al. | 264/1.34 |
| 5,542,171 | 8/1996 | Juskey et al. | 264/130 |
| 5,545,128 | 8/1996 | Hayes et al. | 602/61 |
| 5,551,082 | 9/1996 | Stewart et al. | 2/227 |

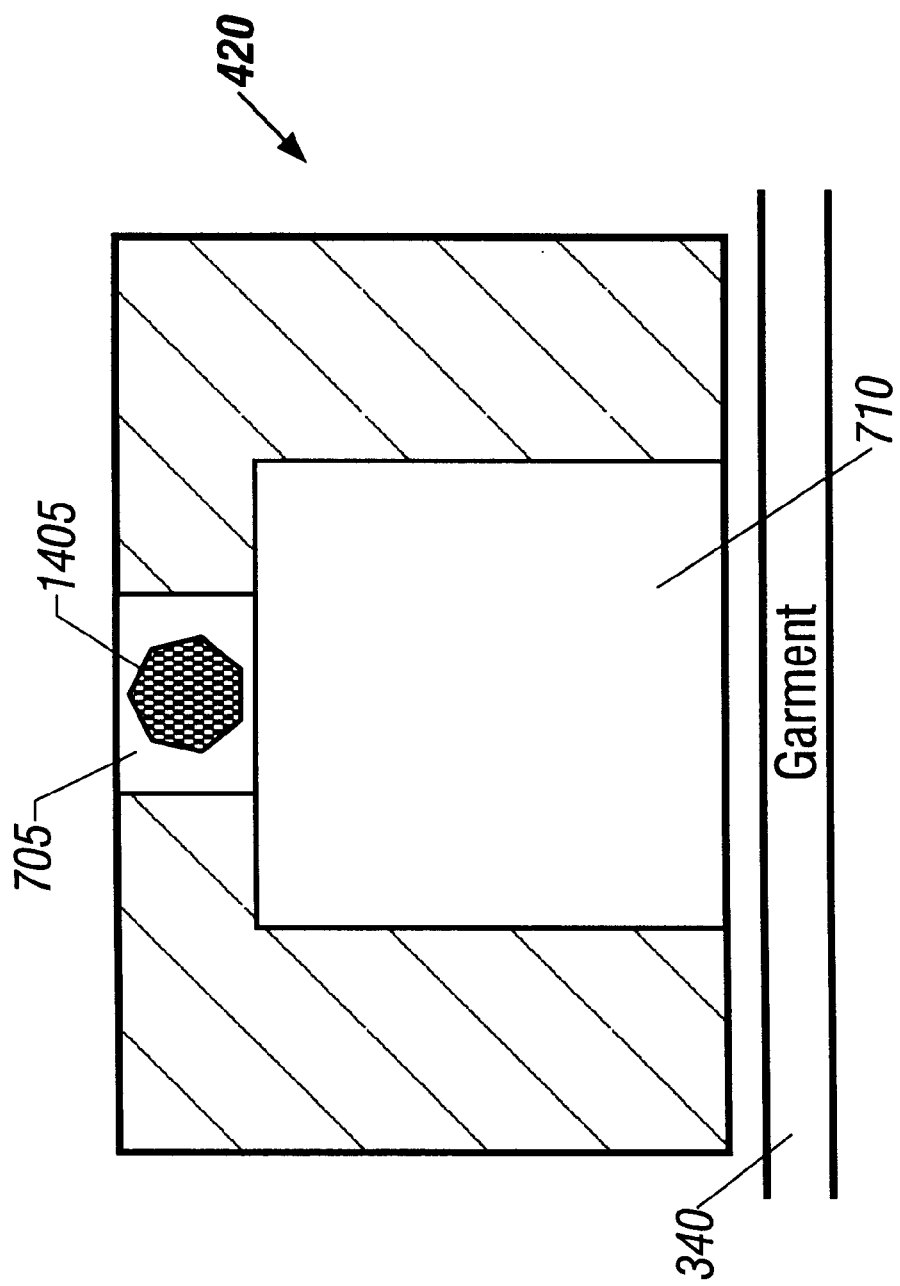

5,914,082

METHOD AND APPARATUS FOR MOLDING THERMOSETTING POLYMERS ONTO SUBSTRATES

CROSS REFERENCE TO RELATED APPLICATIONS

This application is a continuation-in-part of patent application Ser. No. 564,855, filed on Nov. 30, 1995 and now abandoned. The subject matter of this application is related to that of application Ser. Nos. 08/920,195, 08/918,199, 08/918,215, 08/918,302 and 08/918,303, all of which were filed on Aug. 25, 1997.

BACKGROUND OF THE INVENTION

1. Field of the Invention

This invention relates generally to apparatus and methods for molding thermosetting polymers, and more particularly to apparatus and methods for molding thermosetting polymers onto substrates.

2. Background

The use of logos and other types of graphical display on articles of clothing is widespread. To date, the use of such graphic media has generally been limited to two dimensional flat display media such as, for example, silk screen. This presents many shortcomings to marketers of consumer goods. The present invention is directed to overcoming these shortcomings.

SUMMARY OF THE INVENTION

According to one aspect of the present invention, a die set for use in a molding device for molding at least one body of a thermosetting polymer onto at least one substrate is provided that includes an input member adapted to receive and distribute at least one supply of polymer, and a mold adapted to receive a distribution of at least one polymer and mold at least one body of the polymer onto a substrate.

BRIEF DESCRIPTION OF THE DRAWINGS

FIG. 5b is a top view of the manifold of FIG. 5a;

FIG. 5c is a bottom view of the manifold of FIG. 5a;

FIG. 5d is a cross-sectional view of the manifold of FIG. 5a;

FIG. 6b is a top view of the runner plate of FIG. 6a;

FIG. 6c is a bottom view of the runner plate of FIG. 6a;

FIG. 7b is a top view of the mold of FIG. 7a;

FIG. 7c is a bottom view of the mold of FIG. 7a;

FIG. 9b is a preferred embodiment of the platen of FIG. 9a;

FIG. 11b is an illustration of the die set of FIG. 11a;

FIG. 11e is an alternative preferred embodiment of the molding device of Figure 11a;

FIG. 12b is an illustration of the flow control valve of the manifold of FIG. 12a;

FIG. 13b is an illustration of an alternative preferred embodiment of the manifold of FIG. 13a;

FIG. 13d is an illustration of an alternative preferred embodiment of the manifold of FIG. 13a;

FIG. 14a is an illustration of the dripping of silicone resin during the molding process;

FIG. 14b is an illustration of a preferred solution for the dripping problem of FIG. 14a;

FIG. 20b is a perspective illustration of a particularly preferred embodiment of the injector of FIG. 20a;

FIG. 25b is a cross-sectional view illustrating the skim coating of FIG. 25a;

FIG. 28a is an illustration of the application of an adhesion promoter onto a surface of the body of silicone, or some other thermosetting polymer, of FIG. 27a;

FIG. 30a is an illustration of the secondary body of FIG. 24 bonded to the primary body of FIG. 28a;

FIG. 33b is an illustration of a three dimensional body of silicone, or some other thermosetting polymer, including encapsulated elements made by the method illustrated in FIG. 33a.

DESCRIPTION OF THE PREFERRED EMBODIMENTS

A method and apparatus for molding silicone onto clothing is provided that permits a plurality of multi-colored, three-dimensional bodies of silicone to be placed upon and permanently affixed to a plurality of articles of clothing. More generally, the method and apparatus may be applied to the application of silicone moldings onto any substrate such as, for example, paper, cardboard, wood, leather, wire mesh, sponge or foam rubber. More generally still, the teachings of the present disclosure may also be applied to the application of three-dimensional molded bodies of any number of commercially available thermosetting polymers such as, for example, silicone, nitrile rubber, or urethane onto any substrate such as, for example, paper, cardboard, wood, leather, wire mesh, sponge or foam rubber. More generally still, the teachings of the present disclosure may be applied to the application of a plurality of three dimensional bodies of a plurality of different types of thermosetting polymers onto substrates such as, for example, silicone, nitrile rubber or urethane and nitrile rubber, silicone or urethane. Therefore, the disclosure of preferred embodiments for molding three dimensional bodies of silicone onto articles of clothing is meant to be illustrative and not limiting.

A method and apparatus for encapsulating elements within three dimensional bodies of silicone is also provided that permits one or more elements to be encapsulated within a three dimensional body of silicone. More generally, the method and apparatus may be applied to the encapsulation of one or more elements into three dimensional bodies of any number of thermosetting polymers such as, for example, silicone, urethane or nitrile rubber. Therefore, the disclosure of preferred embodiments for encapsulating elements into three dimensional bodies of silicone is intended to be illustrative and not limiting.

Figure 1:
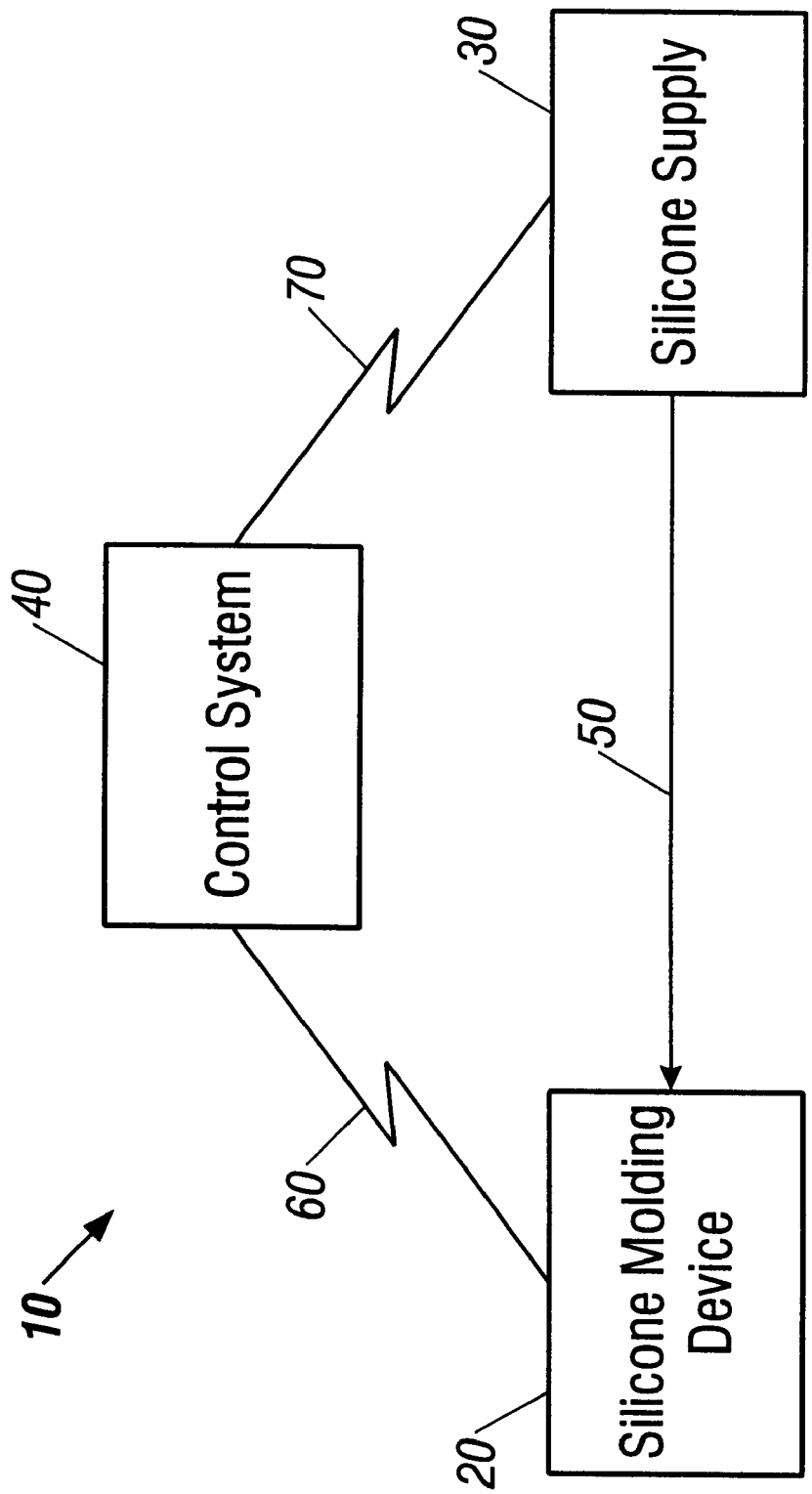
FIG. 1 is an illustration of an apparatus for molding three dimensional bodies of silicone, or some other thermosetting polymer, onto articles of clothing, or some other substrate.

Referring initially to FIG. 1, an apparatus 10 for molding three dimensional bodies of silicone onto an article of clothing will now be described. The apparatus 10 includes a silicone molding device 20, a silicone resin supply 30 and a control system 40. The apparatus 10 permits a three-dimensional silicone body to be molded onto an article of clothing, such as, for example, a pair of jeans, a shirt, a hat, or a purse, in order to display a trademark, logo, advertising, etc. This further permits the creation of textured surfaces. More generally, as will be described below, the apparatus 10 permits a three-dimensional body of any thermosetting polymer to be molded onto substrates.

The silicone molding device 20 may comprise any number of conventional silicone molding devices, modified in accordance with the teachings of the present disclosure, adapted to mold three dimensional bodies of silicone onto articles of clothing. More generally, the molding device 20 may comprise any number of conventional thermosetting polymer molding devices, modified in accordance with the teachings of the present disclosure, adapted to mold three dimensional bodies of thermosetting polymer onto substrates.

The silicone resin supply 30 may comprise any number of conventional silicone resin supplies, modified in accordance with the teachings of the present disclosure, and adapted to provide a controlled amount of silicone resin to the silicone molding device 20. The silicone resin supply 30 provides a controlled supply of silicone resin, or other thermosetting polymer resin, to the silicone molding device 20 using a conventional supply conduit 50. In a preferred embodiment, the silicone resin supply 30 will comprise a plurality of silicone supplies to thereby permit the molding device 20 to simultaneously mold a plurality of silicone bodies of a plurality of colors onto an article of clothing. Examples of such silicones include at least the following: GE LIM 3745, GE LIM 6030, GE LIM 6045, GE LIM 6050 and GE LIM 6745, all commercially available from General Electric, Silicone Products Division, Waterford, N.Y.

Alternatively, and more generally, the silicone resin supply 30 will instead provide a controlled amount of any number of commercially available thermosetting polymer resins such as, for example, silicone, urethane, or nitrile rubber to the molding device 20.

Alternatively, and more generally, the silicone resin supply 30 will comprise a plurality of resin supplies and will simultaneously provide a plurality of thermosetting polymer resins such as, for example, silicone, urethane or nitrile rubber to the molding device 20.

The control system 40 may comprise any number of conventional programmable general purpose computers or controllers, modified in accordance with the teachings of the present disclosure. The control system 40 communicates with, monitors and controls the operation of the silicone molding device 20 and the silicone resin supply 30 using conventional communications busses 60 and 70 using conventional communication protocols.

Alternatively, the control system 40 may comprise hard-wired logic adapted to provide control of the various elements of the embodiments of the present disclosure. Alternatively, the control system 40 may comprise manual control by one or more operators of the embodiments of the present disclosure. Alternatively, the control system 40 may comprise any combination of programmable control, hard-wired logic, and manual operator control adapted to provide control of the various elements of the embodiments of the present disclosure.

Figure 2:
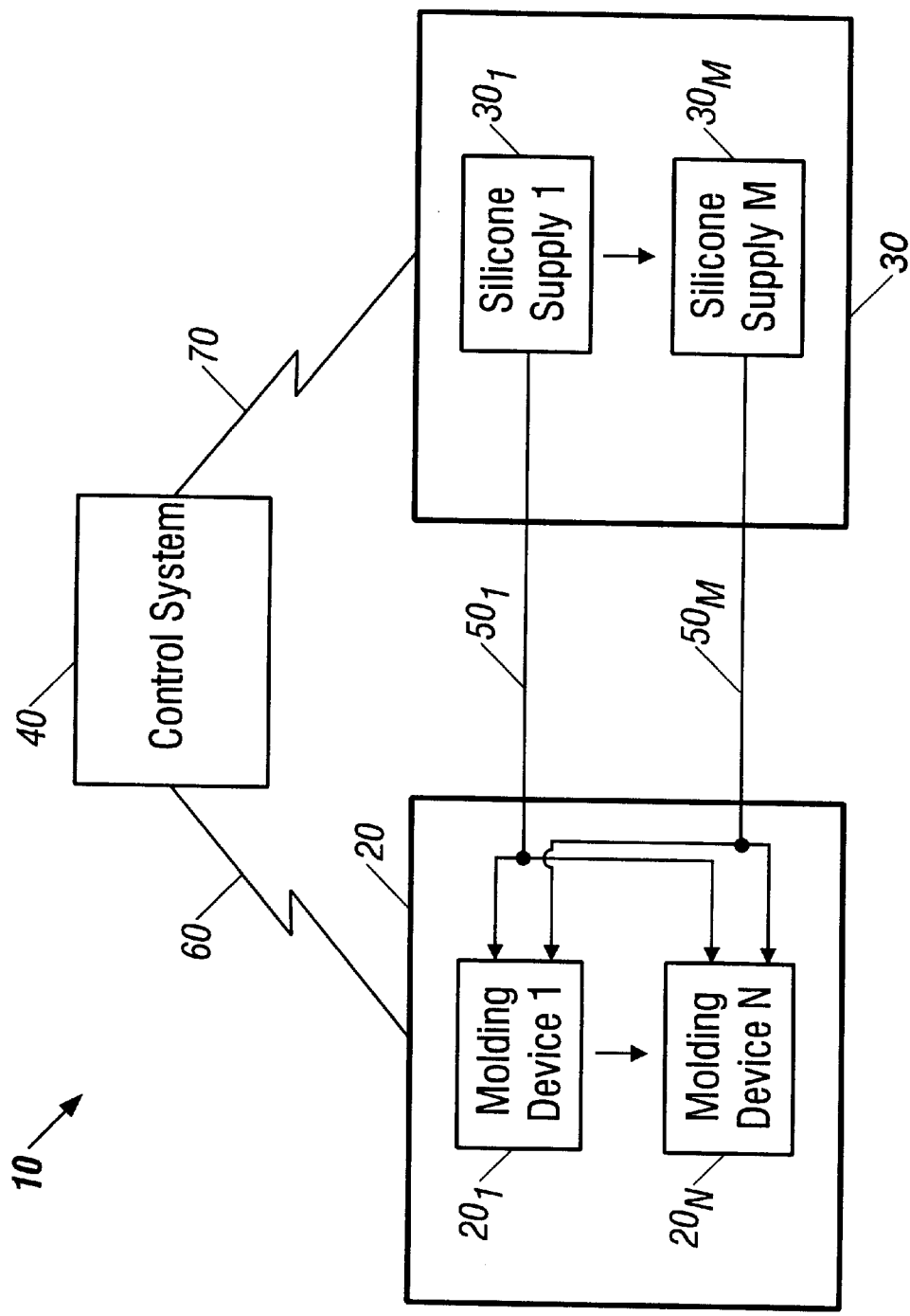
FIG. 2 is an illustration of an apparatus for molding multi-colored three dimensional bodies of silicone, or some other thermosetting polymer, onto a plurality of article of clothing, or some other substrates.
Figure 3:
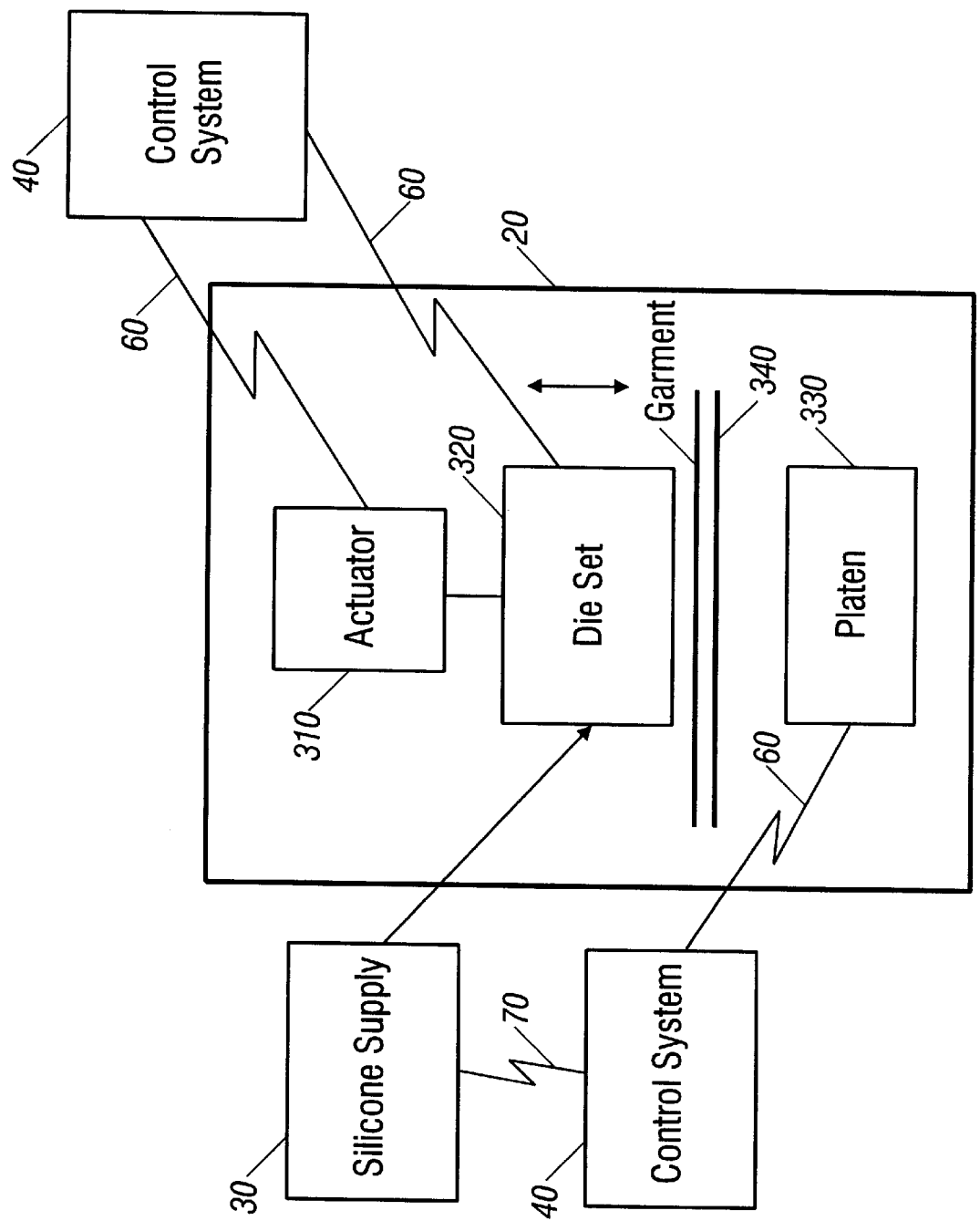
FIG. 3 is an illustration of an apparatus for molding three dimensional bodies of silicone, or some other thermosetting polymer, onto an article of clothing, or some other substrate.

More generally, in a particularly preferred embodiment, referring now to FIG. 2, the apparatus 10 for molding three dimensional bodies of silicone onto articles of clothing includes a plurality of molding devices or stations $20_1$ to $20_N$, a plurality of supplies of silicone resin $30_1$ to $30_M$, and a control system 40. In this manner, the apparatus 10 is able to substantially simultaneously mold a plurality of three dimensional bodies of silicone onto a plurality of articles of clothing. Furthermore, the plurality of supplies of silicone resin 30 of the apparatus 10 permit a plurality of colors of silicone to be provided to each of the molding devices or stations 20. Consequently, a different mix of colors can be provided to each molding device or station 21 permitting a different pattern of three dimensional silicone bodies to be molded onto articles of clothing at each molding device or station 21. Thus, the apparatus 10 provides a flexible and easily programmable and reconfigurable device for molding three dimensional silicone bodies onto articles of clothing for use in displaying such material as trademarks, logos or advertising on articles of clothing such as shirts, pants, hats, purses, etc. . .

More generally, the apparatus 10 may be utilized to mold a plurality of three dimensional bodies of any number of commercially available thermosetting polymers substantially simultaneously onto a plurality of substrates. More generally still, the apparatus 10 may be utilized to mold a plurality of three dimensional bodies of a plurality of different types of thermosetting polymers substantially simultaneously onto a plurality of substrates.

Referring now to FIGS. 3, 4, 4a and 4b, a preferred embodiment of a molding device or station 20 will be described. The molding device 20 includes an actuator 310, a die set 320 and a platen 330. In operation, the molding device 20 molds at least one three dimensional body of silicone onto a garment or article of clothing 340. Examples of such silicone materials include at least the following: GE LIM 3745, GE LIM 6030, GE LIM 6045, GE LIM 6050 and GE LIM 6745, all commercially available from General Electric, Silicone Products Division, Waterford, N.Y.

More generally, the molding device 20 may be used to mold at least one three dimensional body of a thermosetting polymer such as, for example, silicone, urethane, or nitrile rubber onto a substrate such as, for example, cloth, paper, cardboard, wood, leather, wire mesh, sponge or foam rubber.

More generally still, the molding device 20 may be used to mold a plurality of three dimensional bodies of a plurality of types of thermosetting polymers, such as, for example, silicone, urethane or nitrile rubber and nitrile rubber, silicone or urethane onto a substrate such as, for example, cloth, paper, wood, leather, wire mesh, cardboard, sponge or foam rubber. In this manner, thermosetting polymers having similar time and temperature curing profiles may be simultaneously molded onto substrates.

The actuator 310 controllably moves the die set 320 into and out of engagement with the garment 340 under the control of the control system 40. The actuator may comprise any number of conventional actuators such as, for example, pneumatic, hydraulic or electromechanical actuators. The movement of the actuator 310 may be controlled using a combination of any number of conventional feedback control sensors and algorithms such as, for example, proportional-integral-differential. In a preferred embodiment, the actuator 310 is a hydraulic actuator model no. DIVW4CWSWF, including pressure feedback to prevent damage to the article of clothing 340 during engagement with the die set 320, available from Parker-Hannifin located in Elyria, Ohio. In this manner, delicate articles of clothing 340 are not damaged during engagement with the die set 320. In a particularly preferred embodiment, the contact pressure of the die set 320 with the article of clothing 340 is limited to the range of about 50 to 300 psi. Alternatively, and more generally, the preferred range of contact pressures will vary as a function of the particular type and thickness of the substrate 340.

During engagement of the die set 320 with the article of clothing 340, the die set 320 receives at least one supply of silicone resin from the silicone resin supply 30, molds at least one body of silicone onto the article of clothing 340, cures at least one body of silicone onto the article of clothing 340, and disengages from the article of clothing 340 under the control of the control system 40. The die set 320 may comprise any number of conventional die sets for molding thermosetting polymers onto substrates, modified in accordance with the teachings of the present disclosure.

Figure 4:
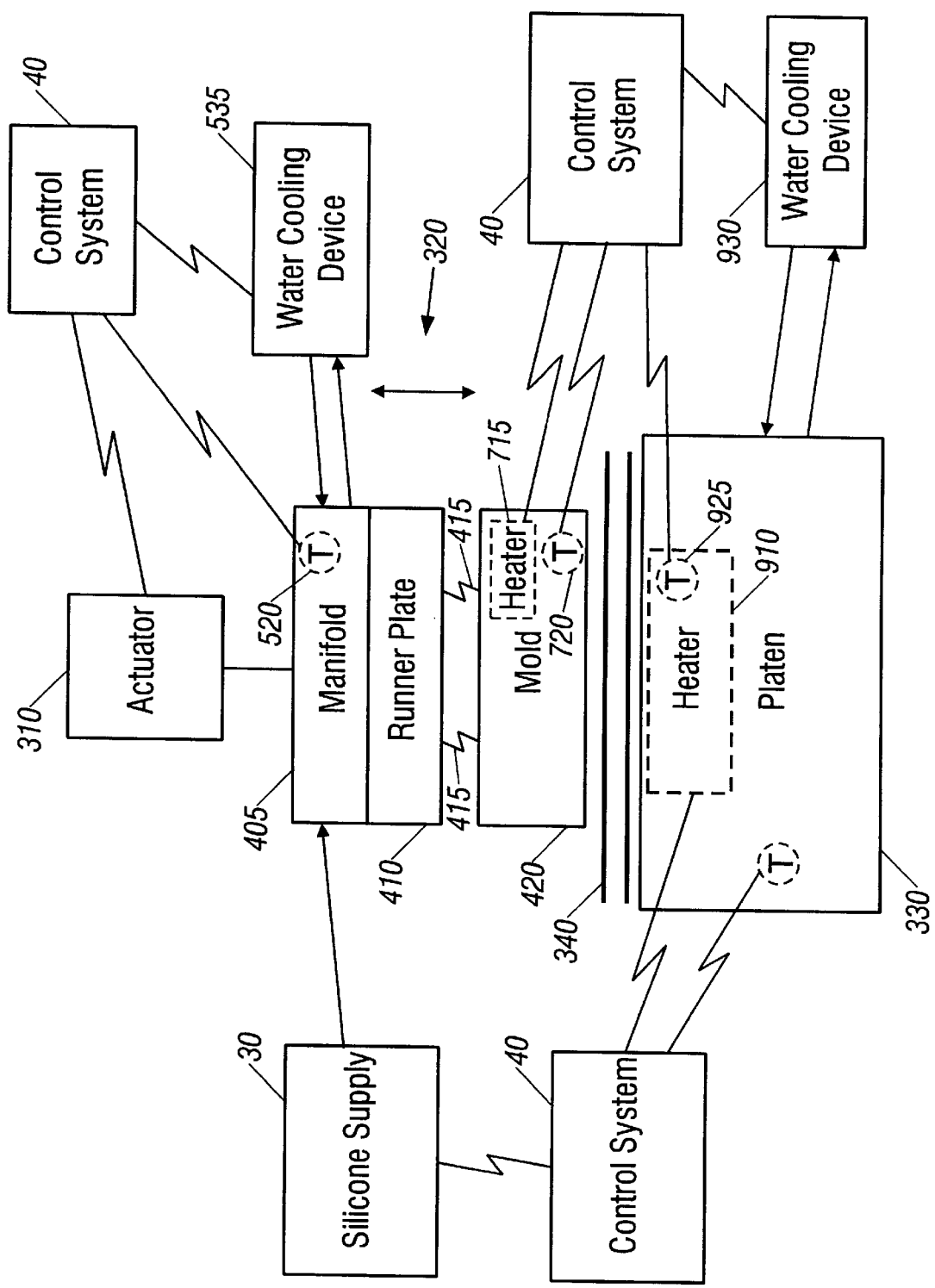
FIG. 4 is another illustration of a preferred embodiment of an apparatus for molding three dimensional bodies of silicone, or some other thermosetting polymer, onto articles of clothing, or some other substrates.
Figure 4A:
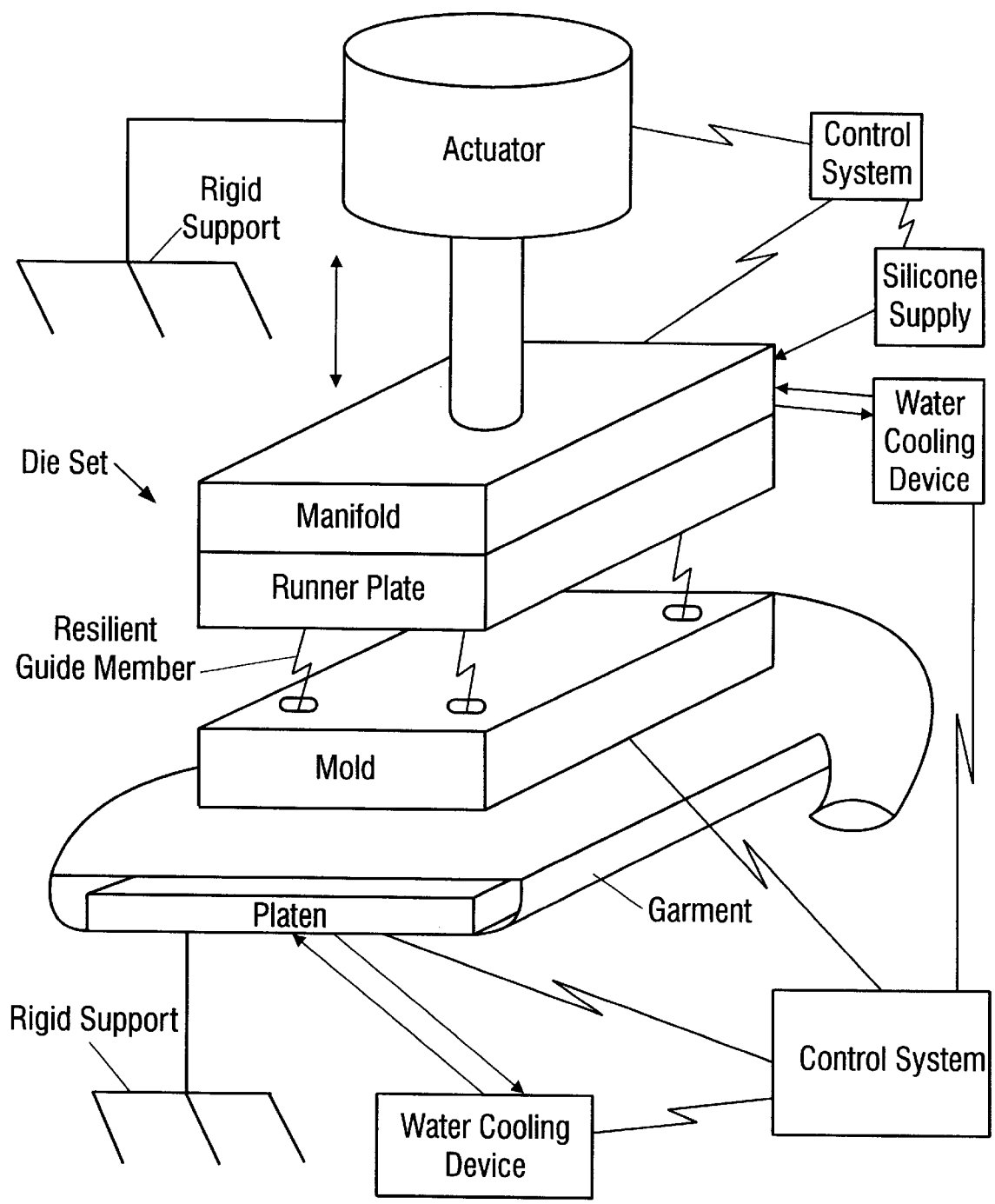
FIG. 4a is a perspective view of the apparatus of FIG. 4 in a disengaged position.
Figure 4B:
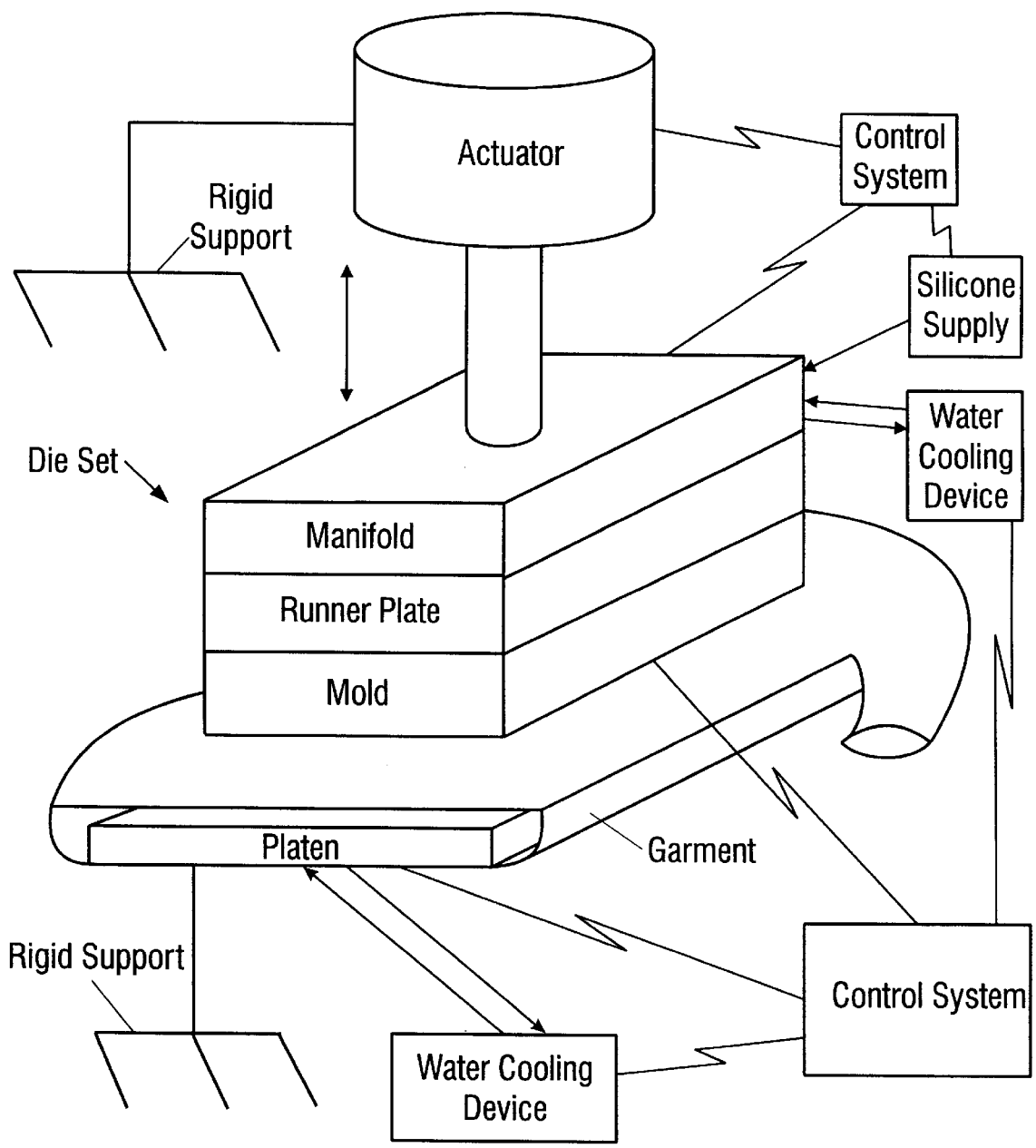
FIG. 4b is a perspective view of the apparatus of FIG. 4 in an engaged position.

In a preferred embodiment, as illustrated in FIGS. 4, 4a and 4b, the die set 320 includes a manifold 405, a runner plate 410, one or more resilient guide members 415, and a mold 420. During engagement of the die set 320 with the article of clothing 340, the manifold 405 receives at least one supply of silicone resin from the silicone resin supply 30 and transmits it to the runner plate 410. The runner plate 410 in turn receives at least one supply of silicone resin from the manifold 405 and distributes at least one supply of silicone resin to the mold 420. The mold 420 in turn receives the distribution of at least one supply of silicone resin and forms and molds at least one three dimensional body of silicone onto the garment 340. Examples of such silicone resins include at least the following: GE LIM 3745, GE LIM 6030, GE LIM 6045, GE LIM 6050 and GE LIM 6745, all commercially available from General Electric, Silicone Products Division, Waterford, N.Y.

Alternatively, during engagement of the die set 320 with the article of clothing 340, the manifold 405 may receive at least one supply of a thermosetting polymer resin such as, for example, silicone, urethane or nitrile rubber from the silicone resin supply 30 and transmit it to the runner plate 410.

Alternatively, and more generally, during engagement of die set 320 with the article of clothing 340, the manifold 405 may receive supplies of a plurality of different types of thermosetting polymer resins such as, for example, silicone, urethane or nitrile rubber and nitrile rubber, silicone or urethane from the silicone resin supply 30 and transmit it to the runner plate 410. In this manner, thermosetting polymers having similar time and temperature curing profiles may be simultaneously molded onto a substrate.

The resilient guide members 415 resiliently couple the runner plate 410 and the mold 420. As illustrated in FIGS. 4a and 4b, during engagement of the die set 320 with the garment 340, the resilient members 415 deflect and permit the runner plate 410 to cooperatively interact with the mold 420 thereby permitting the passage of silicone from the runner plate 410 to the mold 420. Otherwise, the resilient guide members 415 thermally isolate the runner plate 410 from the mold 420. In this manner, heat transfer between mold 420 and the manifold 405 and runner plate 410 are minimized to prevent curing of silicone within the manifold 405 and runner plate 410 during operation of the molding device 20. In a preferred embodiment, a plurality of such resilient guide members 415 are employed to provide even resilient force.

Figure 4C:
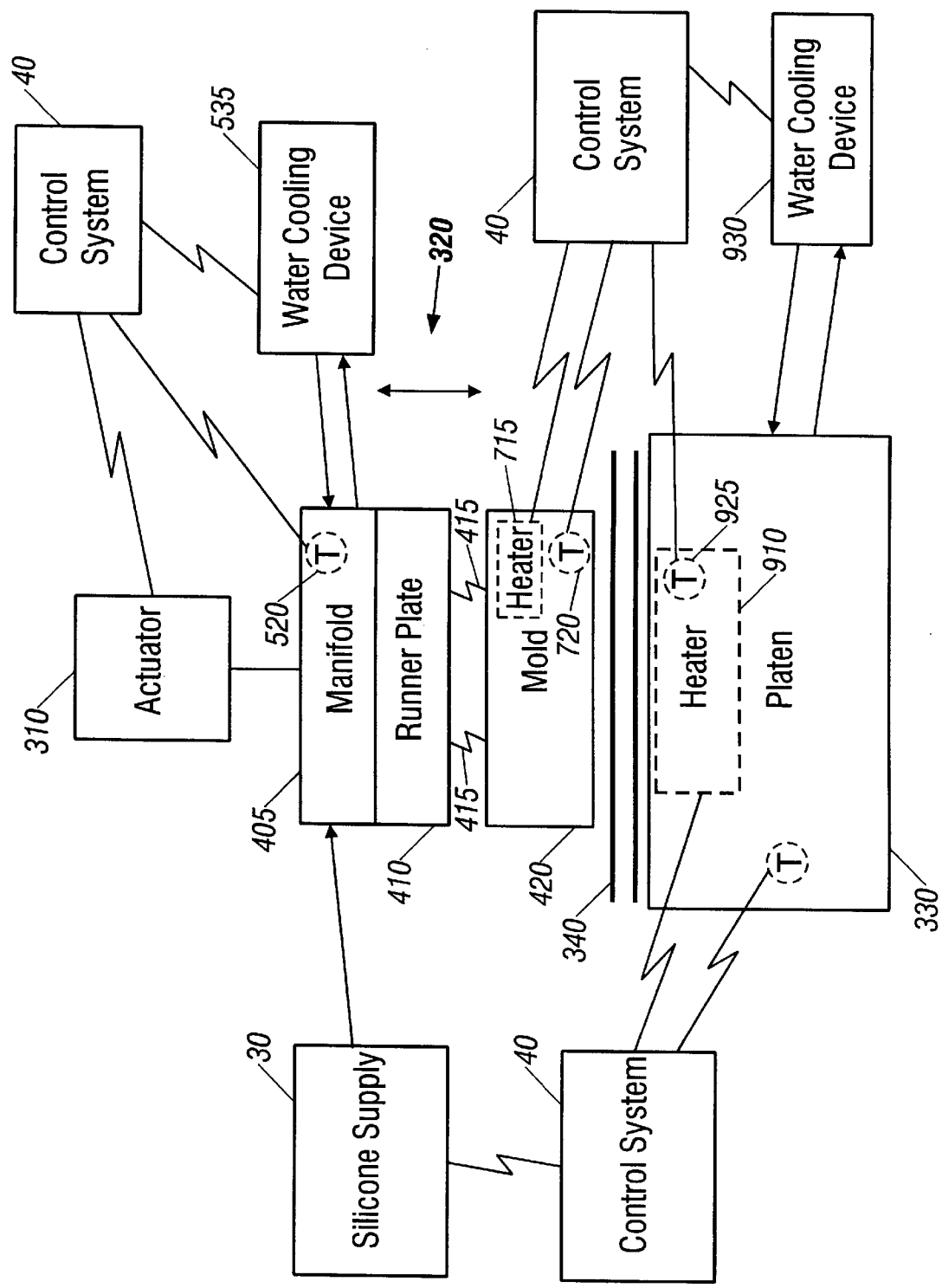
FIG. 4c is an alternative preferred embodiment of the apparatus of FIG. 4 in which the manifold and runner plate are combined.
Figure 5A:
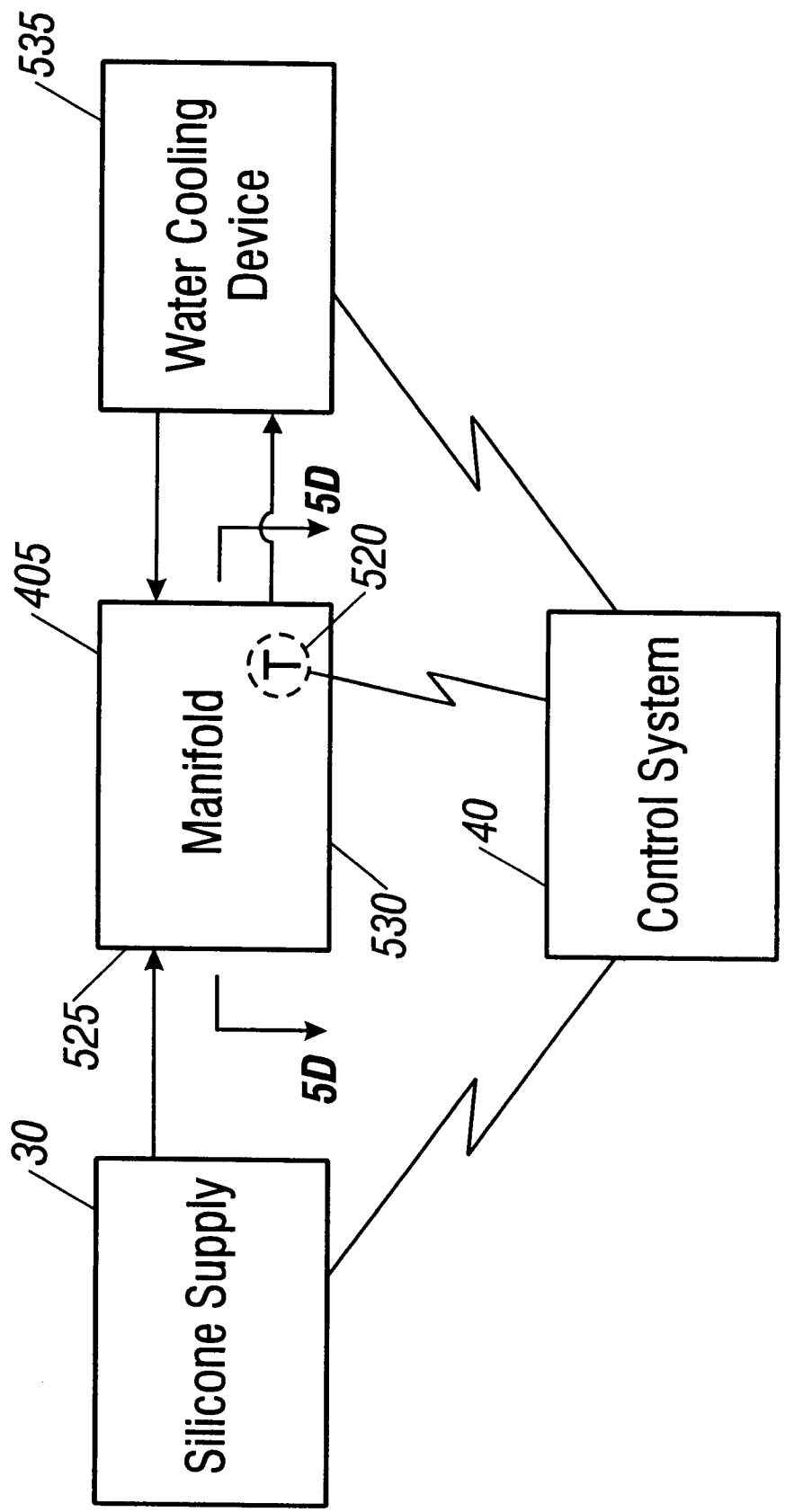
FIG. 5a is a front view of the manifold of FIG. 4.
Figure 5B:
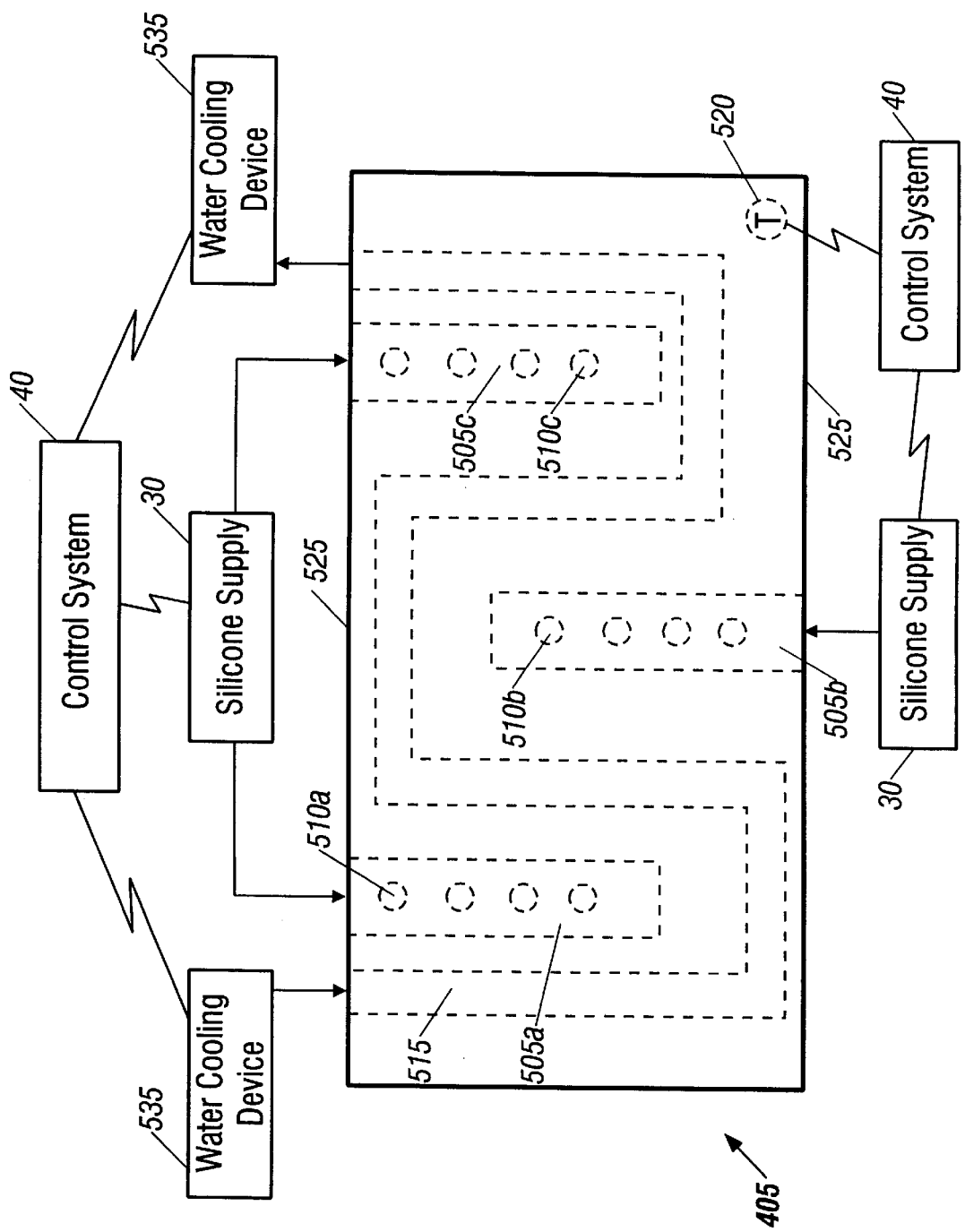
Figure 5C:
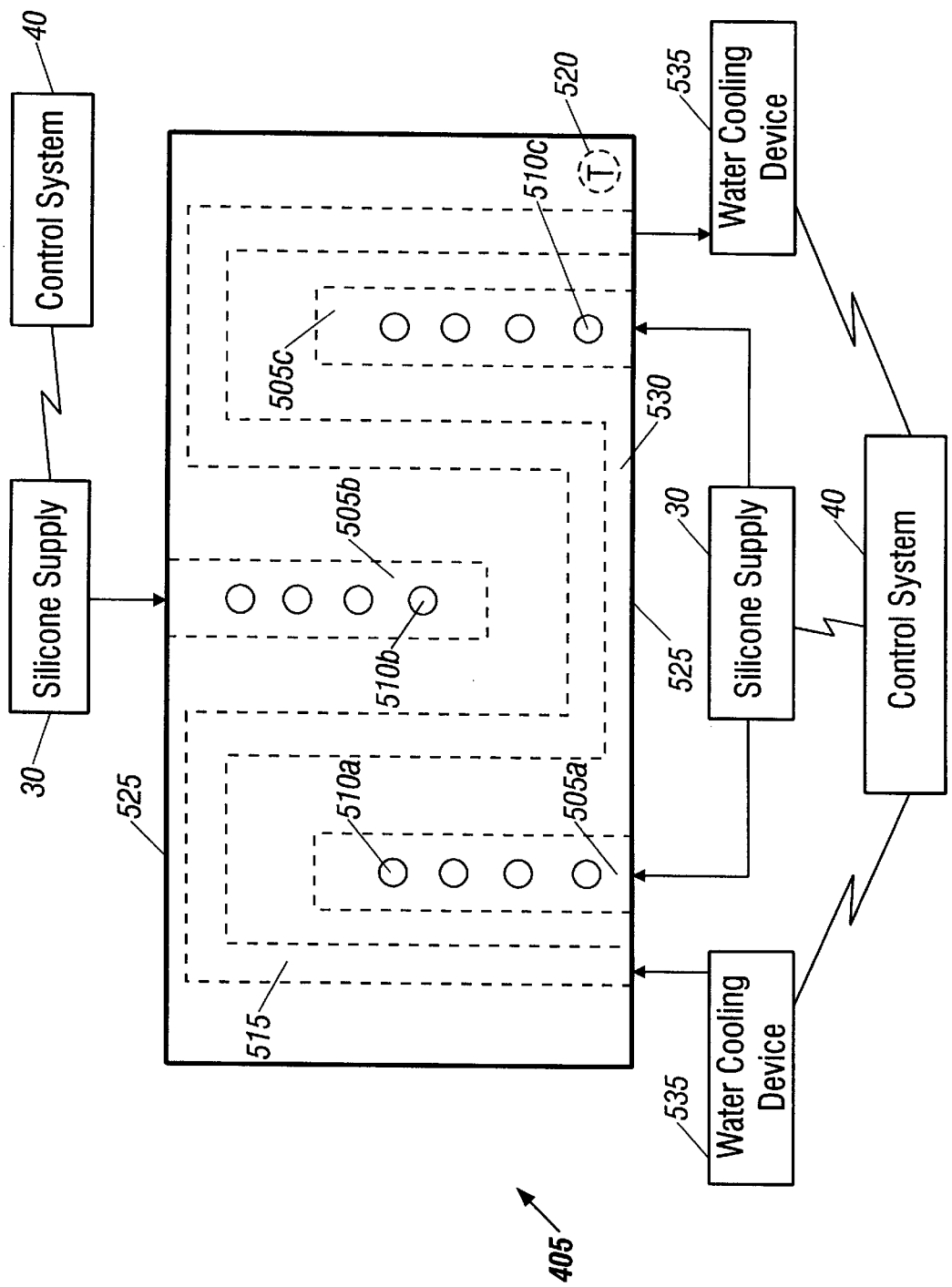
Figure 5D:
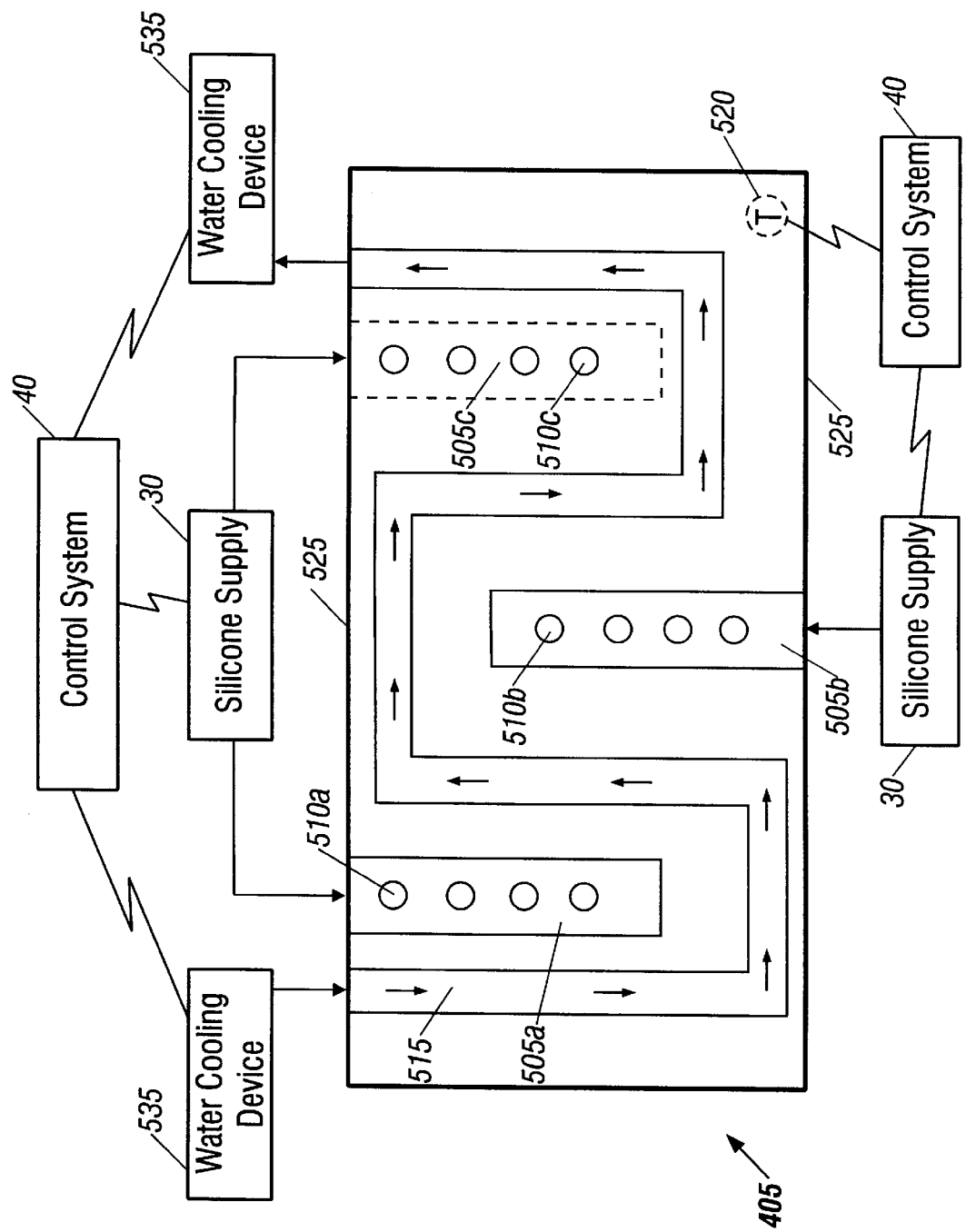

In an alternative preferred embodiment, as illustrated in drawing FIG. 4c, the manifold 405 and runner plate 410 of drawing FIG. 4 are combined into a combined manifold/runner plate 425 in order to both reduce the number of parts in the die set 320 and permit the transmission and distribution of greater numbers of silicone resin supplies resulting in greater silicone resin pressures. In this alternative preferred embodiment, the flow passages are formed in a single body using conventional fabrication processes. In a preferred embodiment, the flow passages are formed using investment casting and CNC machining. In a preferred embodiment, the combined manifold/runner plate 425 is further modified to incorporate the various enhancements of the preferred embodiments of the manifold 405 and runner plate 410 described below.

In a preferred embodiment, as illustrated in FIGS. 5a–5d, the manifold 405 includes a plurality of silicone resin inlet passages 505a–505c, a plurality of corresponding silicone outlet passages 510a–510c, a cooling element 515, and a temperature sensor 520.

Each of the silicone resin inlet passages 505a–505c receive a supply of silicone resin from a corresponding silicone resin supply 30 and convey the silicone supply to corresponding silicone resin outlet passages 510a–510c. The silicone resin supply 30 may comprise one or more silicone supplies. In this manner, each of the silicone resin inlet passages 505a–505c may receive a different supply of silicone resin. The silicone resin outlet passages 510a–510c in turn communicate with corresponding silicone resin inlet passages located within the runner plate 410. In this manner, the manifold 405 receives at least one silicone supply and transmits at least one silicone supply to the runner plate 410.

Alternatively, the manifold 405 may receive at least one supply of a thermosetting polymer such as, for example, silicone, nitrile rubber or urethane for transmission to the runner plate 410. Alternatively, and more generally, the manifold 405 may substantially simultaneously receive supplies of a plurality of different types of thermosetting polymers for transmission to the runner plate 410 such as, for example, silicone, urethane or nitrile rubber and urethane, nitrile rubber or silicone. In this manner, thermosetting polymers having similar time and temperature curing profiles may be simultaneously molded onto substrates.

The silicone resin inlet passages 505a–505c are contained within the body of the manifold 405. The silicone resin inlet passages 505a–505c are defined by openings positioned in one or more sides of the body of the manifold 405 that extend into the body of the manifold 405. In a particularly preferred embodiment, the silicone resin inlet passages 505a–505c extend from openings formed in one or more side surfaces 525 of the body of the manifold 405. The silicone resin inlet passages 505a–505c are preferably positioned substantially normal to the direction of the silicone resin outlet passages 510a–510c. The cross-sectional shape of the silicone resin inlet passages 505a–505c are preferably substantially circular.

The cross-sectional areas of the silicone inlet passages 505a–505c may range, for example, from about 0.010 to 10 square inches for typical silicone materials to provide improved flow characteristics. In a preferred embodiment, the cross-sectional areas of the silicone resin inlet passages 505a–505c range from about 0.100 to 1 square inches in order to provide optimum flow characteristics for typical silicone materials. The preferred physical characteristics will differ depending upon the types of thermosetting polymers employed.

The silicone resin outlet passages 510a–510c are contained within the body of the manifold 405. The silicone resin outlet passages 510a–510c extend from corresponding silicone resin inlet passages 510a–510c to openings in a bottom face 530 of the body of the manifold 405. The silicone resin outlet passages 510a–510c may include one or more passages. In a preferred embodiment, a plurality of substantially evenly distributed silicone resin outlet passages 510–510c are provided extending substantially perpendicular to a side face 525 of the manifold 405. In this manner, the manifold 405 may be used with any runner plate 410 by virtue of its modular design that will accommodate different configurations of runner plate silicone resin inlet passages.

The cross-sectional areas of the silicone resin outlet passages 510a–510c may range, for example, from about 0.010 to 10 square inches for typical silicone materials to provide improved flow characteristics. In a preferred embodiment, the cross-sectional areas of the silicone resin outlet passages 510a–510c range from about 0.100 to 1 square inches to provide optimum flow characteristics for typical silicone materials. The preferred physical characteristics will differ depending upon the types of thermosetting polymers employed.

The silicone inlet passages 505a–505c and the silicone resin outlet passages 510a–510c may be formed in the manifold 405 using any number of conventional fabrication processes. In a preferred embodiment, the silicone resin inlet passages 505a–505c and silicone resin outlet passages 510a–510c are formed in the manifold 405 by CNC machining.

The cooling element 515 controllably maintains the operating temperature of the manifold 405 within a predetermined range of temperatures. In a preferred embodiment, for typical grades of silicone, the cooling element 515 maintains the operating temperature of the manifold 405 between approximately 55 and 60° F. For typical grades of silicone resins, this preferred range of operating temperatures provides a silicone material having a paste-like quality that in turn minimizes unwanted flow and dripping of the silicone material within the die set 320. The preferred operating temperature ranges will differ depending upon the types of thermosetting polymers employed.

In a preferred embodiment, the cooling element 515 is a fluid passage located within the body of the manifold 405 that conveys a cooling fluid such as, for example, water through the body of the manifold 405 to control the operating temperature of the manifold 405. In a preferred embodiment, the molding device 20 further includes a water cooling device 535 that provides a controlled supply of water, or other cooling fluid, for passage through the cooling element 515. In a preferred embodiment, the cooling device 535 is a Thermal Transfer RC Series Model No. RC 0.75-RC2, available from Thermal Transfer Products, Ltd. in Buffalo, N.Y. In a particularly preferred embodiment, the output signal from a conventional temperature sensor 520 is then utilized by the control system 40 to provide feedback control of the operating temperature of the manifold 405 using a conventional control algorithm.

In the preferred embodiment, the fluid passage of the cooling element 515 may be formed in the body of the manifold 405 by brazing a thermally conductive fluid conduit onto a surface of the manifold 405. In a particularly preferred embodiment, the fluid passage of the cooling element 515 is formed in the body of the manifold 405 by investment casting.

The manifold 405 may be fabricated from any number of conventional thermally conductive materials such as, for example, aluminum. The manifold 405 may be fabricated using any number of conventional fabrication processes such as, for example, computer controlled machining. In a preferred embodiment, the manifold is fabricated from aluminum by the process of CNC machining.

In a preferred embodiment, as illustrated in FIGS. 6a–6d, the runner plate 410 includes a plurality of silicone resin inlet passages 605a–605c, a plurality of corresponding silicone resin distribution channels 610a–610c, a plurality of corresponding silicone resin outlet passages 615a–615c, and a plurality of corresponding silicone resin outlet nozzles 620a–620c.

The silicone resin inlet passages 605a–605c of the runner plate 410 receive silicone resin from the corresponding silicone resin outlet passages 510a–510c of the manifold 405. The silicone resin inlet passages 605a–605c transmit silicone resin to corresponding silicone resin distribution channels 610a–610c. The silicone resin distribution channels 610a–610c are necessitated by the particular configuration of the mold cavities of the mold 420. The silicone resin distribution channels 610a–610c transmit silicone resin to corresponding silicone resin outlet passages 615a–615c. The silicone resin outlet passages 615a–615c transmit silicone resin to corresponding mold cavities within the mold 420. The transmission of silicone from the silicone resin outlet passages 615a–615c to the mold cavities of the mold 420 is facilitated by the silicone resin outlet nozzles 620a–620c that extend from a bottom surface 625 of the runner plate 410 and into complementary shaped silicone resin inlet passages within the mold 420.

The silicone resin inlet passages 605a–605c are contained within the body of the runner plate 410. The silicone resin inlet passages 605a–605c are defined by openings positioned in a top face 630 of the runner plate 410 that extend into the body of the runner plate 410. The silicone resin inlet passages 605a–605c preferably extend substantially normal to the top face 630 of the runner plate 410. The silicone resin inlet passages 605a–605c of the runner plate 410 are preferably larger in cross-section than the corresponding silicone resin outlet passages 510a–510c of the manifold 405. In operation, the die set 320 is assembled with bottom face 530 of the manifold 405 in intimate contact with the top face 630 of the runner plate 410. In this manner, silicone resin passes from the silicone resin outlet passages 510a–510c of the manifold 405 to the corresponding silicone resin inlet passages 605a–605c of the runner plate 410.

The cross-sectional areas of the silicone inlet passages 605a–605c may range, for example, from about 0.001 to 10 square inches for typical silicone materials to provide improved flow characteristics. In a preferred embodiment, the cross-sectional areas of the silicone resin inlet passages 605a–605c range from about 0.100 to 1 square inches in order to provide optimum flow characteristics for typical silicone materials. The preferred physical characteristics will differ depending upon the types of thermosetting polymers employed.

The silicone resin distribution passages 610a–610c are contained within the body of the runner plate 410. The silicone resin distribution passages 610a–610c extend from the silicone resin inlet passages 605a–605c to the silicone resin outlet passages 615a–615c. In this manner, the silicone resin distribution channels 610a–610c transmit silicone resin from corresponding silicone resin inlet passages 605a–605c to corresponding silicone resin outlet passages 615a–615c. The silicone resin distribution passages 610a–610c are preferably defined by channels positioned and formed in the top face 630 of the runner plate 410 that extend into the body of the runner plate 410. In operation, the die set 320 is assembled with bottom face 530 of the manifold 405 in intimate contact with the top face 630 of the runner plate 410. Therefore, in the preferred embodiment, the silicone resin distribution channels 610a–610c are defined by the channels formed in the top face 630 of the runner plate 410 and the bottom surface 530 of the manifold 405.

The cross-sectional areas of the silicone resin distribution passages 610a–610c may range, for example, from about 0.010 to 10 square inches for typical silicone materials to provide improved flow characteristics. In a preferred embodiment, the cross-sectional areas of the silicone resin inlet passages 610a–610c range from about 0.100 to 1 square inches in order to provide optimum flow characteristics for typical silicone materials. The preferred physical characteristics will differ depending upon the types of thermosetting polymers employed.

The silicone resin outlet passages 615a–615c are contained within the body of the runner plate 410. The silicone resin outlet passages 615a–615c are defined by openings positioned in the bottom face 625 of the runner plate 410 that extend into the body of the runner plate 410. The silicone resin outlet passages 615a–615c preferably extend substantially normal to the bottom face 625 of the runner plate 410. The silicone resin outlet passages 615a–615c of the runner plate 410 are preferably smaller in cross-section than the corresponding silicone resin distribution passages 610a–610c. In operation, during engagement of the die set 320 with the garment 340, the bottom face 625 of the runner plate is placed in intimate contact with a top face of the mold 420. In this manner, silicone resin passes from the silicone resin outlet passages 615a–615c of the runner plate 410 to the corresponding silicone resin inlet passages of the mold 420.

The cross-sectional areas of the silicone resin outlet passages 615a–615c may range from about 0.010 to 10 square inches for typical silicone materials to provide improved flow characteristics. In a preferred embodiment, the cross-sectional areas of the silicone resin outlet passages 615a–615c range from about 0.100 to 1 square inches in order to provide optimum flow characteristics for typical silicone materials. The preferred physical characteristics will differ depending upon the types of thermosetting polymers employed.

Figure 6A:
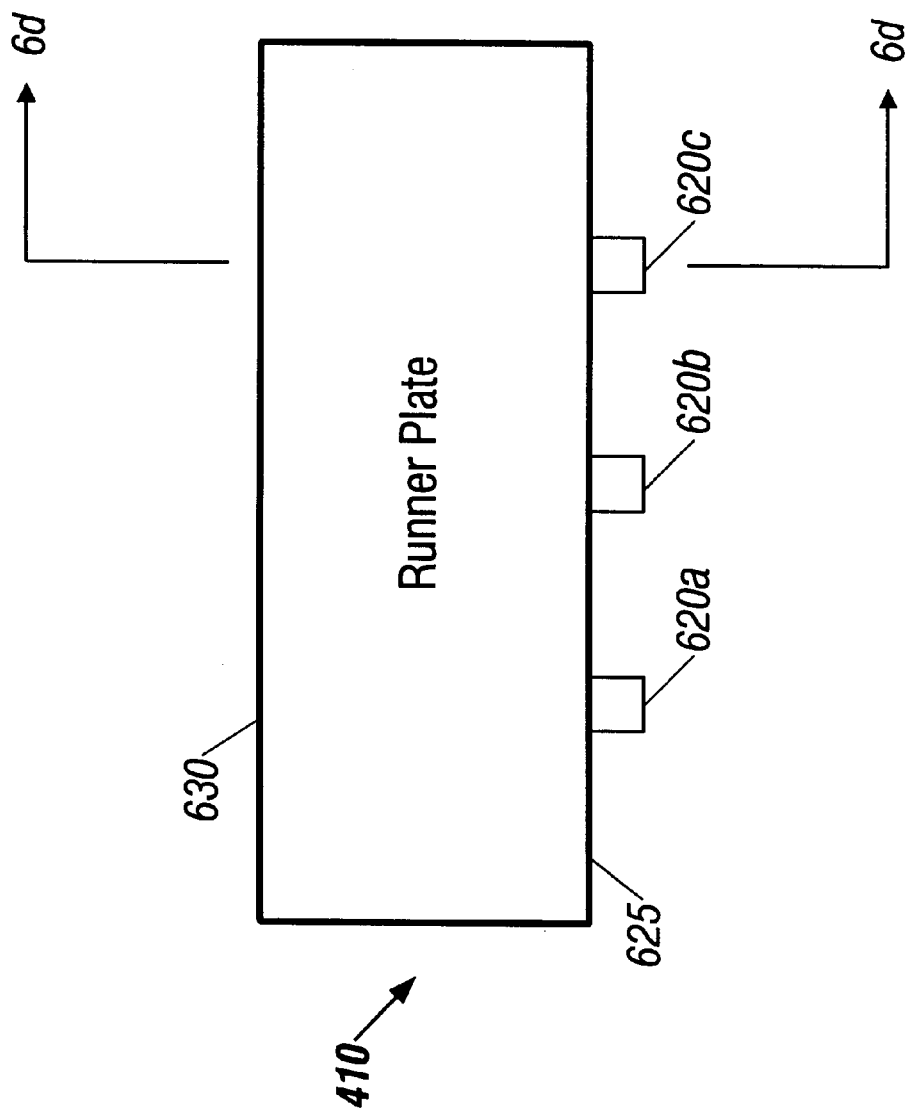
FIG. 6a is a front view of the runner plate of FIG. 4.
Figure 6B:
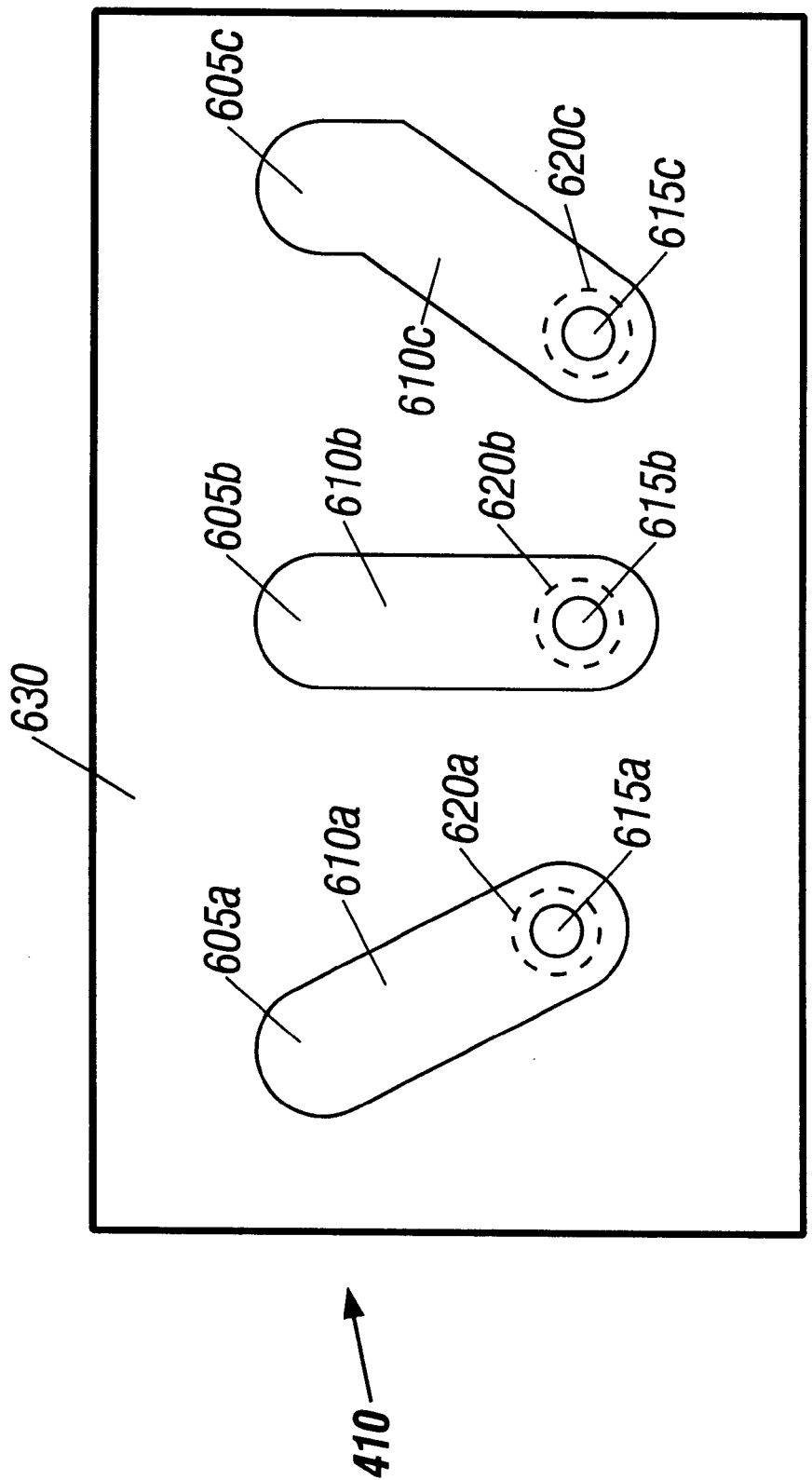
Figure 6C:
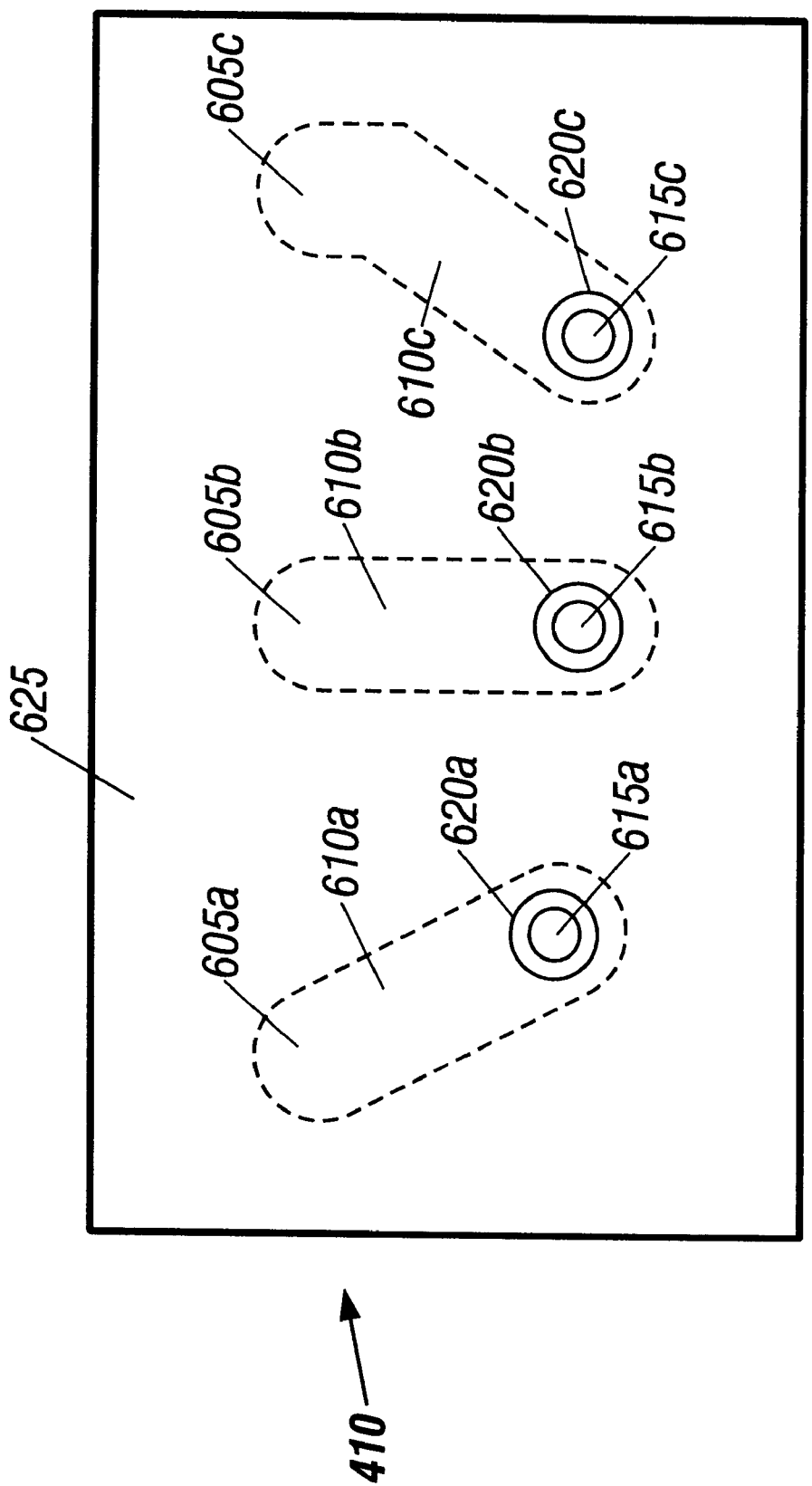
Figure 6D:
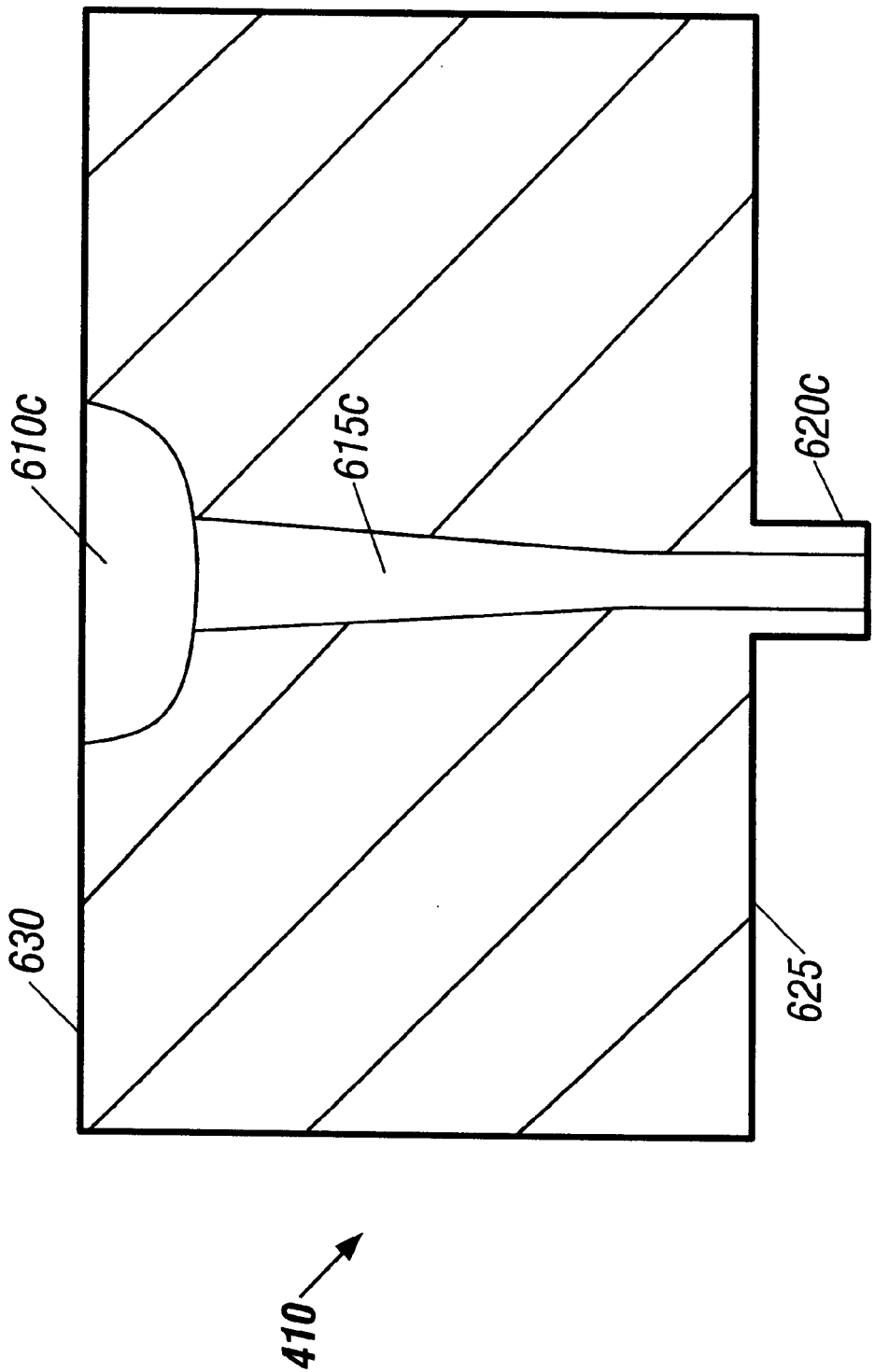
FIG. 6d is a cross-sectional view of the runner plate of FIG. 6a illustrating the nozzles used in the runner plate.

In a particularly preferred embodiment, that transmission of silicone resin from the silicone resin outlet passages 615a–615c to the corresponding silicone resin inlet passages of the mold 420 is facilitated by the silicone resin outlet nozzles 620a–620c. As illustrated in FIGS. 6a and 6d, the silicone resin outlet nozzles 620a–620c extend from the bottom face 625 of the runner plate 410. In operation, during engagement of the die set 320 with the garment 340, the silicone resin outlet nozzles 620a–620c cooperatively interact with complementary shaped silicone resin inlet passages in a top face of the mold 420. The silicone resin outlet nozzles 620a–620c may be formed as integral parts of the runner plate using conventional fabrication processes. In a preferred embodiment, the silicone resin outlet nozzles 620a–620c are separable from the runner plate 410 and comprised of a durable material having a reduced thermal conductivity such as, for example, beryllium copper or ceramic. In this manner, heat transfer from the mold 420 during engagement with the runner plate 410 is reduced to thereby minimize or prevent the curing of silicone resin within the flow passages of the runner plate 410 and manifold 405.

Figure 6E:
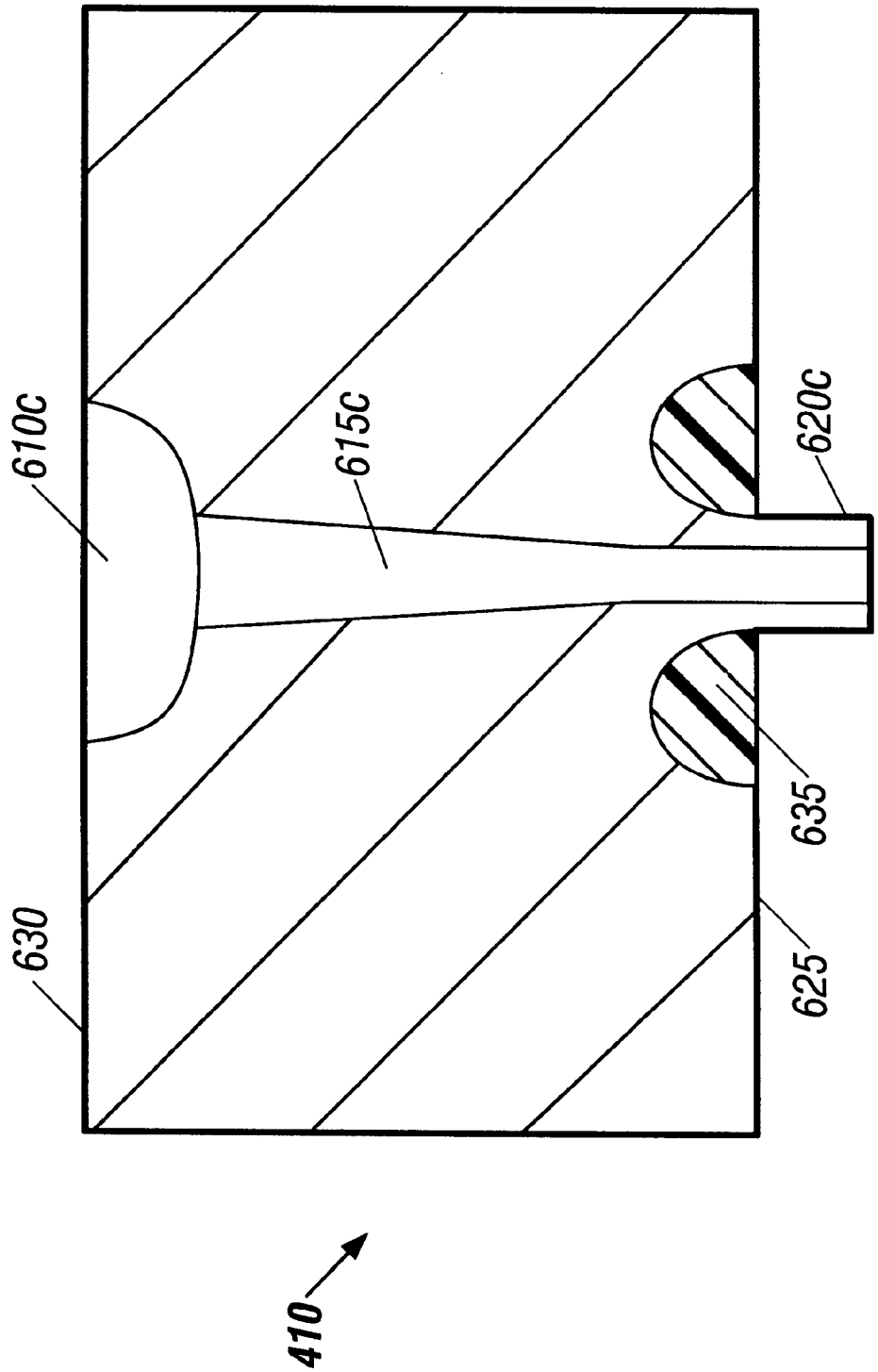
FIG. 6e illustrates an alternative preferred embodiment of the nozzle of FIG. 6d.

In an alternative preferred embodiment, as illustrated in FIG. 6e, a thermal insulating element 635 is added that substantially circumscribes the silicone outlet nozzle 620 to further minimize heat transfer from the mold 420 to the runner plate 410 during engagement of the die set 320 with the garment 340. In a preferred embodiment, the thermal insulating element 635 is fabricated from nitrile rubber.

The runner plate 410 may be fabricated from any number of durable materials such as, for example, aluminum, copper, brass, steel, ceramic, or composite materials. In a preferred embodiment, the runner plate 410 is fabricated from aluminum. The runner plate may be fabricated using any number of conventional fabrication processes. In a preferred embodiment, the runner plate 410 is fabricated by CNC machining.

The resilient guide members 415 resiliently couple the runner plate 410 to the mold 420. The resilient guide members 415 further maintain the alignment of the mold 420 with respect to the runner plate 410.

Figure 8A:
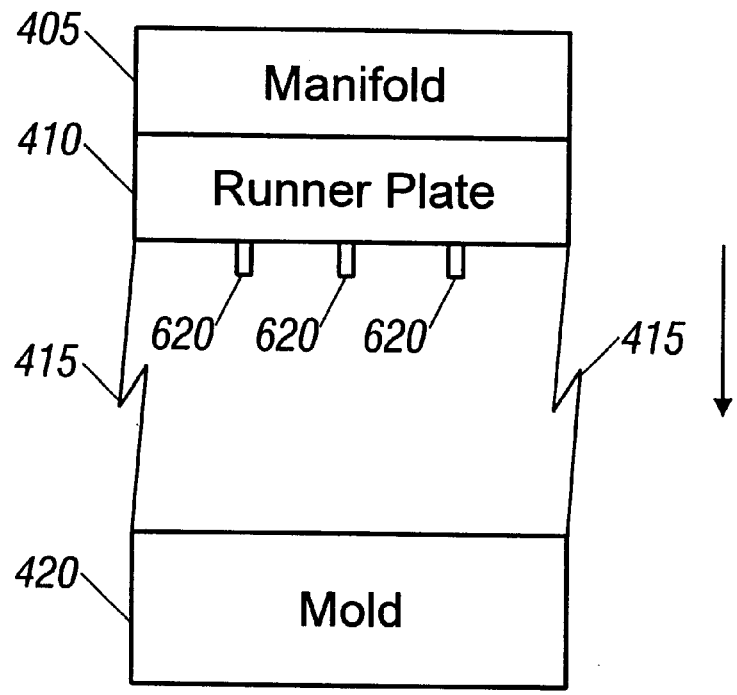
FIG. 8a is an illustration of the die set of FIG. 4 in a disengaged position.
Figure 8B:
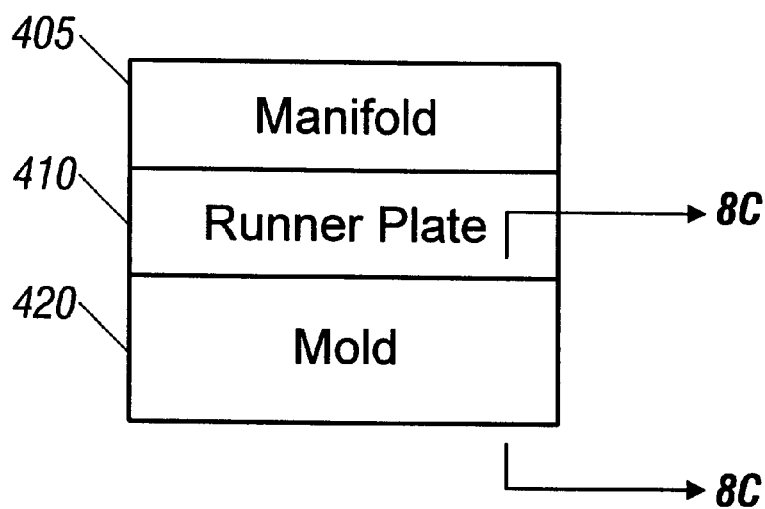
FIG. 8b is an illustration of the die set of FIG. 4 in an engaged position.
Figure 8C:
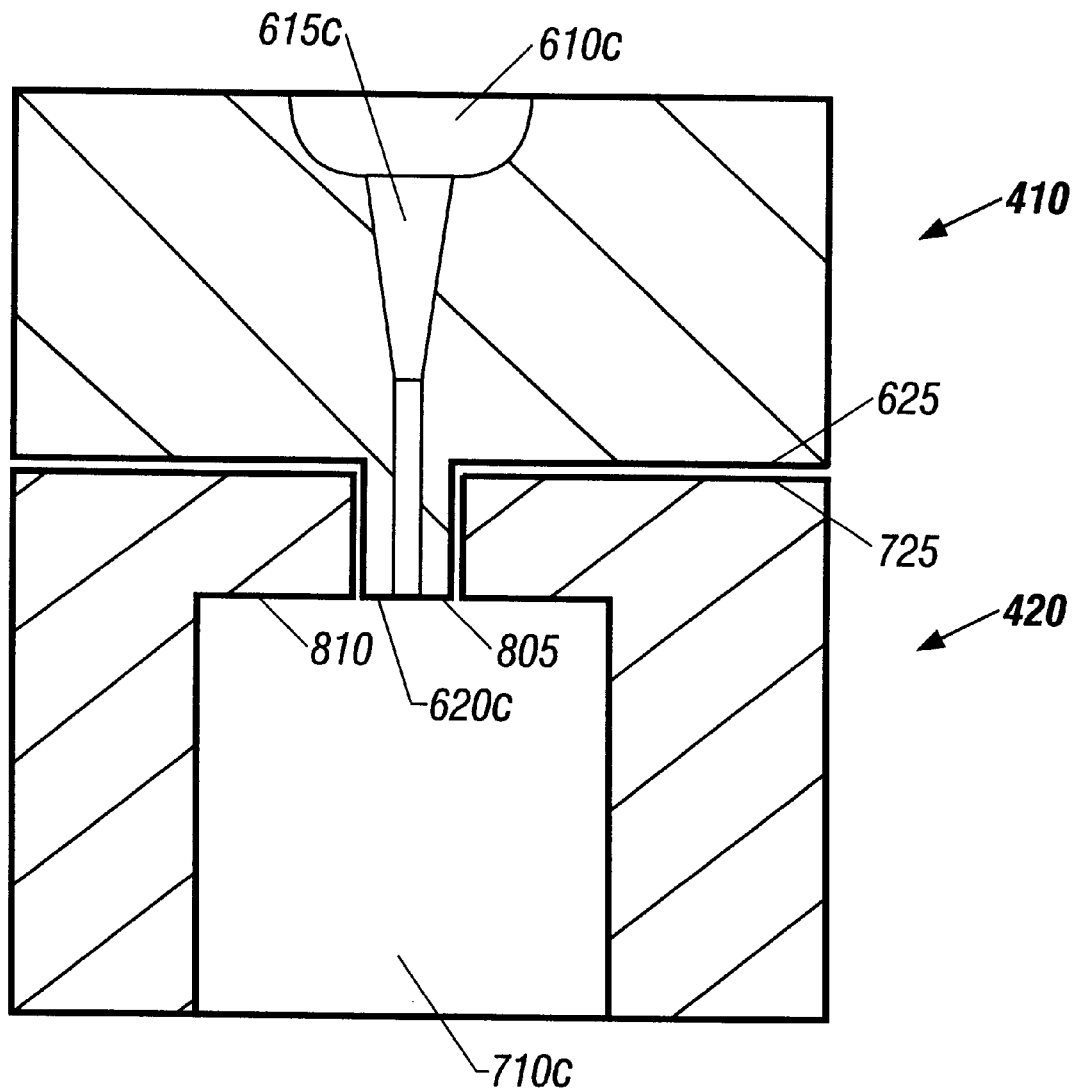
FIG. 8c is cross-sectional view of the die set of FIG. 8b illustrating the cooperative interaction of the runner plate and mold with the die set in the engaged position.
Figure 8D:
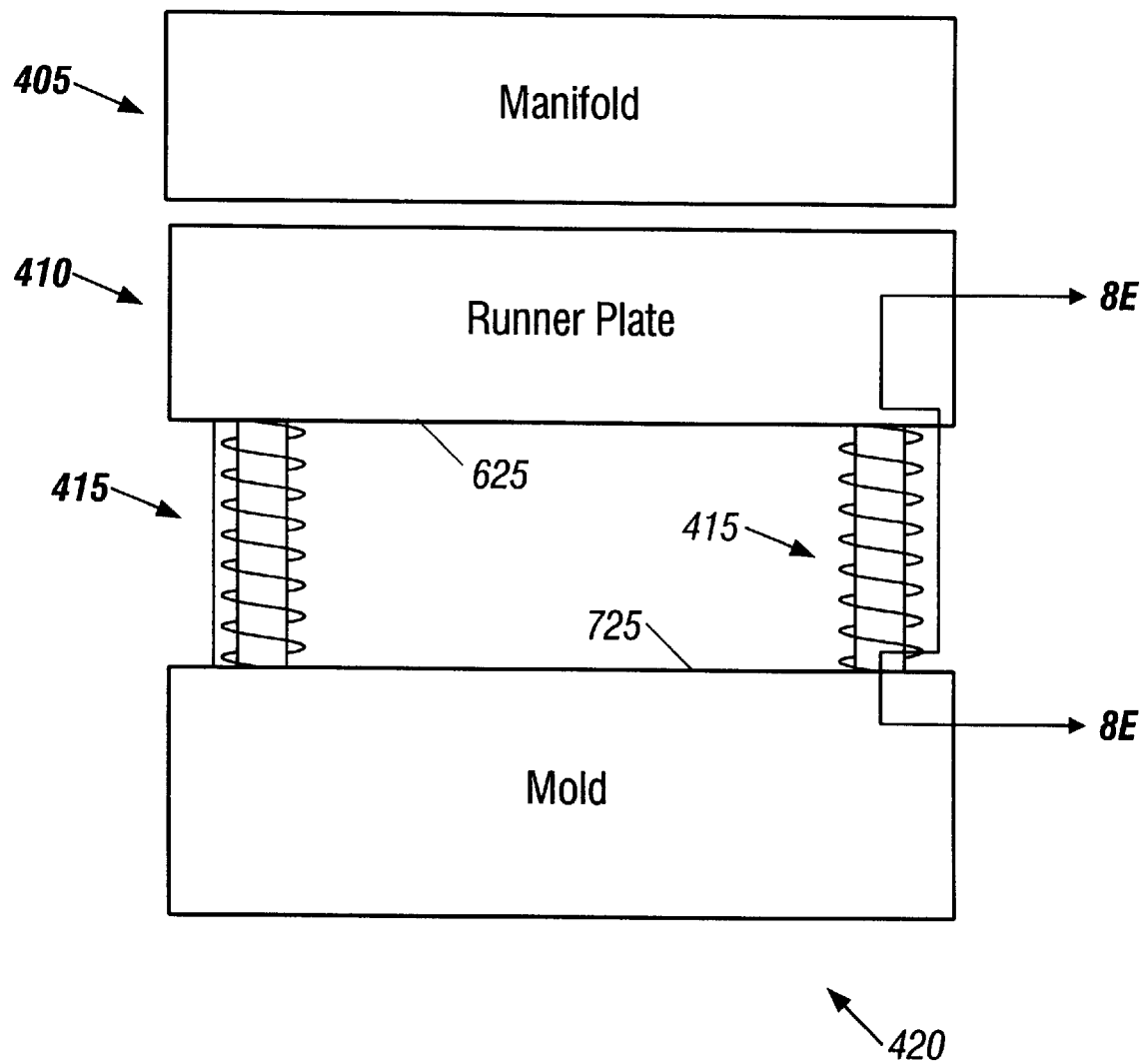
FIG. 8d is an illustration of the die set of FIG. 4 in the disengaged position including a preferred embodiment of the resilient guide members.
Figure 8E:
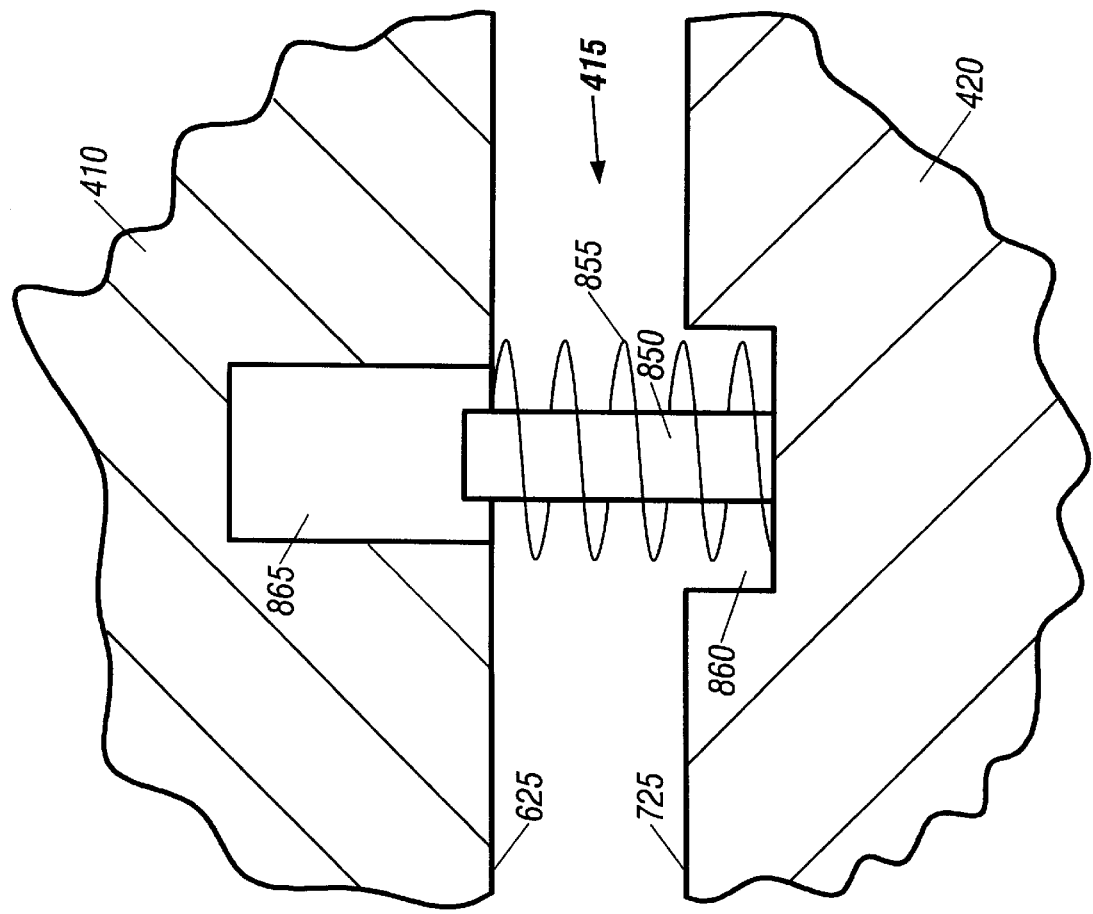
FIG. 8e is a fragmentary cross-sectional view of the die set of FIG. 8d illustrating the preferred embodiment of the resilient guide members.
Figure 8F:
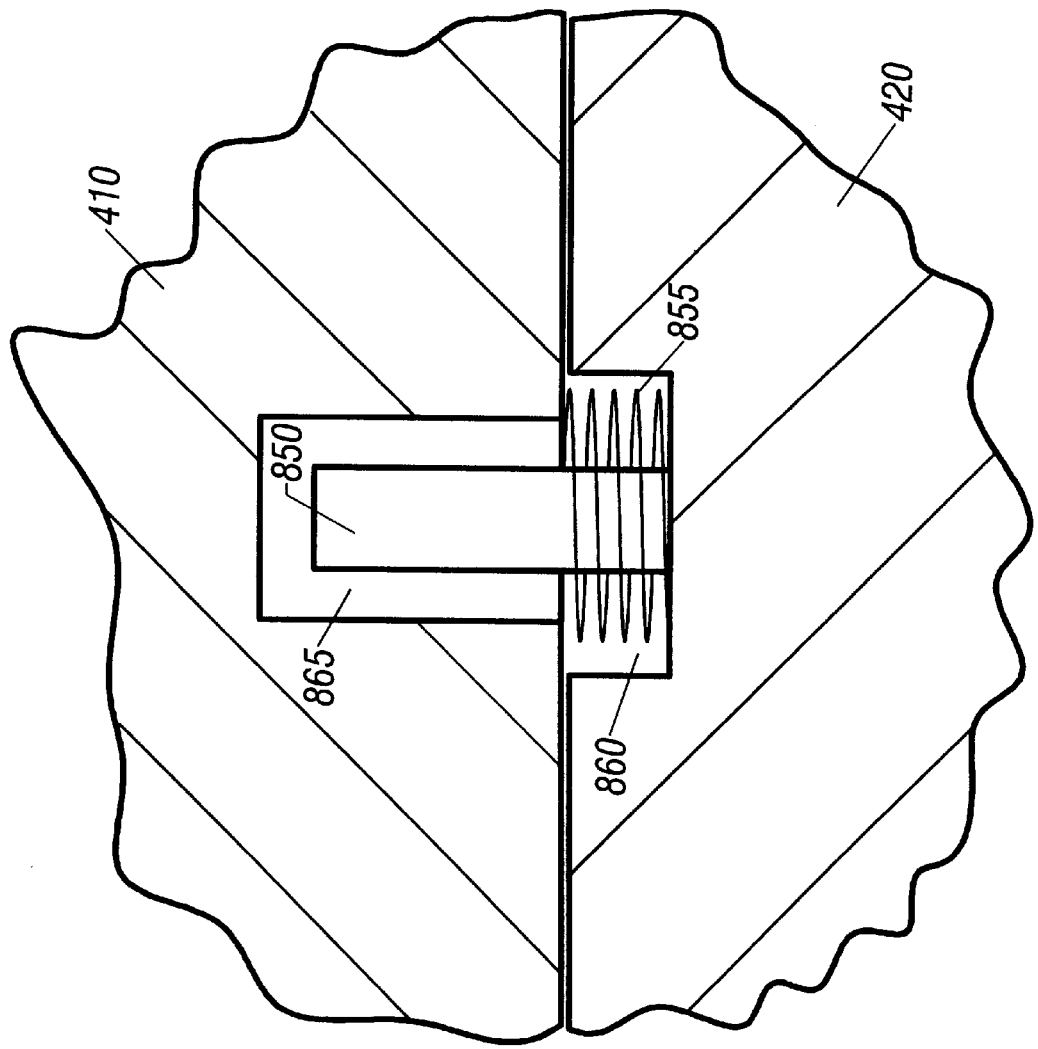
FIG. 8f is an illustration of the die set of FIG. 8e in the engaged position illustrating the preferred embodiment of the resilient guide members.

In a preferred embodiment, as illustrated in drawing FIGS. 8d–8f, the die set 320 includes a plurality of resilient guide members 415 positioned about a periphery of the runner plate 410 and mold 420. In the preferred embodiment, each of the resilient members 415 include a guide post 850 and a spring member 855. The guide posts 850 are positioned within and extend from a recess 860 formed in the top surface 725 of the mold 420. The spring members 855 are coupled to a base of the recess 860 and to the bottom surface 625 of the runner plate positioned above the recess 860. The guide posts 850 also extend at least partially into corresponding guide holes 865 formed in the bottom surface 625 of the runner plate 410. During engagement of the die set 320, the spring members 855 are compressed into the recess 860 and the guide posts 850 slide into the corresponding guide holes 865. During disengagement of the die set 320, the spring member 855 force the mold 420 away from the runner plate 410.

During operation of the molding device 20, the resilient guide members 415 maintain a gap between the runner plate 410 and the mold 420 of at least about 3 inches during disengagement of the die set 320 with the article of clothing. In this manner, the resilient members 415 minimize heat transfer from the mold 420 to the runner plate 410 thereby minimizing or eliminating curing of silicone resin within the runner plate 410 and manifold 405. Alternatively, more generally, the resilient guide members 415 minimize heat transfer from the mold 420 to the runner plate 410 thereby minimizing or eliminating curing of thermosetting polymer resins within the runner plate 410 and manifold 405.

In a preferred embodiment, as illustrated in FIGS. 7a–7d, the mold 420 includes a plurality of silicone resin inlet passages 705a–705c, a plurality of corresponding mold cavities 710a–710c, a heating element 715, and a temperature sensor 720. The silicone resin inlet passages 705a–705c of the mold 420 receive silicone resin from the corresponding silicone resin outlet passages 615a–615c of the runner plate 410. The silicone resin inlet passages 705a–705c transmit silicone resin to corresponding mold cavities 710a–710c. The heating element 715 cures the silicone resin bodies formed by the mold cavities of the mold 420. The temperature sensor 720 permits feedback control of the operating temperature range of the mold 420.

The silicone resin inlet passages 705a–705c are contained within the body of the mold 420. The silicone resin inlet passages 705a–705c are defined by openings positioned in a top face 715 of the mold 420 that extend into the body of the mold 420. The silicone resin inlet passages 705a–705c preferably extend substantially normal to the top face 725 of the mold 420. In a preferred embodiment, the silicone resin inlet passages 705a–705c of the mold 420 are complementary shaped openings adapted to receive the silicone resin outlet nozzles 620a–620c of the runner plate 410.

In the preferred embodiment, as illustrated in FIGS. 8a–8c, during engagement of the die set 320 with the article of clothing 340, the silicone resin outlet nozzles 620a–620cof the runner plate 410 cooperatively interact with the complementary shaped corresponding silicone resin inlet passages 705a–705c of the mold 420. In this manner, silicone resin passes from the silicone resin outlet passages 615a–615c of the runner plate 410 to the corresponding silicone resin inlet passages 705a–705c and mold cavities 710a–710c of the mold 420.

In a particularly preferred embodiment, as illustrated in drawing FIGS. 8a–8c, the extension of the silicone resin outlet nozzles 620a–620c of the runner plate 410 into the silicone resin inlet passages 705a–705c of the mold 420 positions the tangential plane of the lower face 805 of the nozzles 620a–620c substantially coincident with the tangential plane of the upper inner surface 810 of the mold cavity 710 of the mold 420. In this manner, the top surface of the molded three dimensional body of silicone is substantially smooth.

In a particularly preferred embodiment, the mold cavities 710 of the mold 420 are formed by first forming the silicone resin inlet passages 705, inserting silicone resin inlet nozzles 620 into the silicone resin inlet passages 705, and then CNC machining the mold cavities 710. In this manner, the tangential planes of the upper inner surfaces 810 of the mold cavities 710 are made substantially exactly coincident with the tangential lower planes of the lower faces 805 of the nozzles 620.

The cross-sectional areas of the silicone inlet passages 705a–605c may range, for example, from about 0.010 to 10 square inches for typical silicone materials to provide improved flow characteristics. In a preferred embodiment, the cross-sectional areas of the silicone resin inlet passages 705a–705c range from about 0.100 to 1 square inches in order to provide optimum flow characteristics for typical silicone materials. In a particularly preferred embodiment, the cross-sectional areas of the various flow passages of the die set 320 are made successively smaller in the flow path starting with the silicone resin inlet passages 505 of the manifold 405 and ending with the silicone resin outlet passages 615 of the nozzles 620. The preferred physical characteristics will differ depending upon the types of thermosetting polymers employed.

During operation of the molding device 20, the mold cavities 710a–710c receive the silicone resin supply from the corresponding silicone resin inlet passages 705a–705c. The silicone resin fills the cavities 710a–710c and forms the three dimensional bodies of silicone resin on the top surface of the article of clothing 340. The heating element 715 then cures the silicone resin bodies formed by the mold cavities 710a–710c. Because the fabric used in conventional articles of clothing 340 is porous, at least some portion of the silicone resin will penetrate through to the bottom surface of the article of clothing 340. As will be described below, a heater positioned in the platen 330 cures this silicone resin and forms a skim coating of cured silicone on the bottom surface of the article of clothing. In this manner, further bleed through of silicone resin, or other thermosetting polymer resin through porous substrates, is prevented.

Figure 7A:
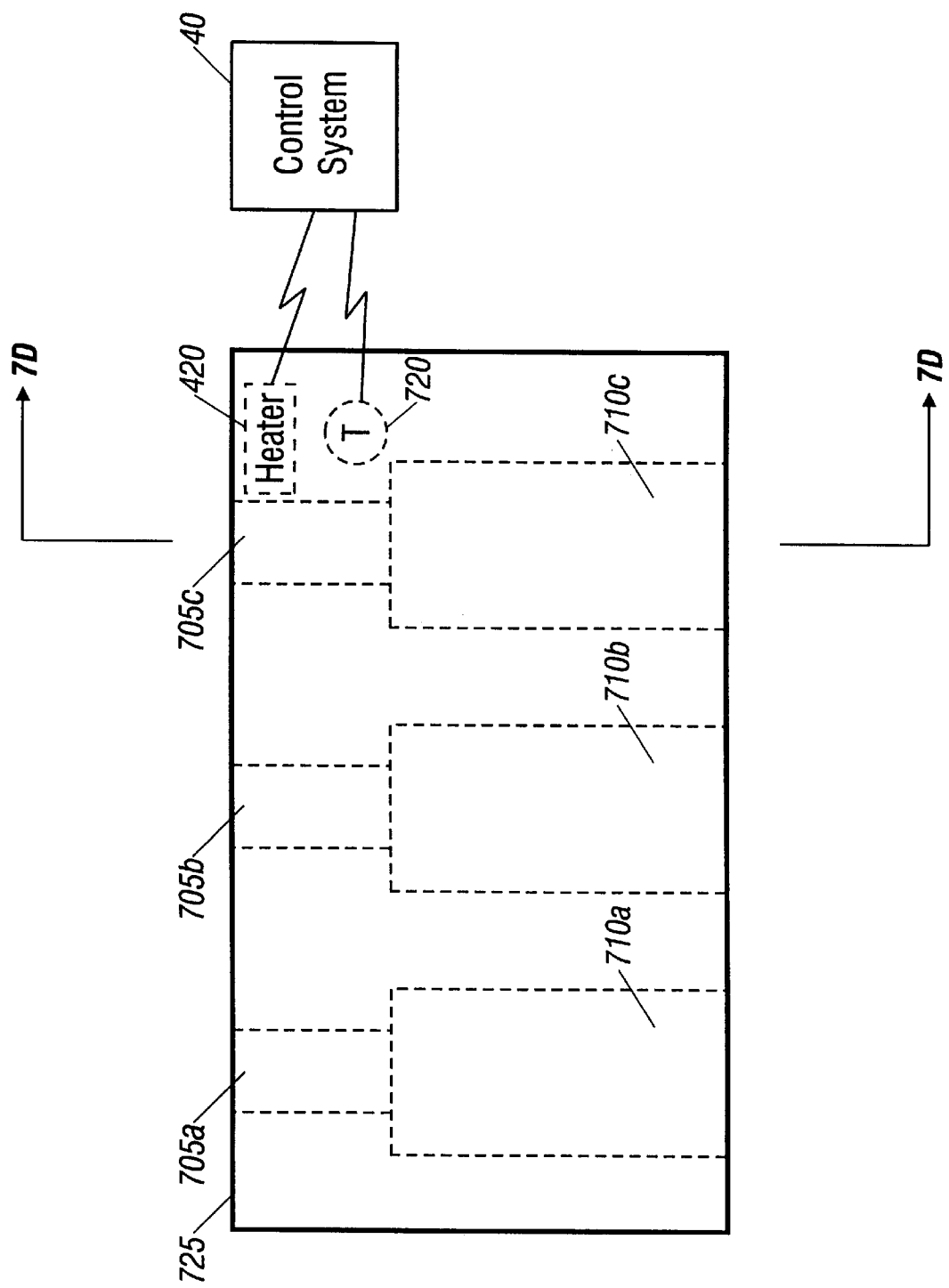
FIG. 7a is a front view of the mold of FIG. 4.
Figure 7B:
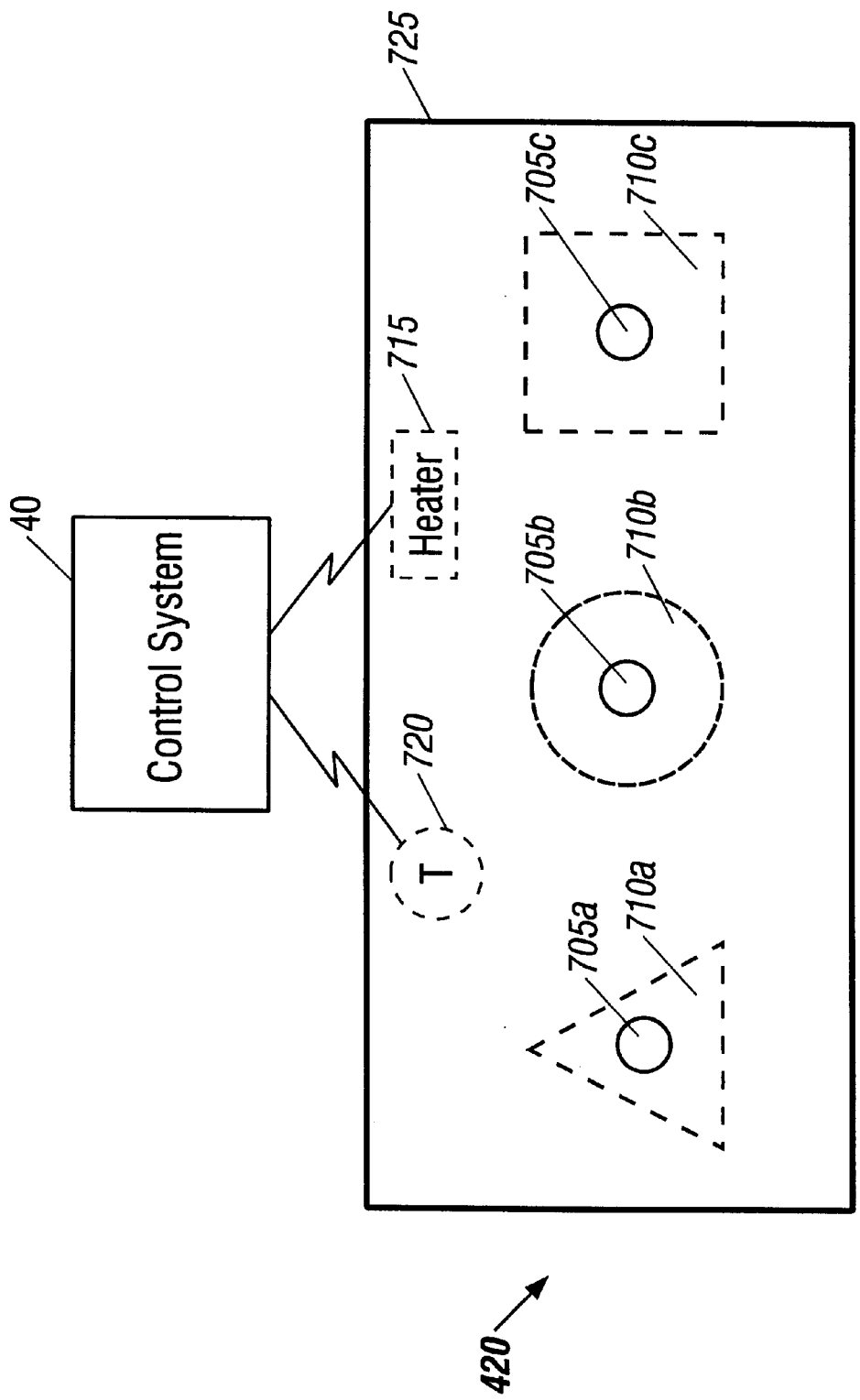
Figure 7C:
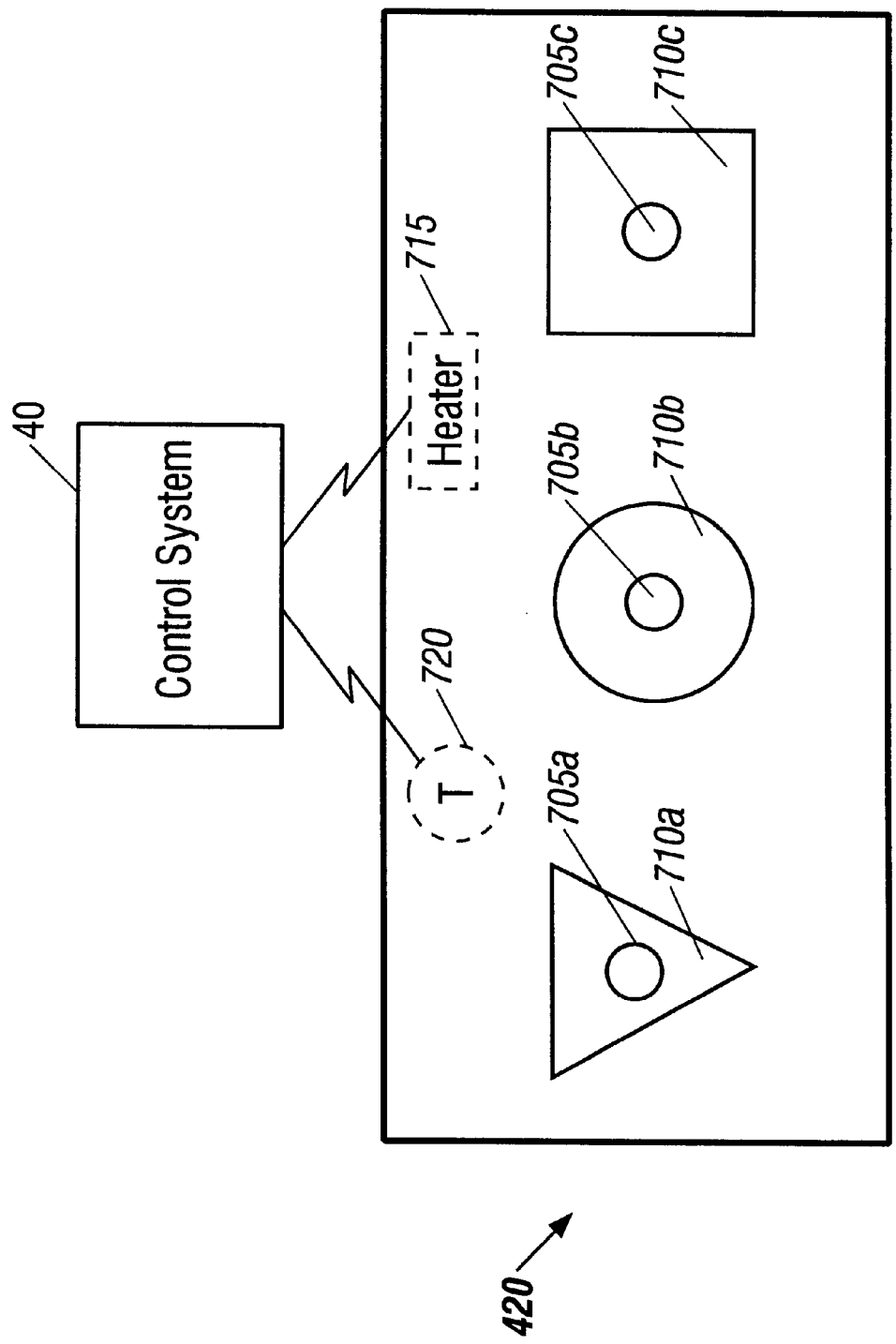
Figure 7D:
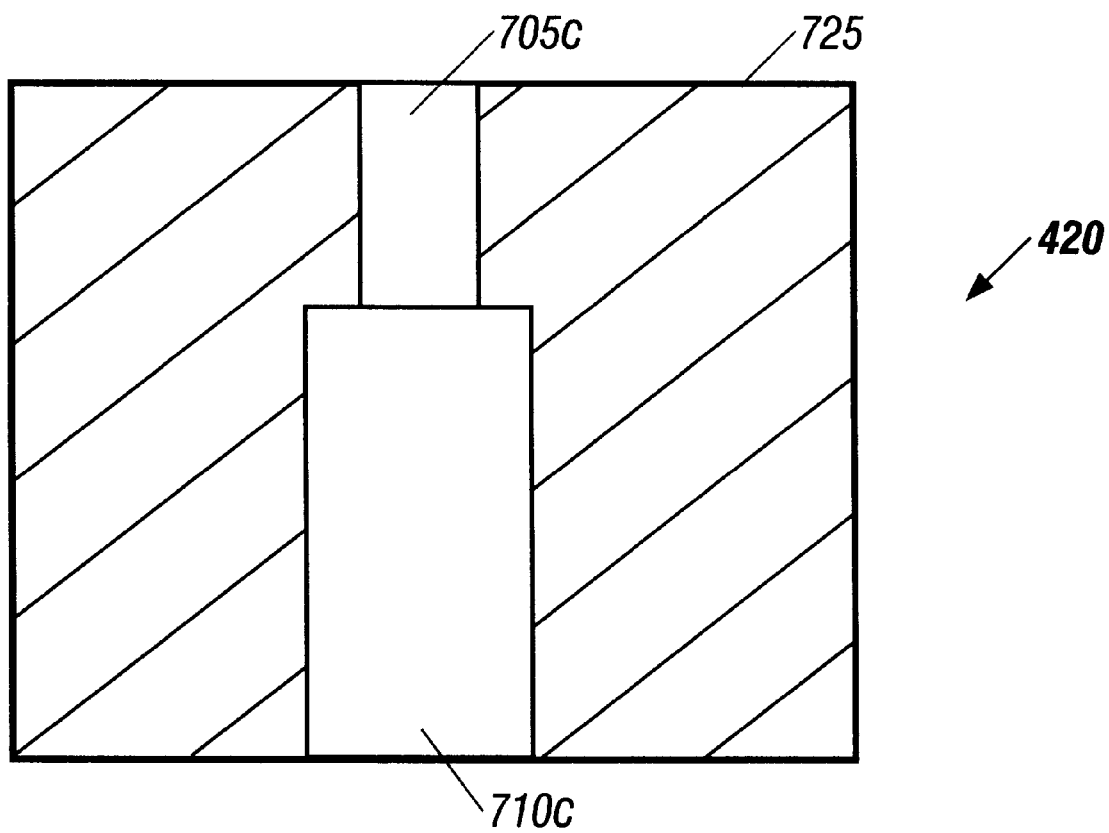
FIG. 7d is a cross-sectional view of the mold of FIG. 7a illustrating the mold cavities.
Figure 7E:
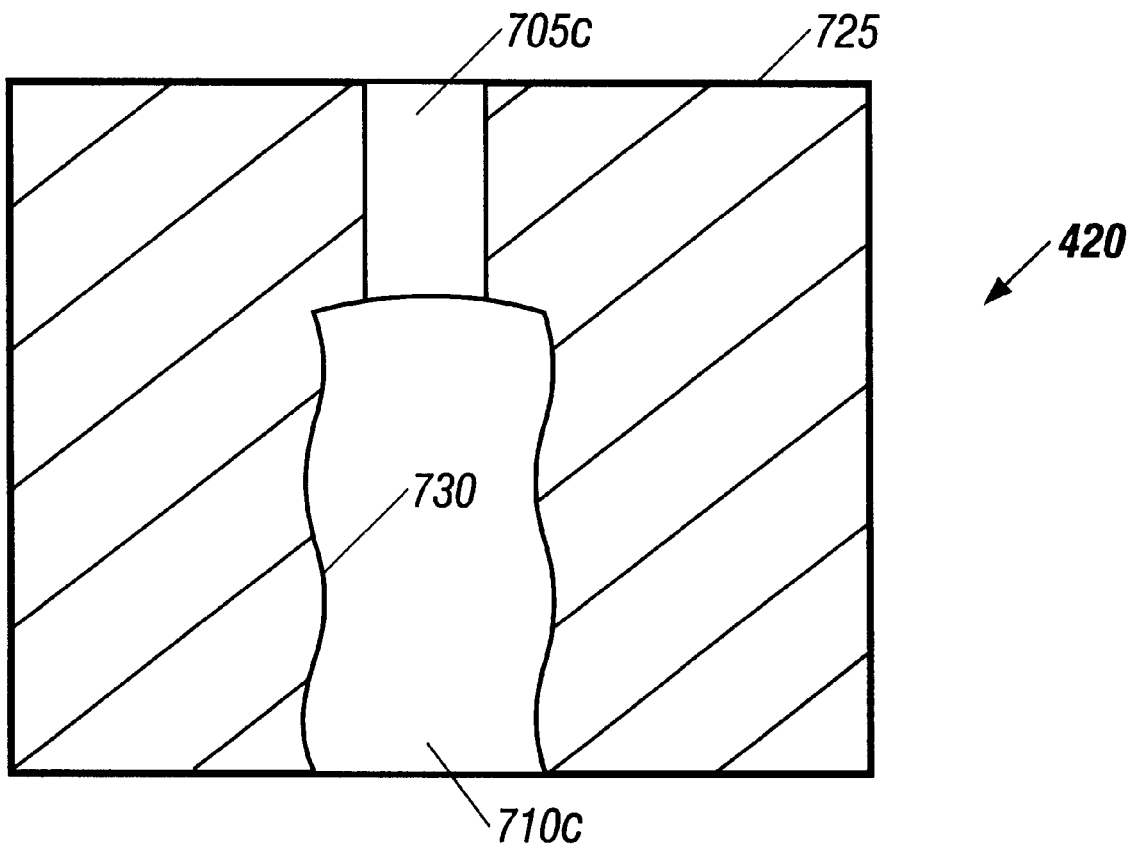
FIG. 7e illustrates an alternative preferred embodiment of the mold cavity of FIG. 7d.

The mold 420 may include any number of mold cavities 710 depending upon the complexity of the particular graphical design to be affixed to the article of clothing 340. Furthermore, one or more of the silicone bodies formed may be comprised of different colors of silicone. The surface texture of the silicone bodies may be smooth or textured. As illustrated in FIG. 7e, texturing of the silicone body may be provided by adjusting the surface texture of the inner surface 730 of the mold cavity 710.

The heating element 715 may comprise any number of conventional heating elements such as, for example, electrical heaters. In a preferred embodiment, the heating element 715 is a cal rod available from the Watlow Corporation. In a particularly preferred embodiment, a plurality of such cal rod heaters are used and are positioned substantially evenly between and among the mold cavities 710 of the mold 420 in order to evenly distribute thermal energy within the mold 420.

The temperature sensor 720 may comprise any number of conventional temperature sensors such as, for example, thermocouple or thermistor. In a preferred embodiment, the temperature sensor 720 is a thermocouple available from Pyromation, Inc. In a particularly preferred embodiment, the temperature sensor 720 generates a signal representative of an operating temperature of the mold 420 that is processed by the control system 40 to control the operation of the heating element 715 to maintain the operating temperature of the mold 420 within a predetermined range of temperatures. The predetermined range of the operating temperatures of the mold 420, for typical types and grades of silicone resin, may range, for example, from approximately 75 to 500° F. In a preferred embodiment, the predetermined range of operating temperatures of the mold 420, for typical types and grades of silicone resins, ranges from about 150 to 300° F. The desired range of operating temperatures will differ depending upon the types of thermosetting polymers employed.

The mold 420 may be fabricated from any number of durable and thermally conductive materials such as, for example, aluminum, copper, brass, steel, or composite materials. In a preferred embodiment, the mold 420 is fabricated from aluminum. The mold cavities 710a–710c of the mold 420 may be fabricated using any number of conventional fabrication processes. In a preferred embodiment, the mold cavities 710a–710c are fabricated by CNC machining.

Figure 7F:
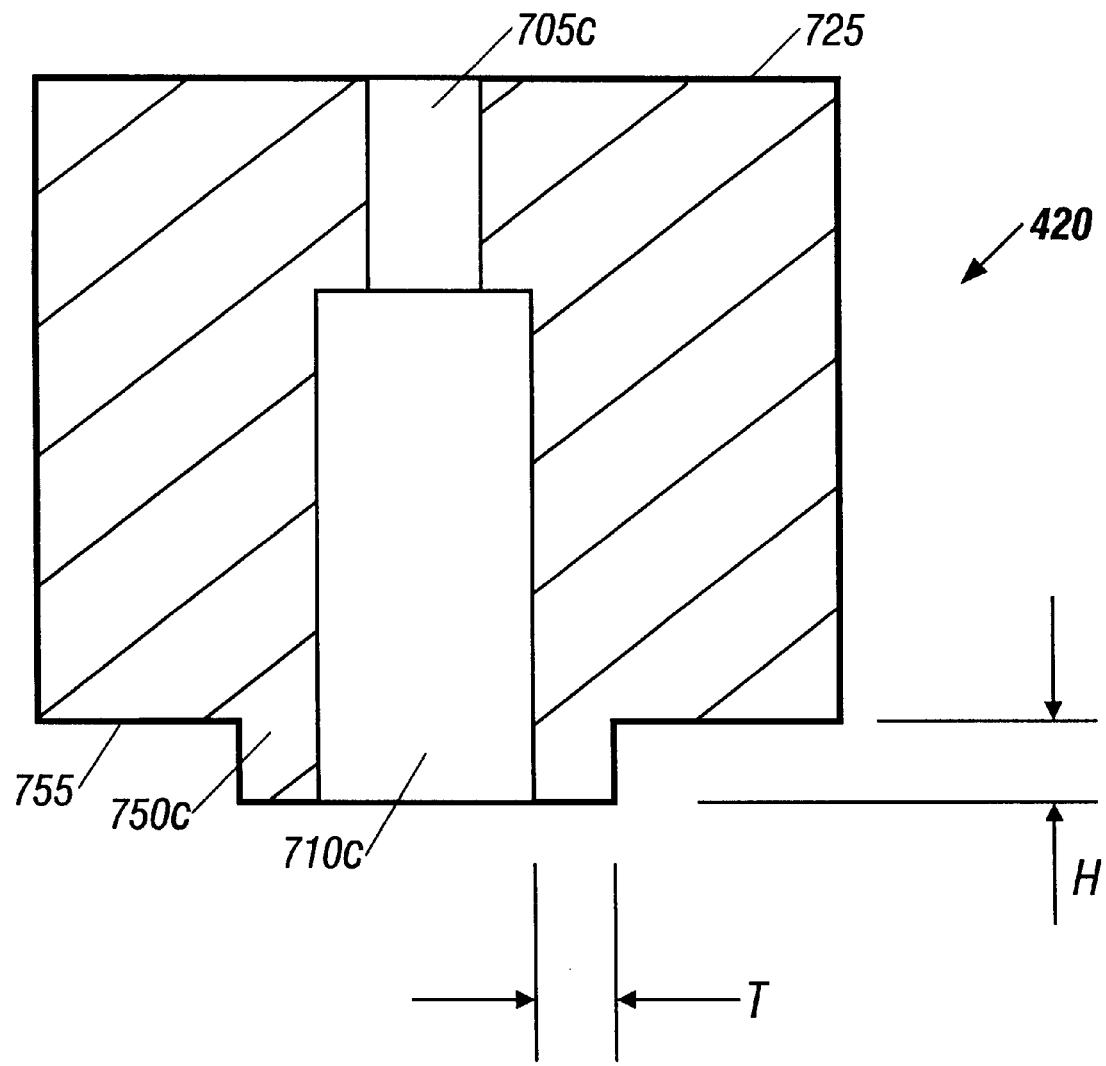
FIG. 7f illustrates a particularly preferred embodiment of the mold of FIGS. 7a–7e.
Figure 7G:
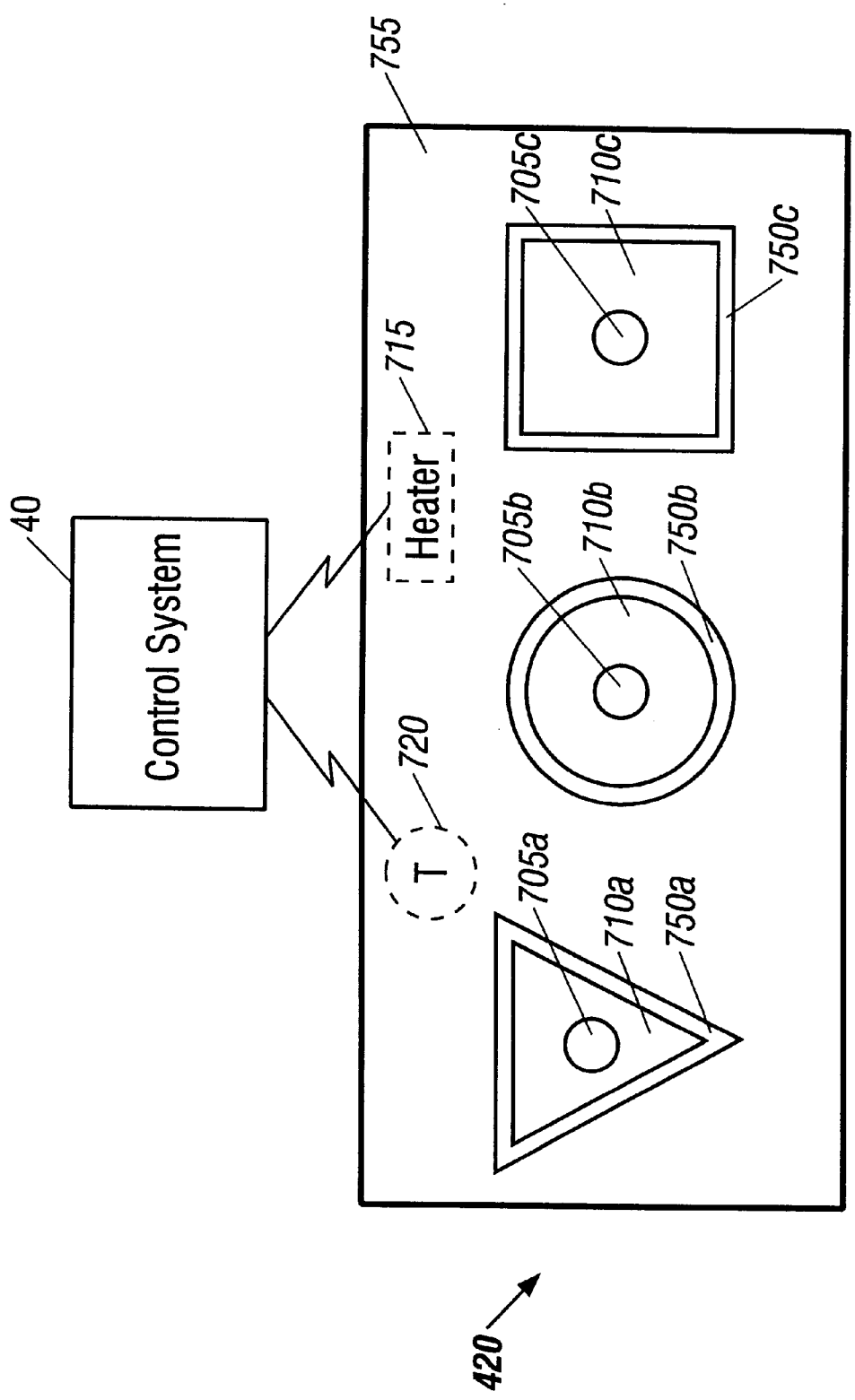
FIG. 7g illustrates a bottom view of the mold of FIG. 7f.

In an alternative preferred embodiment of the mold 420, as illustrated in drawing FIGS. 7f and 7g, raised borders 750a–750c are provided about a periphery of each of the mold cavities 710a–710c that extend outward from the bottom surface 755 of the mold 420. The raised borders 750a–750c minimize the contact area between the mold 420 and the article of clothing 340, thereby minimizing possibly damaging heat transfer to the article of clothing 340. The thickness T and height H of the raised borders 750a–750c may range, for example, from about 0.25 to 1.5 millimeters 0.02 to 9 millimeters respectively. In a preferred embodiment, the thickness T and height H of the raised borders 750a–750c range from about 0.50 to 0.75 millimeters and 0.50 to 6 millimeters respectively. The preferred range of the thickness T and height H of the raised borders 750a–750c will vary as a function of the size and configuration of the mold cavities 710a–710c and the type and thickness of the substrate.

Figure 7H:
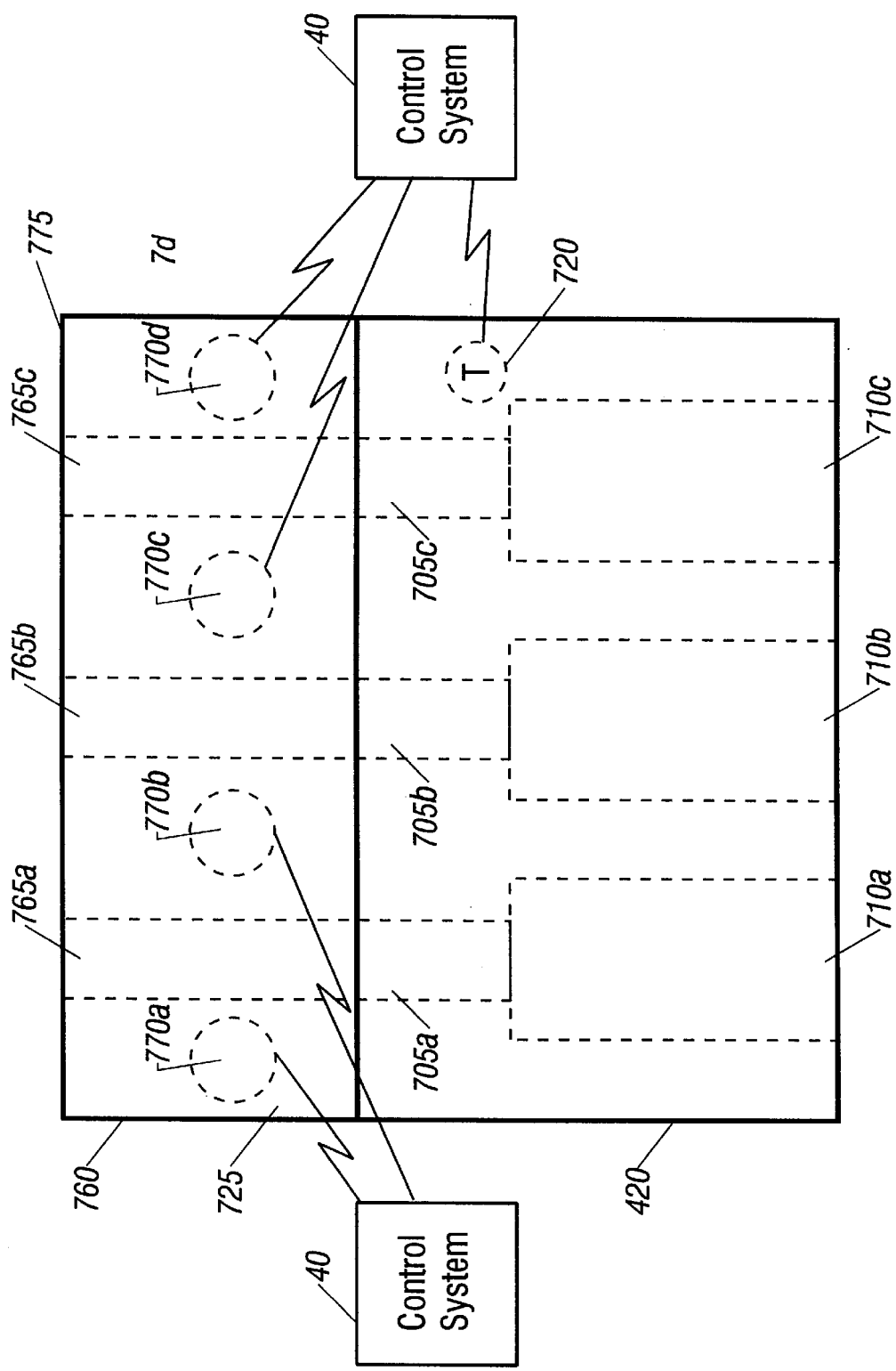
FIG. 7h illustrates an alternative preferred embodiment of the mold of FIGS. 7a–7g.

In an alternative preferred embodiment of the mold 420, as illustrated in FIG. 7h, the heater 715 is removed from the mold 420 and a separate hot plate 760 is provided in the die set 320 that is positioned immediately above the mold 420. The hot plate 760 maintains the operating temperature of the mold 420 within the predetermined range of operating temperatures as discussed above. In this manner, the design and construction of the mold 420 is simplified thereby making it less expensive to manufacture. For example, the physical size of the mold 420 can be made much smaller than the physical size of the heating elements. The mold 420 and hot plate 760 are preferably fabricated from thermally conductive materials such as, for example, aluminum, brass, steel or composite materials to facilitate the conduction of thermal energy from the hot plate 760 to the mold 420.

The hot plate 760 includes a plurality of flow passages 765a–765c and heating elements 770a–770d. The flow passages 765a–765c are fluidicly coupled and correspond to the inlet passages 705a–705c of the mold 420. In this manner, the flow passages 765a–765c convey silicone resin from the manifolds 405, 425 and 1140 and runner plate 410 to the mold 420. The heating elements 770a–770d provide thermal energy and may comprise any number of conventional heating elements such as, for example, electrical heaters or cal rods. In a preferred embodiment, the heating elements 770a–770d are cal rods, available from the Watlow Corporation. In a particularly preferred embodiment, the heating elements 770a–770d are distributed among and between the flow passages 765a–765c in order to provide a substantially even distribution of thermal energy. The operating temperature of the mold 420 is preferably controlled by the control system 40 which monitors the temperature of the mold using the temperature sensor 720. The control system 40 then preferably controls the operation of the heating elements 770a–770d to maintain the operating temperature of the mold 420 within a predetermined range of temperatures.

In a particularly preferred embodiment, the flow passages 765a–765c of the hot plate 760 are further modified to cooperatively interact with flow nozzles provided in the runner plate 410, manifolds 405, 425 and 1140, or insulator plate 1105.

Figure 9A:
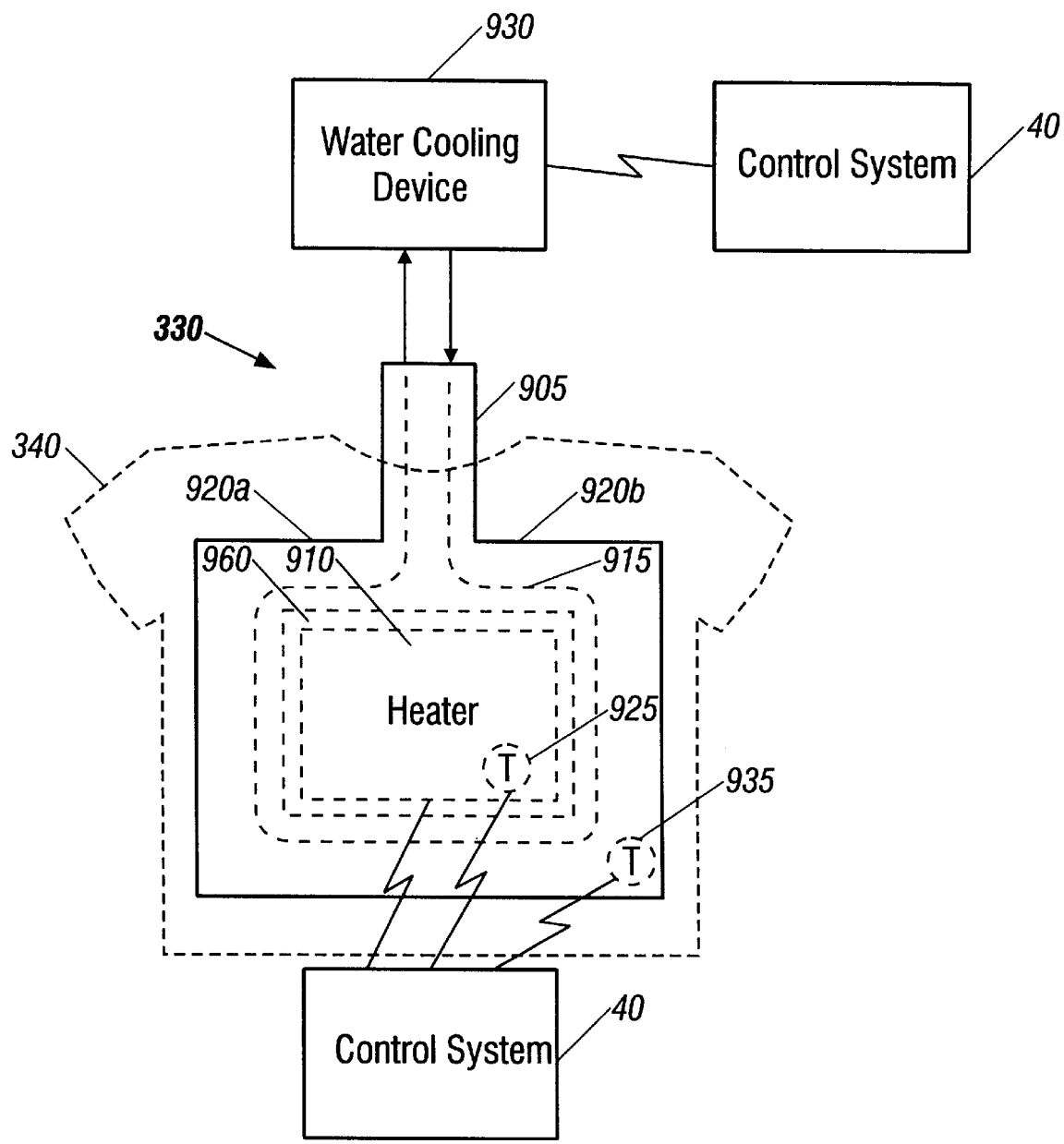
FIG. 9a is a top view of the platen of FIG. 4.

In a preferred embodiment, as illustrated in FIG. 9a, the platen 330 includes a platen body 905, a heating element 910 and a cooling element 915. The platen body 905 supports and positions the article of clothing 340, or other substrate, during engagement with the die set 320 of the molding device 20. In particular, during engagement of the die set 320 with the top surface of the article of clothing 340, the heating element 915 cures the silicone material that passes into and through the article of clothing 340 to form a skim coating of silicone on the bottom surface of the article of clothing 340. In a particularly preferred embodiment, the skim coating is formed within the fabric of the article of clothing. In this manner, further bleed-through of silicone resin, or other thermosetting polymer resin, through the article of clothing 340 is prevented. The cooling element 915 protects the remaining portions of the article of clothing 340 that do not interact with the die set 320 from the heat generated by both the die set 320 and the platen heating element 910.

The platen body 905 supports and positions the article of clothing 340 during engagement with the die set 320. The platen body 905 is preferably includes a substantially planar upper surface that directly supports the article of clothing 340. The platen body 905 also preferably includes at least one reference surface to provide proper positioning of the article of clothing 340 relative to the die set 320. The platen body 905 may be fabricated from any number of durable materials such as, for example, aluminum or steel. In a preferred embodiment, the platen body 905 is fabricated from aluminum. In the exemplary embodiment, illustrated in FIG. 9a, the platen body 905 is designed to support and position a T-shirt. In the exemplary embodiment, the T-shirt fits over the platen with a part of shoulder surfaces 920a and 920b providing reference surfaces to provide proper positioning of the T-shirt 340 relative to the die set 320. For different types of substrates, different reference surfaces will be provided.

The heating element 910 is provided within the platen body 905 and maintains the area in the immediate vicinity of the lower surface of the material of the article of clothing 340 that engages the die set 320 at a controlled range of predetermined temperatures. For typical types and grades of silicone resin, the heating element 910 maintains the area in the vicinity of the lower surface of the material of the article of clothing 340 that engages the die set 320 at temperatures ranging from, for example, about 100 to 500° F. In a preferred embodiment, for typical grades and types of silicone resin, the heating element 910 maintains the area in the vicinity of the lower surface of the material of the article of clothing 340 that engages the die set 320 at temperatures ranging from about 250 to 400° F. The preferred operating temperature range will differ depending upon the types of substrates and thermosetting polymer resins employed. In a particularly preferred embodiment, the outer peripheral circumference of the heating element 910 is wrapped with an insulating material 960 such as, for example, fiberglass insulation in order to minimize heat transfer from the heating element 910 to the remaining outer portions of the platen body 905.

The heating element 910 may comprise any number of conventional heating elements such as, for example, electrical heater or cal rod. In a preferred embodiment, the heating element 910 comprises a plurality of cal rods, available from the Watlow Corp., substantially evenly distributed to provide even heating. In a particularly preferred embodiment, the platen 330 further includes a platen heating element temperature sensor 925 that generates a signal representative of an operating temperature of the heating element 910. The temperature sensor 925 may comprise any number of conventional temperature sensors such as, for example, a thermistor or thermocouple. In the particularly preferred embodiment, the control system 40 receives and processes the temperature signal generated by the temperature sensor 925 to maintain the operating temperature of the heating element 910 within a predetermined range of temperatures.

The size and configuration of the heating element 910 will be determined by the size of the article of clothing 340 as well as the region within the top surface of the material of the article of clothing 340 that will engage the die set 320. Alternatively, the size and configuration of the heating element 910 will be determined by the size of the substrate 340 as well as the region within the top surface of the material of the substrate 340 that will engage the die set 320.

The cooling element 915 is provided within the platen body 905 and maintains the area in the immediate vicinity of the lower surface of the material of the article of clothing 340 that does not engage the die set 320 at a controlled range of predetermined temperatures. For typical materials, the cooling element 915 maintains the area in the vicinity of the lower surface of the material of the article of clothing 340 that does not engage the die set 320 at temperatures, for example, ranging from about 45 to 70° F. In a preferred embodiment, for typical silicone materials, the cooling element 915 maintains the area in the vicinity of the lower surface of the material of the article of clothing 340 that does not engage the die set 320 at temperatures ranging from about 55 to 60° F. In this manner, the cooling element 915 protects the portions of the article of clothing 340 that do not engage the die set 320 from heat transfer from the die set 320 and platen heating element 910. The preferred temperature range will differ depending upon the type of substrate employed.

The cooling element 915 may comprise any number of conventional cooling elements such as, for example, conductive water cooling. In a preferred embodiment, the cooling element 915 comprises a water cooled region of the platen body 905 and the molding device 20 further includes a water cooling device 930. The water cooling device 930 provides a controlled supply of water, or other coolant, for passage through the cooling element 915. In a particularly preferred embodiment, the platen 330 further includes a platen cooling element temperature sensor 935 that generates a signal representative of an operating temperature of the cooling element 915. The temperature sensor 935 may comprise any number of conventional temperature sensors such as, for example, a thermistor. In the particularly preferred embodiment, the control system 40 receives and processes the temperature signal generated by the temperature sensor 935 to maintain the operating temperature of the cooling element 915 within a predetermined range of temperatures.

The size and configuration of the cooling element 915 will be determined by the size of the article of clothing 340 as well as the size and shape of the region within the top surface of the material of the article of clothing 340 that will not engage the die set 320. Alternatively, the size and configuration of the cooling element 915 will be determined by the size of the substrate 340 as well as the size and shape of the region within the top surface of the material of the substrate 340 that will not engage the die set 320.

Figure 9B:
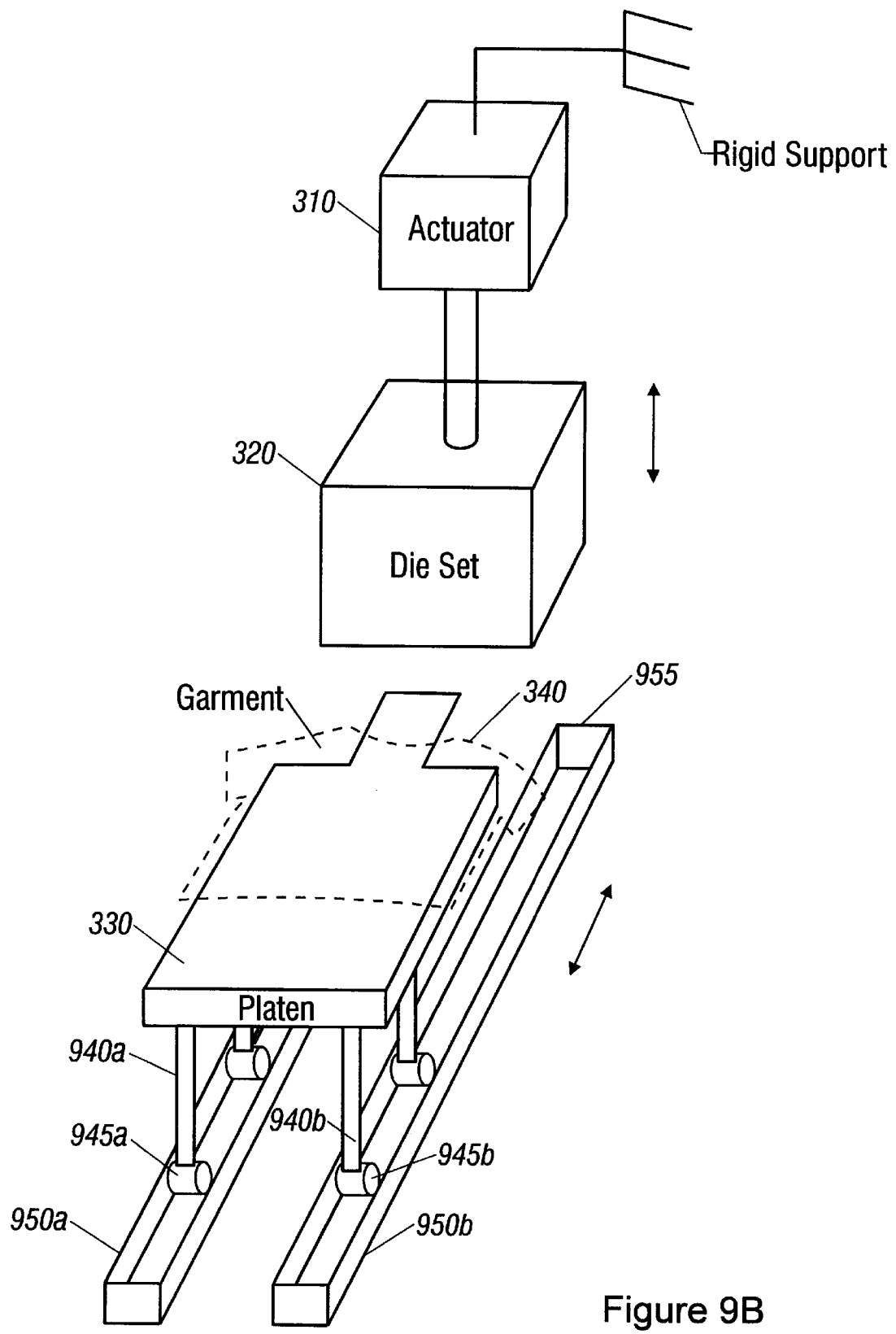

In a particularly preferred embodiment, as illustrated in drawing FIG. 9b, the platen 330 further includes supporting members 940a and 940b, rolling members 945a and 945b, guide track members 950a and 950b, and references stop members 955a and 955b. In the particularly preferred embodiment of the platen 330, the platen is moved into and out of position below and opposite to the die set 320. In this manner, loading and unloading of substrates 340 onto and off of the platen is facilitated by giving the operator more room to operate in. Furthermore, this particularly preferred embodiment also provides added safety by eliminating the possibility of injury to the operator caused by mistaken engagement of the die set 320 with the platen 330 during loading and unloading of substrates 340 onto and off of the platen 330.

The support members 940a and 940b support the main body of the platen 330 and may comprise any number of conventional support members capable of rigid support during the molding process. The rolling members 945a and 945b support the platen 330 and permit the platen 330 to be rolled within and guided by the guide track members 950a and 950b. The rolling members 945a and 945 by may comprise any number of conventional rolling members capable of rigid support during the molding process. The guide track members 950a and 950b provide directional guidance to the platen 330 during the loading and unloading process. The guide track members 950a and 950b also facilitate the positioning of the platen 330 below and opposite the die set 320. In a particularly preferred embodiment, the guide track members 950a and 950b include reference stop members 955a and 955b that provide a reference point for positioning of the platen 330 below and opposite the die set 320. The guide track members 950a and 950b may comprise any number of conventional guide track members capable of rigid support during the molding process.

Figure 10A:
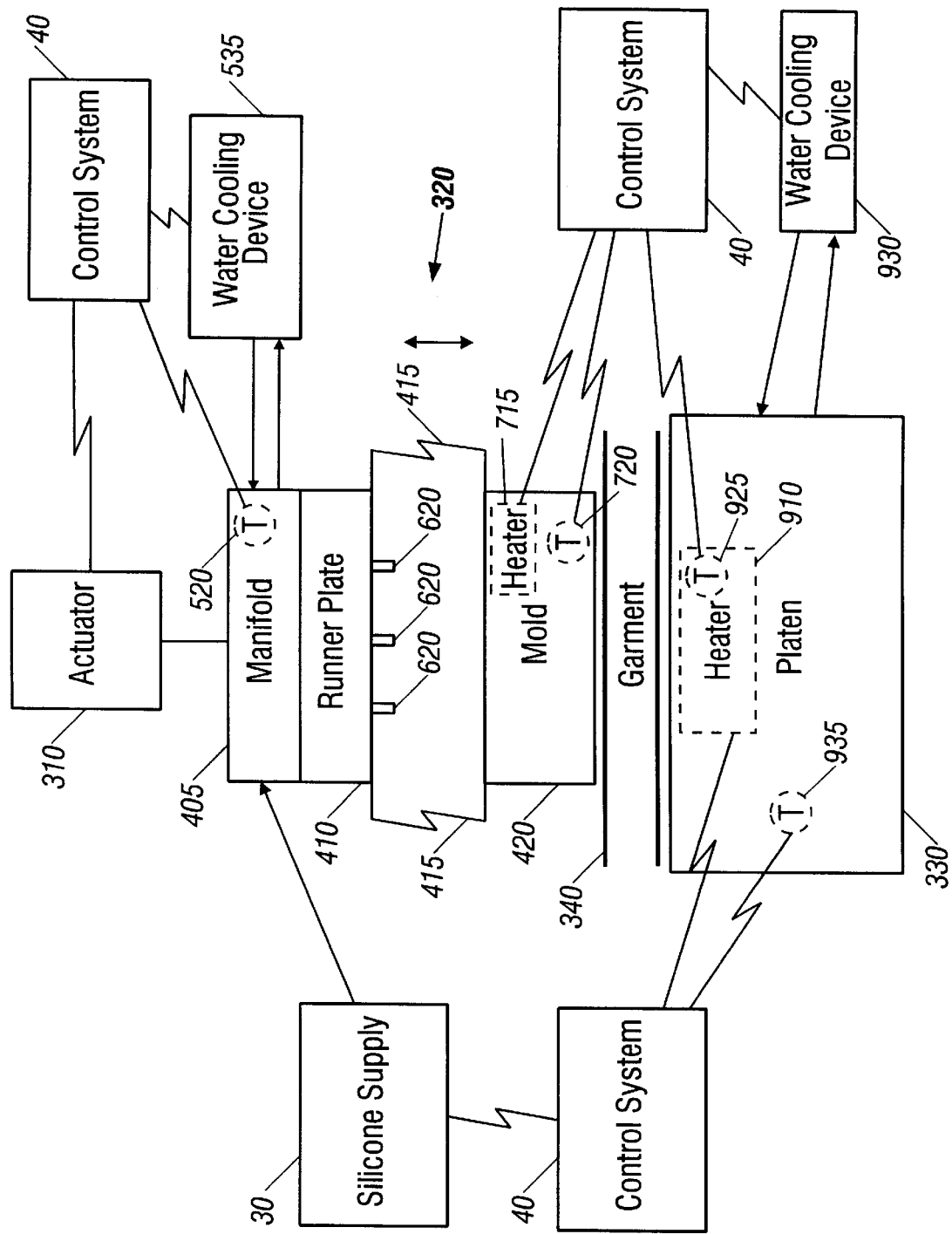
FIG. 10a is an illustration of the molding device of FIG. 4 in the disengaged position.
Figure 10B:
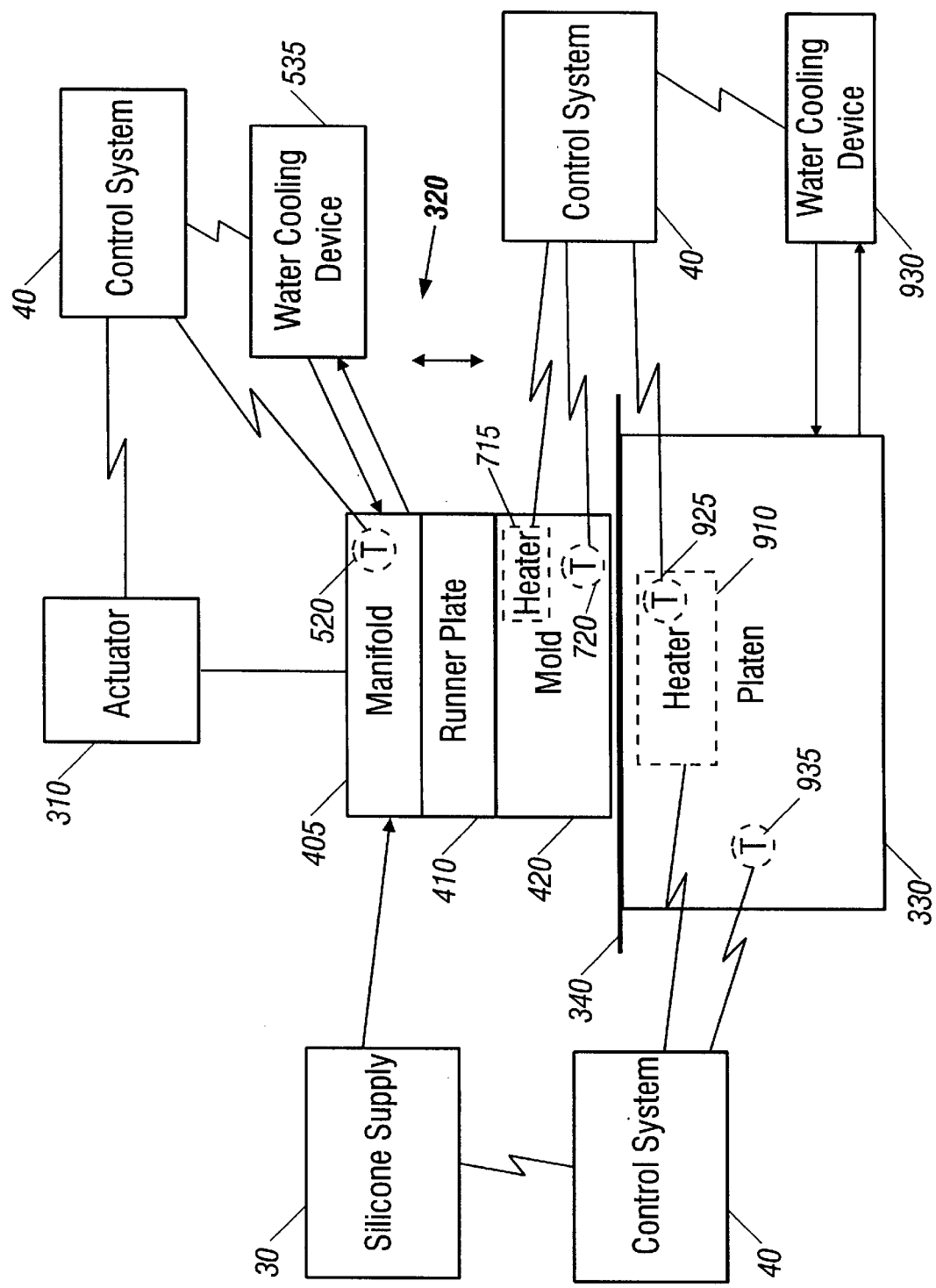
FIG. 10b is an illustration of the molding device of FIG. 4 in the engaged position.

Referring to drawing FIGS. 10a and 10b, in a preferred embodiment, during engagement of the die set 320 with the article of clothing 340, the actuator 310 moves the die set 320 toward the top surface of the article of clothing 340 that is supported and positioned by the heated platen 330. The actuator 310 continues to move the die set 320 until the die set 320 fully engages the top surface of the article of clothing 340. Upon contact of the mold 420 with the top surface of the article of clothing 340, the resilient guide members 415 will deflect in a direction substantially parallel to the direction of movement of the die set 320. Upon full engagement of the die set 320 with the top surface of the article of clothing 340, the bottom face 625 of the runner plate 410 will be in intimate contact with the top face 725 of the heated mold 420 with the runner plate nozzles 620 extending into the corresponding silicone resin inlet passages 705 of the heated mold 420.

In a preferred embodiment, the movement of the die set 320 into full engagement with the top surface of the article of clothing 340 by the actuator 310 is controlled by the control system 40 using any number of conventional control algorithms using any number of conventional position sensors. In a particularly preferred embodiment, the movement of the die set 320 into full engagement is controlled by the control system 40 using position sensors, pressure sensors, speed sensors, position and pressure sensors, position and speed sensors, pressure and speed sensors, or position, pressure and speed sensors. In a particularly preferred embodiment, the movement of the die set 320 into engagement with the top surface of the article of clothing 340 is controlled by the control system 40 by monitoring at least a pressure sensor that generates a signal representative of a contact pressure of the die set 320 with the top surface of the article of clothing 340. In this manner, the article of clothing 340 will not be damaged by the die set 320 during engagement. For typical fabric materials, the contact pressure of the die set 320 with the top surface of the article of clothing 340 may be limited to the range, for example, of between about 50 psi to 600 psi. In a preferred embodiment, for typical fabric materials, the contact pressure of the die set 320 with the top surface of the article of clothing 340 is limited to the range of between about 50 psi to 300 psi. Alternatively, the preferred contact pressure will differ depending upon the types of substrates and thermosetting polymers employed.

Upon full engagement of the die set 320 with the top surface of the article of clothing 340, the silicone resin supply or supplies 30 inject a controlled predetermined amount of silicone resin into each of the mold cavities 710 of the heated mold 420. The controlled amount of silicone resin is received by the cooled manifold 405 and passes through to the runner plate 410. The runner plate 410 distributes the silicone resin via the distribution channels 610 to the corresponding mold cavities 710 of the heated mold 420. The silicone resin then fills the corresponding mold cavities 710 of the mold 420 to form at least one three dimensional body of silicone resin on the article of clothing 340.

Alternatively, upon full engagement of the die set 320 with the top surface of the article of clothing 340, the silicone resin supply or supplies 30 inject a controlled predetermined amount of a thermosetting polymer resin into each of the mold cavities 710 of the heated mold 420. The controlled amount of thermosetting polymer resin is received by the cooled manifold 405 and passes through to the runner plate 410. The runner plate 410 distributes the thermosetting polymer resin via the distribution channels 610 to the corresponding mold cavities 710 of the heated mold 420. The thermosetting polymer resin then fills the corresponding mold cavities 710 of the mold 420 to form at least one three dimensional body of thermosetting polymer resin on the substrate 340.

Alternatively, more generally, upon full engagement of the die set 320 with the top surface of the article of clothing 340, the silicone resin supplies 30 inject a controlled predetermined amount of a plurality of different types of thermosetting polymer resins into the mold cavities 710 of the heated mold 420. The controlled amounts of the different types of thermosetting polymer resins are received by the cooled manifold 405 and pass through to the runner plate 410. The runner plate 410 distributes the thermosetting polymer resins via the distribution channels 610 to the corresponding mold cavities 710 of the heated mold 420. The thermosetting polymer resins then fill the corresponding mold cavities 710 of the mold 420 to form a plurality of three dimensional bodies of a plurality of types of thermosetting polymer resins on the substrate 340. In this manner, thermosetting polymers having similar time and temperature curing profiles may be simultaneously molded onto substrates.

For typical types and grades of silicone, the operating temperature of the cooled manifold 405 may range, for example, from about 50 to 65° F. In a preferred embodiment, for typical types and grades of silicone, the operating temperature of the manifold 405 ranges from about 55 to 60° F. Alternatively, for different thermosetting polymers, the preferred operating temperatures may differ.

The volumetric flow rate and pressure of the injection of silicone resin into the mold cavities 710 of the heated mold 420 is preferably controlled to minimize or prevent damage to the material of the article of clothing 340. For typical clothing materials and grades of silicone resin, the volumetric flow rate and pressure of the silicone resin injection may range, for example, from about 0.33 to 0.50 in$^3$/sec and about 200 to 800 psi respectively. In a preferred embodiment, for typical clothing materials and grades of silicone resin, the volumetric flow rate and pressure of the silicone injection ranges from about 0.01 to 0.33 in$^3$/sec and about 300 to 600 psi respectively. Alternatively, the preferred flow rates and pressures will differ depending upon the specific types of substrates and thermosetting polymer resins employed.

The silicone resin initially will permeate and pass through top surface of the material of the article of clothing 340 until it is cured on the bottom surface of the article of clothing 340 forming a skim coating. In a preferred embodiment, the skim coating is formed within the fabric of the article of clothing 340. The remainder of the three dimensional body of silicone resin is then cured by action of the heat transferred from the heated mold 420 and the platen 330. The amount of time required to cure the three dimensional bodies of silicone resin will depend upon the volume of the three dimensional bodies of silicone resin in a well known manner. Alternatively, the amount of time required to cure the three dimensional bodies of thermosetting polymer resins will depend upon the volume of the three dimensional bodies of thermosetting polymer in a well known manner.

For typical types and grades of silicone, the operating temperatures of the mold 420 and the platen heating element 910 may range, for example, from about 75 to 500° F. and 100 to 500° F. respectively. In a preferred embodiment, for typical types and grades of silicone, the operating temperatures of the mold 420 and the platen heating element 910 range from about 150 to 300° F. and 250 to 400° F. respectively. Alternatively, for different thermosetting polymers, the preferred operating temperatures will differ. The type of silicone used in the molding device 20 may comprise any number of commercially available silicone products such as, for example, GE LIM 3745, GE LIM 6030, GE LIM 6040, GE LIM 6045, GE LIM 6050 or GE LIM 6745 available from the General Electric Company, Silicone Products Division in Waterford, N.Y. In a preferred embodiment, the silicone used is a GE LIM 6745 available from the General Electric Company, Silicone Products Division, in Waterford, N.Y.

More generally, any thermosetting polymer may be used in the molding device 20 to form three dimensional bodies of a thermosetting polymer on a substrate. Examples of such thermosetting polymers include at least the following: silicone, nitrile rubber or urethane. Examples of such substrates include at least the following: cloth, paper, cardboard, wood, leather, wire mesh, sponge, or foam rubber.

Once the three dimensional bodies of silicone have cured on the positioned article of clothing 340, the die set is disengaged from the article of clothing 340. Upon disengagement, the mold 420 will once again separate from the runner plate 410 by virtue of the resilient guide members 415. The thermal isolation provided by the resilient guide members 415 prevents silicone resin from curing within the manifold 405 and runner plate 410.

Figure 11A:
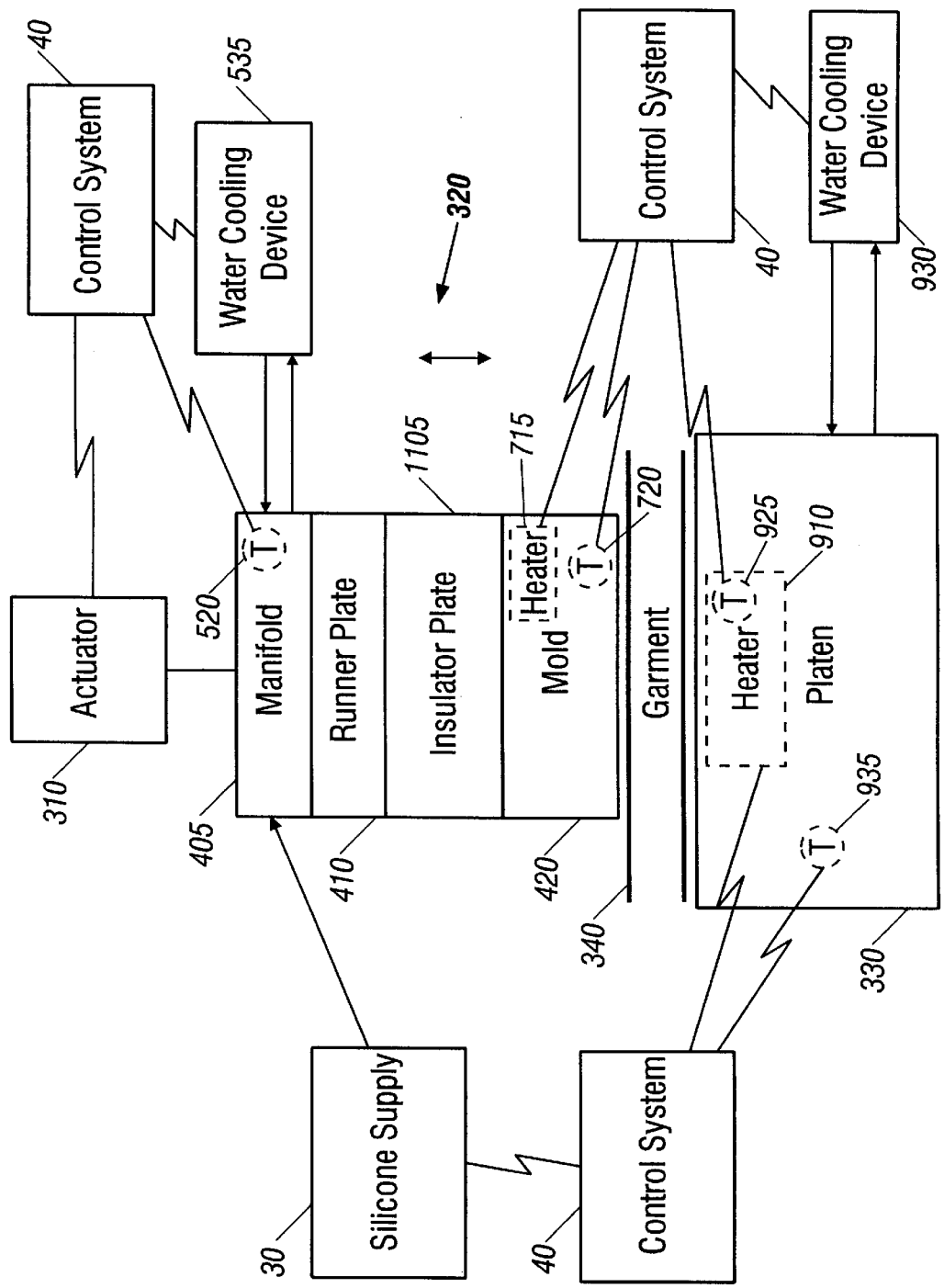
FIG. 11a is an illustration of an alternative preferred embodiment of the molding device of FIG. 4 in the engaged position.
Figure 11B:
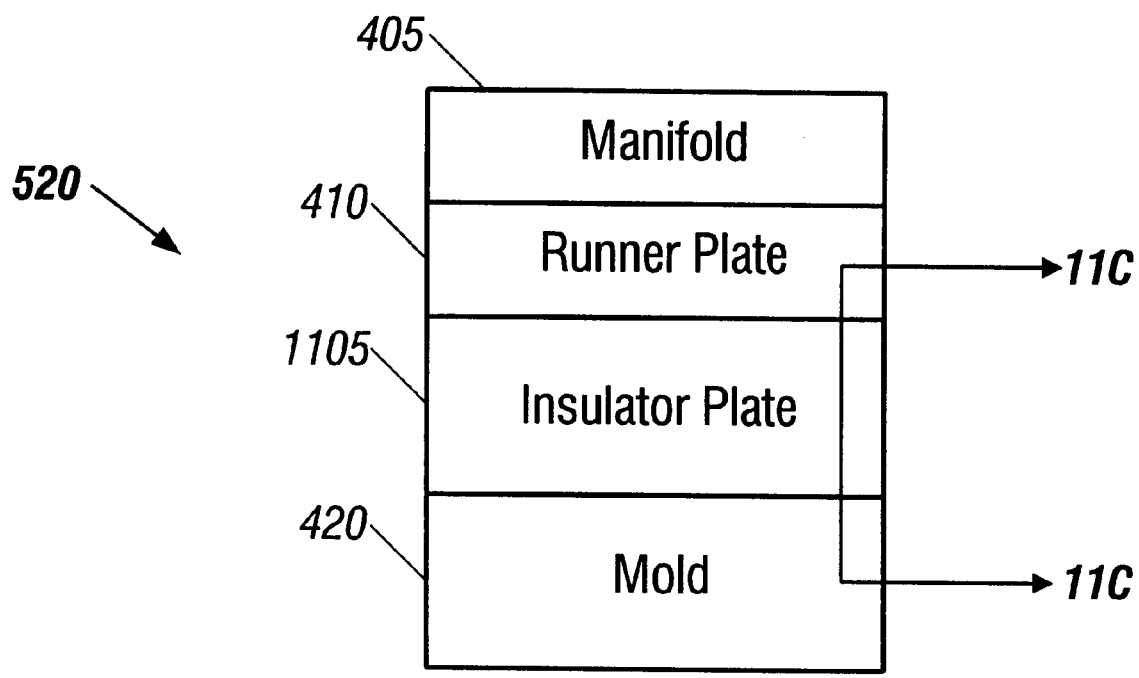
Figure 11C:
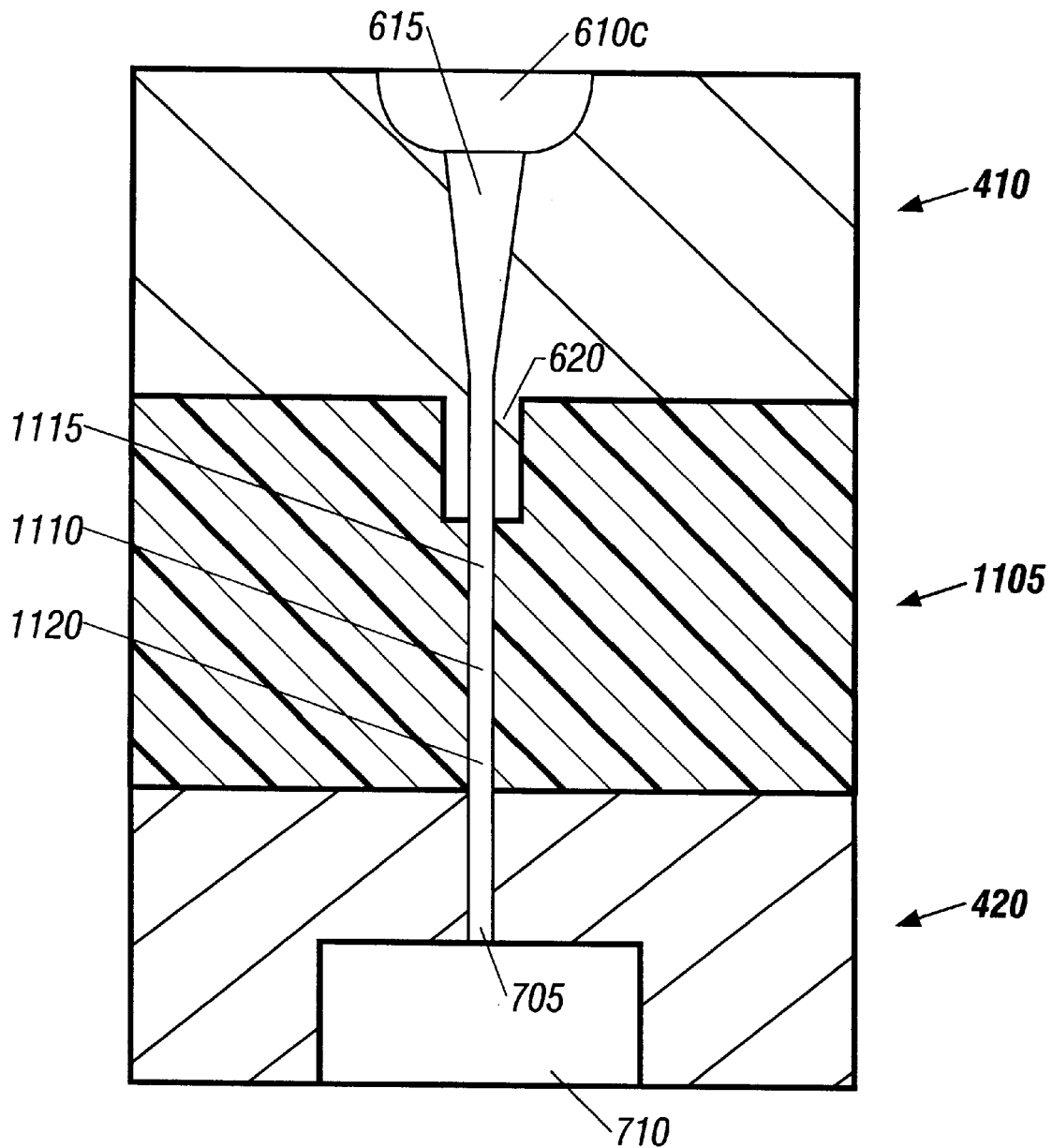
FIG. 11c is a cross-sectional view of the die set of FIG. 11b illustrating the interaction of the runner plate, insulating plate and mold.

In an alternative preferred embodiment, as illustrated in drawing FIGS. 11a–11c, the die set 320 of the molding device employs a thermal insulating plate 1105 instead of the resilient guide member 415 in order to provide thermal isolation of the runner plate 410 and manifold 405 from the heated mold 420. In this alternative preferred embodiment, the manifold 405, runner plate 410, insulating plate 1105 and mold 420 are coupled together using a conventional mechanical device such as, for example, a set of bolts. In this manner, the insulating plate 1105 prevents silicone resin within flow passages of the runner plate 410 and manifold 405 from curing due to heat transfer from the heated mold 420.

In the alternative preferred embodiment, as illustrated in drawing FIG. 11c, the runner plate 410 receives at least one supply of silicone resin from the manifold 405 and distributes at least one supply of silicone resin to the insulating plate 1105. The insulating plate 1105 in turn transmits at least one supply of silicone resin to the mold 420 for subsequent injection into at least one mold cavity 710. The insulating plate 1105 includes at least one silicone resin flow passage 1110 that conveys silicone from a corresponding silicone outlet passage 615 in the runner plate 410 to a corresponding silicone inlet passage 705 in the mold 420.

Each silicone resin flow passage 1110 includes a silicone resin inlet 1115 and a silicone resin outlet 1120. In a particularly preferred embodiment, the silicone resin inlet 1115 is adapted to receive a corresponding one of the runner plate nozzles 620.

Figure 11D:
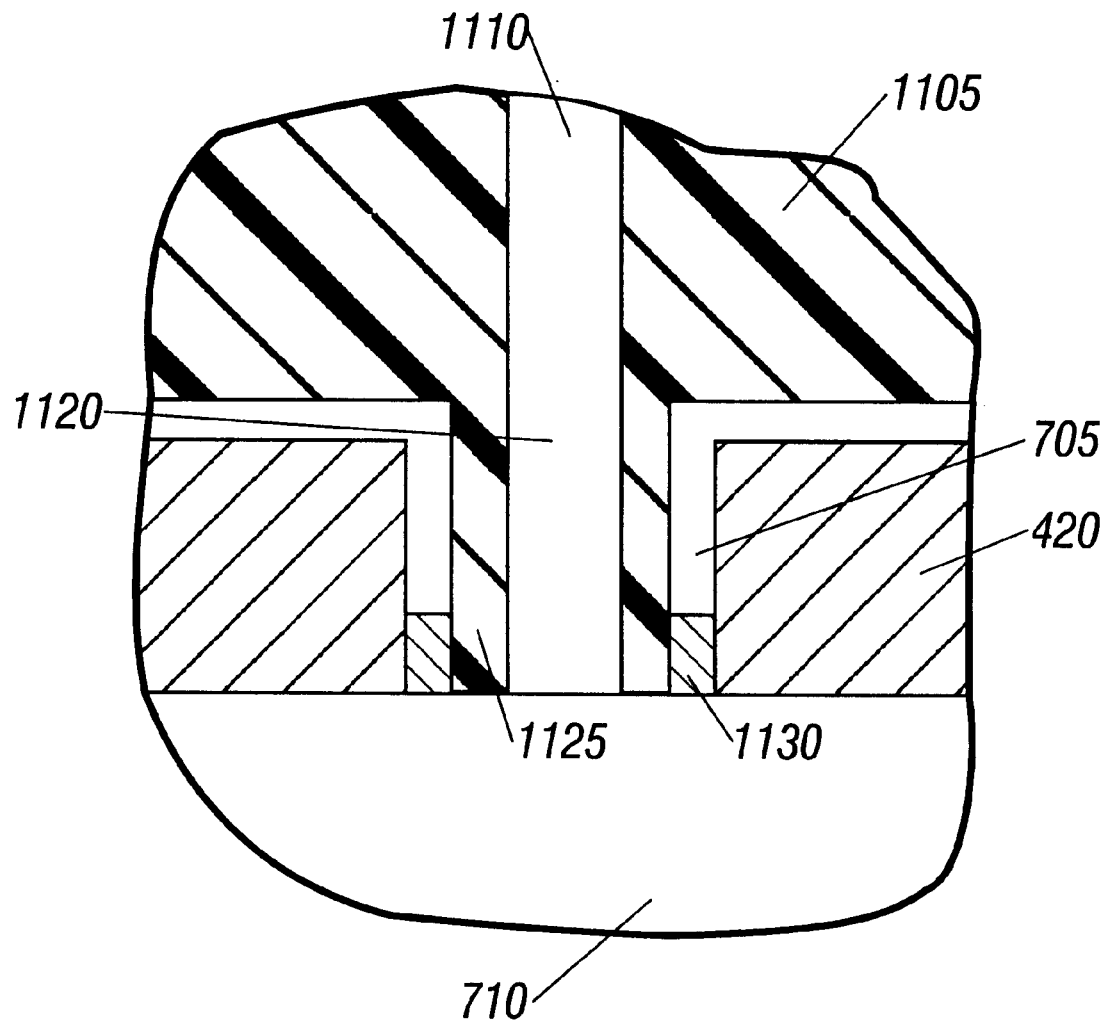
FIG. 11d, is a cross-sectional view of an alternative embodiment of the die set of FIG. 11b illustrating the cooperative interaction of the insulating plate and mold.

In a particularly preferred embodiment, as illustrated in FIG. 11d, the silicone resin outlet 1120 also includes a nozzle 1125 that is adapted to cooperatively interact and mate with a corresponding silicone inlet passage 705 of the mold 420. In a particularly preferred embodiment, the nozzle 1125 further includes a sealing member 1130 positioned about the outer periphery of the tip of the nozzle 1125 that provides a seal between the nozzle 1125 and the silicone resin inlet 705 of the mold 420. In a particularly preferred embodiment, the sealing member 1130 comprises a Teflon coating material applied to the outer periphery of the nozzle 1125.

Figure 11E:
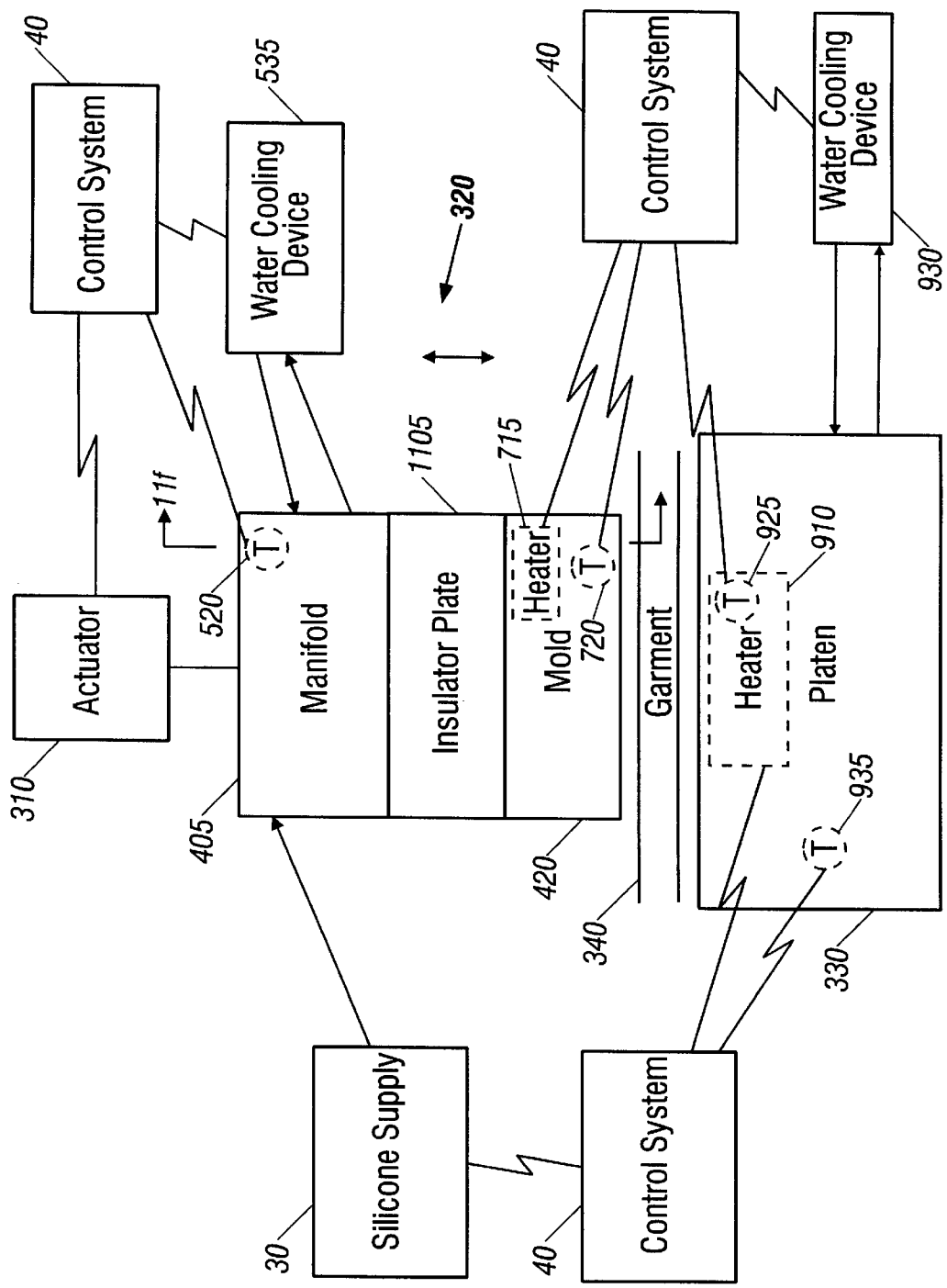
Figure 11F:
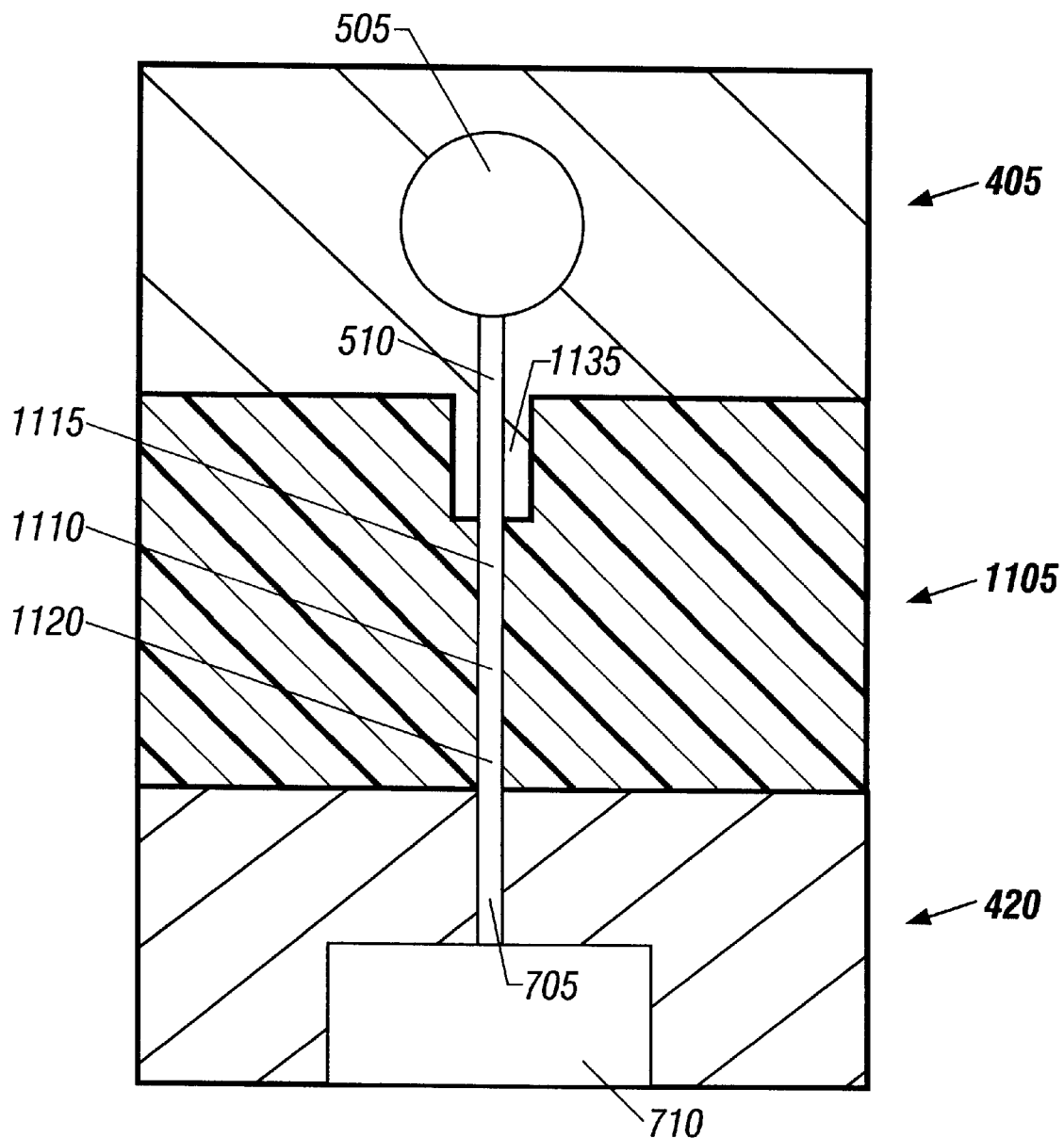
FIG. 11f is a cross-sectional view of a particularly preferred embodiment of the molding device of FIG. 11e.

In an alternative preferred embodiment, as illustrated in drawing FIGS. 11e and 11f, the die set 320 omits the runner plate 410. In this manner, a simplified configuration of the die set 320 is provided that is particularly well suited for simple configurations of three dimensional bodies for molding onto substrates. In the alternative preferred embodiment, the silicone resin is transmitted from the outlet passages 510 of the manifold 405 directly to the inlet passages 1115 of the insulator plate 1105. In a particularly preferred embodiment, the manifold 405 is further modified to incorporate nozzles 1135 that convey silicone resin from the outlet passages 510 of the manifold 405 to the inlet passages 1115 of the insulator plate 1105. In the particularly preferred embodiment, the nozzles 1135 cooperatively interact with the inlet passages 1115 of the insulator plate. In a particularly preferred embodiment, the insulator plate 1105 is further modified to incorporate nozzles that cooperatively interact with the inlet passages 705 of the mold 420 substantially as illustrated in FIG. 11d.

In a particularly preferred embodiment, the nozzles 1135 of the manifold 405 are further modified to thermally insulate the nozzles 1135. In one preferred embodiment, the nozzles 1135 are fabricated from thermal insulative materials such as, for example, beryllium copper or ceramic materials. In another preferred embodiment, the nozzles 1135 include thermal insulating members (not illustrated) that surround the outer periphery of the nozzles 1135 and provide thermal insulation for the nozzles 1135. In yet another alternative embodiment, the nozzles 1135 are both fabricated from thermally insulative materials and include thermal insulating members.

Figure 11G:
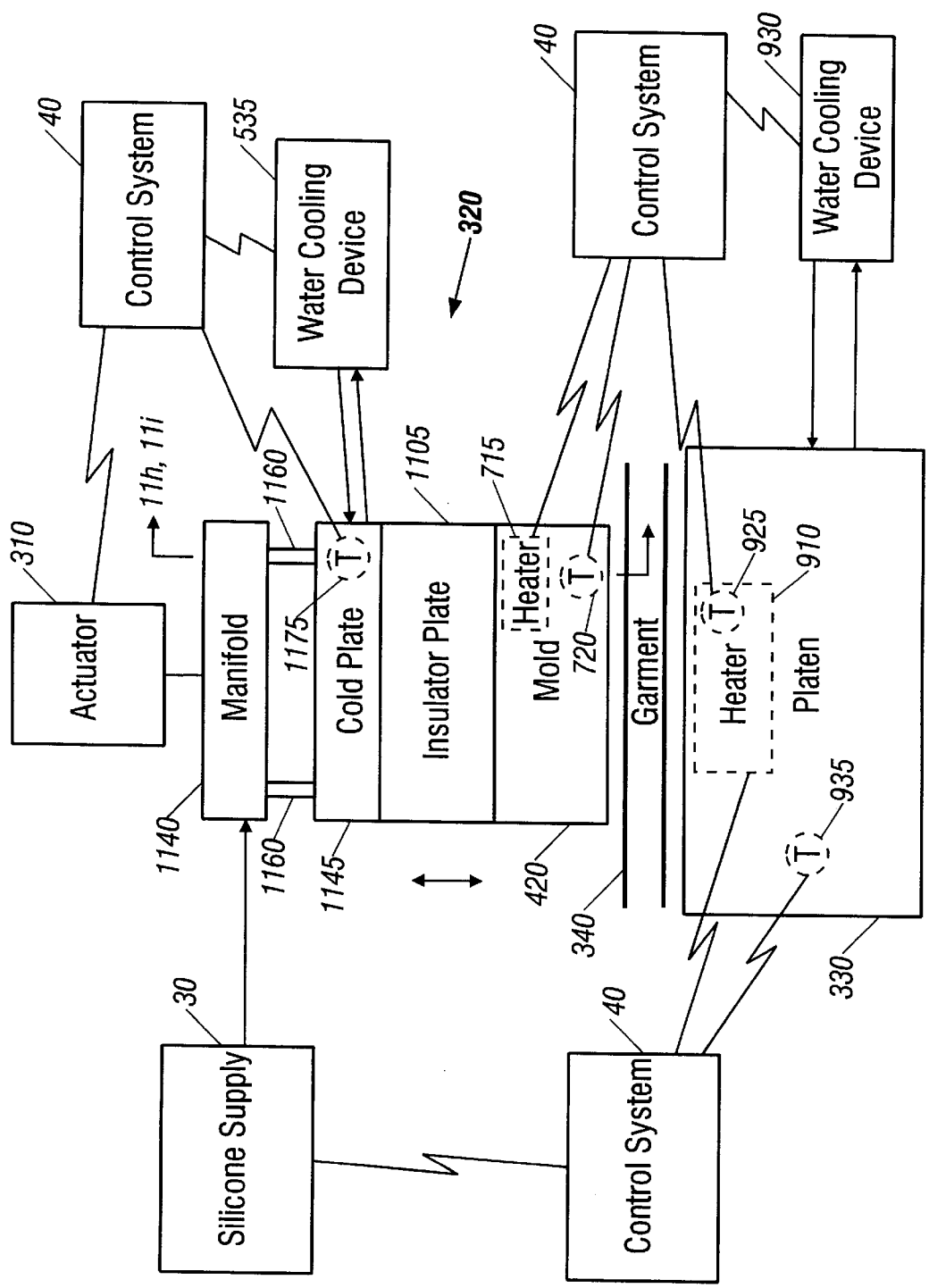
FIG. 11g is an alternative preferred embodiment of the molding device of Figure 11e.
Figure 11H:
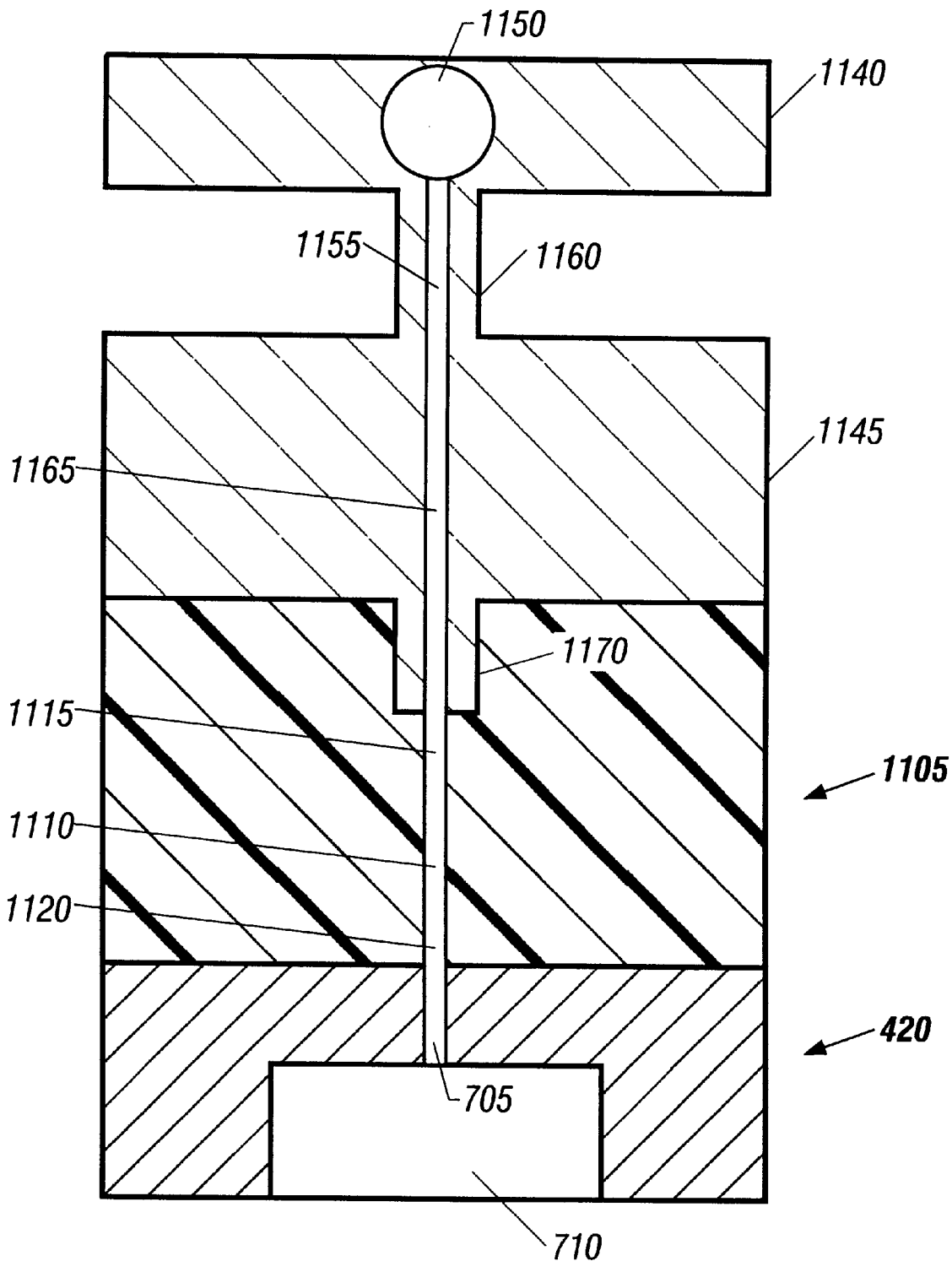
FIG. 11h is a cross-sectional view of a particularly preferred embodiment of the molding device of FIG. 11g.
Figure 11I:
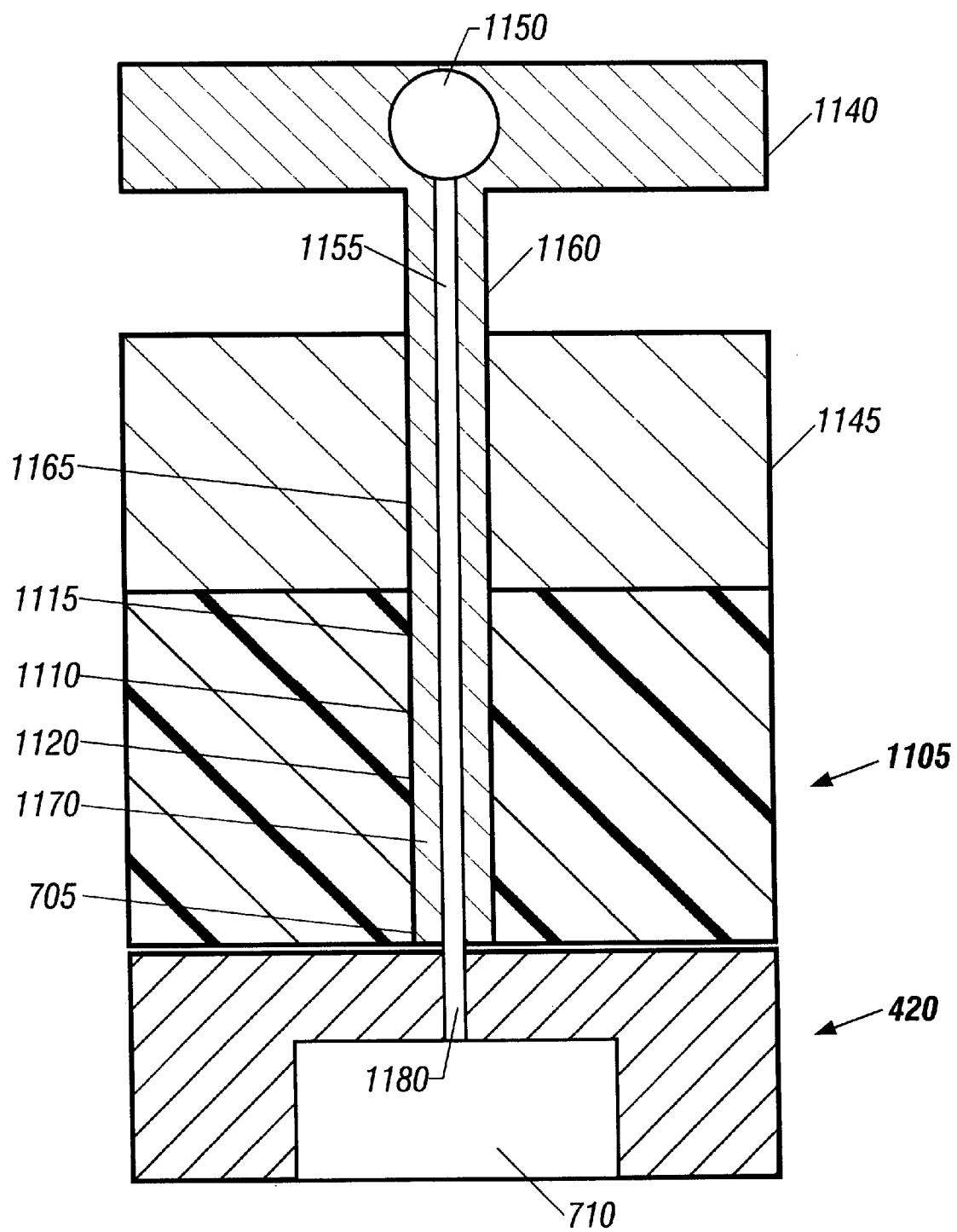
FIG. 11i is a cross-sectional view of an alternative particularly preferred embodiment of the molding device of FIGS. 11g and 11h.

In an alternative preferred embodiment, as illustrated in drawing FIGS. 11g, 11h and 11i, the manifold 405 of the die set 320 is divided into a manifold 1140 and a separate cold plate 1145. In this embodiment, silicone resin injected into the manifold 1140 is transmitted from the manifold 1140 to the mold 420 by passing through the cold plate 1145 and the insulator plate 1105. The combination of the insulator plate 1105 and the cold plate 1145 insulate the silicone resin within the flow passages of the die set 320 from the heat of the mold 420 and also maintain the operating temperature of the silicone resin within a predetermined range of temperatures. In this manner, curing of silicone resin within the flow passages of the die set 320 is virtually eliminated and optimal flow characteristics may be provided. Furthermore, this embodiment provides a simplified design that is ideal for mass production of garments and other commercial goods with three dimensional graphical designs of thermosetting polymers molded thereon.

The manifold 1140 includes at least one inlet passage 1150 and at least one outlet passage 1155. The manifold 1140 is positioned above and coupled to the cold plate 1145 by at least one conduit 1160. Silicone resin injected into the inlet passage 1150 of the manifold 1140 passes through the outlet passage 1155 into the body of the cold plate 1145 via the conduit 1160. The silicone resin then passes through the flow passage 1165 of the cold plate 1145 and into the insulator plate 1105. In a preferred embodiment, the conduit 1160 and manifold 1140 are separable from the body of the cold plate 1145. In a preferred embodiment, the cold plate further includes a nozzle 1170 that cooperatively interacts with the inlet passage 1115 of the insulator plate 1105. In a particularly preferred embodiment, the insulator plate 1105 is further modified to incorporate nozzles that cooperatively interact with the inlet passages 705 of the mold 420 substantially as illustrated in FIG. 11d.

In a particularly preferred embodiment, the nozzles 1170 of the cold plate 1145 are further modified to thermally insulate the nozzles 1170. In one preferred embodiment, the nozzles 1170 are fabricated from thermal insulative materials such as, for example, berylium copper or ceramic materials. In another preferred embodiment, the nozzles 1170 include thermal insulating members (not illustrated) that surround the outer periphery of the nozzles 1170 and provide thermal insulation for the nozzles 1135. In yet another alternative embodiment, the nozzles 1170 are both fabricated from thermally insulative materials and include thermal insulating members.

The cold plate 1145 is operably coupled to the water cooling device 535 in a manner substantially similar to that of the manifold 405 previously discussed. In this manner, the cold plate 1145 maintains the operating temperature of the silicone resin that passes though its flow passage 1165 within a predetermined range of temperatures. In order to facilitate heat transfer from the silicone resin to the cold plate 1145, the manifold 1140 and cold plate 1145 are preferably fabricated from thermally conductive materials such as, for example, aluminum, brass, and steel. The operating temperature of the cold plate 1145 is maintained within a predetermined range of operating temperatures by cooperative interaction of the cold plate 1145 with the water cooling device 535 in a manner substantially identical to that previously discussed for the manifold 405. In this manner, the cold plate 1145 maintains the temperature of the silicone resin that passes though the cold plate 1145 within a predetermined range of operating temperatures. For typical types and grades of silicone resins, the operating temperature of the cold plate 1145 may be maintained within the range, for example, of about 50 to 65° F. In a preferred embodiment, for typical types and grades of silicone resins, the operating temperature of the cold plate 1145 is maintained between about 55 to 60° F. In order to facilitate the control of the operating temperature of the cold plate 1145, a temperature sensor 1175 is preferably further provided within the cold plate 1145 that generates a signal representative of the operating temperature of the cold plate 1145. In this manner, the control system 40 is able to control the operating temperature of the cold plate 1145 automatically.

In a particularly preferred embodiment, as illustrated in FIG. 11i, the nozzle 1170 of the conduit 1160 cooperatively interacts with the inlet 705 of the mold cavity 710 of the mold 420. In this preferred embodiment, the manifold 1140 and conduit 1160 are removably affixed to the mold 420, the insulator plate 1105, and the cold plate 1145. In a preferred embodiment, the tip 1180 of the nozzle 1170 of the conduit 1160 is further positioned substantially within the plane of the upper surface of the mold cavity 710 in order to provide a smooth upper surface to the molded body of silicone resin.

In a particularly preferred embodiment, the nozzles 1170 of the conduit 1160 are further modified to thermally insulate the nozzles 1170. In one preferred embodiment, the nozzles 1170 are fabricated from thermal insulative materials such as, for example, berylium copper or ceramic materials. In another preferred embodiment, the nozzles 1170 include thermal insulating members (not illustrated) that surround the outer periphery of the nozzles 1170 and provide thermal insulation for the nozzles 1135. In yet another alternative embodiment, the nozzles 1170 are both fabricated from thermally insulative materials and include thermal insulating members.

Referring now to drawing FIGS. 12a–12e, an alternative preferred embodiment of the manifolds 405, 425 and 1140 will be described. In the alternative preferred embodiment, the manifolds 405, 425, and 1140 further include one or more flow control valves 1205 for controllable connecting the silicone resin flow passages of the manifolds 405, 425 and 1140 to a silicone resin supply 30. In this manner, the injection of silicone resin into the die set 320 may be precisely controlled and stopped by action of the flow control valve 1105. This in turn will minimize or prevent the problem of silicone resin dripping whereby a small amount of excess silicone resin is introduced into the flow passages of the die set 320.

Alternatively, the injection of a thermosetting polymer resin into the die set 320 may be precisely controlled and stopped by action of the flow control valve 1105. This in turn will minimize or prevent the problem of thermosetting polymer resin dripping whereby a small amount of excess thermosetting polymer resin is introduced into the flow passages of the die set 320.

Figure 12A:
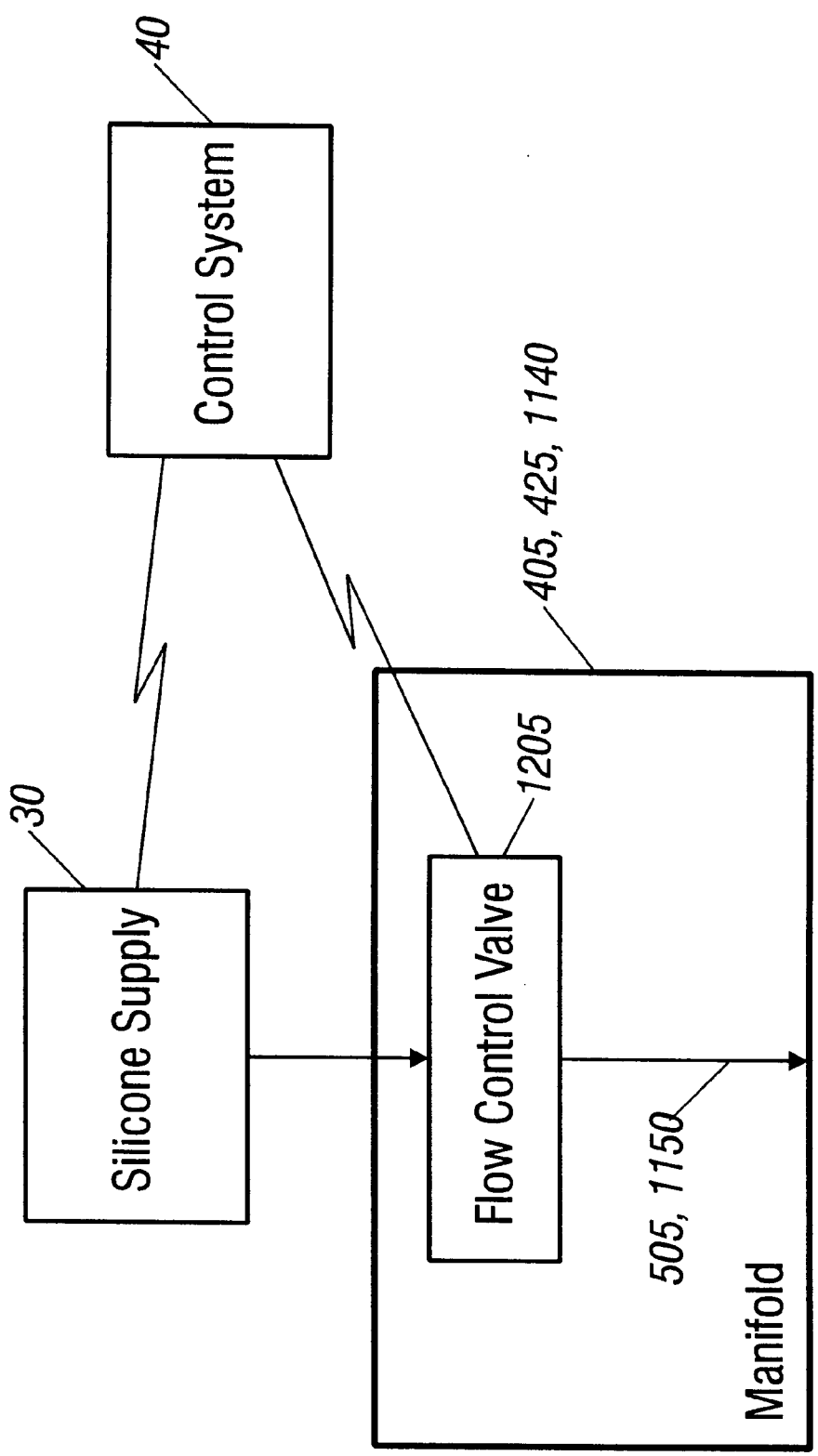
FIG. 12a is an illustration of an alternative preferred embodiment of the manifold of FIG. 4.
Figure 12B:
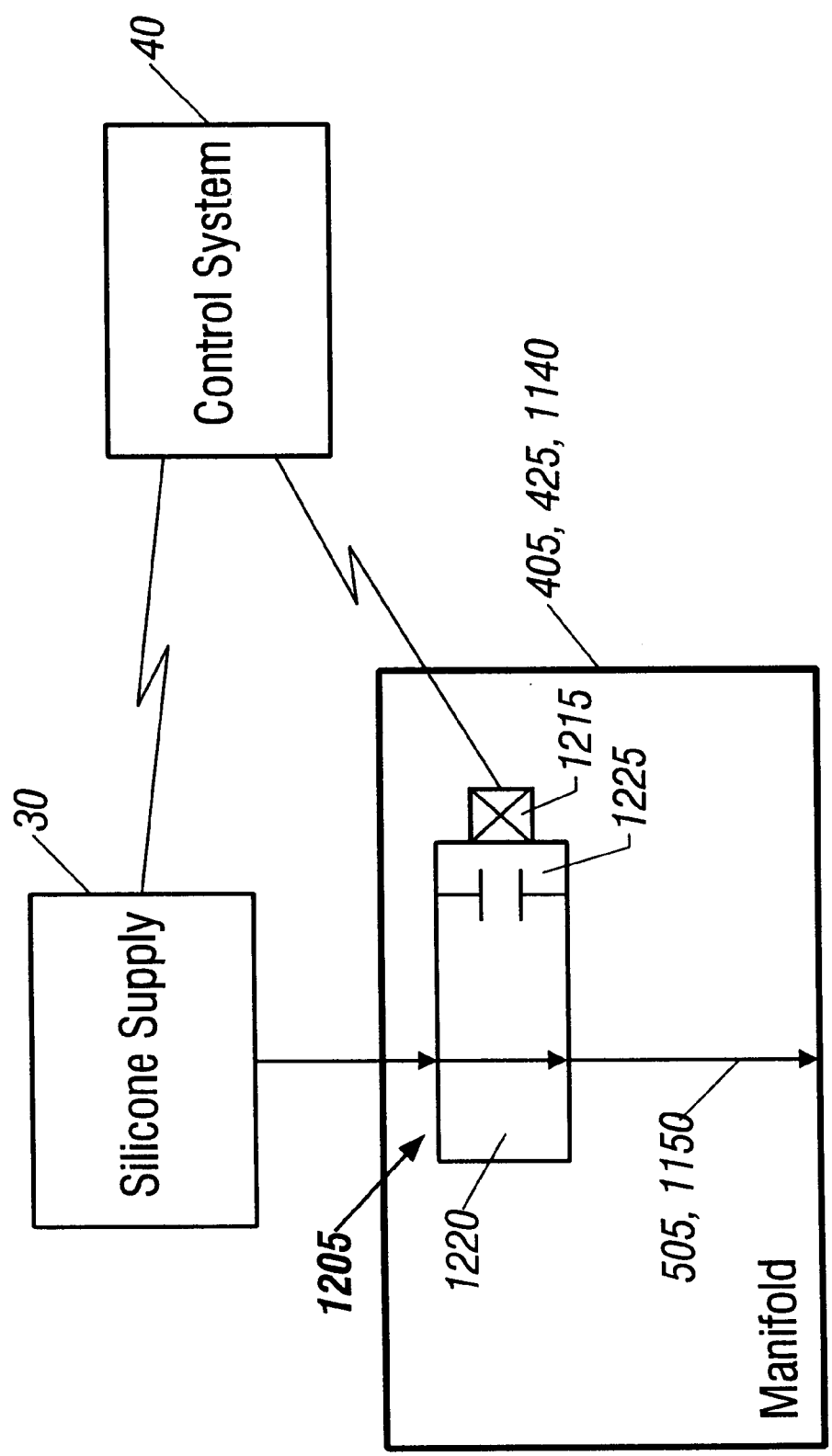

In a preferred embodiment, as illustrated in drawing FIG. 12b, the flow control valve 1205 will comprise a two-position valve, including a two-position valve element 1210 and an actuator 1215, mounted within the body of the manifolds 405, 425 and 1140 and controlled by the control system 40. In a first position 1220, the two position valve element 1210 permits flow of silicone resin from a silicone resin supply 30 to a corresponding one of the silicone resin inlet passages 505 and 1150 of the manifolds 405, 425 and 1140. In a second position 1225, the two position valve element 1210 blocks the flow of silicone resin from a silicone resin supply 30 to a corresponding one of the silicone resin inlet passages 505 and 1150 of the manifolds 405, 425 and 1140. The two-position flow control valve 1205 may comprise any number of conventional two-position flow control valves. The cross-sectional areas of the various flow passages of the flow control valve 1205 are preferably selected to prevent turbulent flow of the silicone resin, or the particular thermosetting polymer resin, in operation.

Figure 12C:
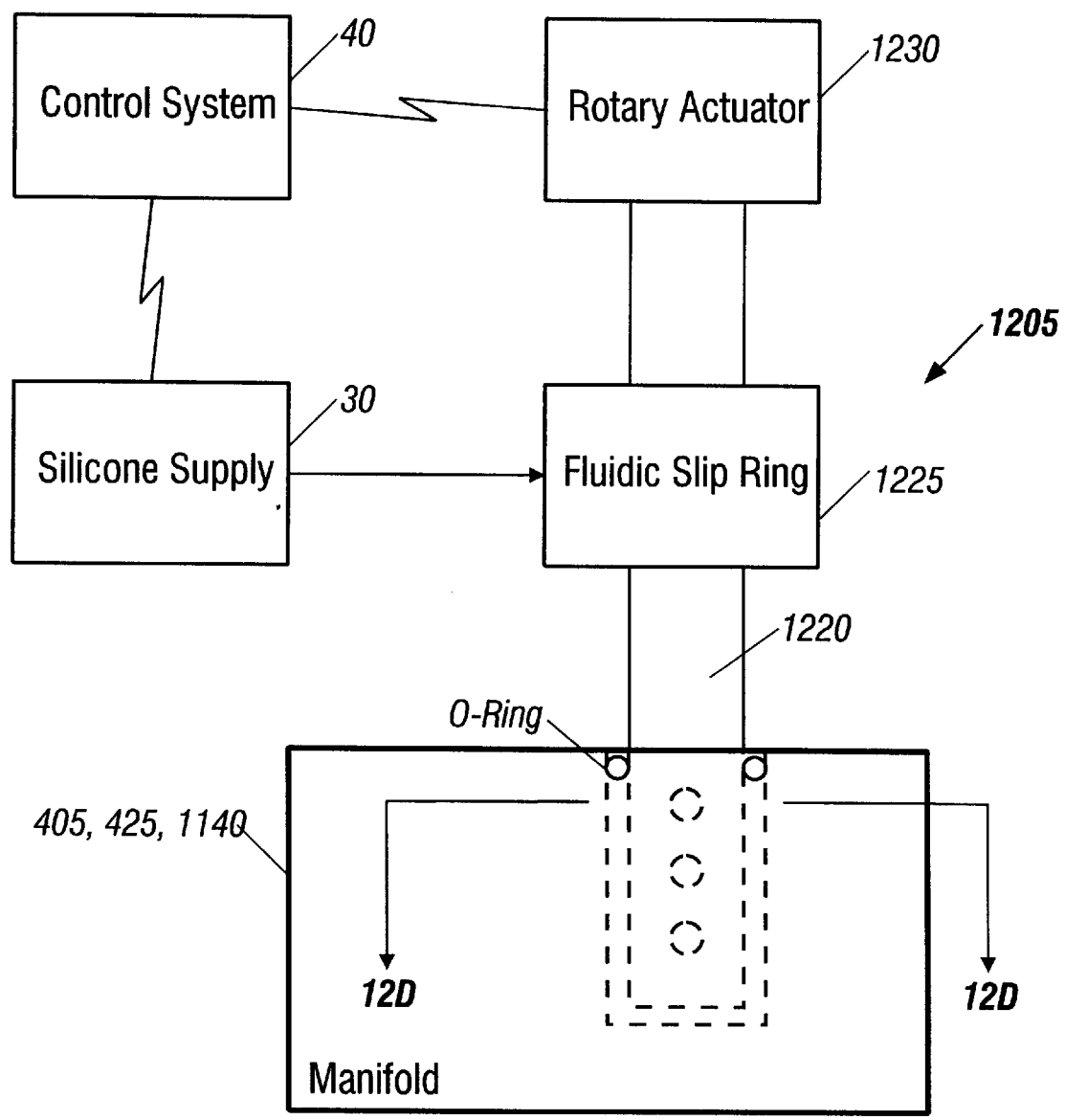
FIG. 12c is an illustration a preferred embodiment of the flow control valve of the manifold of FIG. 12b.
Figure 12D:
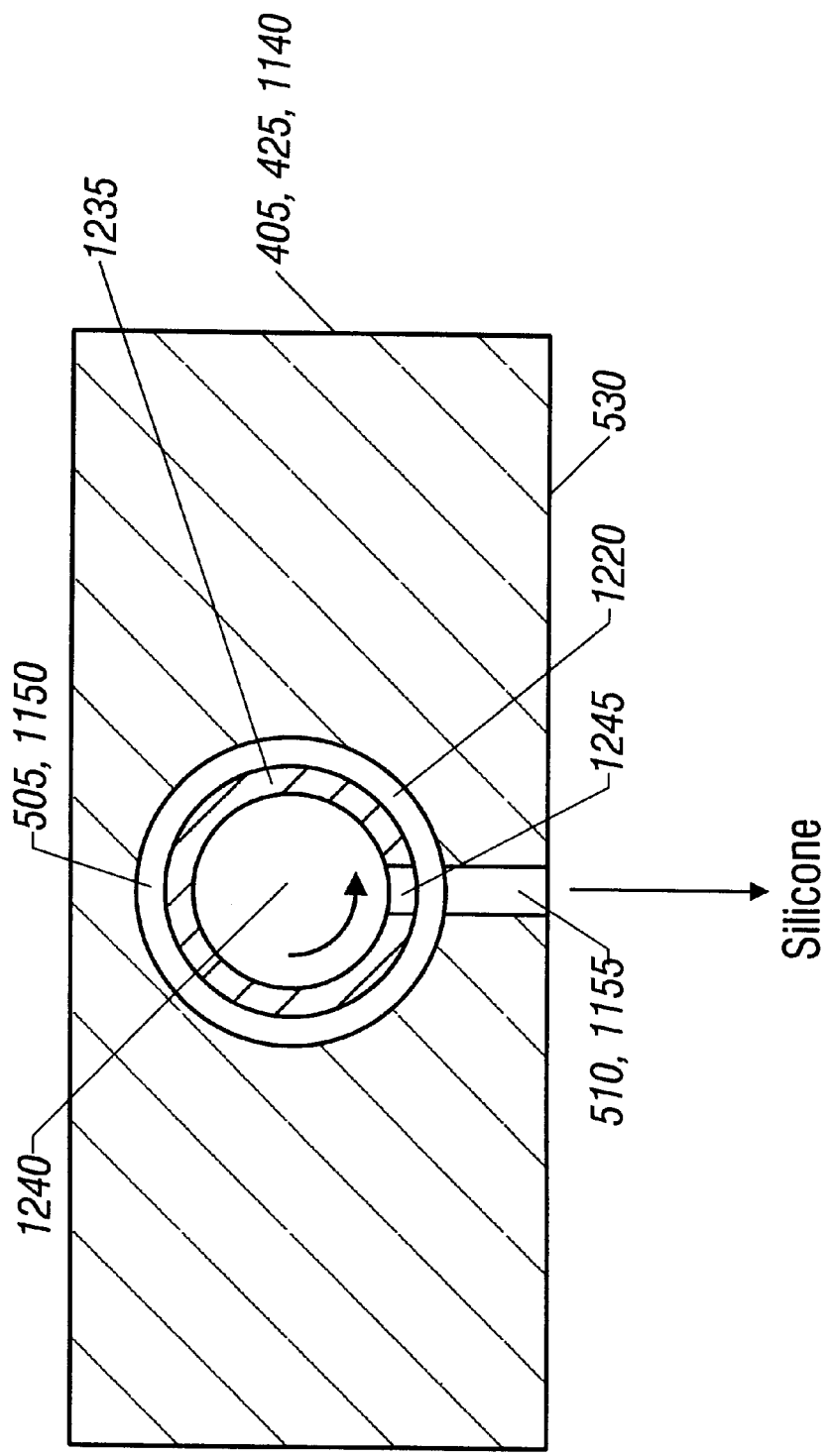
FIG. 12d is a cross-sectional view of the flow control valve of FIG. 12c.
Figure 12E:
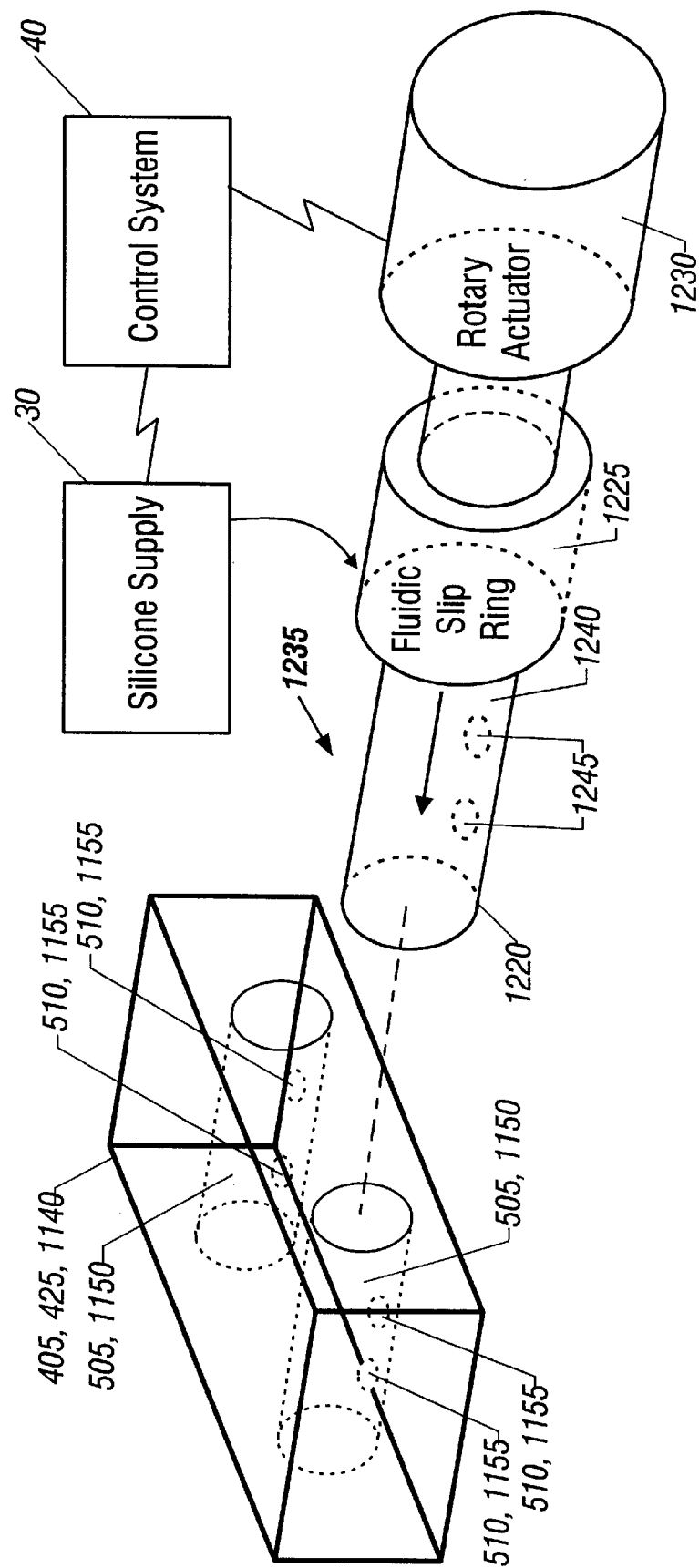
FIG. 12e is an exploded view of the flow control valve of FIG. 12c.

In a particularly preferred embodiment, as illustrated in drawing FIGS. 12c–12e, the two-position flow control valve 1205 comprises a rotary flow control valve that includes a rotary valve element 1220, a fluidic slip ring 1225, and a rotary actuator 1230. The rotary valve element 1220 is comprised of an annular member 1235 having an axially aligned central inlet flow passage 1240 and a number of radial outlet flow passages 1245. rotation of the valve element 1220 by the rotary actuator 1230 will move the radial outlet flow passages 1245 into and out of alignment with the silicone resin outlet passages 510 and 1155 of the manifolds 405, 425 and 1140. In this manner, the flow control valve 1205 provides a two position flow control valve.

In operation, the fluidic slip ring 1225 receives a supply of silicone resin from one of the silicone supplies 30, in a well known manner, and transmits the silicone resin to the axially aligned inlet passage 1240 of the annular member 1235. Rotation of the annular member 1235 by the rotary actuator 1230 then controllably moves the radial outlet passages 1245 of the annular member 1235 into and out of alignment with the silicone resin outlet passages 510 and 1155 of the manifolds 405, 425 and 1140.

The annular member 1235 may comprise an annular element fabricated from a durable material such as, for example, aluminum, copper, brass, steel, ceramic, or composite materials. The axially aligned inlet passage 1240 and the radial outlet passages 1245 of the annular member 1235 may be formed in the annular member 1235 using any number of conventional fabrication processes. As illustrated in FIGS. 12d and 12e, the axially aligned inlet passage 1240 of the annular member 1235 preferably is closed at a first end adjacent the rotary actuator 1230 and open at a second end that is inserted into a corresponding one of the silicone inlet passages 505 and 1150 of the manifolds 405, 425 and 1140. The annular member 1235 also includes an opening (not illustrated) that cooperatively interacts with the fluidic slip ring 1225 to permit the flow of silicone resin from the fluidic slip ring 1225 into the annular member 1235. The cross-sectional areas of the various flow passages of the annular member 1235 are preferably selected to prevent turbulent flow of the silicone resin, or the particular thermosetting polymer resin, in operation.

Figure 12F:
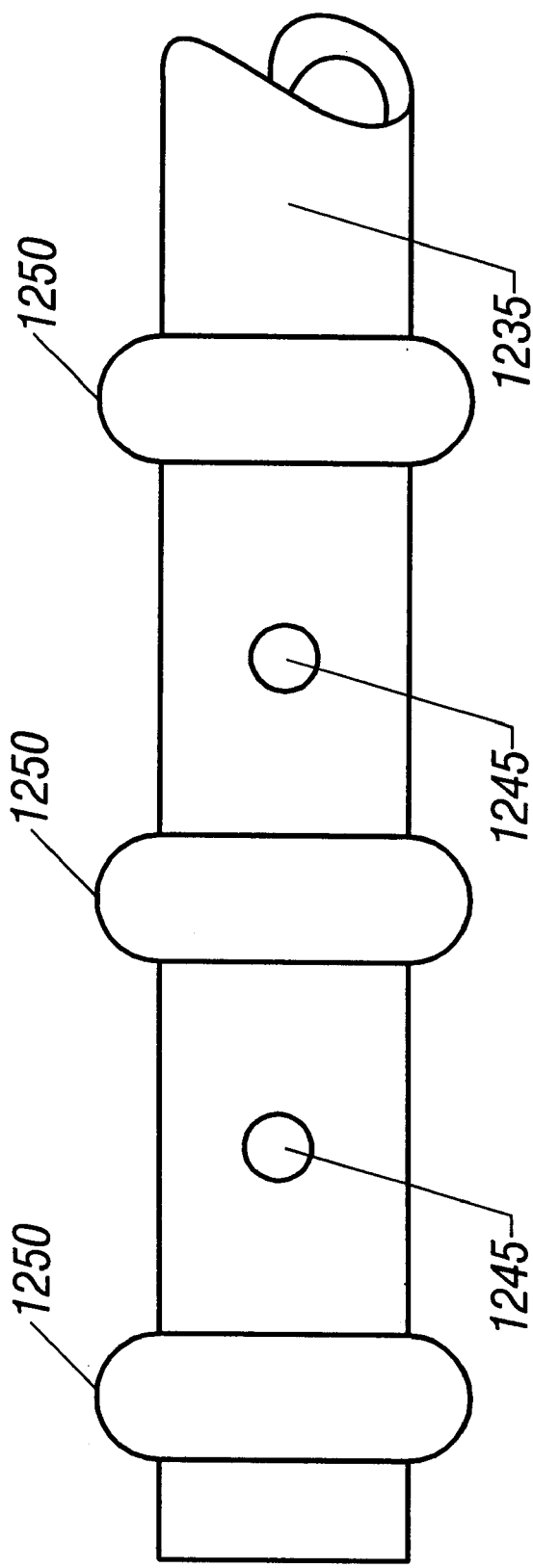
FIG. 12f is an illustration of a preferred embodiment of the annular member of the flow control valve of FIG. 12c.

In a preferred embodiment, as illustrated in drawing FIG. 12f, the annular member 1235 further includes O-ring, or similar, sealing members 1250 positioned on an outer periphery between each of the radial flow passages 1245. In this manner, flow out of the radial flow passages 1245 are fluidicly isolated.

The fluidic slip ring 1225 is of conventional design and operation and cooperatively interacts with the annular member in a well known manner to permit the flow of silicone resin from the silicone resin supply 30 to the inlet passage 1240 of the annular member. The fluidic slip ring 1225 may be mounted upon the annular member 1235 in a well known manner using conventional components.

The rotary actuator 1230 controllably rotates the annular member 1235 in a well known manner under the control of the control system 40. The rotary actuator 1230 may comprise any number of conventional rotary actuators. In operation, the control system 40 preferably controls the operation of the rotary actuator 1230 to minimize or eliminate the problem of dripping of silicone resin.

Referring now to drawing FIG. 13*a*, an alternative preferred embodiment of the molding device 20 will be described. In the alternative preferred embodiment, the molding device 20 further includes at least one selection valve 1305 and an exhaust pump 1310. The selection valve 1305 controllably connects a corresponding one of the silicone inlet passages 505 and 1150 of the manifolds 405, 425 and 1140 to a silicone resin supply 30 or the exhaust pump 1310. In this manner, the injection of silicone resin into the die set 320 may be precisely controlled and stopped by action of the selection valve 1305. Moreover, the exhaust pump 1310 will controllably remove any excess silicone resin injected into the die set 320. This in turn will minimize or prevent the problem of silicone resin dripping whereby a small amount of excess silicone resin is introduced into the flow passages of the die set 320.

Alternatively, the selection valve 1305 controllably connects a corresponding one of the silicone resin inlet passages 505 and 1150 of the manifolds 405, 425 and 1140 to a thermosetting polymer resin supply 30 or the exhaust pump 1310. In this manner, the injection of a thermosetting polymer resin into the die set 320 may be precisely controlled and stopped by action of the selection valve 1305. Moreover, the exhaust pump 1310 will controllably remove any excess thermosetting polymer injected into the die set 320. This in turn will minimize or prevent the problem of thermosetting polymer resin dripping whereby a small amount of excess thermosetting polymer resin is introduced into the flow passages of the die set 320.

The selection valve 1305 will preferably comprise a two-position valve, including a two-position valve element 1315 and an actuator 1320, mounted within the body of the manifolds 405, 425 and 1140 and controlled by the control system 40. In a first position 1325, the two position valve element 1315 permits flow of silicone resin from a silicone resin supply 30 to a corresponding one of the silicone resin inlet passages 505 and 1150 of the manifolds 405, 425 and 1140. In a second position 1330, the two position valve element 1315 blocks the flow of silicone resin from a silicone resin supply 30 to a corresponding one of the silicone resin inlet passages 505 and 1150 of the manifolds 405, 425 and 1140 and instead connects the silicone inlet passages 505 and 1150 of the manifolds 405, 425 and 1140 to the inlet of the exhaust pump 1310. The selection valve 1305 may comprise any number of conventional selection valves. The cross-section areas of the various flow passages of the selection valve 1305 are preferably selected to minimize or prevent turbulent flow of the silicone. Alternatively, the desired and preferred dimensions of the flow passages will vary as a function of the particular thermosetting polymer selected for use.

In a particularly preferred embodiment, the selection valve 1305 is a model no. 2F-B2X32-V-B-31VA selection valve, available from Parker-Hannifin in Elyria, Ohio, mounted external to the body of the manifolds 405, 425 and 1140.

The exhaust pump 1310 may comprise any number of conventional hydraulic pumps. In operation, the control system 40 preferably controls the operation of the selection valve 1305 and the exhaust pump 1310 to minimize or prevent the problem of dripping of silicone resin.

Referring now to drawing FIGS. 13*b*–13*c*, an alternative preferred embodiment of the molding device 20 will be described. In the alternative preferred embodiment, the molding device 20 further includes at least one flow control valve 1335 and a vacuum source 1340 and the manifolds 405, 425 and 1140 further includes at least one exhaust passage 1345 that connects a corresponding one of the silicone resin inlet passages 505 and 1150 to the flow control valve 1335. In operation, the flow control valve 1335 controllably connects a corresponding one of the silicone inlet passages 505 and 1150 of the manifolds 405, 425 and 1140 to the vacuum source 1340. In this manner, the injection of silicone resin into the die set 320 may be precisely controlled and stopped by action of the flow control valve 1335. Moreover, the vacuum source 1340 will controllably remove any excess silicone resin injected into the die set 320. This in turn will minimize or prevent the problem of silicone resin dripping whereby a small amount of excess silicone resin is introduced into the flow passages of the die set 320.

Alternatively, the flow control valve 1335 controllably connects a corresponding one of the silicone inlet passages 505 and 1150 of the manifolds 405, 425 and 1140 to the vacuum source 1340. In this manner, the injection of a thermosetting polymer resin into the die set 320 may be precisely controlled and stopped by action of the flow control valve 1335. Moreover, the vacuum source 1340 will controllably remove any excess thermosetting polymer resin injected into the die set 320. This in turn will minimize or prevent the problem of thermosetting polymer resin dripping whereby a small amount of excess thermosetting polymer resin is introduced into the flow passages of the die set 320.

The flow control valve 1335 will preferably comprise a two-position valve, including a two-position valve element 1350 and an actuator 1355, mounted within the body of the manifolds 405, 425 and 1140 and controlled by the control system 40. In a first position 1360, the two position valve element decouples the vacuum source 1340 from a corresponding one of the silicone exhaust passages 1345 of the manifolds 405, 425 and 1140. In a second position 1365, the two position valve element 1350 couples the vacuum source 1340 to a corresponding one of the silicone exhaust passages 1345 of the manifolds 405, 425 and 1140. The flow control valve 1335 may comprise any number of conventional selection valves. The cross-section areas of the various flow passages of the flow control valve 1335 and exhaust passages 1345 are preferably selected to minimize or prevent turbulent flow of the silicone resin. Alternatively, the desired and preferred dimensions of the flow passages will vary as a function of the particular thermosetting polymer selected for use.

The exhaust passage 1345 may be provided within the body of the manifolds 405, 425 and 1140 using any number of conventional fabrication processes. In a preferred embodiment, the cross-sectional area of the exhaust passage 1345 is selected to minimize or prevent turbulent flow.

The vacuum source 1340 may comprise any number of vacuum sources such as, for example, the inlet to a hydraulic pump or an evacuated chamber. In operation, the control system 40 preferably controls the operation of the flow control valve 1335 and the vacuum source 1340 to minimize or prevent the problem of dripping of silicone resin.

Referring now to drawing FIG. 13*d*, an alternative preferred embodiment of the molding device 20 illustrated in drawing FIG. 13*a* will be described. In the alternative preferred embodiment, the exhaust pump 1310 is replaced with a connection to ambient atmospheric pressure. In this manner, the injection of silicone resin into the die set 320 may be precisely controlled and stopped by action of the selection valve 1305. Moreover, the ambient atmospheric pressure, which is lower than typical injection pressures, will effectively remove any excess silicone resin injected into the die set 320. This in turn will minimize or prevent the problem of silicone resin dripping whereby a small amount of excess silicone resin is introduced into the flow passages of the die set 320.

Referring now to drawing FIGS. 14*a* and 14*b*, an alternative preferred embodiment of the molding device 20 will be described that minimizes the impact of silicone resin dripping. In the alternative preferred embodiment, silicone resin drips 1405 that remain within the flow passages of the die set 320 are blown out into the mold cavities 710 of the mold 420 by a blast of compressed air or short burst of high pressure silicone. The silicone resin drips 1405 are then molded into the three dimensional body of silicone resin within the mold cavity 710 during a normal molding cycle. In this manner, regardless of whether the silicone resin drip 1405 is cured or uncured within the die set, the silicone resin drip is completely removed and molded into the three dimensional body.

Alternatively, thermosetting polymer resin drips 1405 that remain within the flow passages of the die set 320 are blown out into the mold cavities 710 of the mold 420 by a blast of compressed air or short burst of high pressure thermosetting polymer. The thermosetting polymer resin drips 1405 are then molded into the three dimensional body of thermosetting polymer resin within the mold cavity 710 during a normal molding cycle. In this manner, regardless of whether the thermosetting polymer resin drip 1405 is cured or uncured within the die set, the thermosetting polymer resin drip is completely removed and molded into the three dimensional body.

Referring now to drawing FIGS. 15–20*b*, a preferred embodiment of the plurality of silicone resin supplies 30 will be described. The plurality of silicone resin supplies 30 preferably controllably provide a predetermined amount a plurality of supplies of silicone resin to each of the molding devices 20. In this manner, each of the molding devices 20 can mold a plurality of three dimensional bodies onto substrates substantially simultaneously. Furthermore, the plurality of supplies of silicone resin 30 preferably provide at least a plurality of colors of silicone resin. In this manner, each molding device can mold a plurality of three dimensional silicone bodies having a plurality of colors onto a substrate.

Alternatively, and more generally, a plurality of thermosetting polymer supplies 30 preferably controllably provide a predetermined amount a plurality of supplies of thermosetting polymer resins to each of the molding devices 20. In this manner, each of the molding devices 20 can mold a plurality of three dimensional bodies of thermosetting polymers onto substrates substantially simultaneously. Furthermore, the plurality of supplies of thermosetting polymer resins preferably provide at least a plurality of colors of thermosetting polymer resins. In this manner, each molding device can mold a plurality of three dimensional thermosetting polymer bodies having a plurality of colors onto a substrate.

Figure 16:
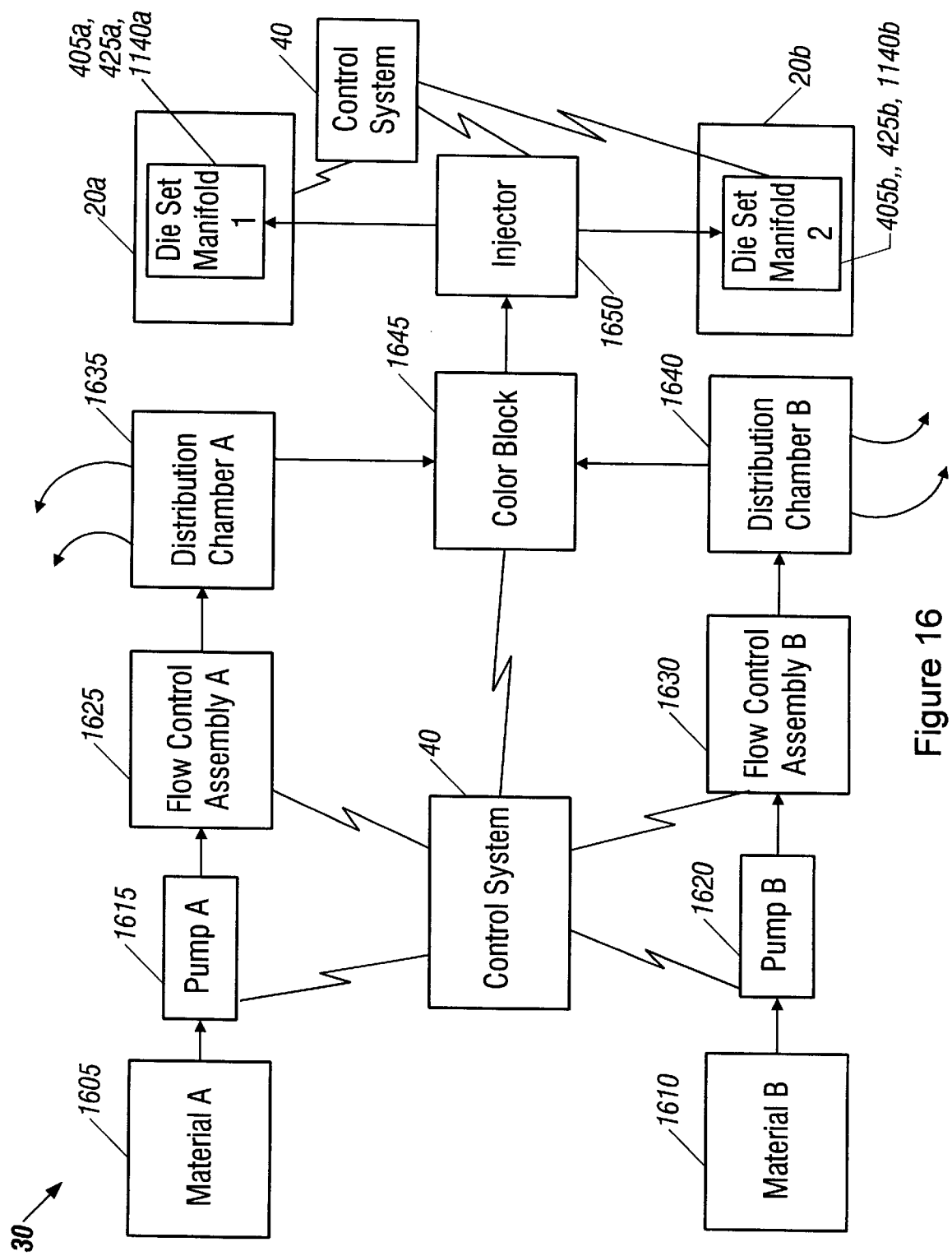
FIG. 16 is an illustration of a preferred embodiment of an apparatus for providing a plurality of supplies of silicone resin, or some other thermosetting polymer resin or resins.

As illustrated in drawing FIG. 16, in a preferred embodiment, the silicone resin supplies 30 include a source of a material A 1605, a source of a material B 1610, a pump A 1615, a pump B 1620, a flow control assembly A 1625, a flow control assembly B 1630, a distribution chamber A 1635, a distribution chamber B 1640, a color block 1645, and an injector 1650. In operation, the pump A 1615 pumps material A from the source of material A 1605 to the flow control assembly A 1625. The flow control assembly A 1625 is adapted to control the pressure and flow rate of the material A. The material A is then distributed in a distribution chamber A 1635 to at least one color block 1645. In a particularly preferred embodiment, the distribution chamber A distributes material A to a plurality of color blocks as indicated by the arrows.

In an alternative preferred embodiment, the color block 1645 is replaced with a conventional mixing device such as, for example, a static mixer that mixes the materials A and B to generate an uncolored thermosetting polymer for subsequent injection into a molding device 20.

Likewise, the pump B 1620 pumps material B from the source of material B 1610 to the flow control assembly B 1630. The flow control assembly B 1630 is adapted to control the pressure and flow rate of the material B. The material B is then distributed in a distribution chamber B 1640 to at least one color block 1645. In a particularly preferred embodiment, the distribution chamber B 1640 distributes material B to a plurality of color blocks as indicated by the arrows.

The at least one color block 1645 receives material A, receives material B, controllably injects a pigment and mixes materials A and B and the pigment to form a colored silicone resin. Alternatively, and more generally, a colored thermosetting polymer resin may be formed by using the appropriate materials A and B, and possibly C, D, E, etc., depending upon the particular thermosetting polymer selected. The colored silicone resin, or thermosetting polymer resin, is then received by at least one injector 1650 for subsequent injection into the manifolds 405, 425 and 1140 of at least one molding device 20. In an alternative preferred embodiment, the color block 1645 is modified to remove the capability to inject pigment and thereby generates an uncolored thermosetting polymer resin.

In the preferred embodiment, all of the silicone resin supplies share the supply of material A 1605, the supply of material B 1610, the pump A 1615, the pump B 1620, the flow control assembly A 1625, the flow control assembly B 1630, the distribution chamber A 1635 and the distribution chamber B 1640.

The materials A and B may comprise any number of conventional constituent materials for conventional silicones such as, for example, GE LIM 3745, GE LIM 6030, GE LIM 6045, GE LIM 6050 and GE LIM 6745, available from General Electric, Silicone Products Division, in Waterford, N.Y. In a preferred embodiment, the materials A and B comprise conventional constituent materials for silicones identified as GE LIM 3745 and GE LIM 6745, available from General Electric, Silicone Products Division, in Waterford, N.Y. More generally, any thermosetting polymer resin that requires the mixture of two or more materials may be utilized by the appropriate addition, as necessary, of additional supplies, pumps, flow control assemblies and distribution chambers. In this manner, the plurality of silicone resin supplies 30 may be adapted for use with virtually any thermosetting polymer. Examples of such thermosetting polymers include at least silicone, nitrile rubber or urethane.

The pumps A and B, 1615 and 1620, may comprise any number of conventional hydraulic pumps capable of pumping typical types and grades of silicone resin constituent materials. The pumps A and B, 1615 and 1620, furthermore may comprise constant or variable displacement pumps. In a preferred embodiment, the pumps A and B, 1615 and 1620, are model no. STSKWNSSMH #100 pumps available from St. Services. The pumps A and B, 1615 and 1620, may pump materials A and B at flow rates ranging, for example, from about 0.1 gal/min. to 100 gal./min. In a preferred embodiment, the pumps A and B pump the materials A and B at flow rates ranging from about 1.0 to 10.0 gal./min. Alternatively, more generally, the desired flow rates will vary as a function of particular thermosetting polymer selected and the constituent materials comprising the specific thermosetting polymer selected.

The flow control assemblies A and B, 1625 and 1630, control the operating pressure and flow rate of materials A and B. In a preferred embodiment, as illustrated in drawing FIG. 17a, the flow control assemblies A and B, 1625 and 1630, each include an accumulator 1705, a pressure sensor 1710, a flowmeter 1715, a variable orifice 1720, a pressure relief valve 1725 and a drainage valve 1730.

In operation, material pumped into the flow control assembly is received by the accumulator 1705. The accumulator 1705 operates in a well known manner to maintain a controlled reservoir of material at a predetermined range of operating pressures. The operating pressure of the material is monitored by the pressure sensor 1710 which generates, in a well known manner, a signal representative of an operating temperature of the material within the flow control assembly for processing by the control system 40. The flowmeter 1715 monitors the flow rate of material within the flow control assembly and generates, in a well known manner, a signal representative of a flow rate of the material for processing by the control system 40. The variable orifice 1720 controls the flow rate of material exhausting from the flow control assembly under the control of the control system 40. The pressure relief valve 1725 automatically releases material from the flow control assembly whenever the operating pressure exceeds a predetermined maximum as determined by a spring bias provided in the pressure relief valve 1725. The exhaust valve 1730 controllably permit material to be exhausted from the flow control assembly under the control of the control system 40. The control system 40 monitors the pressure sensor 1710 and flow sensor 1715 and controllably operates the variable orifice 1720 and exhaust valve 1730 to maintain the operating pressure and flow rate of the flow control assembly within a predetermined range of values using conventional control algorithms for fluids.

For typical silicone constituent materials, the flow control assemblies 1625 and 1630 may maintain the operating pressure of the materials within the flow control assemblies 1625 and 1630, for example, between about 10 and 1000 psi. In a preferred embodiment, for typical silicone constituent materials, the flow control assemblies 1625 and 1630 maintain the operating pressure of the materials within the flow control assemblies between about 100 and 250 psi. For typical silicone constituent materials, the flow control assembly may maintain the flow rate of the materials within the flow control assemblies 1625 and 1630, for example, between about 0.1 gal./min. to 100 gal./min during an injection cycle. In a preferred embodiment, for typical silicone constituent materials, the flow control assemblies 1625 and 1630 maintain the flow rate of the materials within the flow control assemblies 1625 and 1630 between about 1 and 10 gal./min. during an injection cycle. Alternatively, more generally, the desired operating parameters of the flow control assemblies 1625 and 1630 will depend upon the particular thermosetting polymer selected and the specific constituent components of that thermosetting polymer.

In a particularly preferred embodiment, the flow control assemblies 1625 and 1630 are available from Mitten Fluid Power in Syracuse, N.Y.

Figure 17A:
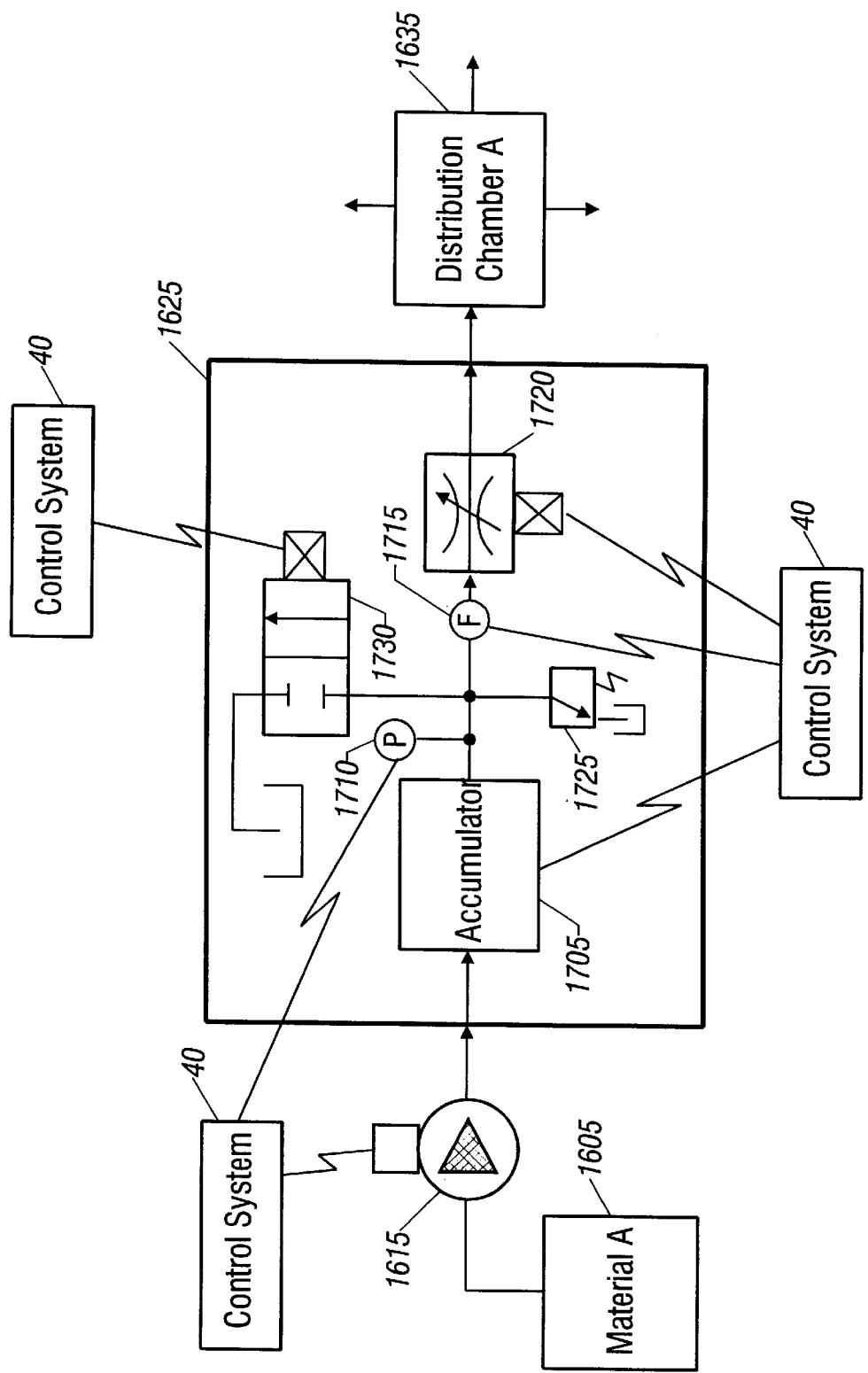
FIG. 17a is an illustration of a preferred embodiment of a flow control assembly for use in the apparatus of FIG. 16.
Figure 17B:
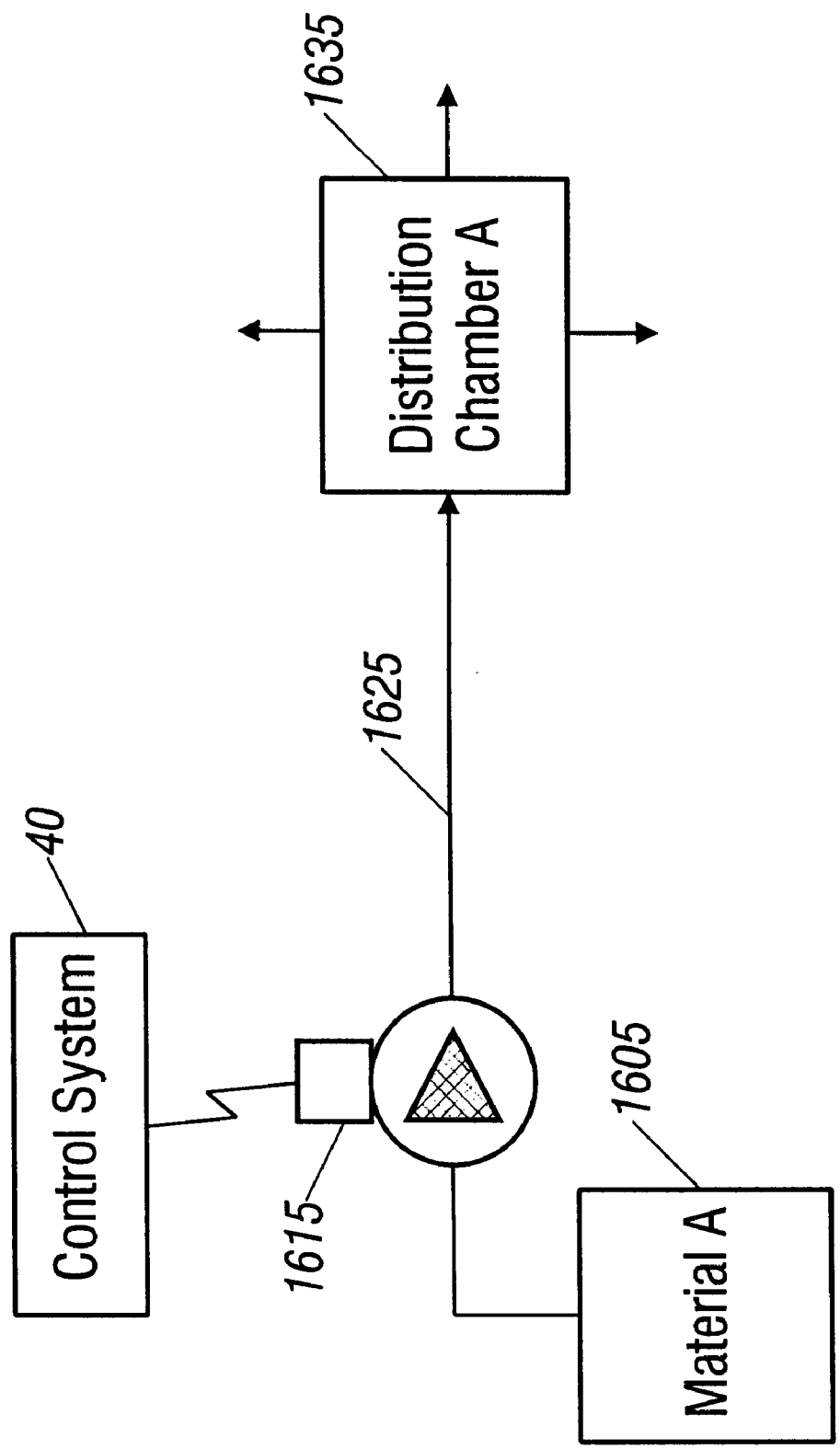
FIG. 17b is an illustration of an alternative preferred embodiment of a flow control assembly for use in the apparatus of FIG. 16.
Figure 18A:
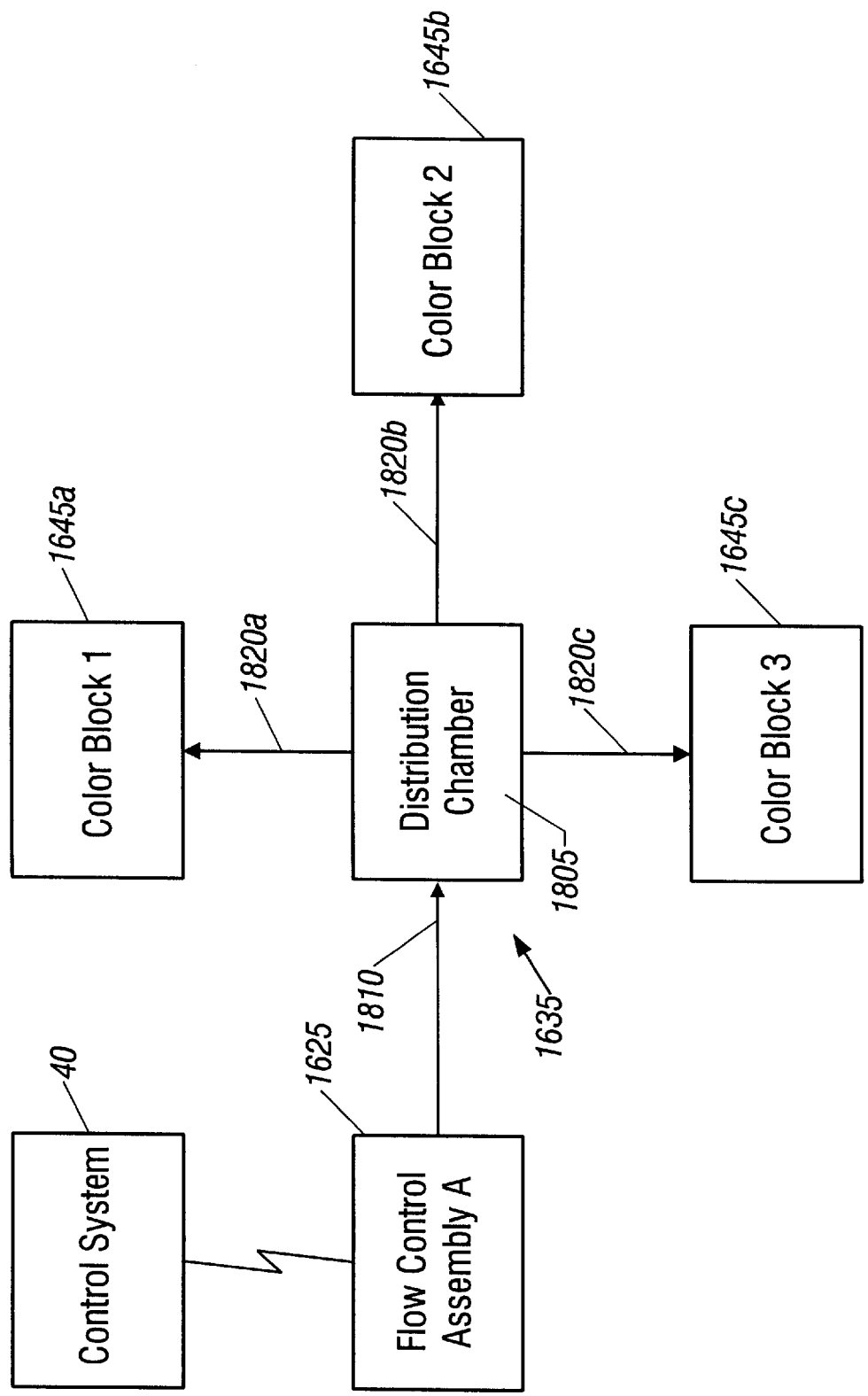
FIG. 18a is an illustration of a preferred embodiment of a distribution chamber for use in the apparatus of FIG. 16.

In an alternative preferred embodiment, as illustrated in drawing FIG. 17b, the flow control assemblies 1625 and 1630 are conventional commercially available fluid conduits. In a particularly preferred embodiment, the flow control assemblies 1625 and 1630 are available from Mitten Fluid Power in Syracuse, N.Y.

The distribution chambers A and B, 1625 and 1630, distribute the A and B materials to at least one color block 1645. As illustrated in drawing FIG. 18a, the distribution chambers include a chamber 1805 having a single inlet 1810 and at least one outlet 1820. In a preferred embodiment, the chamber 1805 includes a plurality of outlets 1820 that are in turn each connected to a color block as indicated by the arrows. The volumetric size of the chamber 1805 may range, for example, from about 0.125 to 100 gallons. In a preferred embodiment, for typical types and grades of silicone, the volumetric size of the chamber 1805 is about 10 gallons. Alternatively, more generally, the desired volumetric size of the chamber 1805 will vary as a function of the particular thermosetting polymer selected as well as the size and number of molding devices 20 and mold cavities 710 simultaneously in use.

In a particularly preferred embodiment, the distribution chambers are model no. UT 102 distribution chambers available from Mitten Fluid Power in Syracuse, N.Y.

The color block 1645 receives materials A and B from the distribution chambers A and B, 1635 and 1640, controllably adds a pigment, and mixes materials A and B with the pigment in a well known manner to form a colored silicone resin. As illustrated in drawing FIG. 19a, in a preferred embodiment, the color blocks include a material A inlet 1905, a material B inlet 1910, a pigment supply 1915, a chamber 1920, a static mixer 1925, and a colored silicone resin outlet 1930. The A and B materials are received in the inlets 1905 and 1910 and input to the chamber 1920. A pigment is injected into the chamber by the pigment supply 1915 under the control of the control system 40. The mixture of materials A and B and the pigment are then mixed in a well known manner within the static mixer 1925. The resulting colored silicone resin is then output through the colored silicone outlet 1930. In an alternative preferred embodiment, the pigment supply 1915 is omitted from the color block 1645 and only uncolored polymer resin is produced.

The color block 1645 may comprise any number of conventional commercially available color blocks. In a preferred embodiment, the color block is a model no. SSMH111 available from St. Services in Albany, N.Y.

Alternatively, the color block 1645 may be adapted to mix and color any number of thermosetting polymer resins such as, for example, silicone, nitrile rubber or urethane. In another alternative preferred embodiment, the color block 1645 is modified to omit the pigment supply 1915.

Figure 19A:
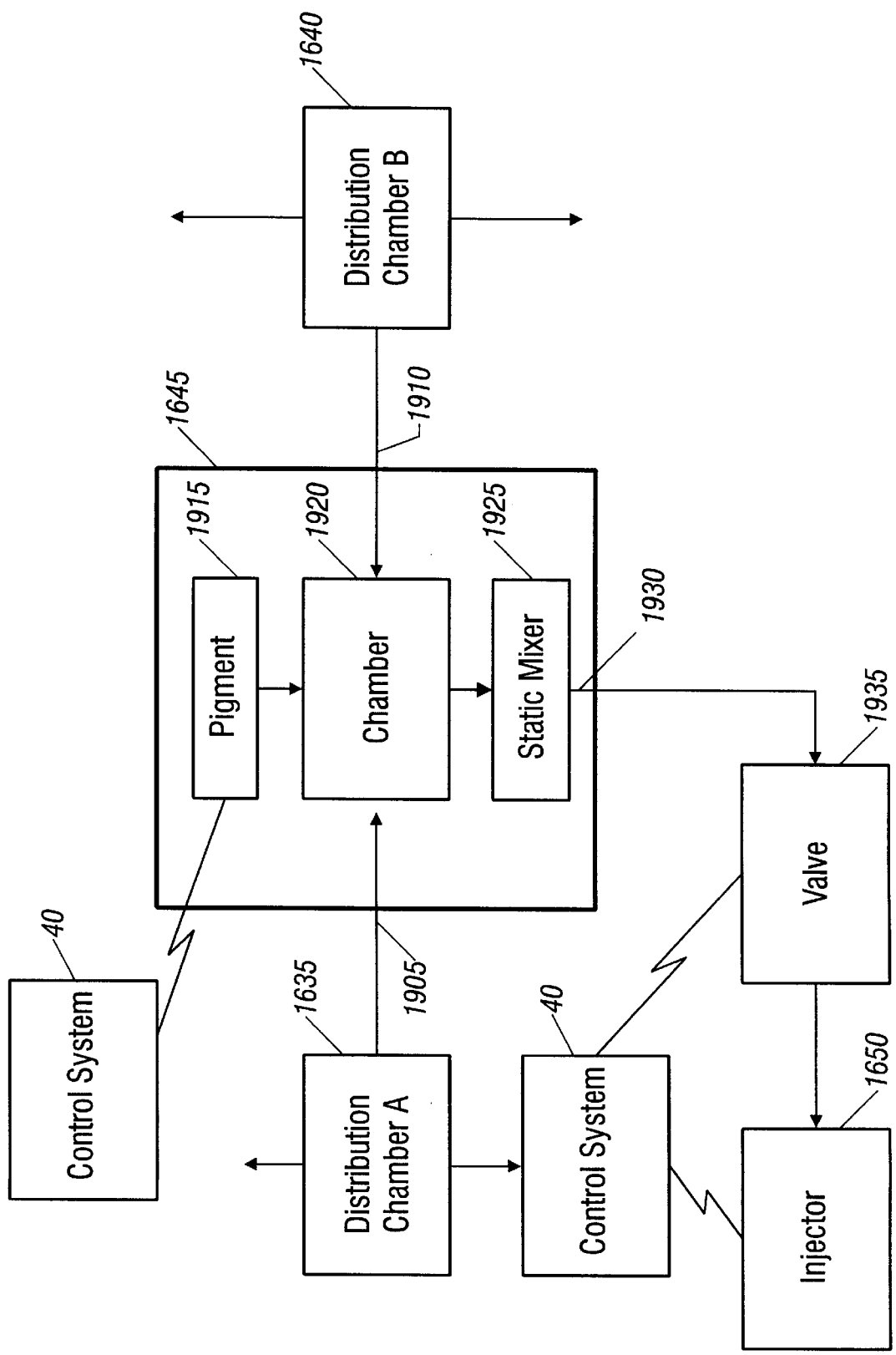
FIG. 19a is an illustration of a preferred embodiment of a color block for use in the apparatus of FIG. 16.

As illustrated in FIG. 19a, in a particularly preferred embodiment, a flow control valve 1935 is further provided between the colored silicone resin outlet 1930 and the injector 1650 that controllably couples an injector 1650 to the color block 1645. The flow control valve 1935 may comprise any number of conventional flow control valve. In a preferred embodiment, the flow control valve 1935 is a model FM2DDKN flow control valve available from Parker-Hannifin located in Elyria, Ohio.

The injectors 1650 controllably inject a controlled amount of the supply of silicone resin provided by the color block 1645 into one or more manifolds 405*a*–405*c*, 425*a*–425*c*, or 1140*a*–1140*c* of one or more corresponding molding devices 20*a*–20*c*. As illustrated in drawing FIGS. 20*a* and 20*b*, in a preferred embodiment, each of the injectors 1650 comprise a silicone resin inlet 2005, a silicone resin distribution junction 2010, one or more check valves 2015*a*–2015*c*, one or more silicone resin feed lines 2020*a*–2020*c*, one or more silicone resin feed junctions 2025*a*–2025*c*, one or more silicone resin injection chambers 2030*a*–2030*c*, one or more injection pistons 2035*a*–2035*c*, one or more injection housings 2040*a*–2040*c*, one or more actuator rods 2045*a*–2045*c*, an actuator 2050, one or more position sensors 2055*a*–2055*b*, one or more silicone resin injection lines 2060*a*–2060*c*, and one or more flow control valves 2065*a*–2065*c*. Alternatively, the injectors 1650 may controllably inject a controlled amount of a supply of thermosetting polymer resin into one or more manifolds 405*a*–405*c*, 425*a*–425*c* or 1140*a*–1140*c* of one or more corresponding molding devices 20*a*–20*c*.

During operation of the injector 1650, silicone resin is either drawn into or pumped out of the silicone resin injection chambers 2030*a*–2030*c* by controlled movement of the injection pistons 2035*a*–2035*c*, in a direction indicated by the downward arrow 2070, during a silicone resin loading cycle, or in a direction indicated by the upward arrow 2075, during a silicone resin injection cycle. During the silicone resin loading cycle of the injector 1650, the supply of colored silicone resin from the color block 1645 is drawn into one or more silicone resin injection chambers 2030*a*–2030*c* through the silicone resin inlet 2005, silicone resin distribution junction 2010, one or more check valves 2015*a*–2015*c*, one or more silicone resin feed lines 2020*a*–2020*c*, one or more silicone resin feed junctions 2025*a*–2025*c*, and a portion of the one or more silicone resin injection lines 2060*a*–2060*c*. During the silicone resin injection cycle, a controlled amount of silicone resin is pumped out of one or more silicone resin injection chambers 2030*a*–2030*c* to one or more manifolds 405*a*–405*c*, 425*a*–425*c*, or 1140*a*–1140*c* of one or more corresponding molding devices 20*a*–20*c* through one or more silicone resin injection lines 2060*a*–2060*c* and one or more flow control valve 2065*a*–2065*c*.

The silicone resin inlet 2005 is fluidicly coupled to the outlet of the flow control valve 1935 and the inlet of the silicone resin distribution junction 2010. The silicone resin inlet 2005 conveys silicone, or other thermosetting polymer resin, from the outlet of the flow control valve 1935 to the inlet of the silicone resin distribution junction 2010. The silicone resin inlet 2005 may comprise any number of conventional fluid conduits adapted to convey conventional thermosetting polymer materials such as, for example, silicone. The cross-sectional area of the fluid pathway of the silicone resin inlet 2005 will vary is a known manner as a function of the particular operating conditions. In a preferred embodiment, the silicone resin inlet 2005 is a model UT 201 available from St. Services in Albany, N.Y.

The silicone resin distribution junction 2010 is fluidicly coupled to the outlet of the silicone resin inlet 2005 and to the inlets of one or more corresponding silicone resin feed lines 2020*a*–2020*c*. The silicone resin distribution junction 2010 conveys and distributes silicone, or some other thermosetting polymer resin, from the silicone resin inlet 2005 to the inlet of one or more corresponding silicone resin feed lines 2020*a*–2020*c*. The silicone resin distribution junction 2010 may comprise any number of conventional fluidic junctions adapted to convey thermosetting polymer resins such as, for example, silicone resins. The cross-sectional area of the fluid pathways of the silicone resin distribution junction 2010 will vary in a known manner as a function of the particular operating conditions. In a preferred embodiment, the silicone resin distribution junction 2010 is a model UT 202 junction available from St. Services in Albany, N.Y.

The one or more silicone resin feed lines 2020*a*–2020*c* are fluidicly coupled to the corresponding outlets of the silicone resin distribution junction 2010 and to the corresponding inlets of one or more silicone resin feed junctions 2025*a*–2025*c*. The one or more silicone resin feed lines 2020*a*–2020*c* convey silicone resin, or some other thermosetting polymer resin, from the silicone resin distribution junction 2010 to the corresponding inlets of one or more silicone resin feed junctions 2025*a*–2025*c*. The one or more silicone resin feed lines 2020*a*–2020*c* may comprise any number of conventional fluidic conduits adapted to convey thermosetting polymer resins such as, for example, silicone resins. The cross-sectional area of the fluid pathways of the silicone resin feed lines 2020*a*–2020*c* will vary in a known manner as a function of the particular operating conditions. In a preferred embodiment, the silicone resin feed lines 2020*a*–2020*c* are a model UT 203 feed line available from St. Services in Albany, New York.

In a particularly preferred embodiment, each of the silicone resin feed lines 2020*a*–2020*c* include corresponding check valves 2015*a*–2015*c*. The check valves 2015*a*–2015*c* permit fluid flow in forward direction indicated by the arrows but prevent fluid flow in the reverse direction. In this manner, during the silicone resin loading cycle, the one or more check valves 2015*a*–2015*c* permit silicone resin, or some other thermosetting polymer resin, to flow into the silicone resin injection chambers 2030*a*–2030*c* from the silicone resin inlet 2005. While during the silicone resin injection cycle, the one or more check valves 2015*a*–2015*c* block the reverse flow of silicone resin, or some other thermosetting polymer resin, pumped out of the silicone resin injection chambers 2030*a*–2030*c*. The check valves 2015*a*–2015*c* may comprise any number of conventional fluid check valves. In a preferred embodiment, the check valves 2015*a*–2015*c* are model CV041P-65 check valves, available from Parker-Hannifin in Elyria, Ohio.

The one or more silicone resin feed junctions 2025*a*–2025*c* are fluidicly coupled to the outlet of one or more silicone resin feed lines 2020*a*–2020*c* and to the inlet of one or more silicone resin injection lines 2060*a*–2060*c*. The one or more silicone resin feed junctions 2025*a*–2025*c* convey silicone resin, or some other thermosetting polymer resin, from the outlet of one or more silicone resin feed lines 2020*a*–2020*c* to the inlets of one or more corresponding silicone resin injection lines 2060*a*–2060*c*. The one or more silicone resin feed junctions 2025*a*–2025*c* may comprise any number of conventional fluidic conduits adapted to convey thermosetting polymer resins such as, for example, silicone resins. The cross-sectional area of the fluid pathways of the silicone resin feed junctions 2025*a*–2025*c* will vary in a known manner as a function of the particular operating conditions. In a preferred embodiment, the silicone resin feed junctions 2025a–2025c are model UT 301 feed junctions available from St. Services in Albany, N.Y.

The one or more silicone resin injection lines 2060a–2060c are fluidicly coupled to the outlet of one or more corresponding silicone resin injection chambers 2030a–2030c, the outlet of one or more corresponding silicone resin feed junctions 2025a–2025c, one or more corresponding flow control valves 2065a–2065c, and the inlets of one or more die set manifolds 405a–405c, 425a–425c, or 1140a–1140c of one or more corresponding molding devices 20a–20c. During the silicone resin loading cycle, the one or more silicone resin injection lines 2060a–2060c convey silicone resin from the outlets of one or more corresponding silicone resin feed junctions 2025a–2025c to the corresponding inlet of one or more corresponding silicone resin injection chambers 2030a–2030c. During the silicone resin injection cycle, the one or more silicone resin injection lines 2060a–2060c convey silicone resin from the corresponding outlets of one or more silicone resin injection chambers 2030a–2030c to the corresponding inlets of one or more die set manifolds 405a–405c, 425a–425c, or 1140a–1140c of one or more corresponding molding devices 20a–20c.

The one or more silicone resin injection lines 2060a–2060c may comprise any number of conventional fluidic conduits adapted to convey thermosetting polymer resins such as, for example, silicone resins. The cross-sectional area of the fluid pathways of the silicone resin injection lines 2060a–2060c will vary in a known manner as a function of the particular operating conditions. In a preferred embodiment, the silicone resin injection lines 2060a–2060c are model UT-208 injection lines available from St. Services in Albany, N.Y.

Figure 20A:
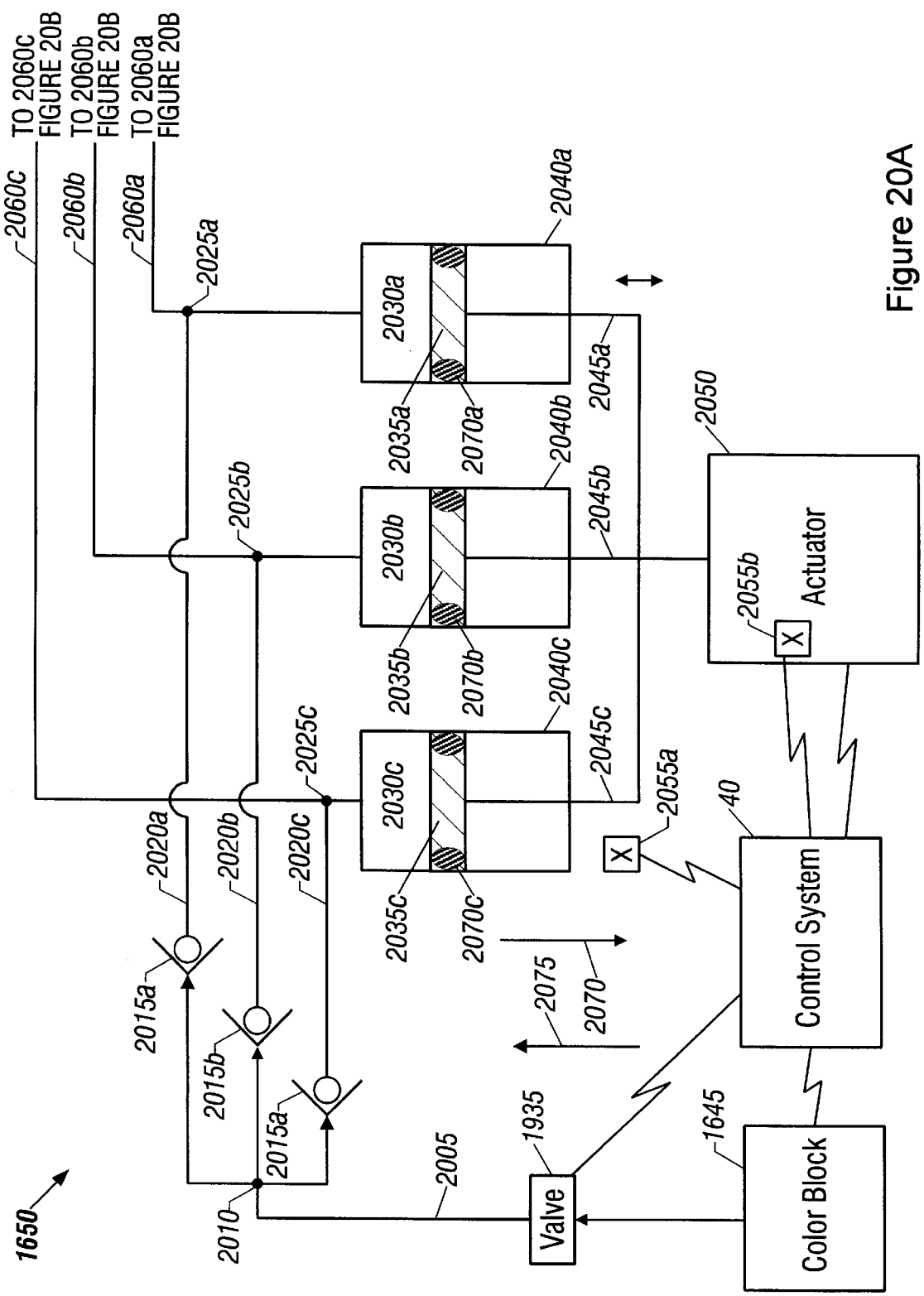
FIG. 20a is an illustration of a preferred embodiment of an injector for use in the apparatus of FIG. 16.

In a particularly preferred embodiment, as illustrated in drawing FIG. 20a, each of the silicone resin injection lines 2060a–2060c further include corresponding flow control valves 2065a–2065c. The flow control valves 2065a–2065c controllably fluidicly couple or decouple the silicone resin injection lines 2060a–2060c to the corresponding inlets of the one or more die set manifolds 405a–405c, 425a–425c or 1140a–1140c of one or more molding devices 20a–20c. The flow control valves 2065a–2065c may comprise any number of conventional flow control valves. In a preferred embodiment, the flow control valves 2065a–2065c are model FM2DDKN flow control valves, available from Parker-Hannifin in Elyria, Ohio. In a particularly preferred embodiment, the operation of the flow control valves 2065a–2065c is controlled by the control system 40.

The at least one silicone resin injection chambers 2030a–2030c are defined by the combination and cooperative interaction of one or more silicone injection pistons 2035a–2035c with corresponding one or more silicone resin injection housings 2040a–2040c. The silicone resin injection pistons 2035a–2035c controllably reciprocate within the interior of corresponding one or more silicone resin injection housings 2040a–2040c to draw silicone resin in or pump silicone resin out of the corresponding one or more silicone resin injection housings 2040a–2040c.

Figure 20B:
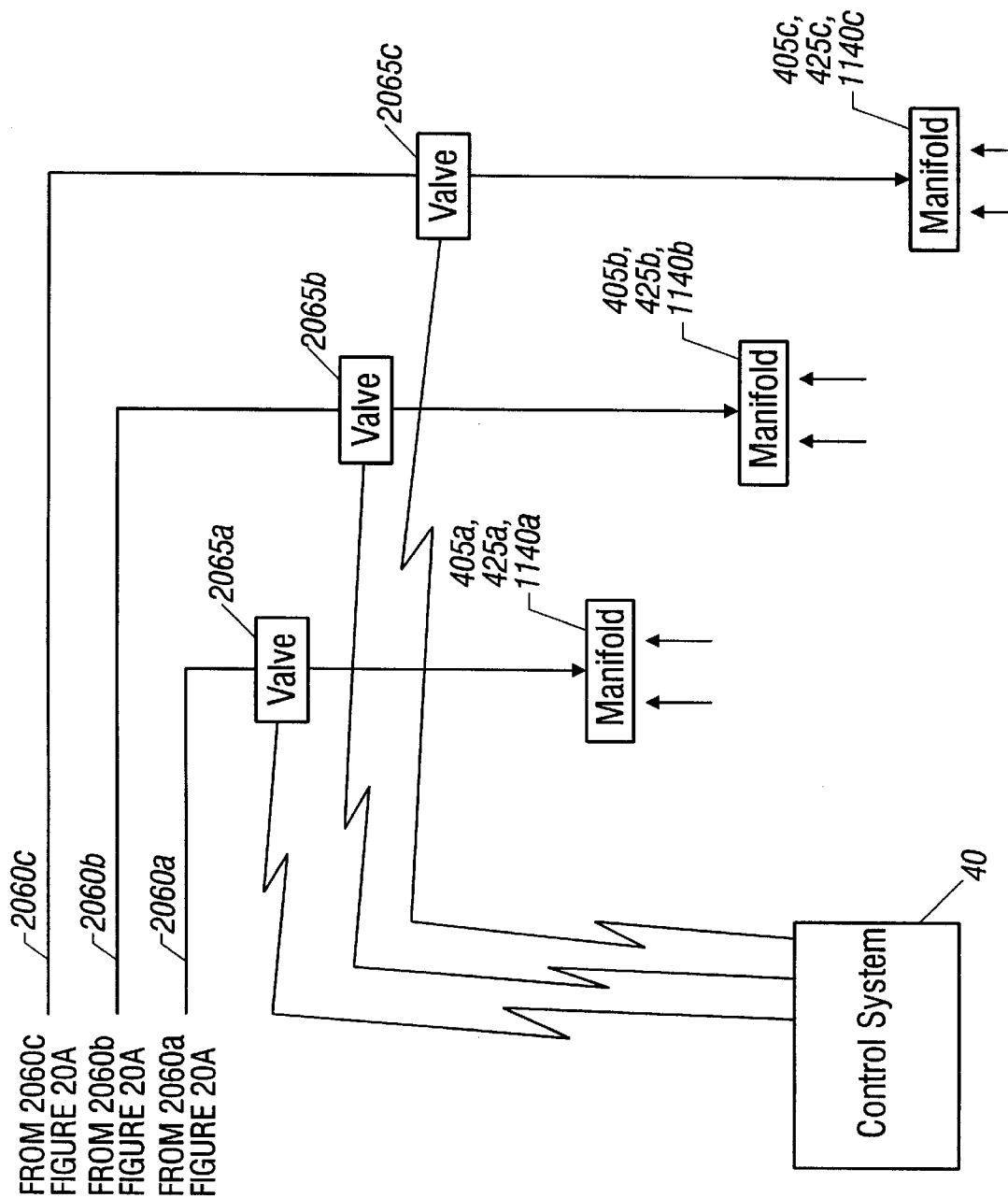
Figure 20C:
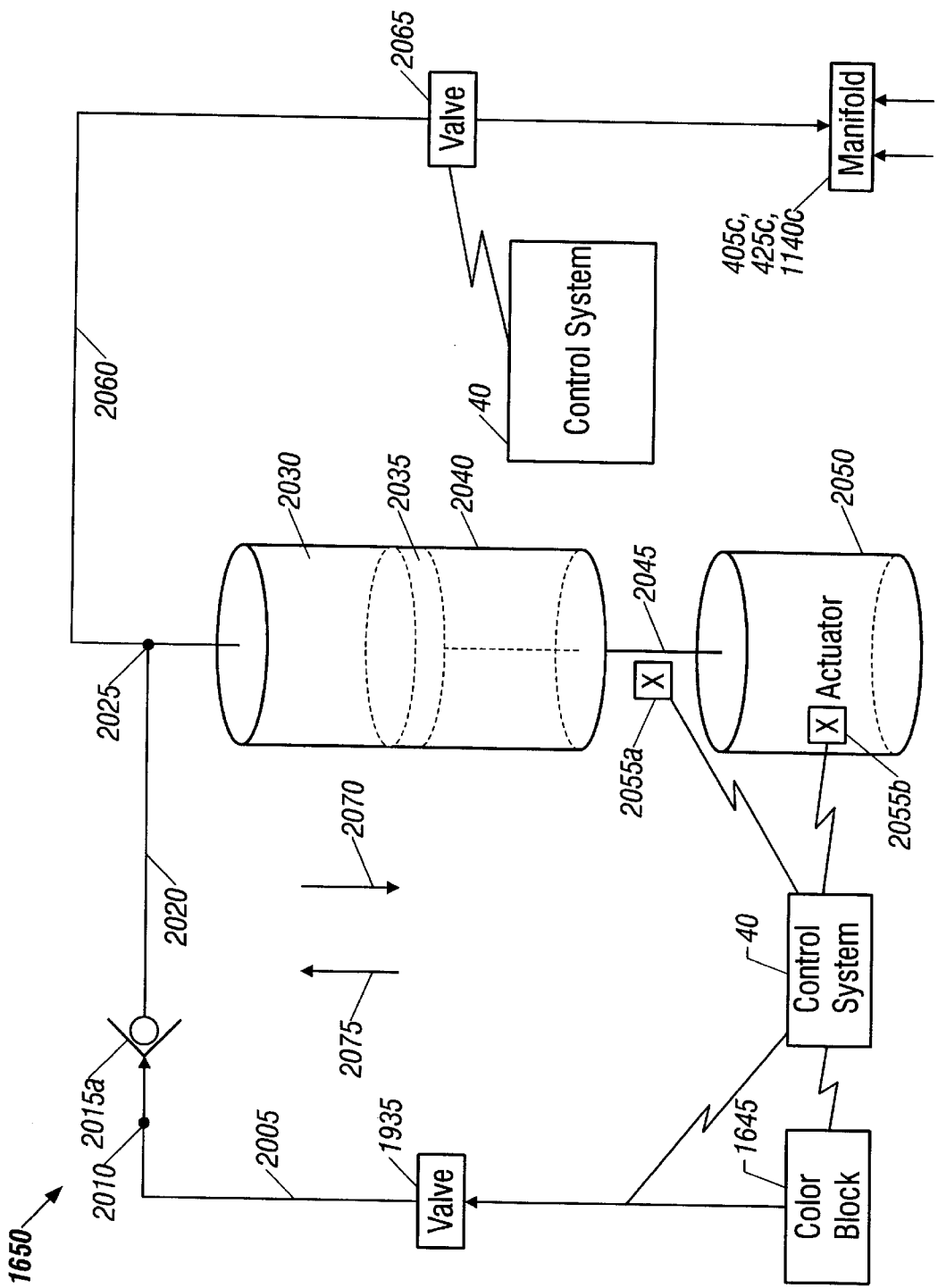

As illustrated in drawing FIG. 20b, the one or more silicone resin injection housings 2040a–2040c preferably comprise a cylindrically shaped annular member including a circular sealing member at one end having a fluid passage adapted for coupling with a corresponding one of the silicone resin injection lines 2060a–2060c. In a particularly preferred embodiment, the one or more silicone resin injection housings 2040a–2040c are metallic cylindrically shaped annular members having a circular sealing member on one end that further includes a fluid passage coupled to a corresponding one of the silicone resin injection lines 2060a–2060c.

The silicone resin injection pistons 2035a–2035c are preferably selected to slidingly and sealingly interact with the inner surfaces of the annular members of the silicone resin injection housings 2040a–2040c. In a particularly preferred embodiment, the silicone resin injection pistons 2035a–2035c are fabricated from durable materials such as, for example, aluminum and include circumferential sealing members 2070a–2070c for engaging the inner surface of the annular member of the corresponding silicone resin injection housing 2040a–2040c. The silicone resin injection pistons 2035a–2035c are reciprocated within the corresponding silicone resin injection housings 2040a–2040c by corresponding silicone resin injection actuator rods 2045a–2045c. The silicone resin actuator drive rods 2045a–2045c are in turn coupled to the actuator 2050.

In a particularly preferred embodiment, as illustrated in drawing FIG. 20a, the one or more silicone resin injection pistons 2035a–2035c are commonly actuated by the actuator 2050. In this manner, a plurality of three dimensional bodies of silicone resin, or some other thermosetting polymer resin, may be controllably formed substantially simultaneously onto a plurality of substrates.

The actuator 2050 controllably actuates one or more silicone resin injection pistons 2035a–2035c under the control of the control system 40. The actuator 2050 may comprise any number of conventional actuators. In a preferred embodiment, the actuator 2050 is a model 2.50KS21HLT38-38AX4.200 actuator, available from Parker-Hannifin in Elyria, Ohio. In a particularly preferred embodiment, as illustrated in drawing FIG. 20a, the actuator 2050 further includes at least one position sensor 2055a–2055b to provide at least one signal representative of the position of the actuator and/or the one or more actuator drive rods 2045a–2045c. In this manner, the control system 40 may provide precise control of the position of the silicone resin injection pistons 2035a–2035c and thereby inject a controlled and precise amount of silicone resin into the die set manifolds 405a–405c, 425a–425c or 1140a–1140c of one or more molding devices 20a–20c. In a particularly preferred embodiment, as illustrated in drawing FIG. 20a, one or more of the one or more die set manifolds 405a–405c, 425a–425c or 1140a–1140c of the one or more corresponding molding devices 20a–20c also receive supplies of silicone resin from other injectors as indicated by the arrows. In this manner, each of the molding devices 20 can controllably mold a plurality of three dimensional bodies of multiple colors of silicone resin, or some other thermosetting polymer resin, onto a plurality of substrates substantially simultaneously.

Figure 21:
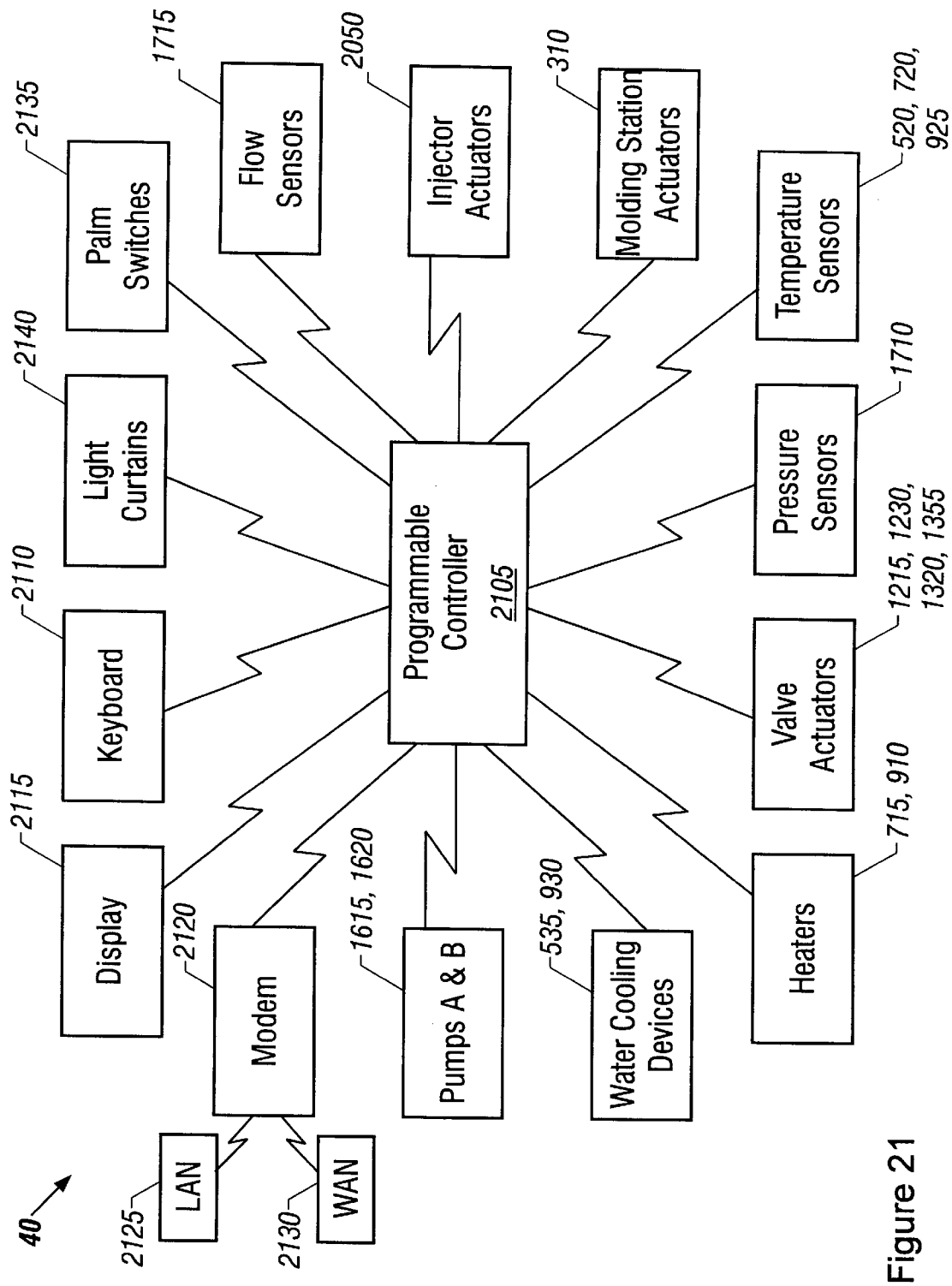
FIG. 21 is an illustration of a preferred embodiment of a control system for use in the apparatus of FIGS. 1, 2 and 15.

The control system 40 monitors and controls the operation of the apparatus 10 and may include one more sensors and actuating devices. As illustrated in drawing FIG. 21, in a preferred embodiment, the control system 40 includes a programmable general purpose computer or programmable controller 2105, a keyboard 2110, a display 2115, a modem 2120, a local-area-network communication device 2125, a wide-area-network communication device 2130, the silicone resin pumps 1615 and 1620, the water cooling devices, 535 and 930, for each of the molding devices 20, the heaters, 715 and 910, for each of the molding devices 20, the valve actuators, including at least 1215, 1230, 1320 and 1355, for the molding devices 20 and silicone resin supplies 30, the pressure sensors 1710 for the silicone resin supplies 30, the temperature sensors, 520, 720 and 925, for each of the molding devices 20, the actuators 310 for each of the molding devices 20, the actuators 2050 for each of the silicone resin injectors, the flow sensors 1715 for the silicone resin supplies 30, 2135 palm switches for the apparatus 10, and light curtains 2140 for each of the molding devices 20.

The programmable controller 2105 monitors and controls the operation of the apparatus 10. The programmable controller 2105 may comprise any number of conventional programmable industrial controllers capable of transmitting and receiving analog and digital signals. The programmable controller 2105 may communicate with the various input-output devices of the apparatus 10 using any number of conventional communication protocols. In a preferred embodiment, the programmable controller 2105 is a model FXON programmable controller, commercially available from the Mitsubishi Corporation.

Alternatively, hard-wired and/or manual control may be substituted for the programmable controller 2105. Alternatively, any combination of programmable control, hard-wired control, and manual operator control may be used.

The programmable controller 2105 preferably includes a conventional operator interface such as a keyboard 2110 and display 2115.

The programmable controller 2105 preferably includes a modem 2120 that permits communication between the programmable controller 2105 and other remote devices. The modem 2105 may comprise any number of conventional modems.

The control system 40 preferably includes a LAN 2125 and a LAN 2130 to enable communication with a number of remote devices in a conventional network environment. In this manner, a number of apparatus 10 may be employed to fabricate garments or other substrates with three dimensional moldings of silicone or other thermosetting polymers at a plurality of geographic locations with remote control and monitoring of the plurality of apparatus 10 using the LAN 2125 and/or WAN 2130. The LAN 2125 and WAN 2130 may comprise any number of conventional devices and communication protocols.

The control system 40 preferably includes a number of conventional operator safety devices including palm switches 2135 and light curtains 2140. The palm switches 2135 are of conventional design and operation and protect the operator from physical injury by requiring the operator to press both palm switches during engagement of the die sets of the molding devices 20. The light curtains 2140 are of conventional design and construction and surround the molding devices 20 with a light barrier that, if broken, shuts down the molding devices 20 to protect the operator from injury.

Figure 22A:
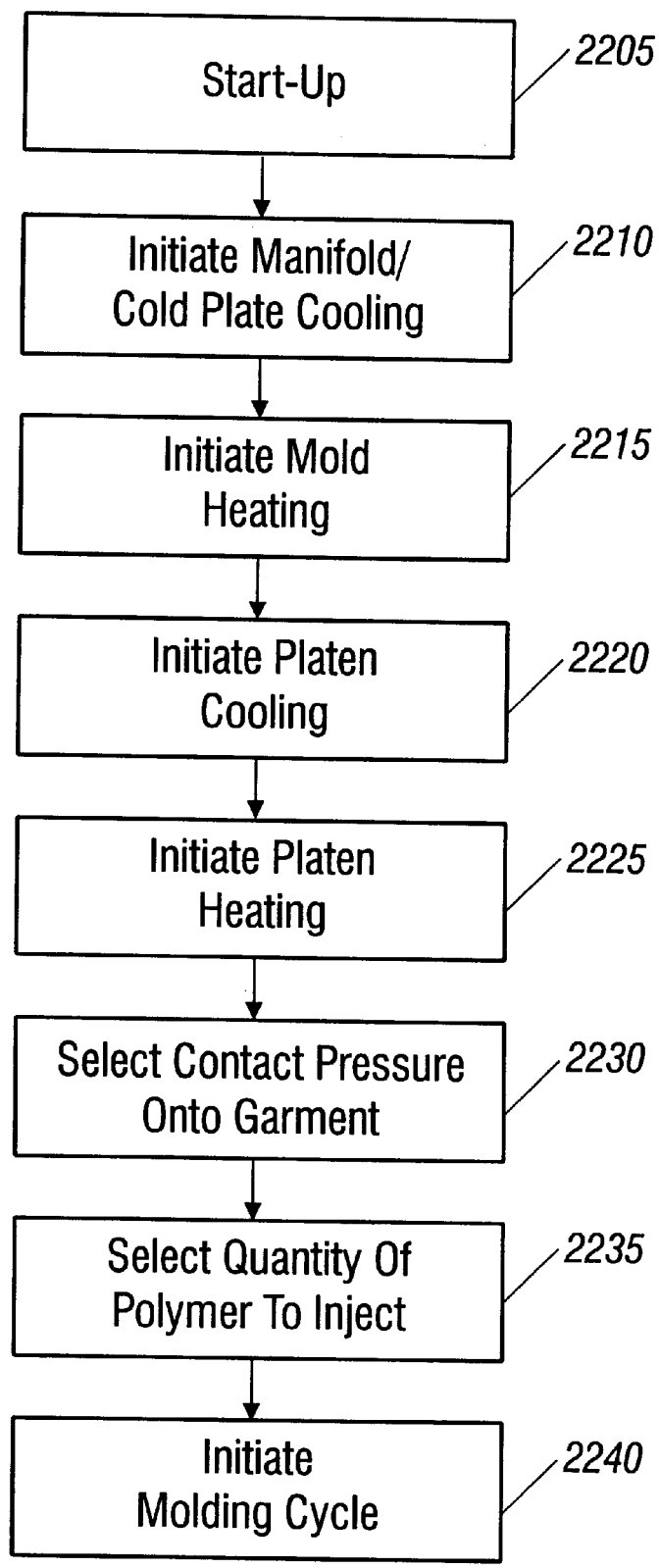
FIG. 22a is an illustration of a preferred method for molding a plurality of silicone bodies, or some other thermosetting polymer or polymers, onto an article of clothing, or some other substrate.
Figure 22B:
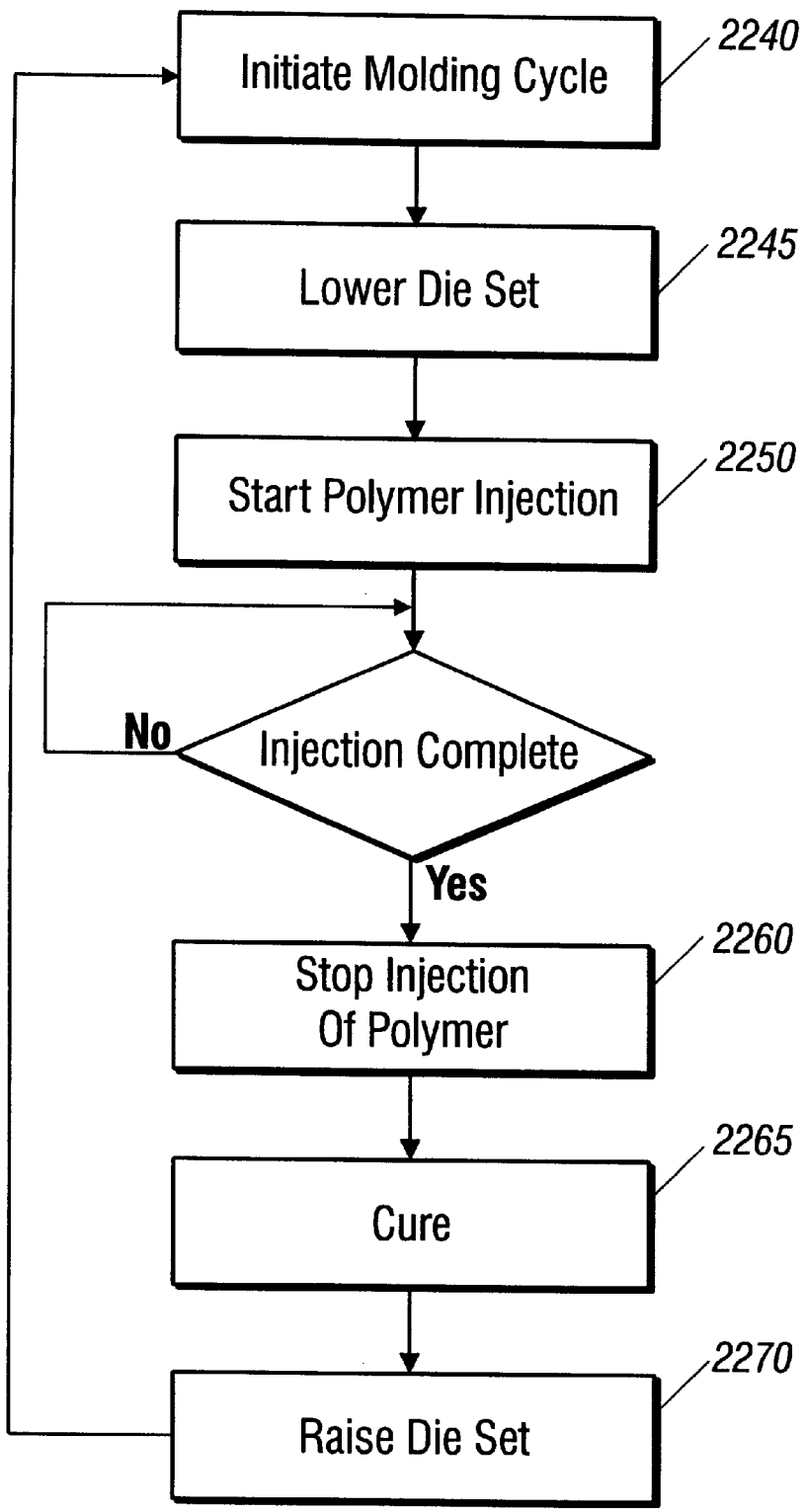
FIG. 22b is a continued illustration of the preferred method for molding a plurality of silicone bodies, or some other thermosetting polymer or polymers, onto an article of clothing, or some other substrate.

Referring now to drawing FIGS. 22a–22b, a preferred embodiment of the operation of the molding device 20 will be described. During initial startup 2205, the physical set-up of the molding device 20 is prepared. This will typically include preparing and calibrating the actuator 310 for the molding device 20, selecting, preparing and calibrating the die set 320 for the molding device 20, selecting, preparing and calibrating the alignment and position of the platen 330 for the molding device 20, selecting, preparing and calibrating the silicone resin, or other thermosetting polymer resin, supplies 30 for the molding device 20, and initializing and calibrating the control system 40.

After initial startup 2205 has been completed, the operator will initiate manifold or cold plate cooling 2210. The initiation of manifold or cold plate cooling 2210 will preferably include the steps of selecting a predetermined range of operating temperatures for the manifolds 405 and 425 or cold plate 1145. For typical types and grades of silicone resins, the operating temperature range of the manifolds 405 and 425 or cold plate 1145 may range, for example, from about 50 to 65° F. In a preferred embodiment, the operating temperature range of the manifolds 405 and 425 or cold plate 1145 ranges from about 55 to 60° F. The preferred operating temperature range of the manifolds 405 and 425 or cold plate 1145 will vary as a function of the volume and particular type and grade of thermosetting polymer selected for use with the molding device 20.

After initiate manifold or cold plate cooling 2210 has been completed, the operator will initiate mold or hot plate heating 2215. The initiation of mold or hot plate heating 2215 will preferably include the steps of selecting a predetermined range of operating temperatures for the mold 420 and/or hot plate 760. For typical types and grades of silicone resins, the operating temperature range of the mold 420 and/or hot plate 760 may range, for example, from about 75 to 500° F. In a preferred embodiment, the operating temperature range of the mold 420 and/or hot plate 760 ranges from about 150 to 300° F. The preferred operating temperature range of the mold 420 will vary as a function of the number and volume of mold cavities 701, and the particular type and grade of thermosetting polymer resin selected for use with the molding device 20.

The order of execution of the operational steps of initiate manifold or cold plate cooling 2210 and initiate mold or hot plate heating 2215 may be reversed. In a particularly preferred embodiment, however, the operational steps of initiate manifold or cold plate cooling 2210 and initiate mold or hot plate heating 2215 are performed substantially in the order described above in order to prevent the operating temperature of the manifold 405 from rising too high due to heat transfer from the mold 420. In this manner, the possibility of the curing of silicone resin, or some other thermosetting polymer resin, within the manifold during initial operation of the molding device 20 is minimized or prevented.

After initiate mold or hot plate heating 2215 has been completed, the operator will initiate platen cooling 2220. The initiation of platen cooling 2220 will preferably include the steps of selecting a predetermined range of operating temperatures for the cooled region of the platen 330. For typical types and grades of substrates, the operating temperature range of the cooled region of the platen 330 may range, for example, from about 45 to 70° F. In a preferred embodiment, the operating temperature range of the cooled region of the platen 330 ranges from about 55 to 60° F. The preferred operating temperature range of the cooled region of the platen 330 will vary as a function of the type and thickness of the substrate, and the operating temperatures of the heated region of the platen 330 and of the mold 420.

After initiate platen cooling 2220 has been completed, the operator will initiate platen heating 2225. The initiation of platen heating 2225 will preferably include the steps of selecting a predetermined range of operating temperatures for the heated region of the platen 330 that engages the die set 320. For typical types and grades of silicone resins, the operating temperature range of the heated region of the platen 330 may range, for example, from about 100 to 500° F. In a preferred embodiment, the operating temperature range of the heated region of the platen 330 ranges from about 250 to 400° F. The preferred operating temperature range of the heated region of the platen 330 will vary as a function of the type and thickness of the substrate, the type and grade of thermosetting polymer resin selected, and the operating temperature of the mold 420.

The order of execution of the operational steps of initiate platen cooling 2220 and initiate platen heating 2225 may be reversed. In a particularly preferred embodiment, however, the operational steps of initiate platen cooling 2220 and initiate platen heating 2225 are performed substantially in the order described above in order to prevent the operating temperature of the cooled region of the platen 330 from rising too high due to heat transfer from the heated region of the platen 330. In this manner, the possibility of damage to the substrate due to excessive temperature and heat during initial operation of the molding device 20 is minimized or prevented.

After initiate platen heating 2225 has been completed, the operator will select the contact pressure of the die set 320 onto the substrate 340 during engagement of the die set 320 with the substrate 340. The selection of contact pressure of the die set 2230 will preferably include the steps of selecting a predetermined range of permissible contact pressures of the die set 320 with the substrate 340 during engagement. For typical types and grades of clothing, the contact pressure of the die set 320 with the clothing 340 during engagement may range, for example, from about 50 to 600 psi. In a preferred embodiment, the contact pressure of the die set 320 with the clothing 340 ranges from about 50 to 300 psi. The preferred range of contact pressure between the die set 320 and the substrate 340 during engagement vary as a function of the type and thickness of the substrate.

After selection of the contact pressure 2230 has been completed, the operator will select the quantity of silicone resin, or other thermosetting polymer resin, for injection into each of the mold cavities 710 of the mold 420. The selection of the quantity of silicone resin for injection into each of the mold cavities 710 of the mold 420 in step 2235 will preferably include the step of selecting a separate quantity for each mold cavity 710 of the mold 420. In this manner, a plurality of supplies of silicone resin may be controllably injected into the mold cavities 710 of the mold 420 from a plurality of supplies of silicone resin 30. For typical types of clothing and three dimensional designs, the quantity of silicone resin injected into each mold cavity 710 of the mold 420 may range, for example, from about 1 to 150 grams. In a preferred embodiment, for the generation of complicated three dimensional designs onto clothing, the quantity of silicone resin injected into each mold ranges from about 1 to 75 grams. The desired quantity of thermosetting polymer resin selected for injection into each mold cavity 710 of the mold 420 will vary as a function of the particular three dimensional design selected for placement upon a substrate.

The operational steps of selecting the range of permissible contact pressures 2230 and the selection of the quantity of silicone for injection 2235 may be performed in any order.

After the completion of the initial operational steps of start-up 2205, initiate manifold or cold plate cooling 2210, initiate mold or hot plate heating 2215, initiate platen cooling 2220, initiate platen heating 2225, select contact pressure 2230, and select quantity of silicone resin for injection 2235, the operator then positions and aligns the substrate upon the platen 330 and then initiates the molding cycle 2240.

The molding cycle 2240 includes the steps of lowering the die set 2245, starting the injection of silicone resin 2250, checking for injection completion 2255, stopping injection of silicone resin 2260, curing the silicone resin 2265 and raising the die set 2270. Upon initiating the molding cycle 2240, the silicone resin, or other thermosetting polymer resin, supplies 30 will load one or more silicone resin injection chambers 2030 of one or more injectors 1650 with the predetermined quantities of silicone resin, or other thermosetting polymer resin, to be injected. Alternatively, a mixture of different thermosetting polymer resin supplies may be provided that will permit three dimensional bodies of a plurality of thermosetting polymer resins of multiple colors to be molded onto a substrate.

During the step of lowering the die set 2245, the actuator 310 controllably lowers the die set 320 into engagement with the garment 340 positioned and aligned upon the platen 330. In a preferred embodiment, the operation of the actuator 310 is controlled by the control system 40. In a particularly preferred embodiment, the position of the actuator 310 as well as the contact pressure of the die set 320 with the garment 340 are monitored and controlled by the control system 40. Upon engagement of the die set 320 with the garment 340, the operational step of injecting silicone resin 2250 begins. For typical articles of clothing, the contact pressure during engagement with the die set 320 may be limited, for example, to the range of 50 to 600 psi in order to prevent damage to the article of clothing 340. In a preferred embodiment, for typical articles of clothing, the contact pressure during engagement with the die set 320 is limited to the range of 50 to 300 psi in order to prevent damage to the article of clothing 340. Alternatively, the permissible range of contact pressure during engagement with the die set 320 will vary as a function of the type and thickness of the substrate.

During the step of injecting silicone 2250, one or more injectors 1650 controllably inject controlled quantities of silicone resin, or some other thermosetting polymer resin, into one or more corresponding mold cavities 710 in order to form one or more three dimensional bodies of silicone resin, or some other thermosetting polymer resin. During the step of injecting silicone resin 2250, the control system 40 continually checks to see whether or not the injection of silicone resin has been completed in operational step 2255. In a preferred embodiment, the step of checking to see if the injection of silicone resin has been completed 2255 is facilitated by the feedback control of the injectors 1650. Once, the injection of silicone resin into the mold cavities 710 has been completed, the injection of silicone resin is stopped in operational step 2260. This may be accomplished by stopping the one or more injector actuators 2050. The operating pressure and flow rate of the silicone resin injected into the mold cavities 710 may be limited, for example, to the range of about 200 to 800 psi and 0.33 to 0.50 $in^3$/sec in order to prevent damage to the article of clothing. In a particularly preferred embodiment, the operating pressure and flow rate of the silicone resin injected into the mold cavities 710 are limited to the range of about 300 to 600 psi and 0.01 to 0.33 $in^3$/sec in order to prevent damage to the article of clothing. Alternatively, the preferred range of operating pressures and flow rates will vary as a function of the type and thickness of the substrate.

During the step of curing the silicone resin 2265, the die set 320 is maintained in engagement with the article of clothing 340, or other substrate, for a predetermined time period in order to permit the heated mold 420 of the die set 320 to cure the one or more three dimensional bodies of silicone resin, or some other thermosetting polymer resin, in place upon the positioned and aligned article of clothing 340, or other substrate. For typical types and grades of silicone resin, the curing time and temperature may range, for example, from approximately 5 to 50 seconds and 200 to 500° F. In a preferred embodiment, the curing time and temperatures range from about 10 to 30 seconds and 300 to 400° F. The curing times and temperatures will vary as a function of the particular type of thermosetting polymer selected as well as the number and volume of the mold cavities 710 of the mold 420. Once the silicone resin, or other thermosetting polymer resin has cured, the die set 320 is raised out of engagement with the article of clothing 340, or other substrate.

During the step of raising the die set 2270, the actuator 310 controllably raises the die set 320 out of engagement with the article of clothing 340, or other substrate. The control system 40 then waits at operational step 2240 for the operator to once again initiate the molding cycle.

In a several particularly preferred embodiments, the operational steps of starting silicone resin injection 2250 and stopping the injection of silicone resin 2260 are further facilitated by implementing operational steps designed to minimize or prevent the dripping of silicone resin, or some other thermosetting polymer resin, as described above and illustrated in drawing FIGS. 12a–12e, 13a–13d, and 14a–14b.

Figure 22C:
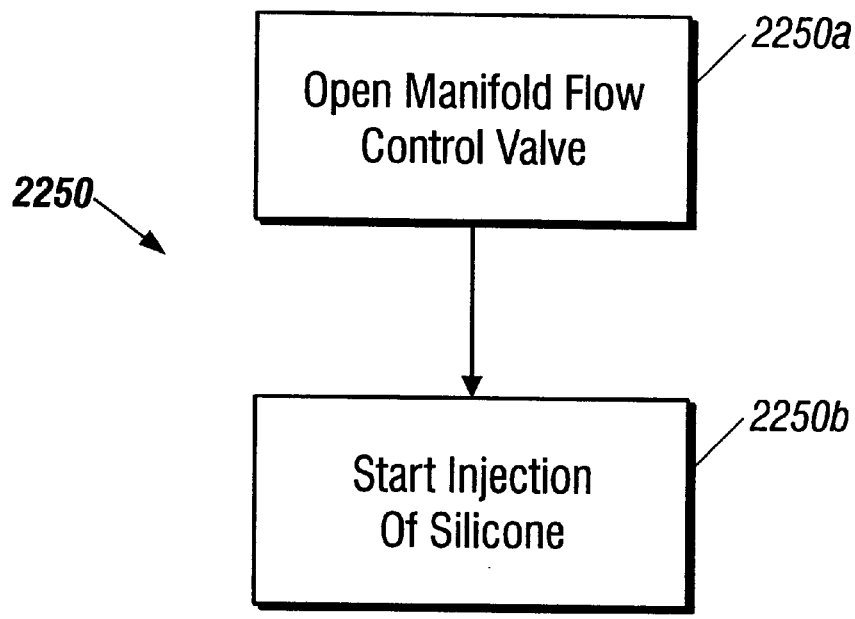
FIG. 22c is an illustration of a particularly preferred method for starting the injection of silicone resin, or some other thermosetting polymer resin.
Figure 22D:
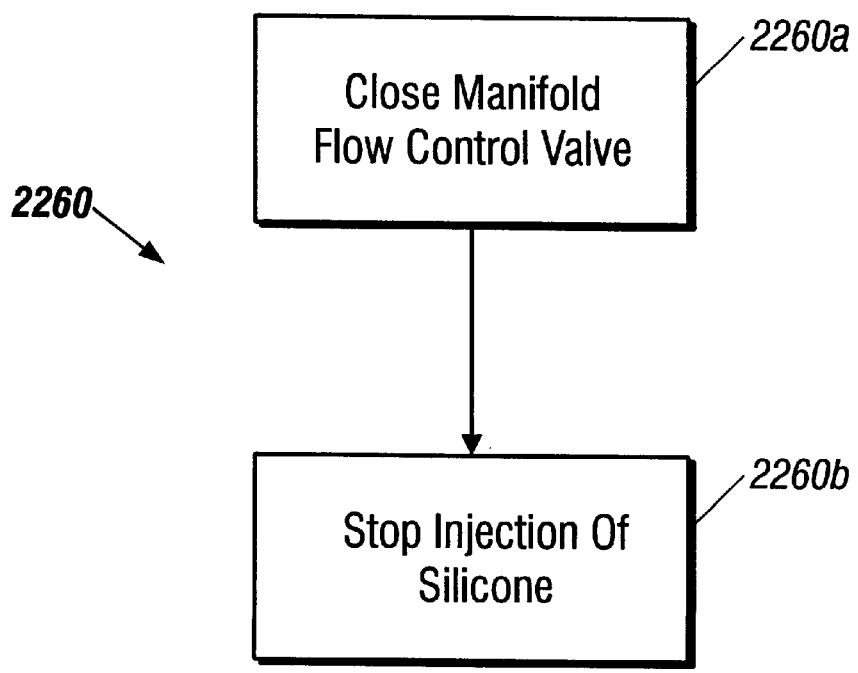
FIG. 22d is an illustration of a particularly preferred method for stopping the injection of silicone resin, or some other thermosetting polymer resin.

Referring to drawing FIGS. 22c and 22d, in one particularly preferred embodiment, the operational steps of starting and stopping the injection of silicone resin, 2250 and 2260, further include operational steps designed to implement the preferred embodiments of the manifolds 405, 425 and 1140 illustrated in drawing FIGS. 12a–12f. In particular, the operational step of starting the injection of silicone resin 2250 further includes the steps of opening the manifold flow control valve 2250a and starting the injection of silicone resin 2250b and the operational step of stopping the injection of silicone resin 2260 further includes the steps of closing the manifold flow control valve 2260a and stopping the injection of silicone resin 2260b. In this manner, the flow of silicone resin into the die set 320 can be immediately stopped as close as possible to the mold 420 itself thereby minimizing or eliminating the flow of excess silicone resin into the die mold 420. In a particularly preferred embodiment, the manifold flow control valves are closed within a time a time period ranging from about 125 to 500 msec.

Figure 13A:
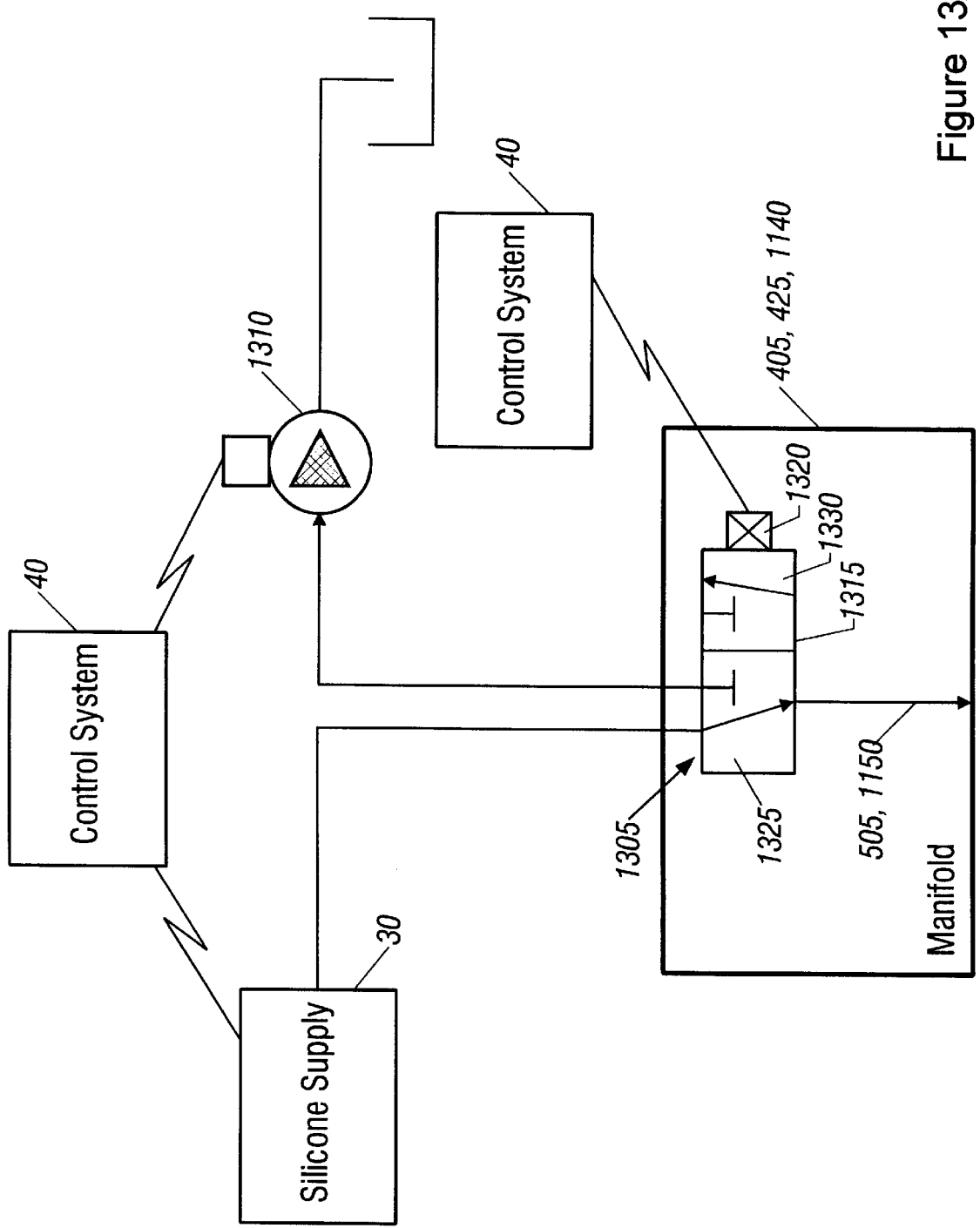
FIG. 13a is an illustration of another alternative preferred embodiment of the manifold of FIG. 4 including a flow control valve.
Figure 22E:
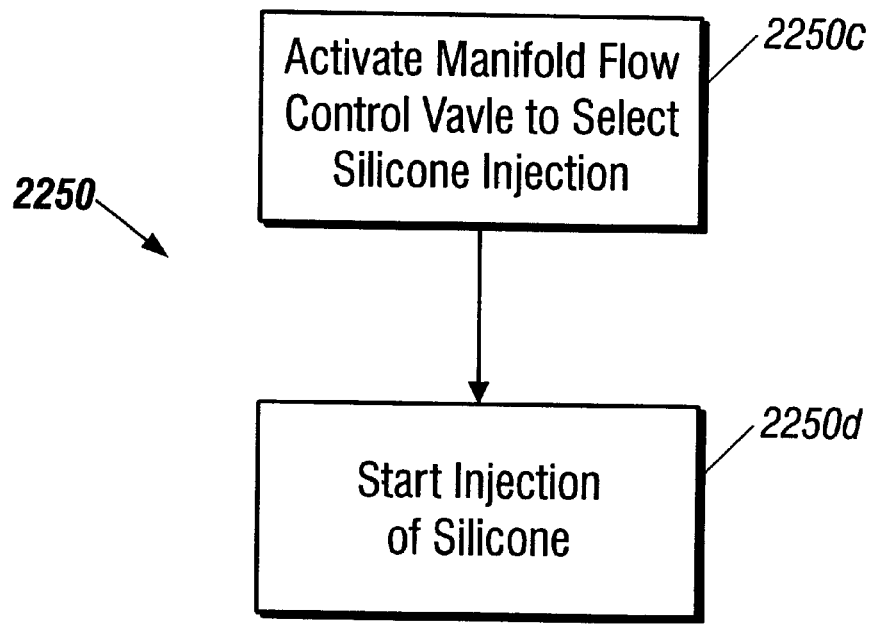
FIG. 22e is an illustration of another particularly preferred method for starting the injection of silicone resin, or some other thermosetting polymer resin.
Figure 22F:
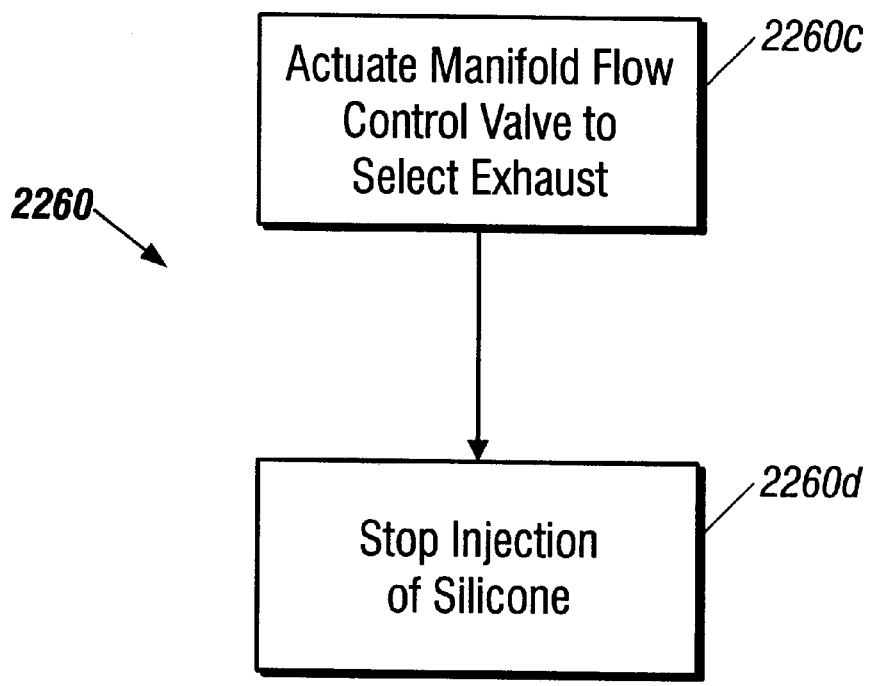
FIG. 22f is an illustration of another particularly preferred method for stopping the injection of silicone resin, or some other thermosetting polymer resin.

Referring to drawing FIGS. 22e and 22f, in another particularly preferred embodiment, the operational steps of starting and stopping the injection of silicone resin, 2250 and 2260, further include operational steps designed to implement the preferred embodiment of the molding device 20 illustrated in drawing FIG. 13a. In particular, the operational step of starting the injection of silicone resin 2250 further includes the steps of actuating the manifold flow control valve to select silicone resin injection 2250c and starting the injection of silicone resin 2250d and the operational step of stopping the injection of silicone resin 2260 further includes the steps of actuating the manifold flow control valve to select the exhaust pump 2260c and stopping the injection of silicone resin 2260d. In a particularly preferred embodiment, the step of selecting the exhaust pump 2260c is performed for a time duration ranging between about 250 to 6000 msec. in order to prevent the dripping of silicone resin into the mold 420 of the die set 320.

Figure 13B:
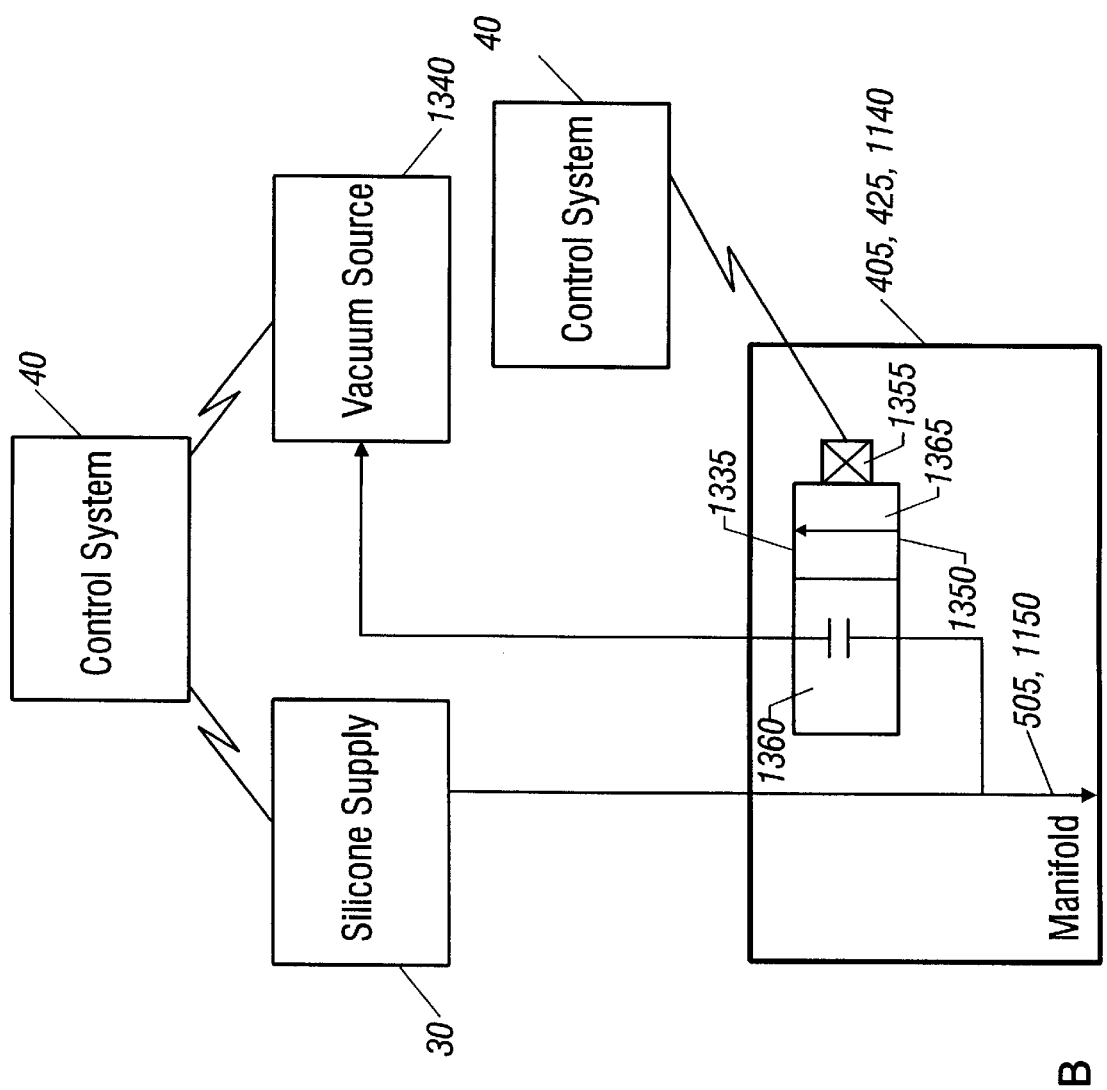
Figure 13C:
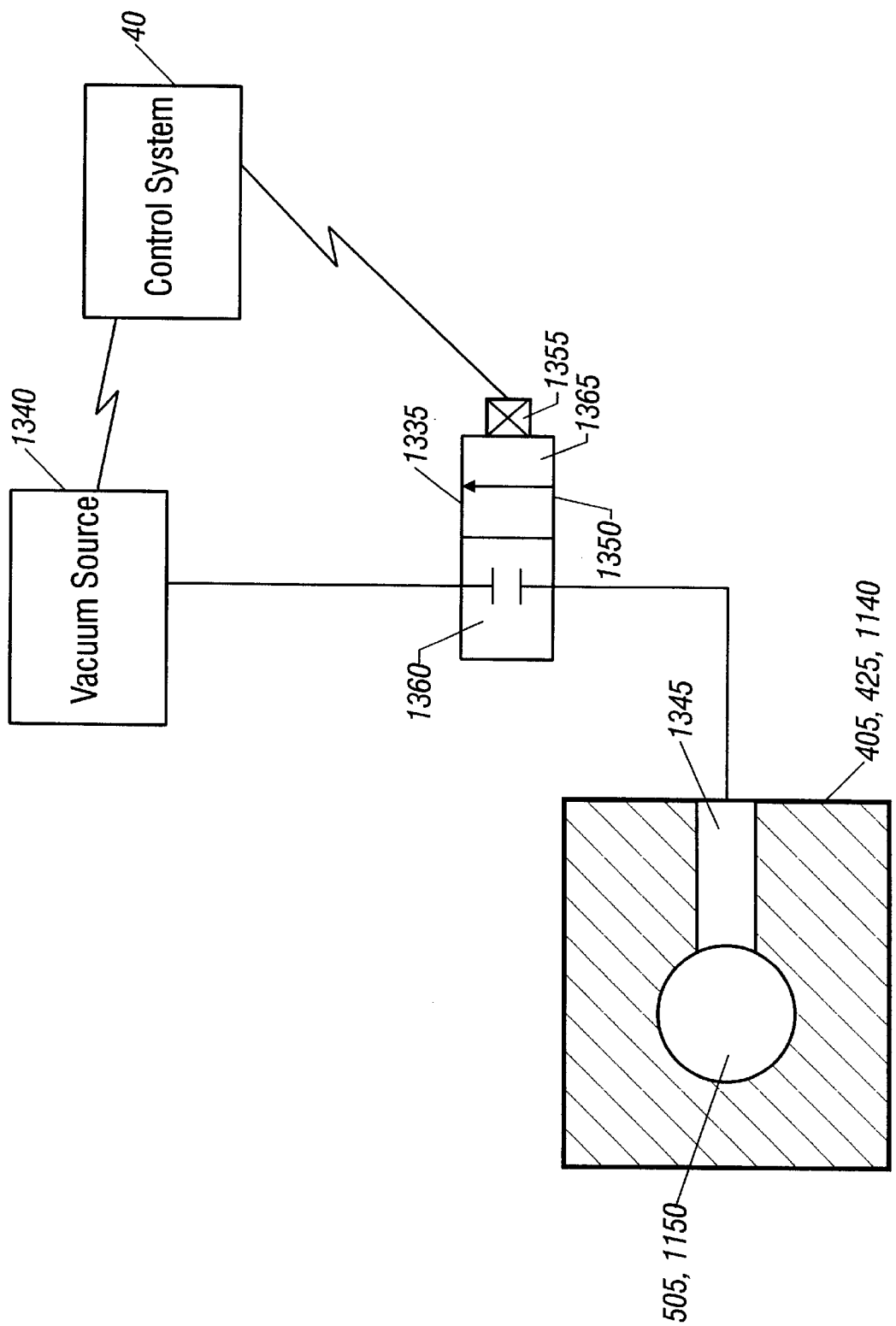
FIG. 13c is a cross-sectional view of the manifold of FIG. 13b.
Figure 22G:
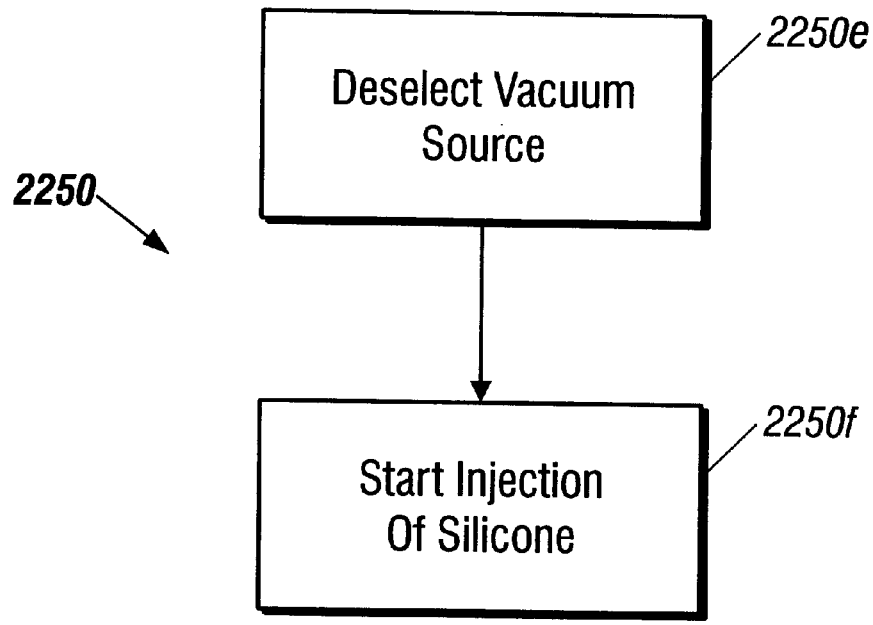
FIG. 22g is an illustration of another particularly preferred method for starting the injection of silicone resin, or some other thermosetting polymer resin.
Figure 22H:
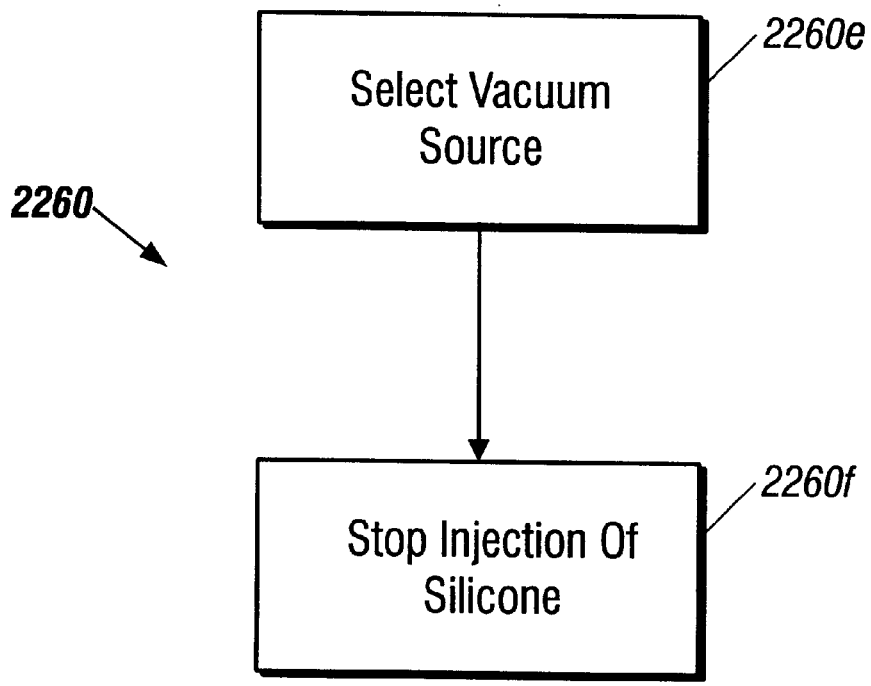
FIG. 22h is an illustration of another particularly preferred method for stopping the injection of silicone resin, or some other thermosetting polymer resin.

Referring to drawing FIGS. 22g and 22h, in another particularly preferred embodiment, the operational steps of stopping and starting the injection of silicone resin, 2250 and 2260, further include operational steps designed to implement the preferred embodiment of the molding device 20 illustrated in drawing FIGS. 13b–13c. In particular, the operational step of starting the injection of silicone resin 2250 further includes the steps of actuating the manifold flow control valve to deselect the vacuum source 2250e and starting the injection of silicone resin 2250f and the operational step of stopping the injection of silicone resin 2260 further includes the steps of actuating the manifold flow control valve to select the vacuum source 2260e and stopping the injection of silicone resin 2260f. In a particularly preferred embodiment, the step of selecting the vacuum source 2260e is performed for a time duration ranging between about 250 to 6000 msec. in order to prevent the dripping of silicone resin into the mold 420 of the die set 320.

Figure 14B:
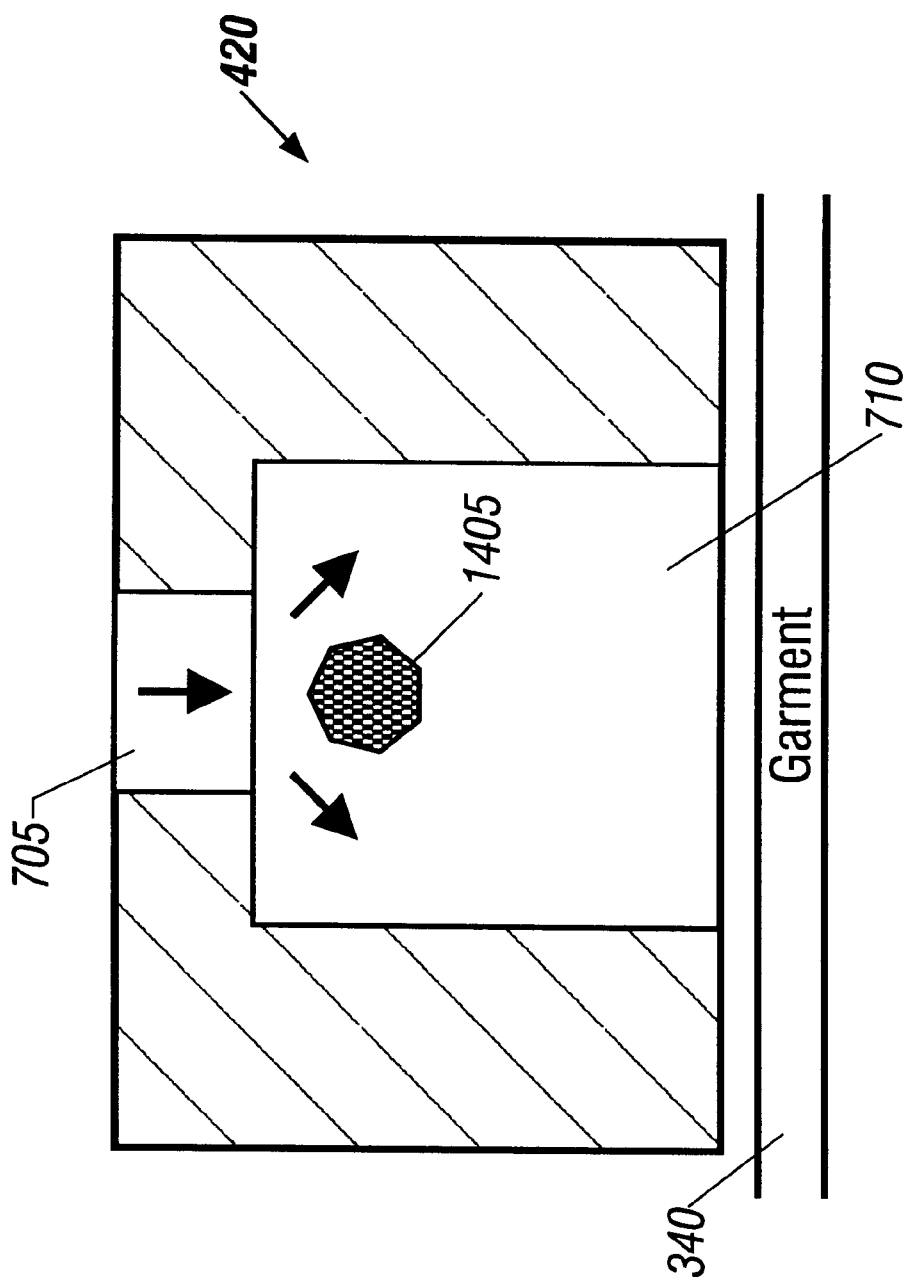
Figure 15:
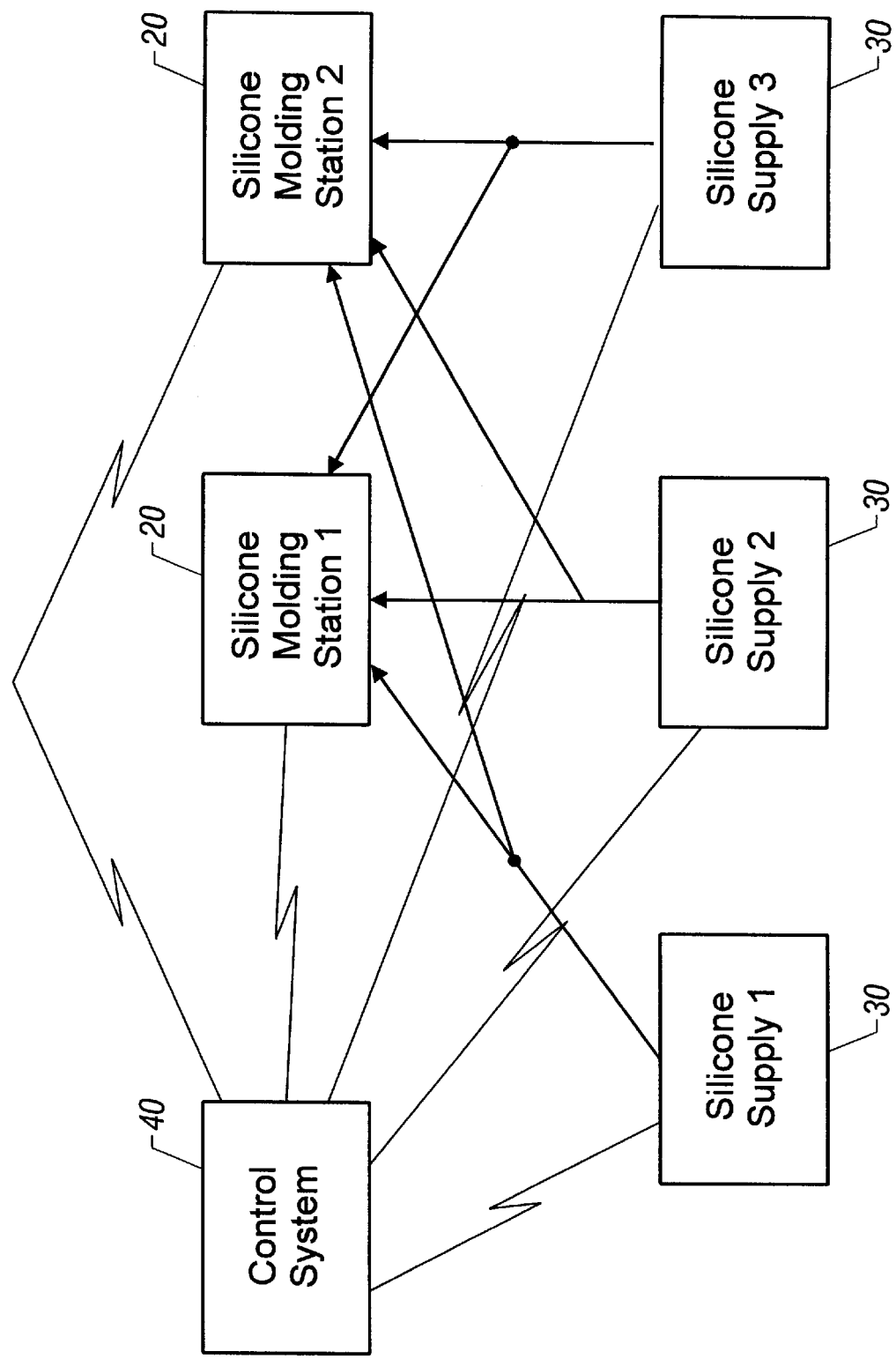
FIG. 15 is an illustration of a preferred embodiment of an apparatus for molding three dimensional bodies of thermosetting polymers onto a plurality of substrates using a plurality of supplies of thermosetting polymer resins.
Figure 22I:
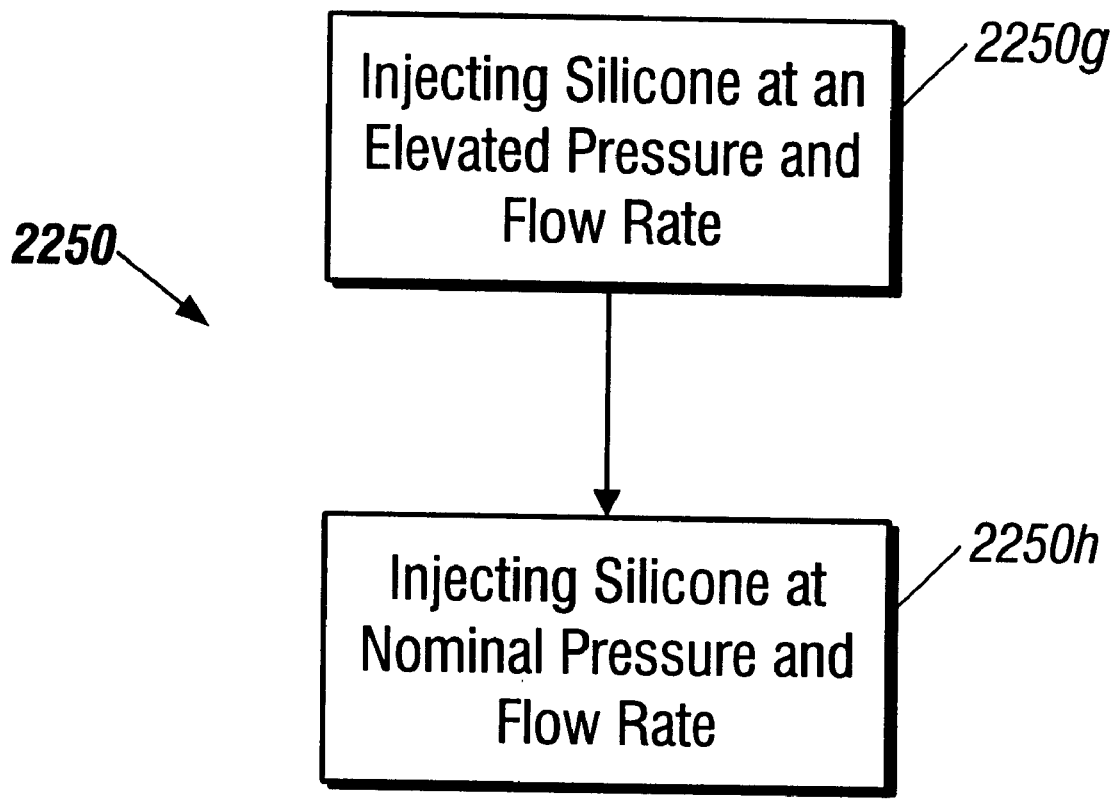
FIG. 22i is an illustration of another particularly preferred method for starting the injection of silicone resin, or some other thermosetting polymer resin.

Referring to drawing FIGS. 22i, in another particularly preferred embodiment, the operational step of starting the injection of silicone resin 2250 further includes operational steps designed to implement the preferred embodiment of the molding device 20 illustrated in drawing FIGS. 14a and 14b. In particular, the operational step of starting the injection of silicone resin 2250 further includes the steps of injecting silicone resin at an elevated pressure and flow rate 2250g and injecting silicone resin at normal pressures and flow rates 2250h. The step of injecting silicone resin at elevated pressures and flow rates 2250g may include injecting silicone resin at pressures ranging, for example, from about 101 to 150% of normal values. In a particularly preferred embodiment, the step of injecting silicone resin at elevated pressures and flow rates 2250g injects silicone resin at pressures ranging from about 101 to 120% of normal values. The step of injecting silicone resin at elevated pressures and flow rates 2250g may be performed for time periods ranging, for example from about 1 to 10 seconds. In a particularly preferred embodiment, the step of injecting silicone resin at elevated pressures and flow rates 2250g is performed for time periods ranging from about 1 to 6 seconds. In this manner, silicone resin, or other thermosetting resin material, that may have cured within the flow passages of the die set 320 is blown out into the cavities 710 of the mold 420 for subsequent incorporation into the three dimensional bodies of silicone.

Figure 13D:
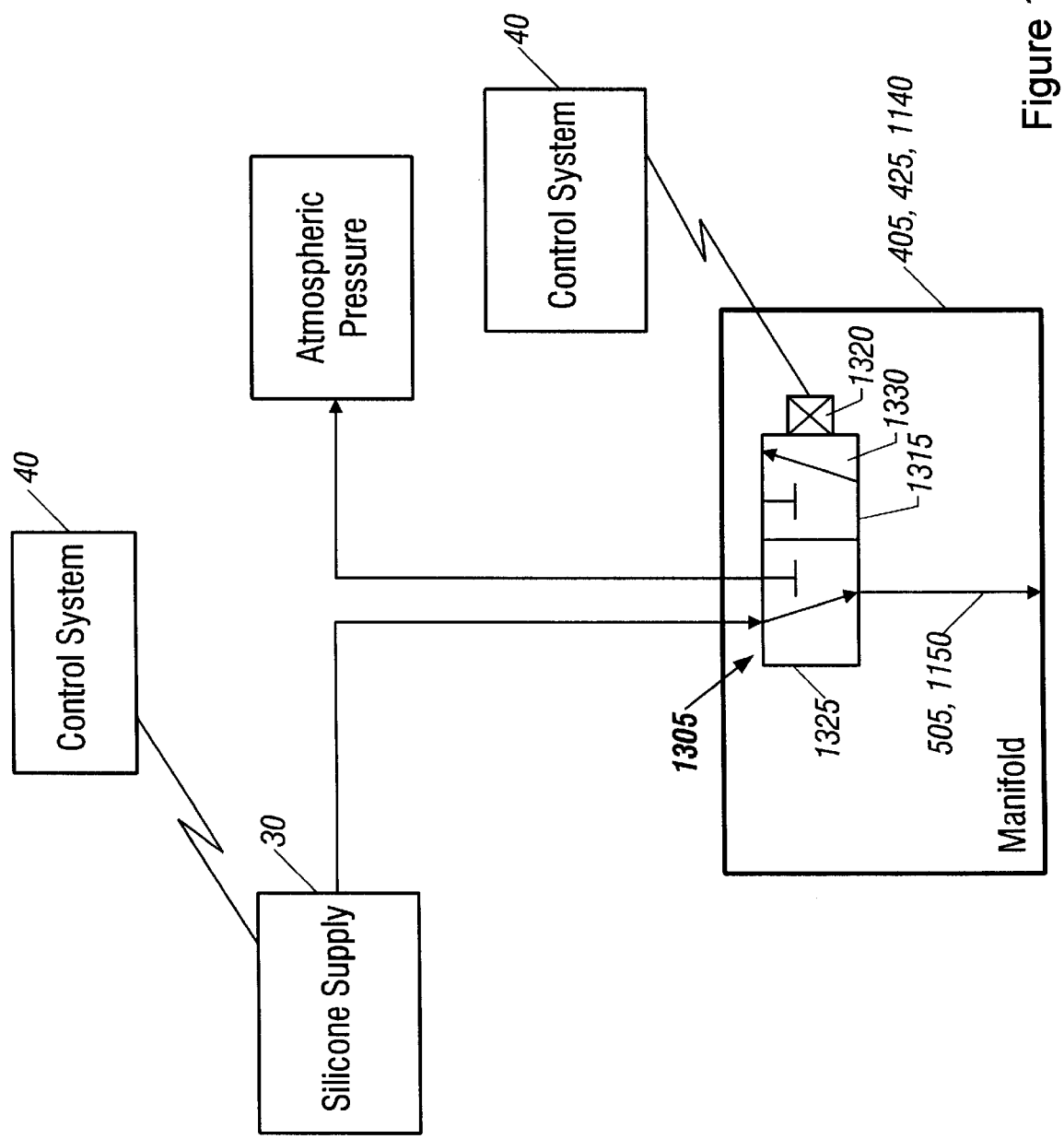
Figure 22J:
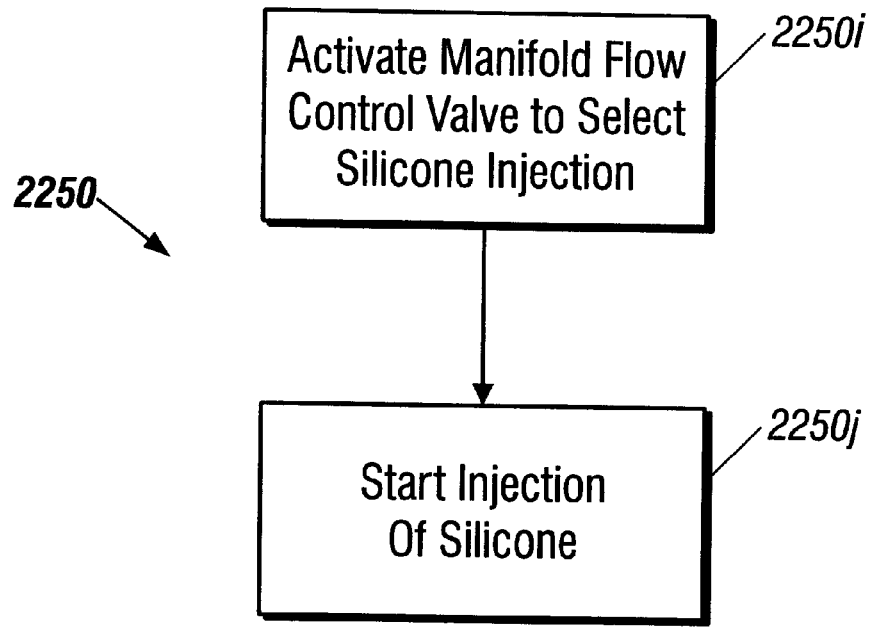
FIG. 22j is an illustration of another particularly preferred method for starting the injection of silicone resin, or some other thermosetting polymer resin.
Figure 22K:
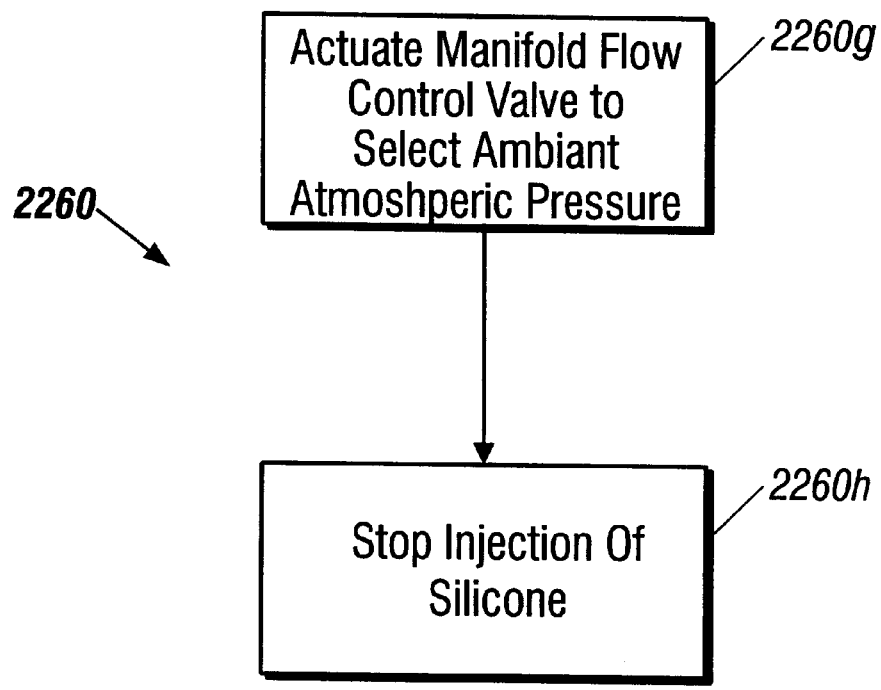
FIG. 22k is an illustration of another particularly preferred method for stopping the injection of silicone resin, or some other thermosetting polymer resin.

Referring to drawing FIGS. 22j and 22k, in another particularly preferred embodiment, the operational steps of stopping and starting the injection of silicone resin, 2250 and 2260, further include operational steps designed to implement the preferred embodiment of the molding device 20 illustrated in drawing FIGS. 13d. In particular, the operational step of starting the injection of silicone resin 2250 further includes the steps of actuating the manifold flow control valve to select silicone injection 2250i and starting the injection of silicone resin 2250j and the operational step of stopping the injection of silicone resin 2260 further includes the steps of actuating the manifold flow control valve to select ambient atmospheric pressure 2260g and stopping the injection of silicone resin 2260h. In a particularly preferred embodiment, the step of selecting ambient atmospheric pressure 2260g is performed for a time duration ranging between about 1 to 1000 msec. in order to prevent the dripping of silicone resin into the mold 420 of the die set 320.

In a particularly preferred embodiment, the operational steps described above are all controlled and monitored by the control system 40. In an alternative embodiment, the operational steps described above are implemented using any number of thermosetting polymers including, for example, silicone, nitrile rubber or urethane. In another alternative embodiment, the operational steps described above are implemented using a combination of different thermosetting polymers having similar curing characteristics, including such combinations as, for example, silicone, nitrile rubber or urethane and urethane, silicone or nitrile rubber.

Referring to drawing FIGS. 23a–23d, a preferred embodiment of an article of clothing including one or more three dimensional bodies of silicone, or other thermosetting polymer, 2300 will now be described. The article of clothing 2300 includes a T-shirt 2305, or other similar garment, such as, for example, a cap, or purse and at least one three dimensional body of silicone, or other thermosetting polymer, 2310 molded onto the T-shirt 2305, or other garment. In a particularly preferred embodiment, as illustrated in drawing FIG. 23a, the article of clothing 2300 includes a plurality of three dimensional bodies of silicone, or other thermosetting polymers, 2310a–2310c. In a particularly preferred embodiment, the three dimensional bodies of silicone, or other thermosetting polymers, 2310 are molded onto the T-shirt 2305, or other garment, using the apparatus 10 and accompanying methods described above. In this manner, a plurality of multi-colored three dimensional bodies of silicone can be molded onto a plurality of T-shirts 2305, or other garments, substantially simultaneously. More generally, the T-shirt 2305, or other garment, may comprise any substrate and a plurality of three dimensional multi-colored bodies of the same or different thermosetting polymers may be molded onto the substrate using the apparatus 10 and accompanying methods described above.

Figure 23A:
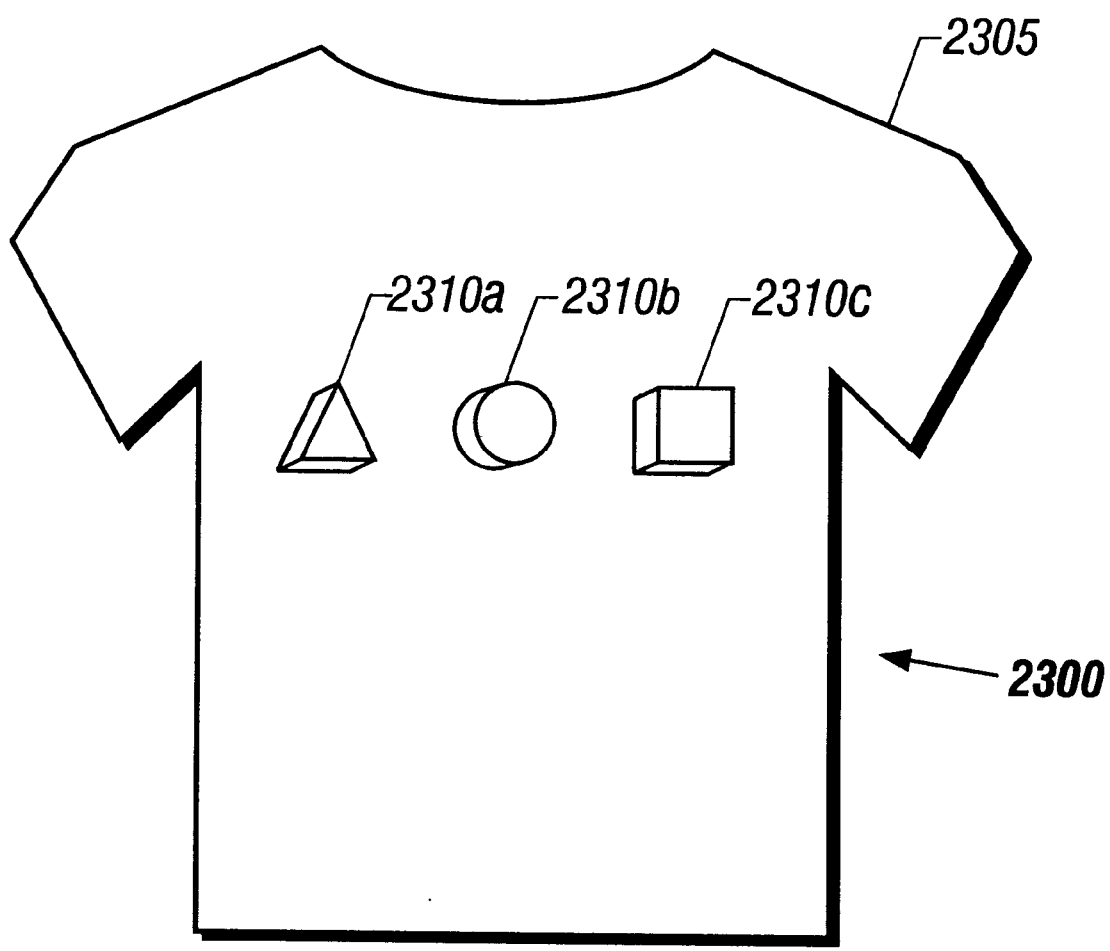
FIG. 23a is an illustration of an article of clothing, or some other substrate, including a plurality of three dimensional bodies of silicone, or some other thermosetting polymer.
Figure 23B:
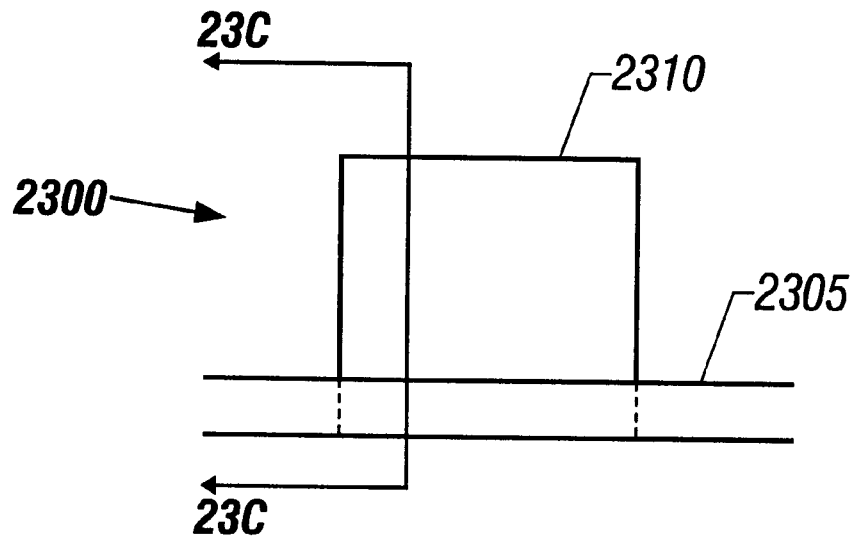
FIG. 23b is a front view of the article of clothing of FIG. 23a illustrating one of the three dimensional bodies.
Figure 23C:
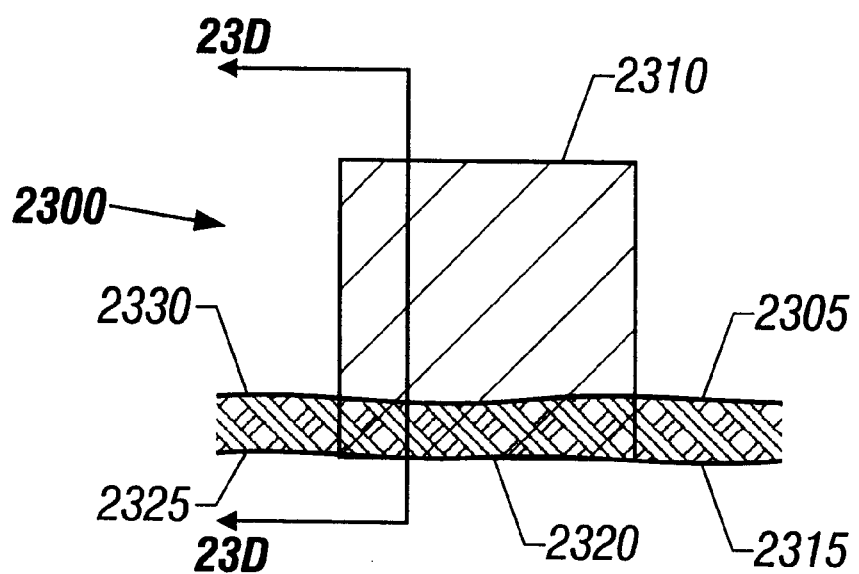
FIG. 23c is a cross-sectional view of the article of clothing of FIG. 23b illustrating the bonding of the silicone body, or some other thermosetting polymer, to the article of clothing, or some other substrate.
Figure 23D:
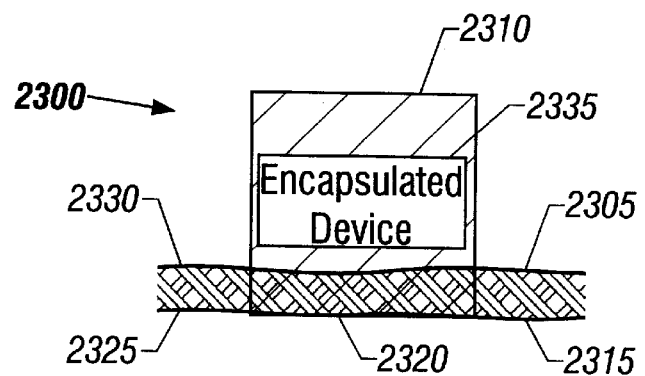
FIG. 23d is an alternative preferred embodiment of the silicone body, or some other thermosetting polymer, of FIG. 23c including an encapsulated element.

As illustrated in drawing FIGS. 23b and 23c, the three dimensional bodies of silicone 2310, or some other thermosetting polymer, are preferably molded onto a T-shirt 2305, or some other substrate, by permeating the fibers 2315 of the T-shirt 2305, or some other garment or substrate. In this manner, the three dimensional bodies of silicone 2310, or some other thermosetting polymer, are permanently affixed to the T-shirt 2305, or some other garment or substrate. In a particularly preferred embodiment, as illustrated in drawing FIGS. 23c and 23d, a skim coating 2320 of cured silicone resin, or some other thermosetting polymer resin, is also formed on the inside surface 2325 of the fabric 2330 of the T-shirt 2305, or some other garment or substrate. In a preferred embodiment, the skim coating 2320 is formed within the fabric 2330 of the article of clothing 2305 before reaching the inside surface 2325 of the fabric 2330 of the article of clothing 2305. In this manner, the skin of the wearer of the article of clothing 2305 will only contact the smooth fabric surface. As discussed above, the skim coating 2320 is preferably formed by curing the silicone resin, or some other thermosetting polymer resin, using the heated portion of the platen 330 of the molding device 20 during the molding process.

In a particularly preferred embodiment, one or more of the three dimensional bodies of silicone, or some other thermosetting polymer, 2310 will further include at least one encapsulated element 2335 such as, for example, a beeper, liquid crystal display, hologram, or other device. In a particularly preferred embodiment, the encapsulated device 2335 is a computer chip, granular fill material, paper or cardboard.

Referring now to drawing FIGS. 24, 25a, 25b, 26a, 27a, 28a, 29a, 30a, and 31a, a preferred embodiment of a method for fabricating an article of clothing 2300 including at least one three dimensional body of silicone, or some other thermosetting polymer, 2310 having at least one encapsulated element 2335 will be described. As illustrated in drawing FIG. 31a, the method of fabricating an article of clothing 2300 including at least one three dimensional body of silicone, or some other thermosetting polymer, 2310 having at least one encapsulated element 2335 preferably includes the steps of: forming a primary body of silicone, or some other thermosetting polymer, including at least one cavity 3105, forming a skim coating of silicone, or some other thermosetting polymer, within a mold cavity for a secondary body 3110, placing the element to be encapsulated into the mold cavity for the secondary body 3115, encapsulating the element in silicone, or some other thermosetting polymer, within the secondary body mold cavity 3120, curing the secondary body of silicone, or some other thermosetting polymer, including the encapsulated element 3125, removing the cured secondary body from the mold cavity and applying an adhesion promoter to the outside surface of the secondary body that will contact the cavity of the primary body 3130, and placing the secondary body within the cavity of the primary body and allowing the secondary body to bond to the primary body 3135. Alternatively, the steps performed in fabricating an article of clothing 2300 including at least one three dimensional body of silicone 2310 having at least one encapsulated element 2335 may be utilized to provide an article of clothing including at least one body of a thermosetting polymer having an encapsulated element.

Figure 24:
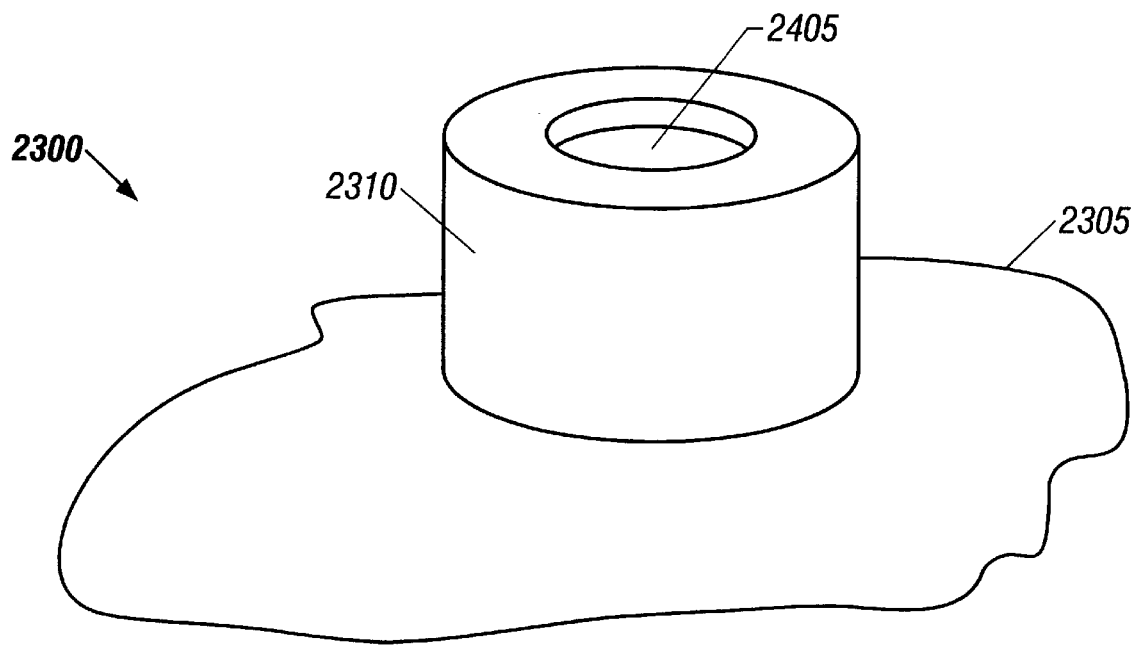
FIG. 24 is a perspective view of a silicone body, or some other thermosetting polymer, affixed to a substrate and including a cavity.

In operational step 3105, as illustrated in drawing FIG. 24, a three dimensional body 2310 of silicone, or some other thermosetting polymer, including a cavity 2405 is formed onto a t-shirt 2305, or some other garment or substrate, preferably using the apparatus 10 and accompanying methods described above. The cavity 2405 may be provided in the three dimensional body 2310 by providing an appropriate mold cavity as will be recognized by persons having ordinary skill in the art. In a preferred embodiment, the cavity 2405 is provided on an upper surface of the body 2310 to facilitate subsequent encapsulation of the element 2335. The three dimensional body 2310 is preferably formed using the preferred embodiments for molding three dimensional bodies of thermosetting polymers onto substrates discussed above.

Figure 25A:
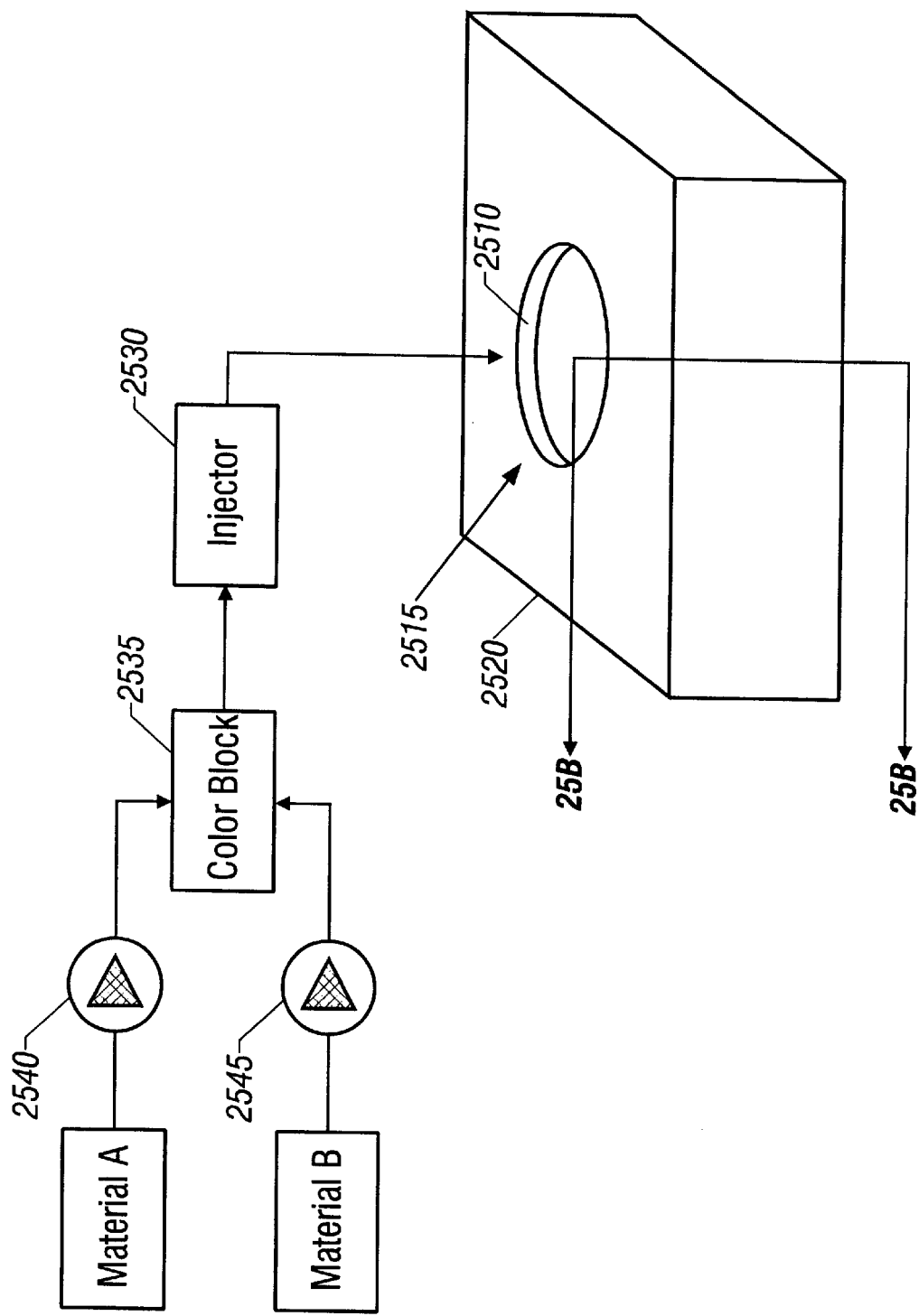
FIG. 25a is an illustration of the formation of a skim coating of a thermosetting polymer within a cavity of a mold.
Figure 25B:
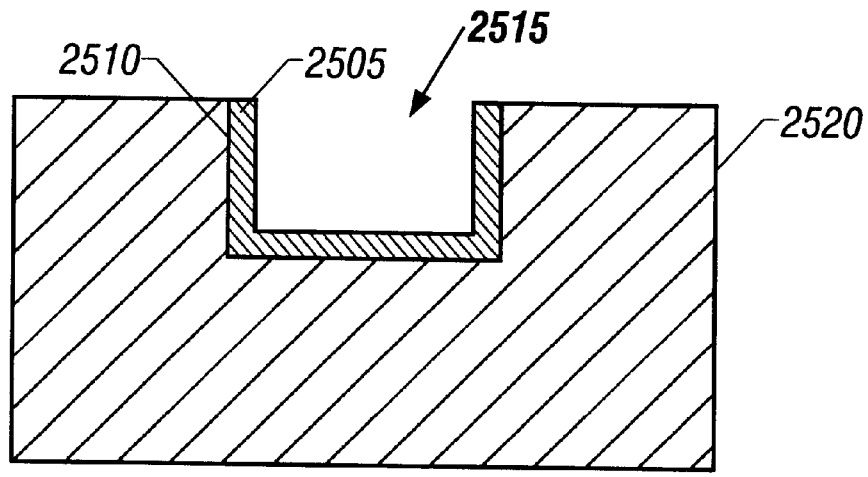

In operational step 3110, as illustrated in drawing FIGS. 25a and 25b, a skim coating of silicone, or some other thermosetting polymer, 2505 is formed on the surface 2510 of a mold cavity 2515 of a mold 2520 for a secondary body. The skim coating of silicone, or some other thermosetting polymer, 2505 may be formed by providing a supply of silicone resin, or some other thermosetting polymer resin, 2525 that is injected onto the surface of the mold cavity 2515 by an injector 2530.

The supply of silicone resin, or some other thermosetting polymer resin, 2525 is preferably formed using a color block 2535 that injects a pigment into a supply of materials A and B that are pumped to the color block 2535 by pumps A and B, 2540 and 2545. In an alternative embodiment, and more generally, for a thermosetting polymer, materials A, B, . . . C, D, E . . . etc . . . may be mixed in the color block 2535 with a pigment to form a colored thermosetting polymer. In a particularly preferred embodiment, the operation, design and control of the injector 2530, color block 2535, and pumps 2540 and 2545 are substantially as described above for the apparatus 10. The color block 2535 may inject a pigment to provide a colored silicone resin for subsequent injection and encapsulation of the element 2335. In an alternative preferred embodiment, a substantially transparent silicone resin, or some other thermosetting polymer resin, is injected into the secondary body mold cavity 2515 to facilitate subsequent viewing of the encapsulated element 2335.

The skim coating 2505 may be formed by applying a substantially uniform thin coating of silicone resin, or some other thermosetting polymer resin, onto the surface 2510 of the mold cavity 2515. In a preferred embodiment, the skim coating 2505 is formed by applying a substantially uniform coating of silicone resin, or some other thermosetting polymer resin, onto the surface 2510 of the mold cavity 2515 ranging in thickness from about 0.50 to 2 millimeters. The skim coating 2505 of silicone resin, or some other thermosetting polymer resin, may then be cured in a conventional manner using a combination of time and temperature. In a preferred embodiment, the skim coating 2505 of silicone resin is cured for about 3 minutes at a temperature of about 75° F. Alternatively, more generally, the preferred time and temperature for curing will vary as a function of the particular thermosetting polymer.

Figure 26:
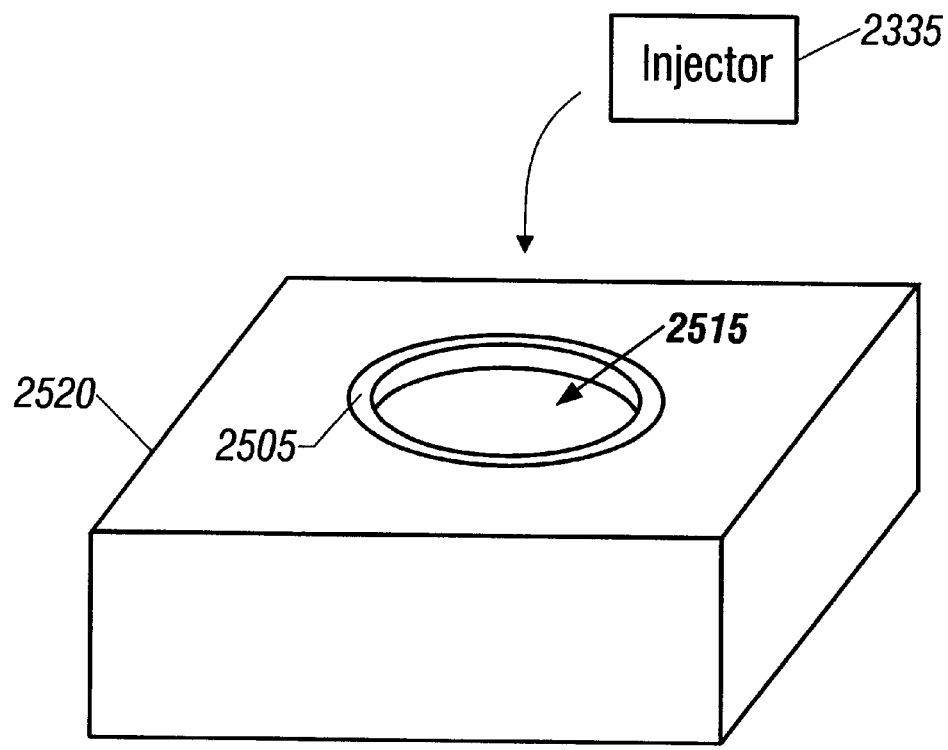
FIG. 26a is an illustration of the insertion of an element device into the cavity of the mold coated with the skim coating of FIGS. 25a and 25b.

In operational step 3115, as illustrated in drawing FIG. 26*a*, the element 2335 is placed into the mold cavity 2515 onto the skim coating 2505 of silicone, or some other thermosetting polymer. In a preferred embodiment, the outer surface of the element 2335 is throughly cleaned of substantially all foreign material and dried prior to placement within the mold cavity 2515 to facilitate the subsequent encapsulation process. In a particularly preferred embodiment, the element 2335 is placed in the approximate center of the mold cavity 2515 to facilitate the subsequent encapsulation process.

Figure 27A:
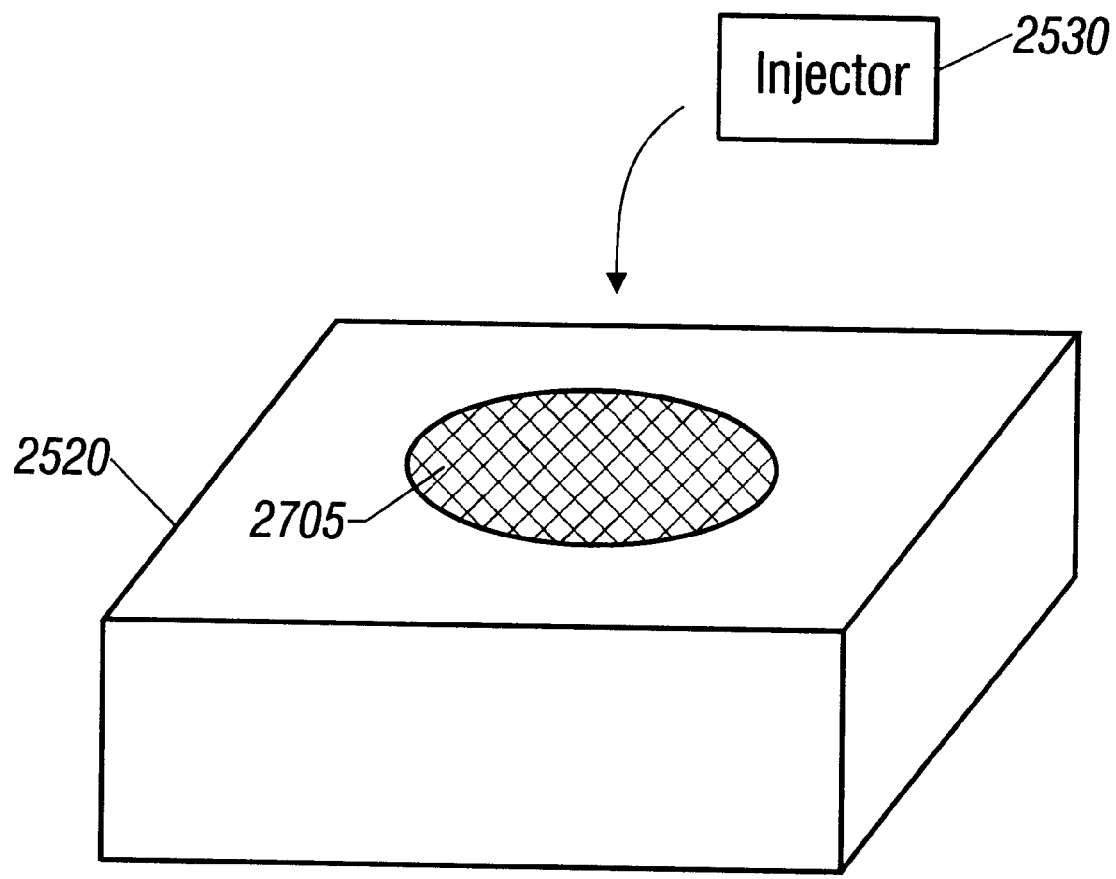
FIG. 27a is an illustration of the injection of silicone resin into the cavity including the element and skim coating of FIG. 26a to form a secondary body of silicone, or some other thermosetting polymer, including an encapsulated element.

In operational step 3120, as illustrated in drawing FIG. 27*a*, the element 2335 is encapsulated with silicone resin, or some other thermosetting polymer resin, within the mold cavity 2515 to form a secondary body 2705 having an encapsulated element. The element 2335 may be encapsulated within the secondary body by injecting a controlled quantity of silicone resin, or some other thermosetting polymer resin, into the mold cavity 2515 using the injector 2530.

In operational step 3125, the secondary body 2705 including the encapsulated element 2335 is cured within the mold cavity 2515 in a known manner using a combination of time and temperature. In a preferred embodiment, the secondary body 2705 is cured within the mold cavity for a time period ranging from about 15 to 50 seconds at temperatures ranging from about 200 to 500° F. in order to prevent thermal damage to the encapsulated element 2335. For clear silicone, curing at room temperature is effected in about 2 to 4 minutes.

Figure 28A:
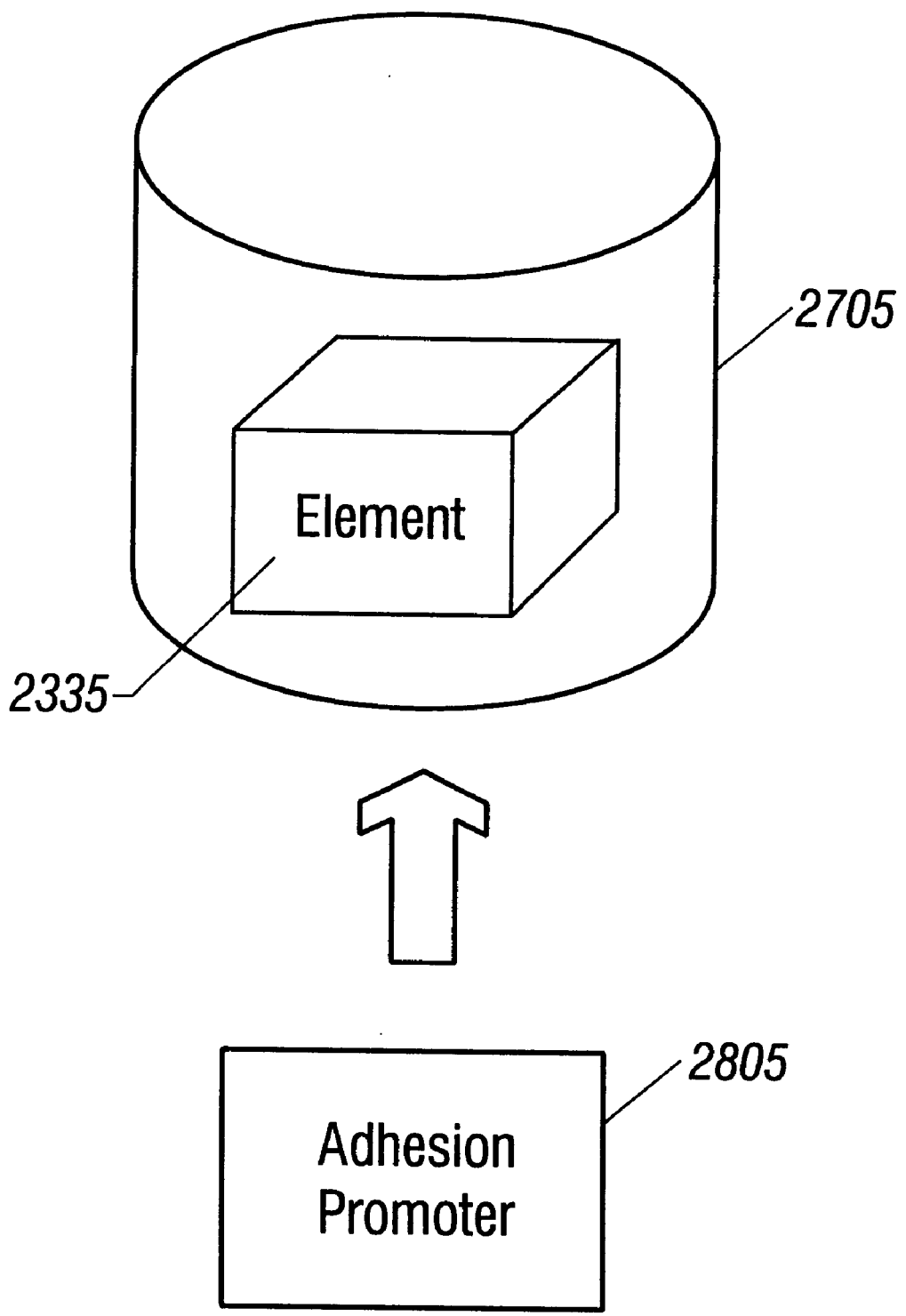

In operational step 3130, as illustrated in drawing FIG. 28*a*, the secondary body 2705 is removed from the mold cavity 2515 and an adhesion promoter 2805 is applied to an outer surface of the secondary body 2705 that will contact the surfaces of the cavity 2405 formed in the primary silicone, or some other thermosetting polymer, body 2310. The adhesion promoter 2805 may be applied in a substantially uniform coating over the outer surface of the secondary body 2705 that will contact the surfaces of the cavity 2405 formed in the primary body 2310. In a preferred embodiment, a substantially uniform coating ranging in thickness from about 0.040 to 0.125 inches is applied over the outer surface of the secondary body 2705 that will contact the surfaces of the cavity 2405 formed in the primary body 2310. The adhesion promoter 2805 may comprise any number of conventional commercially available adhesion promoters for silicone, or other thermosetting polymers, materials. In a preferred embodiment, the adhesion promoter 2805 is optimized for silicone materials and is a part no. AP 546 available from General Electric, Silicone Products Division in Waterford, N.Y.

Figure 29A:
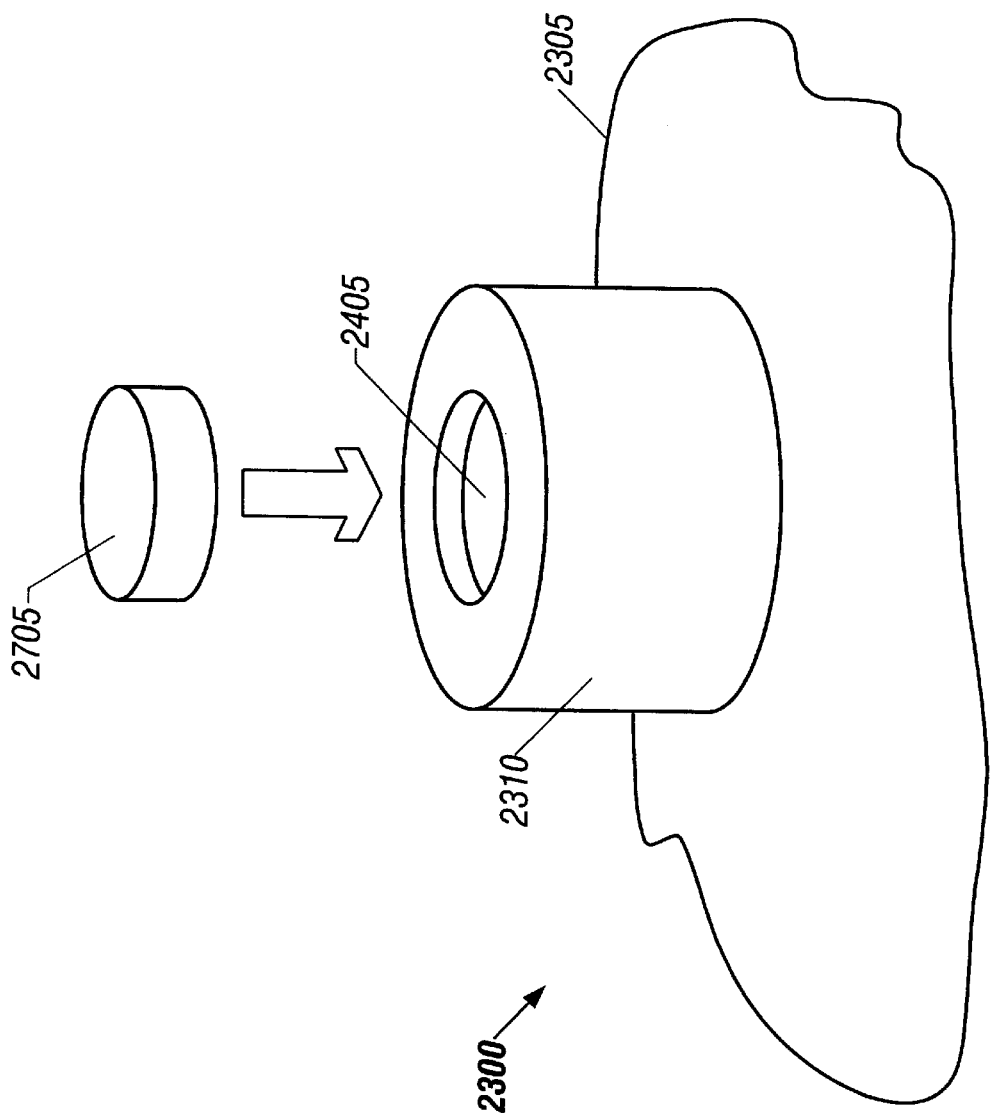
FIG. 29a is an illustration of the insertion of the secondary body of FIG. 28a into the cavity of the primary body of FIG. 24.
Figure 30A:
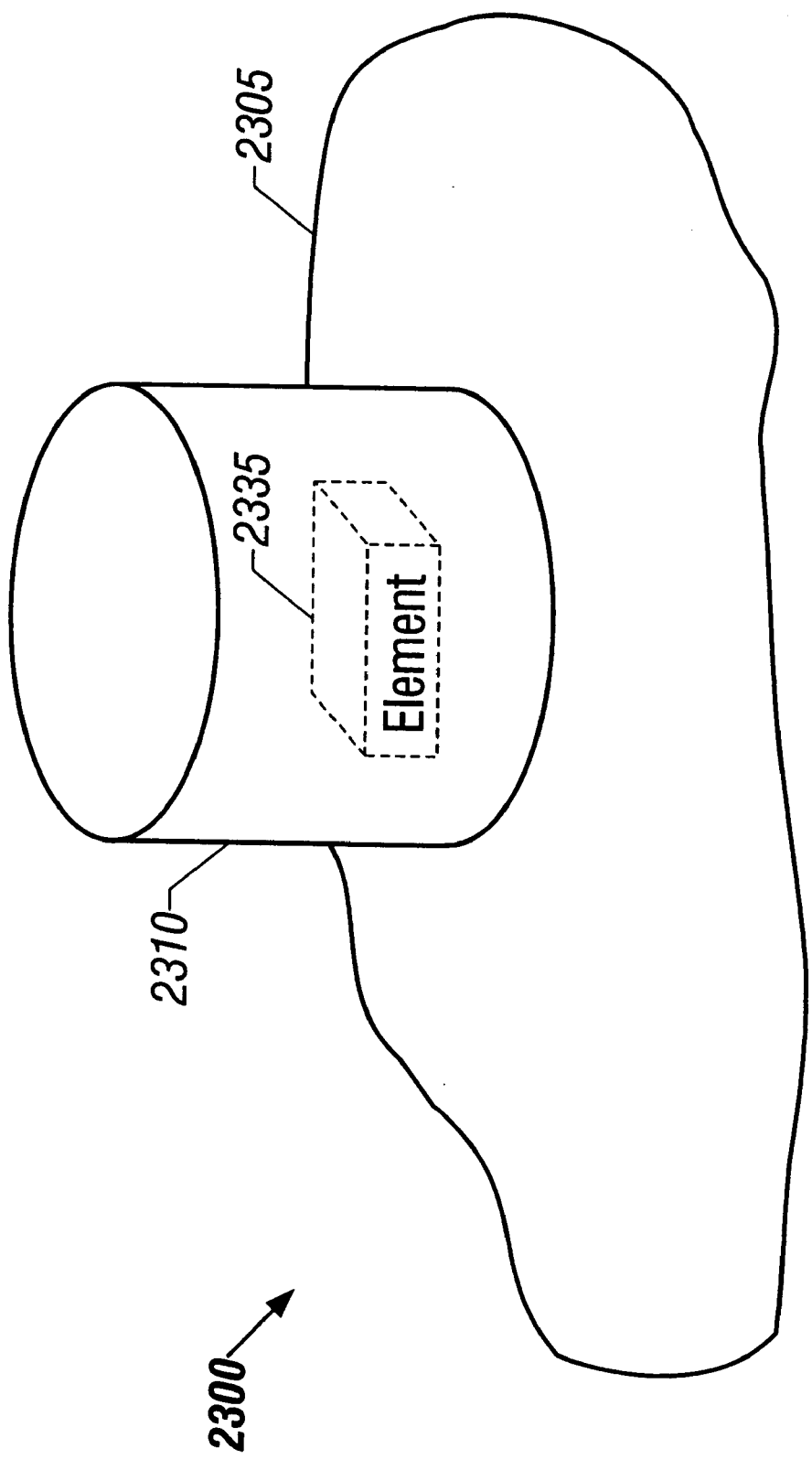
Figure 31A:
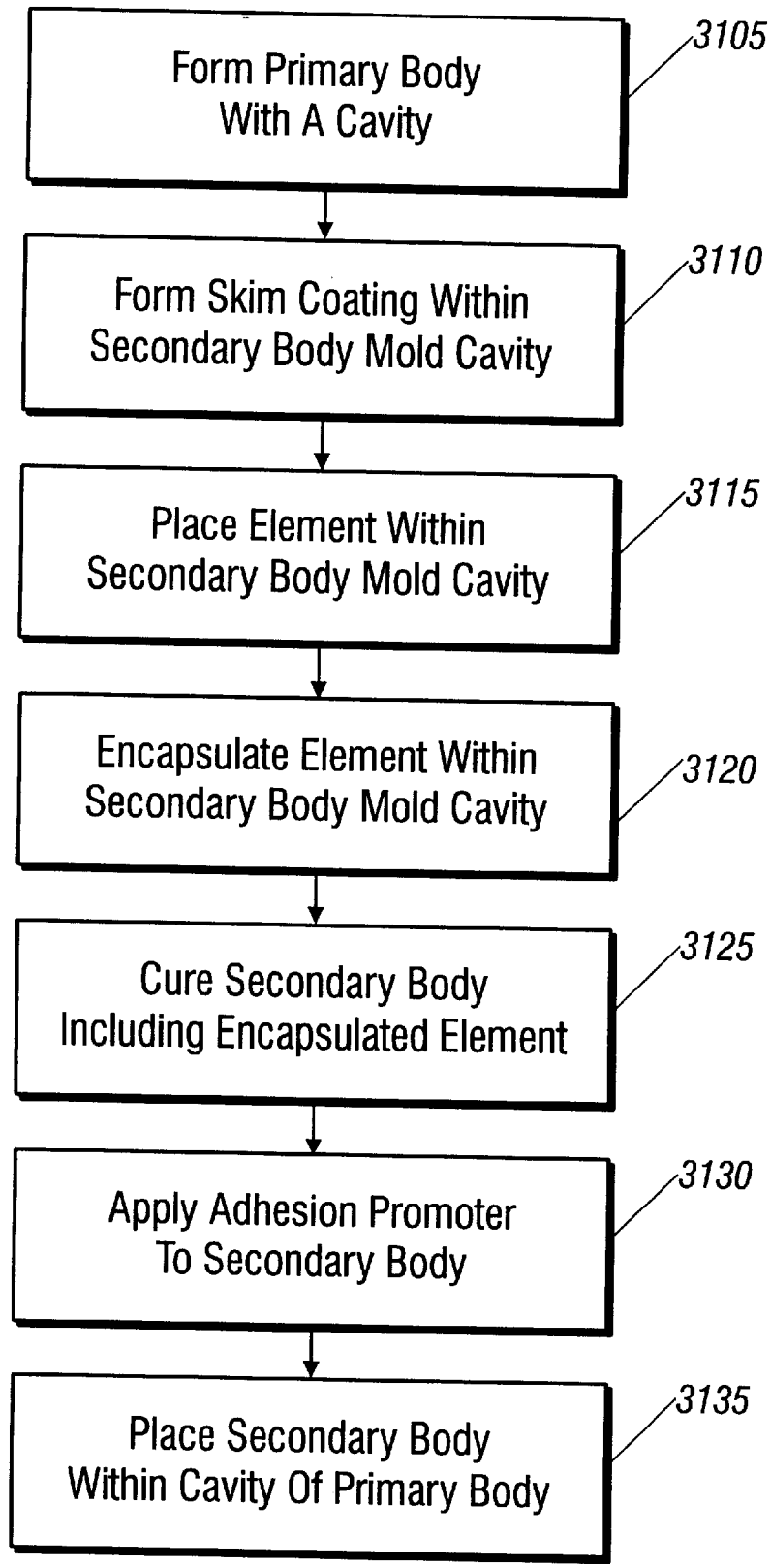
FIG. 31a is an illustration of a preferred method of encapsulating an element within a three dimensional body of silicone, or some other thermosetting polymer.

In operational step 3135, as illustrated in drawing FIGS. 29*a* and 30*a*, the secondary body 2705 is placed within the cavity 2405 of the primary body 2310. The secondary body 2705 is then allowed to bond to the primary body 2310. The resulting three dimensional body of silicone, or some other thermosetting polymer, 2310 includes an encapsulated element 2335 that is itself encapsulated within a secondary body 2705. The primary and secondary bodies 2310 and 2705 may or may not be comprised of the same color of silicone, or some other thermosetting polymer. In a preferred embodiment, the primary body 2310 is comprised of a colored silicone and the secondary body 2705 is comprised of a substantially clear silicone to facilitate the viewing of the encapsulated element by a person.

Figure 32A:
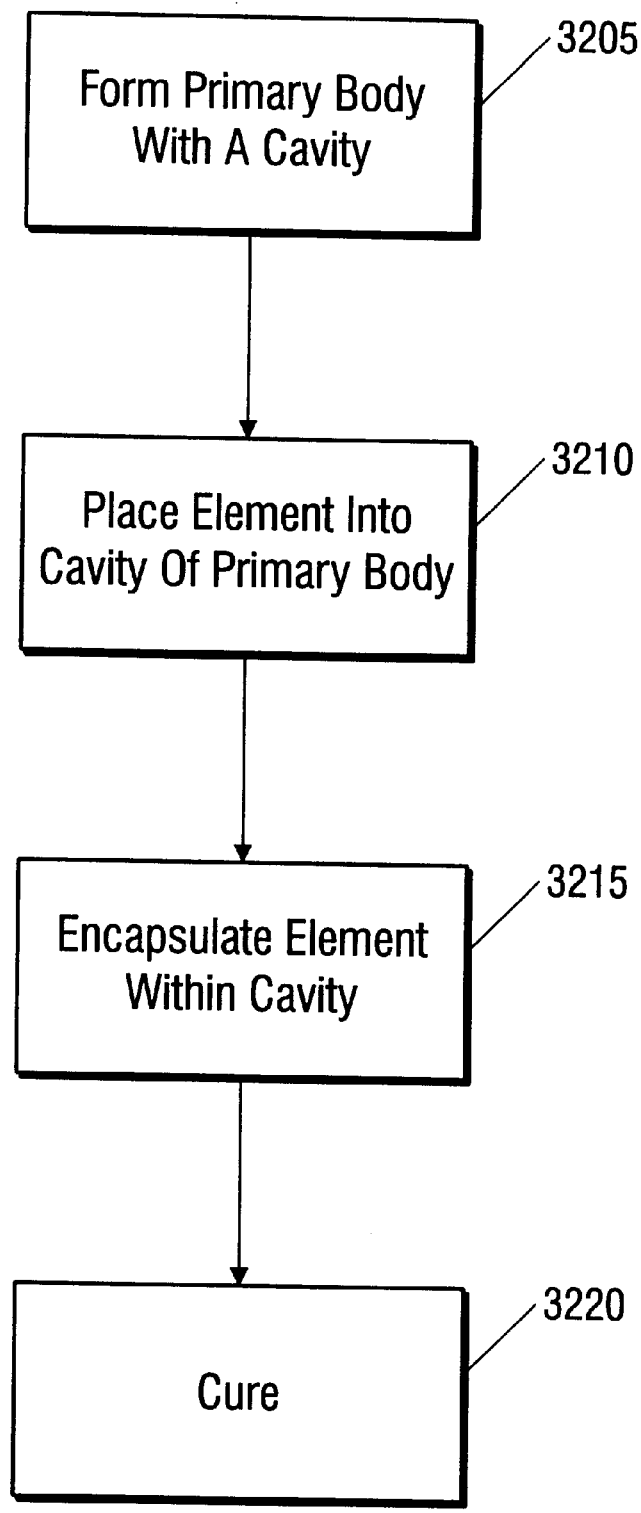
FIG. 32a is an illustration of an alternative preferred method of encapsulating an element within a three dimensional body of silicone, or some other thermosetting polymer.

In an alternative preferred embodiment, as illustrated in drawing FIG. 32*a*, a method for fabricating an article of clothing 2300 including at least one three dimensional body of silicone, or some other thermosetting polymer, 2310 having at least one encapsulated element 2335 includes the operational steps of: forming a primary body of silicone, or some other thermosetting polymer, including at least one cavity 3205, placing the element to be encapsulated into the cavity of the primary body 3210, encapsulating the element in silicone, or some other thermosetting polymer, within the primary body cavity 3215, and curing the primary body of silicone, or some other thermosetting polymer, including the encapsulated element 3220.

In the alternative preferred embodiment illustrated in drawing FIG. 32*a*, the curing time and temperature required to encapsulate the element 2335 within the cavity 2405 of the primary body of silicone, or some other thermosetting polymer, 2310 are adjusted to prevent damage to the preexisting primary body of silicone, or some other thermosetting polymer, 2310. In a particularly preferred embodiment, the curing time is lengthened and the curing temperature are lowered.

Figure 33A:
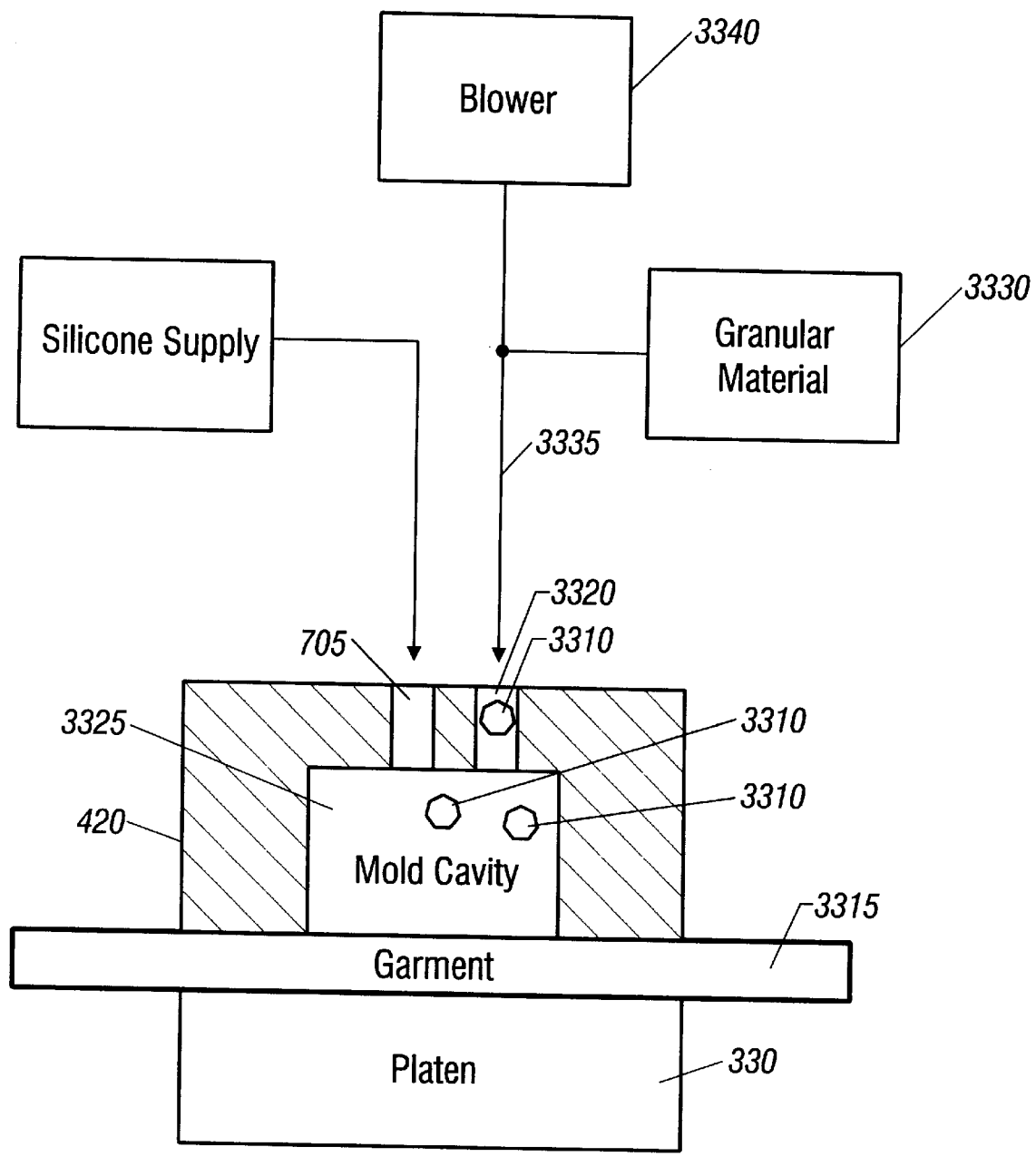
FIG. 33a is an illustration of an alternative preferred method of encapsulating an element within a three dimensional body of silicone, or some other thermosetting polymer.
Figure 33B:
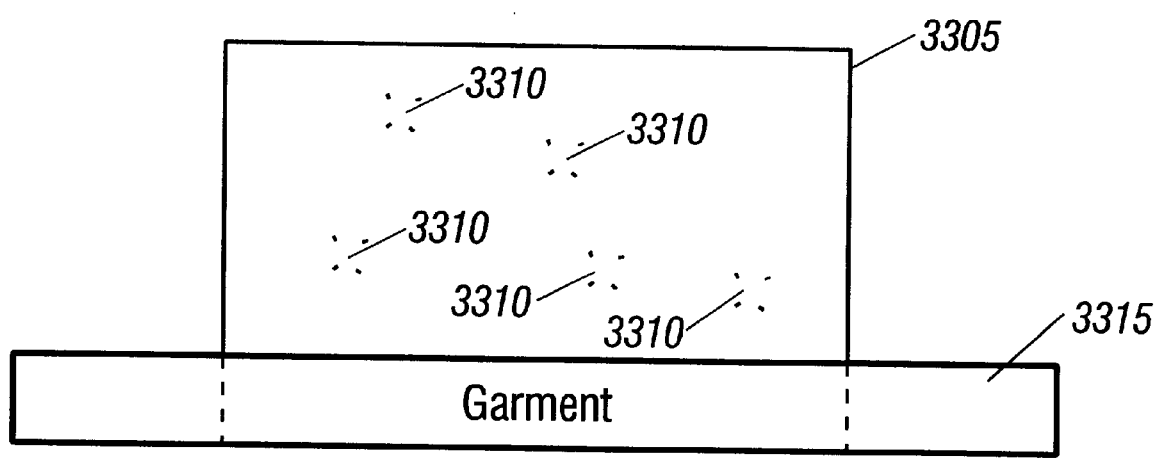

In another alternative embodiment, as illustrated in drawing FIGS. 33*a*–33*b*, a three dimensional body of silicone, or some other thermosetting polymer, 3305 including encapsulated elements 3310 may be formed upon a substrate 3315, such an article of clothing, by introducing the encapsulated elements during the molding process. The elements 3310 may be provided by provided by providing an additional inlet 3320 for the mold cavity 3325 to permit the introduction of the elements 3310. In a preferred embodiment, the elements 3310 are introduced into the inlet 3320 by feed a supply of elements 3330 into a flow path 3335 of a blower 3340, or other similar device that is coupled to the inlet 3320. In this manner, the elements 3310 may be encapsulated simultaneously with the molding of the three dimensional body 3305 onto the article of clothing 3315. In a particularly preferred embodiment, the molding of the three dimensional body 3305 is otherwise provided using the apparatus and methods described above.

A method and apparatus for molding three dimensional bodies of silicone, or some other thermosetting polymer, onto articles of clothing, or other substrates, has been described. The method and apparatus further permits a plurality of three dimensional bodies of silicone, or some other thermosetting polymer, that are of a plurality of colors onto an article of clothing, or other substrates. The method and apparatus further permits a plurality of such three dimensional bodies to be molded onto a plurality of substrates substantially simultaneously. The method and apparatus may be generally applied to the molding of three dimensional bodies of thermosetting polymers onto substrates. The method and apparatus may be further applied to form a plurality of three dimensional bodies of a plurality of types of thermosetting polymers onto substrates.

A molding device has been described for molding three dimensional bodies of silicone, or some other thermosetting polymer, onto an article of clothing, or some other substrate. The molding device permits at least one three dimensional body of silicone, or some other thermosetting polymer, to be molded onto an article of clothing, or some other substrate. More generally, the molding device may be used to mold any thermosetting polymer onto a substrate. More generally still, the molding device may be used to mold a plurality of different types of thermosetting polymers onto a substrate. The molding device may be adapted to incorporate a number of elements to minimize the curing and/or dripping of silicone resin, or other thermosetting polymer resins, within the die set of the molding device. The molding device may be generally applied to the molding of three dimensional bodies of thermosetting polymers onto substrates.

A die set has been described that provides an input member, thermal isolation, and a mold for use in a molding device. The die set may be utilized to mold and cure three dimensional bodies of silicone, or other thermosetting polymers, onto substrates.

A silicone resin supply has been described that provides a plurality of supplies of silicone resin, or some other thermosetting polymer resin, for subsequent injection into at least one molding device.

A method and apparatus for encapsulating elements within three dimensional bodies of silicone, or some other thermosetting polymer, has been described that permits at least one element to be encapsulated into a three dimensional body of silicone, or some other thermosetting polymer.

The method and apparatus described herein may be used to create articles of clothing, or some other substrate, having at least one three dimensional body of silicone, or some other thermosetting polymer. The method and apparatus described herein may further be used to create articles of clothing, or some other substrate, having at least one three dimensional body of silicone, or some other thermosetting polymer, that further includes at least one encapsulated element.

While described in the form of preferred embodiments for molding three dimensional bodies of silicone, with and without encapsulated elements, the teachings of the present disclosure will find broad application to molding three dimensional bodies of thermosetting polymers, with and without encapsulated elements, onto substrates generally.

What is claimed is:

1. A die set for use in a molding device for molding at least one three dimensional body of a thermosetting polymer onto at least one substrate, comprising:
    an input member adapted to receive and distribute at least one supply of said polymer;
    a mold including at least one cavity coupled to said input member and adapted to receive said distribution of said at least one supply of said polymer and mold at least one of said at least one three dimensional body of said polymer onto said at least one substrate; and
    at least one resilient member coupled between said input member and said mold.

2. The die set of claim 1, wherein said input member is adapted to receive and distribute a plurality of supplies of said polymer, and said mold includes a plurality of cavities and is adapted to receive said distribution of said plurality of supplies of said polymer and mold said plurality of supplies of said polymer onto said at least one substrate to form a plurality of three dimensional bodies of said polymer.

3. The die set of claim 1, wherein said die set further includes a thermal insulating plate coupled between said input member and said mold.

4. The die set of claim 1, wherein said die set further includes at least one thermal isolation element coupled between said input member and said mold.

5. The die set of claim 1, wherein said input member includes a cooling element adapted to maintain a temperature of said input member within a predetermined range of temperatures.

6. The die set of claim 1, wherein said input member includes at least one flow control valve adapted to controllably couple said input member to one of said at least one supplies of said polymer.

7. The die set of claim 6, wherein said flow control valve is a rotary valve.

8. The die set of claim 1, wherein said input member includes at least one selection valve adapted to controllably couple said input member to either one of said at least one supplies of said polymer or a pressure sink.

9. The die set of claim 1, wherein said input member includes at least one selection valve adapted to controllably couple said input member to a vacuum source.

10. The die set of claim 1, wherein said input member includes at least one nozzle adapted to cooperatively interact with and distribute said at least one supply of said polymer to said mold.

11. The die set of claim 10, wherein said at least one nozzle includes a thermal insulating member.

12. The die set of claim 1, wherein said mold includes a heating member adapted to controllably maintain a temperature of said mold within a predetermined range of temperatures.

13. The die set of claim 1, wherein each mold cavity is at least partially defined by a portion extending outward from said mold.

14. The die set of claim 1, wherein said input member comprises:
    a manifold adapted to receive said at least one supply of said polymer; and
    a runner plate coupled to said manifold and adapted to distribute said at least one supply of said polymer.

15. The die set of claim 1, wherein said at least one supply of polymer comprises a supply of a first polymer and a supply of a second polymer.

16. The die set of claim 1, wherein said die set is adapted to mold a plurality of three dimensional bodies of thermosetting polymer onto a plurality of substrates substantially simultaneously.

17. The die set of claim 1, wherein said die set is adapted to mold a plurality of three dimensional bodies of thermosetting polymer onto a substrate using a plurality of different types of thermosetting polymers.

18. A method for molding at least one three dimensional body of a thermosetting polymer onto at least one substrate using a die set in a molding device, comprising:
    adapting an input member of said die set to receive and distribute at least one supply of said polymer;
    coupling a mold of said die set including at least one cavity to said input member;
    adapting said mold to receive said distribution of said at least one supply of said polymer for molding at least one of said at least one three dimensional body of said polymer onto said at least one substrate;

coupling at least one resilient member between said input member and said mold;

positioning said at least one substrate on said surface;

injecting a controlled amount of said supply of said polymer into said cavity of said mold to form said at least one three dimensional body of said polymer; and curing said at least one three dimensional body of said polymer on said substrate.

19. The method of claim 18, further comprising:

adapting said input member to receive and distribute a plurality of supplies of said polymer; and adapting said mold to receive said distribution of said plurality of supplies of said polymer, wherein said mold includes a plurality of cavities for molding said plurality of supplies of said polymer onto said at least one substrate to form a plurality of three dimensional bodies of said polymer.

20. The method of claim 18, further comprising:

coupling at least one thermal isolation element between said input member and said mold.

21. The method of claim 18, further comprising:

adapting a cooling element to maintain a temperature of said input member within a predetermined range of temperatures.

22. The method of claim 18, further comprising: adapting a heating member to controllably maintain a temperature of said mold within a predetermined range of temperatures.

23. The method of claim 18, further comprising:

adapting a manifold of said input member to receive said at least one supply of said polymer;

coupling a runner plate of said input member to said manifold; and adapting said runner plate to distribute said at least one supply of said polymer.

* * * * *